(12) United States Patent
Reihani

(10) Patent No.: US 7,218,782 B1
(45) Date of Patent: May 15, 2007

(54) SYSTEM AND METHOD FOR AUTOMATED SYMBOLIC RECOGNITION INCLUDING MULTI-PHASE SYMBOLIC RESHAPING

(76) Inventor: Kamran Reihani, 2600 Sandigale Dr., Las Cruces, NM (US) 88011

( * ) Notice: Subject to any disclaimer, the term of this patent is extended or adjusted under 35 U.S.C. 154(b) by 677 days.

(21) Appl. No.: 10/419,480

(22) Filed: Apr. 18, 2003

(51) Int. Cl.
*G06K 9/18* (2006.01)
*G06K 9/34* (2006.01)
*G06K 9/62* (2006.01)

(52) U.S. Cl. ............... 382/186; 382/177; 382/224
(58) Field of Classification Search ........... 382/198, 382/185, 186
See application file for complete search history.

(56) References Cited

U.S. PATENT DOCUMENTS

| | | | |
|---|---|---|---|
| 4,277,775 A * | 7/1981 | Nally et al. | 382/207 |
| 4,491,960 A | 1/1985 | Brown | |
| 4,641,354 A | 2/1987 | Fukunaga et al. | |
| 4,972,496 A | 11/1990 | Sklarew | |
| 5,010,579 A | 4/1991 | Yoshida et al. | |
| 5,058,182 A * | 10/1991 | Kuan et al. | 382/202 |
| 5,592,566 A | 1/1997 | Pagallo et al. | |
| 5,675,665 A | 10/1997 | Lyon | |
| 5,796,867 A * | 8/1998 | Chen et al. | 382/187 |
| 5,812,697 A * | 9/1998 | Sakai et al. | 382/186 |
| 5,812,698 A | 9/1998 | Platt et al. | |
| 5,903,668 A | 5/1999 | Beernink | |
| 5,970,170 A | 10/1999 | Kadashevich et al. | |
| 6,005,973 A | 12/1999 | Seybold et al. | |
| 6,018,736 A | 1/2000 | Gilai et al. | |
| 6,108,444 A | 8/2000 | Syeda et al. | |
| 6,144,764 A | 11/2000 | Yamakawa et al. | |
| 6,249,604 B1 | 6/2001 | Huttenlocher et al. | |
| 6,275,611 B1 | 8/2001 | Parthasarathy et al. | |
| 6,327,386 B1 | 12/2001 | Mao et al. | |
| 6,366,697 B1 | 4/2002 | Goldberg et al. | |
| 6,571,013 B1 | 5/2003 | Macey et al. | |
| 6,686,907 B2 * | 2/2004 | Su et al. | 345/171 |
| 2002/0051575 A1 * | 5/2002 | Myers et al. | 382/202 |
| 2003/0169924 A1 * | 9/2003 | Nishiyama et al. | 382/182 |

(Continued)

OTHER PUBLICATIONS

R. Plamondon and S. Srihan; "On-Line and Off-Line Handwriting Recognition: A Comprehensive Survey"; *IEEE Trans. On Pattern Analysis and Machine Intelligence*; v. 22, No. 1, Jan. 2000: 63-84.
K. Reihani, "Processing hierarchy for 2-D image structures," Int. J. Computing Systmes in Engineering: vol. 5; No. 1;; pp. 41-54 (1994).

(Continued)

*Primary Examiner*—Joseph Mancuso
*Assistant Examiner*—Kathleen Yuan
(74) *Attorney, Agent, or Firm*—Knnobe Martens Olson & Bear LLP; John Carson

(57) ABSTRACT

An automated symbolic recognition system and method includes a three phase symbolic reshaping scheme during the symbol recognition process that includes: (a) deriving dissimilarity level from alphanumeric ID's net topological variation and the integration of each of its arcpoly structural variation(s) signifying a reasonably accurate confidence level for the goodness of recognition, thus establishing a mechanism that derives dissimilarity level (or cost value) between image and database features including shape, size and topological relationship, (b) determining the reshaping or transformation of an arcpoly to another arcpoly by introducing variations to the original arcpoly to alter its shape and orientation and deriving at each step, the new cost value as a function of variation(s) present and imposed, and (c) determining the equivalent representation of an arcpoly by a succession of smaller and adjoining arcpoly(s) in order, or vice versa.

27 Claims, 144 Drawing Sheets

U.S. PATENT DOCUMENTS

2004/0141646 A1* 7/2004 Mahmoud Fahmy et al. ............................ 382/187
2006/0050962 A1* 3/2006 Geiger et al. ............... 382/186

OTHER PUBLICATIONS

Reihani K. "Symbolic representation, modeling, and manipulation of arcs and lines," *Proc. OE/Technology '92 Intelligent Robotics & Visual Comm. Conf.*, 1827-22, 209-219 (1992).

Reihani, K. and W. Thompson, "Variational concepts for arcs and lines in an expert system environment," *Proc. of World Congress on Expert Systems*, 3, 1784-1791 (1991).

Reihani, K. and W. Thompson, "Robust technique for basic shape recognition," *Proc. AT&T Bell Laboratory's Syntactic & Structural Pattern Recognition Conf.*, 366-376 (1990).

Reihani, K. and W. Thompson, "Contour extraction and smoothing techniques for handwritten character recognition," *Proc. Twentieth Annual Pittsburgh Conf. on Modeling & Simulation*, 561-566 (1989).

Reihani, K. and W. Thompson, "Modeling of handwritten characters," *Proc. Nineteenth Annual Pittsburgh Conf. on Modeling & Simulation*, 2177-2182 (1988).

Reihani, K. "Feature extraction system for handwritten character recognition," *Ph.D. Dissertation New Nexico State University* (Dec. 1987).

Reihani, K. and W. Thompson, "Hierarchical partitioning and contour extraction algorithm," Proc. Twenty-First Annual Pittsburgh Conf. on Modeling & Simulation, 2009-2015 (1990).

* cited by examiner

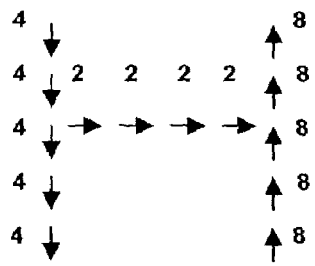
"8-DIRECTION CODES"
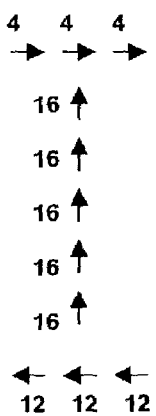
"16 DIRECTION CODES"
FIG. 2

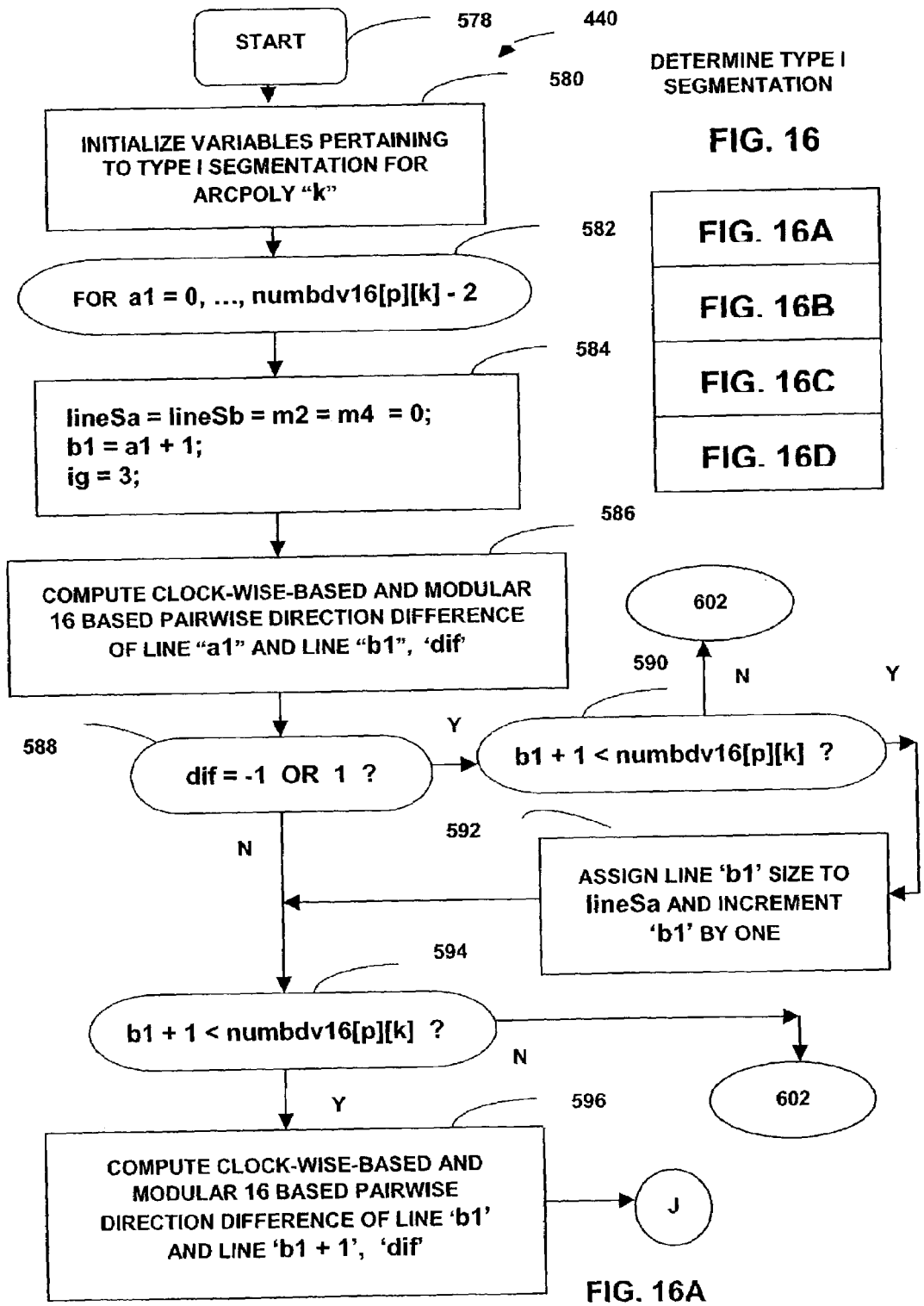

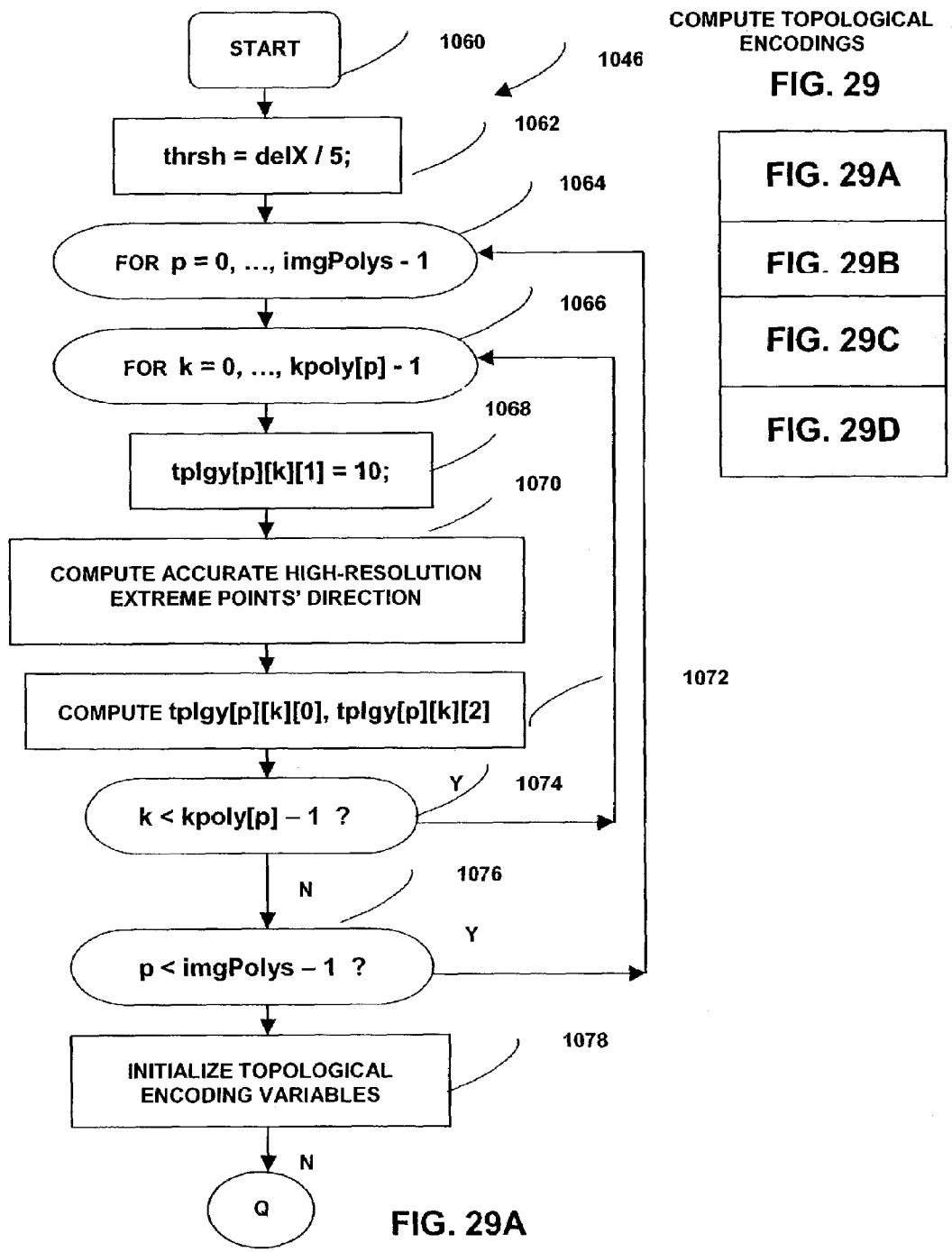

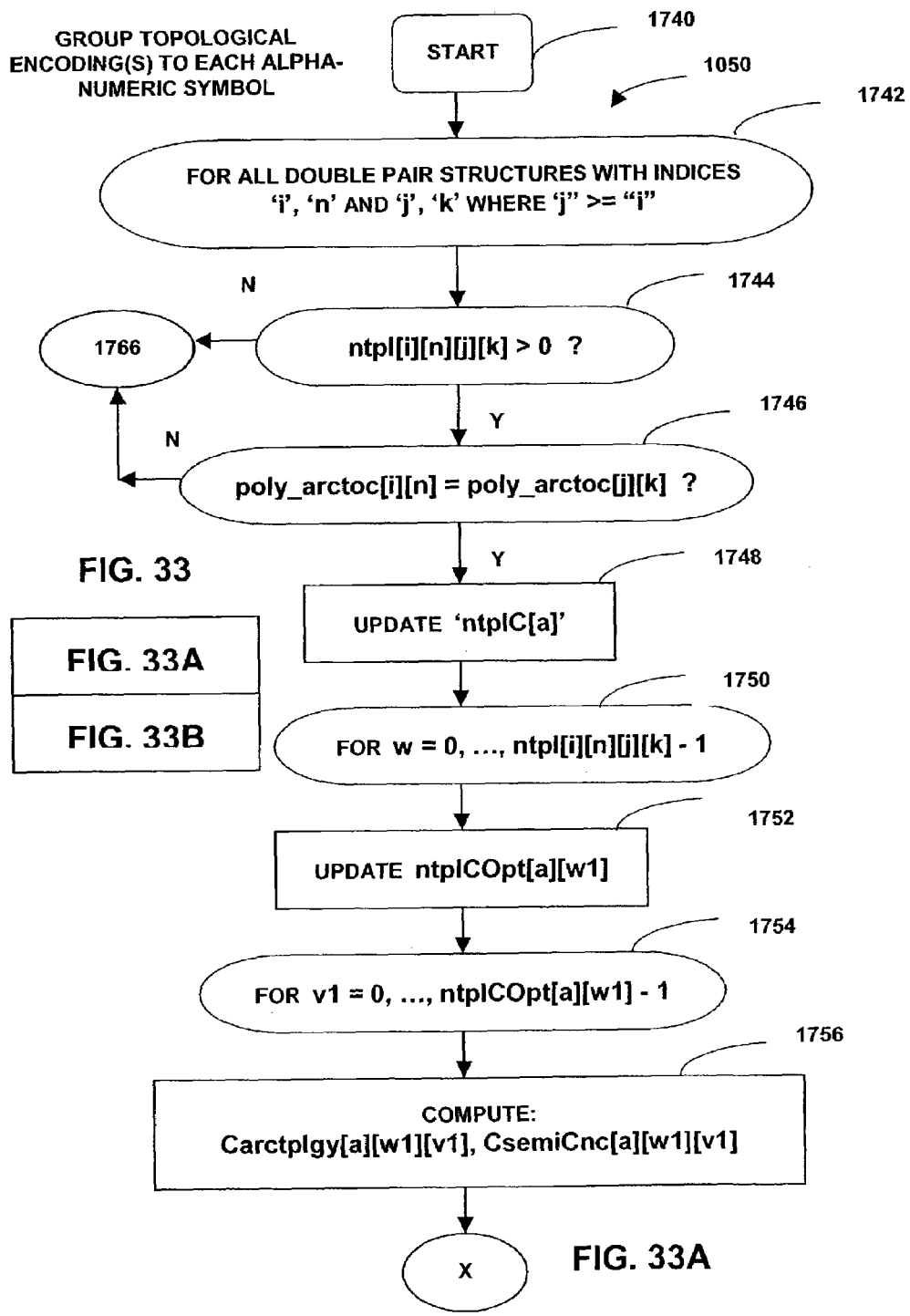

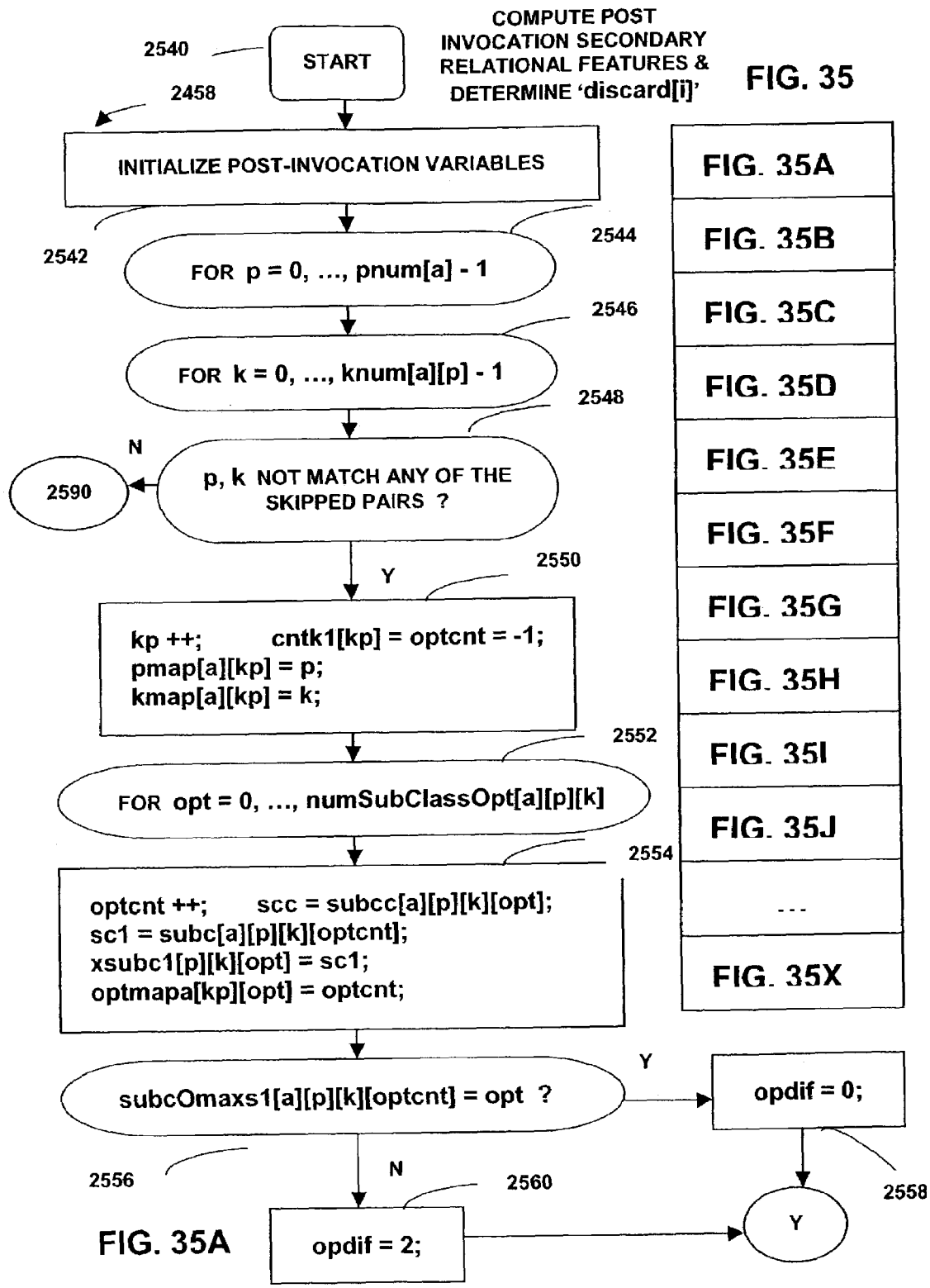

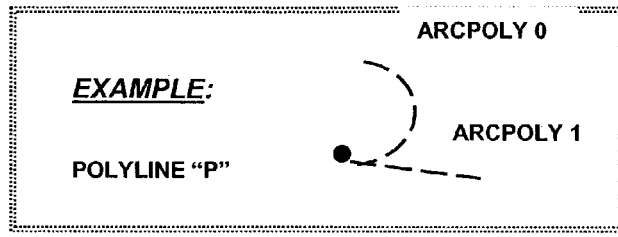

EXAMPLE:

POLYLINE "P"

ARCPOLY 0
ARCPOLY 1

POLYLINE "P", ARCPOLY "K", LINE "l" FEATURES AND DESCRIPTORS:

- kpoly[p],

- xstrt[p][k], ystrt[p][k], xmid[p][k], ymid[p][k], xend[p][k], yend[p][k], lineCnt[p][k], ed[p][k], es[p][k], depdir[p][k], ds[p][k], motion_cw[p][k]

- xL[p][k][l], yL[p][k][l], edl[p][k][l], esl[p][k][l]

BOUNDING BOX: *(EXAMPLE: handwritten alphabet: "v" for polyline "ql")*

(xminpt[ql], ymaxpt[ql])          (xmaxpt[ql], ymaxpt[ql])

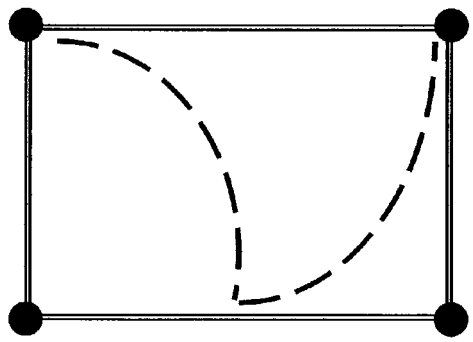

(xminpt[ql], yminpt[ql])          (xmaxpt[ql], yminpt[ql])

FIG. 38

Bounding Box Parameters For Scanning:

COLLECTIVE EVIDENCE DATA BASE:

| tplgy[p][k][0]: | tplgy[p][k][2]: | Connection Code: |
|---|---|---|
| 0 | 0 | 0 |
| 0 | 10 | 1 |
| 0 | 20 | 2 |
| 10 | 0 | 3 |
| 10 | 10 | 4 |
| 10 | 20 | 5 |
| 20 | 0 | 6 |
| 20 | 10 | 7 |
| 20 | 20 | 8 |

EXAMPLE: Compute "dis[j]":
(For j = 1, ..., 9)
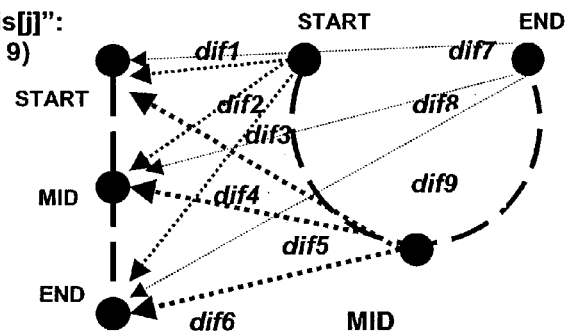
Pair 1 Structure: Polyline "p1", Arcpoly "k1"
Pair 2 Structure: Polyline "p2", Arcpoly "k2"
EXAMPLE: "tTypeql[0][0]", "txHolder[0][0]", "tTypeql[0][1]", "txHolder[0][2]"
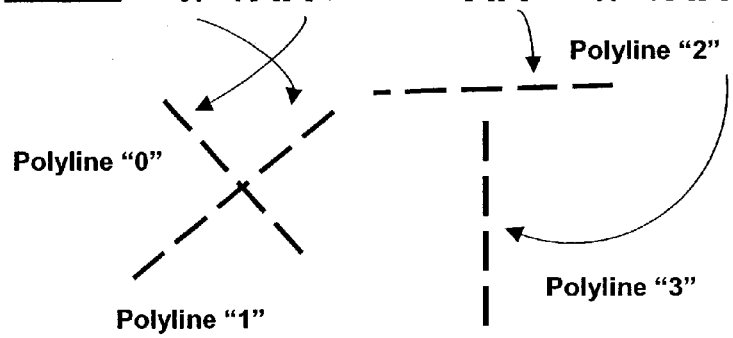
EXAMPLE: Local Minima " ◉ " And Maxima " ● " :
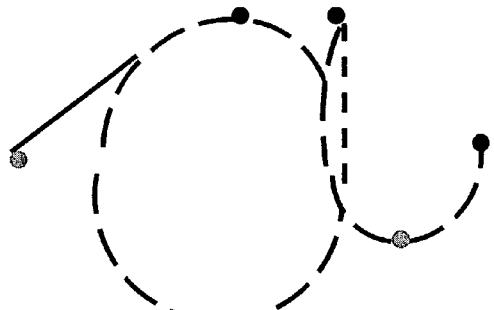
FIG. 41

Secondary Relational Features for Polyline "p", Arcpoly "k", Alpha-Numeric "a":

- Nkpolys[a], kvNum[a][idxc1], NextrUnmtch[a][idxc1], extrInC[a][idxc1], NmissSubcs[a][idxc1], missInC[a][idxc1], TscVL[a][idxc1], tplVL[a][idxc1], topolThrsh[a][idxc1], Copt[a][idxc1],
- vsubcc[a][idxc1][kv], vsubc[a][idxc1][kv], optmapI[a][idxc1][kv], optmapII[a][idxc1][kv], pmap44[a][idxc1][kv], kmap44[a][idxc1][kv], scRotVL[a][idxc1][kv], scVL[a][idxc1][kv],
- pextra[a][idxc1][j], kextra[a][idxc1][j], extrUnmtch[a][idxc1][j], extrInC1[a][idxc1][w],
- missSubcs[a][idxc1][v], missInC1[a][idxc1][u], kpTokv2[a][idxc1][kp].

Where,    idxc1 = idxC[a][Ccnd],
             kv = 0, ..., kvNum[a][idxc1] − 1
             w = extrUnmtch[a][idxc1][j]
             j = 0, ..., NextrUnmtch[a][idxc1] − 1
             v = 0, ..., NmissSubcs[a][idxc1] − 1
             u = 0, ..., nStruc2[Copt[a][idxc1]][idxc1] − 1
             kp = 0, ..., Nkpolys[a] − 1

Moreover, "Ccnd" refers to the candidate "alphabet or number" and "idxc1" refers to the data base index for each modeled "Ccnd"

Definitions: (Per Alpha-Numeric "a" Or / And "idxc1")

Copt[a][idxc1] → data base option index
TscVL[a][idxc1] → total dis-similarity (cost) level
tplVL[a][idxc1] → total topological dis-similarity (cost) level
topolThrsh[a][idxc1] → topological threshold for computing topological dis-similarity (cost) level

FIG. 42A

| | | |
|---|---|---|
| kvNum[a][idxc1] | → | number of image structures matched one-to-one with data base's modeled "idxc1" structures |
| Nkpolys[a] | → | number of image structures |
| NextrUnmtch[a][idxc1] | → | number of image structures without a data base modeled counter-part structure (extra) |
| NmissSubcs[a][idxc1] | → | number of data base modeled structures without image counter-part structures (miss) |
| extrInC[a][idxc1] | → | image without a data base modeled counter-part structure cost level |
| missInC[a][idxc1] | → | data base model without image counter-part structure cost level |
| vsubcc[a][idxc1][kv] | → | "kv"$^{th}$ data base modeled logical symbol |
| vsubc[a][idxc1][kv] | → | "kv"$^{th}$ data base modeled sub-class symbol |
| optmapl[a][idxc1][kv] | → | logical symbol option for primary relational features (i.e., "scc_rotVL" vector) |
| optmapll[a][idxc1][kv] | → | sub-class symbol option for primary relational features (i.e., "delE" vector) |
| pmap44[a][idxc1][kv], kmap44[a][idxc1][kv] | → | "kv"$^{th}$ polyline and arcpoly indices, respectively |
| kpTokv2[a][idxc1][kp] | → | obtains counter part modeled from image structure index |
| scVL[a][idxc1][kv] | → | "kv"$^{th}$ total structural dis-similarity (cost) level |
| scRotVL [a][idxc1][kv] | → | "kv"$^{th}$ total structural dis-similarity (cost) level |
| pextra[a][idxc1][j], kextra[a][idxc1][j] | → | extra polyline and arcpoly indices |
| extrUnmtch[a][idxc1][j] | → | "j"$^{th}$ extra image structure index |
| missSubcs[a][idxc1][v] | → | "v"$^{th}$ miss data base index |
| extrInC1[a][idxc1][w] | → | "w"$^{th}$ extra image structure index's cost level |
| missInC1[a][idxc1][u] | → | "u"$^{th}$ miss structure index's cost level |

FIG. 42B

EXAMPLE: Topological Invocations: *(Evidence-Based Strategy Contd.)*
q = 0:
| x | a | o |
|---|---|---|
| Y |   | = |
| t |   | 5 |
|   |   | ? |
|   |   | + |
q = 1:
| W | D | z |
|---|---|---|
| s | + | t |
| o | K |   |
| L |   |   |
| 5 |   |   |
q = 2:
| q | N |
|---|---|
| p | ; |
|   | ] |
|   | } |
q = 3:
| o | A |
|---|---|
| O |   |
| G |   |
q = 4:
| v |
|---|
| J |
| u |
| T |
| o |
q = 5:
| s | y | u |
|---|---|---|
| 7 | = | 4 |
|   | o |   |
q = 6:
| o | Q | R |
|---|---|---|
| H |   | i |
NOTE: $q = 0, ..., ntplC[a] - 1$ where, $ntplC[a] = 7$;
Alpha-Numeric Invocations, *i.e.* 
per "q" and "q1" 
$q1 = 0, ..., ntplCOpt[q] - 1$
FIG. 44

Assimilated Polyline "p", Arcpoly "k" Features and Descriptors of Alpha-Numeric "a":

- pnum[a] → number of polylines
- knum[a][p] → number of arcpolys per polyline 'p'
- xstrtc[a][p][k], ystrtc[a][p][k] → start point location per polyline 'p', arcpoly 'k'
- xmidc[a][p][k], ymidc[a][p][k] → mid point location per polyline 'p', arcpoly 'k'
- xendc[a][p][k], yendc[a][p][k] → last point location per polyline 'p', arcpoly 'k'
- lineCntc[a][p][k] → number of lines per polyline 'p', arcpoly 'k'
- edc[a][p][k] → extreme points' direction per polyline 'p', arcpoly 'k'
- esNormc[a][p][k] → normalized extreme points' size per polyline 'p', arcpoly 'k'
- depdirc[a][p][k] → depth direction per polyline 'p', arcpoly 'k'
- dsNormc[a][p][k] → normalized depth size per polyline 'p', arcpoly 'k'
- motion_cw[a][p][k] → boolean value clock-wise state per polyline 'p', arcpoly 'k'
- xLc[a][p][k][l], yLc[a][p][k][l] → last point per line index 'l' and polyline 'p', arcpoly 'k'
- edlc[a][p][k][l] → line direction per line index 'l', polyline 'p', arcpoly 'k'
- eslNormc[a][p][k][l] → normalized line size per line index 'l', polyline 'p', arcpoly 'k'

FIG. 45

Condition "op":

kp = 0 & kp != skipKp[idxc1][op]    'OR':

kp > 0 & op = option2[kp – 1] & kp != skipKp[idxc1][op] & vnum[op] > 0 'OR':

kp > 0 & vnum[op] = 0   'OR':

kp != skipKp[idxc1][op] & skipKp[idxc1][op] != -1

FIG. 46

COLLECTIVE EVIDENCE DATA BASE:

| | |
|---|---|
| Code[0][48 + 0] = 0; | Code[1][48 + 0] = 0; |
| Code[0][48 + 1] = 0; | Code[1][48 + 1] = 10; |
| Code[0][48 + 2] = 0; | Code[1][48 + 2] = 20; |
| Code[0][48 + 3] = 10; | Code[1][48 + 3] = 0; |
| Code[0][48 + 4] = 10; | Code[1][48 + 4] = 10; |
| Code[0][48 + 5] = 10; | Code[1][48 + 5] = 20; |
| Code[0][48 + 6] = 20; | Code[1][48 + 6] = 0; |
| Code[0][48 + 7] = 20; | Code[1][48 + 7] = 10; |
| Code[0][48 + 8] = 20; | Code[1][48 + 8] = 20; | codeCnc = Code[v][g];  Where, v = 0, Or 1 And g = 0, 1, ..., Or 8

FIG. 47

COLLECTIVE EVIDENCE DATA BASE:

| | | | |
|---|---|---|---|
| If : | edx = 1 & osubcc = 12 | → | osubcc = 9; |
| If : | edx = 1 & osubcc = 9 | → | osubcc = 12; |
| If : | edx = 3 & osubcc = 9 | → | osubcc = 10; |
| If : | edx = 3 & osubcc = 10 | → | osubcc = 9; |
| If : | edx = 5 & osubcc = 10 | → | osubcc = 11; |
| If : | edx = 5 & osubcc = 11 | → | osubcc = 10; |
| If : | edx = 7 & osubcc = 11 | → | osubcc = 12; |
| If : | edx = 7 & osubcc = 12 | → | osubcc = 11; |
| If : | edx = 9 & osubcc = 12 | → | osubcc = 9; |
| If : | edx = 9 & osubcc = 9 | → | osubcc = 12; |
| If : | edx = 11 & osubcc = 10 | → | osubcc = 9; |
| If : | edx = 11 & osubcc = 9 | → | osubcc = 10; |
| If : | edx = 13 & osubcc = 10 | → | osubcc = 11; |
| If : | edx = 13 & osubcc = 11 | → | osubcc = 10; |
| If : | edx = 15 & osubcc = 11 | → | osubcc = 12; |
| If : | edx = 15 & osubcc = 12 | → | osubcc = 11; |

FIG. 48

COLLECTIVE EVIDENCE DATA BASE:

| If: | fromSubcc = 2 | Or | 6 | → | fromSubcc = 12; |
| If: | fromSubcc = 3 | Or | 7 | → | fromSubcc = 9; |
| If: | fromSubcc = 4 | Or | 8 | → | fromSubcc = 10; |
| If: | fromSubcc = 5 | Or | 1 | → | fromSubcc = 11; |

| If: | toSubcc = 2 | Or | 6 | → | toSubcc = 12; |
| If: | toSubcc = 3 | Or | 7 | → | toSubcc = 9; |
| If: | toSubcc = 4 | Or | 8 | → | toSubcc = 10; |
| If: | toSubcc = 5 | Or | 1 | → | toSubcc = 11; |

FIG. 49

EXAMPLE: Reshaping: *Structural, Topological, Combined:*
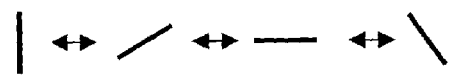
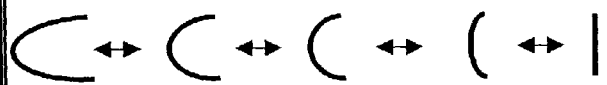
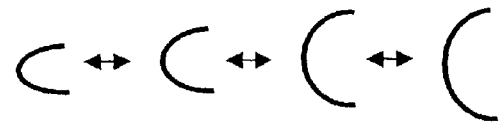
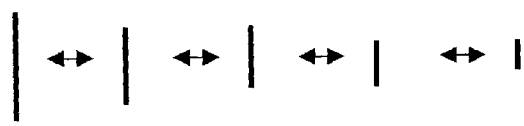
..................................................
..................................................
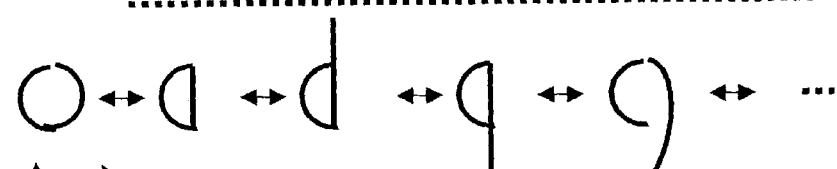
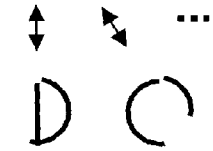
FIG. 50

COLLECTIVE EVIDENCE DATA BASE: *EXAMPLES:*

Establish Extreme Points Topological Code : (*i.e., "D"*):

LINE - TO - LINE DIRECTIONAL SHIFTS :

'0' = 'UR'   '1' = 'DR'   '2' = 'DL'   '3' = 'UL' ptCode[9][0][9] = '2';         ptCode[9][2][9] = '0';
ptCode[10][0][9] = '2';        ptCode[10][2][9] = '0';
ptCode[11][0][9] = '2';        ptCode[11][2][9] = '0';
ptCode[12][0][9] = '2';        ptCode[12][2][9] = '0';
ptCode[9][0][10] = 'L';        ptCode[9][2][10] = 'R';
ptCode[10][0][10] = 'L';       ptCode[10][2][10] = 'R';
ptCode[11][0][10] = 'L';       ptCode[11][2][10] = 'R';
ptCode[12][0][10] = 'L';       ptCode[12][2][10] = 'R';
ptCode[9][0][11] = '3';        ptCode[9][2][11] = '1';
ptCode[10][0][11] = '3';       ptCode[10][2][11] = '1';
ptCode[11][0][11] = '3';       ptCode[11][2][11] = '1';
ptCode[12][0][11] = '1';       ptCode[12][2][11] = '3';
ptCode[9][0][12] = 'D';        ptCode[9][2][12] = 'U';
ptCode[10][0][12] = 'D';       ptCode[10][2][12] = 'U';
ptCode[11][0][12] = 'U';       ptCode[11][2][12] = 'D';
ptCode[12][0][12] = 'D';       ptCode[12][2][12] = 'U';

ARC - TO - ARC DIRECTIONAL SHIFTS :

ptCode[1][0][1] = '3';         ptCode[1][2][1] = '1';
ptCode[2][0][1] = '1';         ptCode[2][2][1] = '3';
ptCode[3][0][1] = '1';         ptCode[3][2][1] = '3';
ptCode[4][0][1] = '1';         ptCode[4][2][1] = '3';
ptCode[5][0][1] = '3';         ptCode[5][2][1] = '1';
ptCode[6][0][1] = '2';         ptCode[6][2][1] = '0';
ptCode[7][0][1] = '2';         ptCode[7][2][1] = '0';
ptCode[8][0][1] = '3';         ptCode[8][2][1] = '1';
ptCode[1][0][2] = 'U';         ptCode[1][2][2] = 'D';
ptCode[2][0][2] = 'D';         ptCode[2][2][2] = 'U';
ptCode[3][0][2] = 'D';         ptCode[3][2][2] = 'U';
ptCode[4][0][2] = 'D';         ptCode[4][2][2] = 'U';
ptCode[5][0][2] = 'D';         ptCode[5][2][2] = 'U';
ptCode[6][0][2] = 'D';         ptCode[6][2][2] = 'U';
ptCode[7][0][2] = 'U';         ptCode[7][2][2] = 'D';

FIG. 51

COLLECTIVE EVIDENCE DATA BASE: Compute "rpt" & "cpt":

*EXAMPLE:* rpt = -1;
cpt = -1;

If: pt = 'U':
    If: y1 > y2  →  rpt = x1;  cpt = y1;
    Else:  →  rpt = x2;  cpt = y2;
If: pt = 'D':
    If: y1 < y2  →  rpt = x1;  cpt = y1;
    Else:  →  rpt = x2;  cpt = y2;
If: pt = 'R':
    If: x1 > x2  →  rpt = x1;  cpt = y1;
    Else:  →  rpt = x2;  cpt = y2;
If: pt = 'L':
    If: x1 < x2  →  rpt = x1;  cpt = y1;
    Else:  →  rpt = x2;  cpt = y2;
If: pt = 'O':
    If: x1 > x2 & y1 > y2  →  rpt = x1;  cpt = y1;
    If: x1 < x2 & y1 < y2  →  rpt = x2;  cpt = y2;

If: rpt = -1 & cpt = -1:
        delx = x1 - x2;
        dely = y1 - y2;

If: delx <= 0 & dely >= 0:
            delx *= -1;
            If: dely > delx:  →  rpt = x1;  cpt = y1;
            Else:  →  rpt = x2;  cpt = y2;

If: delx >= 0 & dely <= 0:
            dely *= -1;
            If: dely < delx  →  rpt = x1;  cpt = y1;
            Else:  →  rpt = x2;  cpt = y2;

FIG. 52

COLLECTIVE EVIDENCE DATA BASE:

*EXAMPLE:* COMPUTE "pt_code"

"fromSubcc" → "toSubcc"

<6>          <5>

When: "codeCnc = 2" → pt_code = ptCode[5][2][6] = 'D';

When: "codeCnc = 0" → pt_code = ptCode[5][0][6] = 'U';

"fromSubcc" → "toSubcc"

<6>          <7>

When: "codeCnc = 2" → pt_code = ptCode[7][2][6] = 'U';

When: "codeCnc = 0" → pt_code = ptCode[7][0][6] = 'D';

FIG. 53

Logical Symbols: (Process 3704)

switch level[a][p][k]:            NOTE: $2^{ND}$ Parameter: "thrsh_lineArc"
(See: FIG. 64)

$8^{TH}$ Parameter: "rota <-> level[a]p][k] = 0, 1, 2, 3, 0r 4":

case 0:
- opt1[a][p][k] = 0;
- Process 3704A : Param.:   a, 0, ds, dd, ed, es, ext, 0, p, k, x1, y1, x2, y2
- Process 3704A : Param.:   a, 1000, ds, dd, ed, es, ext, 0, p, k, x1, y1, x2, y2
- break;

case 1:
- opt1[a][p][k] = numSubClassOpt[a][p][k];
- Process 3704A : Param.:   a, 0, ds, dd, ed, es, ext, 1, p, k, x1, y1, x2, y2
- Process 3704A : Param.:   a, 0, ds, dd, ed, es, ext, -1, p, k, x1, y1, x2, y2
- Process 3704A : Param.:   a, 1000, ds, dd, ed, es, ext, 1, p, k, x1, y1, x2, y2
- Process 3704A : Param.:   a, 1000, ds, dd, ed, es, ext, -1, p, k, x1, y1,x2, y2
- break;

case 2:
- opt1[a][p][k] = numSubClassOpt[a][p][k];
- Process 3704A : Param.:   a, 0, ds, dd, ed, es, ext, 2, p, k, x1, y1, x2, y2
- Process 3704A : Param.:   a, 0, ds, dd, ed, es, ext, -2, p, k, x1, y1, x2, y2
- Process 3704A : Param.:   a, 1000, ds, dd, ed, es, ext, 2, p, k, x1, y1,x2, y2
- Process 3704A : Param.:   a, 1000, ds, dd, ed, es, ext, -2, p, k, x1,y1,x2, y2
- break;

case 3:
- opt1[a][p][k] = numSubClassOpt[a][p][k];
- Process 3704A : Param.:   a, 0, ds, dd, ed, es, ext, 3, p, k, x1, y1, x2, y2
- Process 3704A : Param.:   a, 0, ds, dd, ed, es, ext, -3, p, k, x1, y1, x2, y2
- Process 3704A : Param.:   a, 1000, ds, dd, ed, es, ext, 3, p, k, x1, y1,x2, y2
- Process 3704A : Param.:   a, 1000, ds, dd, ed, es, ext, -3, p, k, x1,y1,x2, y2
- break;

case 4:
- opt1[a][p][k] = numSubClassOpt[a][p][k];
- Process 3704A : Param.:   a, 0, ds, dd, ed, es, ext, 4, p, k, x1, y1, x2, y2
- Process 3704A : Param.:   a, 0, ds, dd, ed, es, ext, -4, p, k, x1, y1, x2, y2
- Process 3704A : Param.:   a, 1000, ds, dd, ed, es, ext, 4, p, k, x1, y1,x2, y2
- Process 3704A : Param.:   a, 1000, ds, dd, ed, es, ext, -4, p, k, x1,y1,x2, y2
- break;

FIG. 54

Remaining Sub-Class Symbols: (Process 3584)

switch level[a][p][k]:          NOTE: 2$^{ND}$ Parameter: "thrsh_lineArc"
(See: FIG. 65)

case 0:
- opt1[a][p][k] = 0;
- Process 3584A : Param.:   a, 0, ds, dd, ed, es, ext, p, k, vsubcc
- Process 3584A : Param.:   a, 1000, ds, dd, ed, es, ext, p, k, vsubcc
- break;

case 1:
- opt1[a][p][k] = numSubClassOpt[a][p][k];
- Process 3584A : Param.:   a, 0, ds, dd, ed, es, ext, p, k,  vsubcc
- Process 3584A : Param.:   a, 1000, ds, dd, ed, es, ext, p, k, vsubcc
- break;

case 2:
- opt1[a][p][k] = numSubClassOpt[a][p][k];
- Process 3584A : Param.:   a, 0, ds, dd, ed, es, ext, p, k, vsubcc
- Process 3584A : Param.:   a, 1000, ds, dd, ed, es, ext, p, k, vsubcc
- break;

case 3:
- opt1[a][p][k] = numSubClassOpt[a][p][k];
- Process 3584A : Param.:   a, 0, ds, dd, ed, es, ext, p, k, vsubcc
- Process 3584A : Param.:   a, 1000, ds, dd, ed, es, ext, p, k, vsubcc
- break;

case 4:
- opt1[a][p][k] = numSubClassOpt[a][p][k];
- Process 3584A : Param.:   a, 0, ds, dd, ed, es, ext, p, k, vsubcc
- Process 3584A : Param.:   a, 1000, ds, dd, ed, es, ext, p, k, vsubcc
- break;

FIG. 55

| Structural & Topological Relations Variance: | Variance (Dissimilarity Level) Cost Value: |
|---|---|
| Extreme Points Size (Unit Change) | $v_{es} = 1;$ |
| Depth Size (Unit Change) | $v_{ds} = 1;$ |
| Extra (Unit Change) (See: FIG. 35) | $v_{plus} = n;$<br>Where, 'n' is the arcpoly normalized size |
| Missing | (See: FIG. 35) |
| Single-Extreme Point Position (Unit Change) | Topological : (See FIG. 29) |
| Single-Extreme Point Extension (Unit Change) | $v_{ext} = 1;$ |
| Rotation (Unit Change) | $v_{rot} = 2 * x * \sin(\gamma / 2);$<br>Where, $x = (360 / 16) * rt;$<br>(see Process 3704A, High-Level Semantics Part III)<br><br>x: Arcpoly Size<br>y: Rotation Variance |

COLLECTIVE EVIDENCE DATA BASE:

FIG. 56

COLLECTIVE EVIDENCE DATA BASE:

| | | | |
|---|---|---|---|
| sc_e[0][0] =-7; | sc_d[0][0] =-7; | sc_x[0][0] =0; | size[0][0] = 9; |
| | | | |
| sc_e[1][0] =-5; | sc_d[1][0] =-5; | sc_x[1][0] =0; | size[1][0] = 11; |
| sc_e[1][1] =0; | sc_d[1][1] =0; | sc_x[1][1] =0; | size[1][1] = 24; |
| sc_e[1][2] =10; | sc_d[1][2] =0; | sc_x[1][2] =0; | size[1][2] = 48; |
| sc_e[1][3] =-5; | sc_d[1][3] =-5; | sc_x[1][3] =1; | size[1][3] = 17; |
| sc_e[1][4] =0; | sc_d[1][4] =5; | sc_x[1][4] =0; | size[1][4] = 34; |
| sc_e[1][5] =10; | sc_d[1][5] =-5; | sc_x[1][5] =0; | size[1][5] = 38; |
| sc_e[1][6] =0; | sc_d[1][6] =-5; | sc_x[1][6] =0; | size[1][6] = 16; |
| | | | |
| sc_e[2][0] =0; | sc_d[2][0] =0; | sc_x[2][0] =0; | size[2][0] = 24; |
| sc_e[2][1] =10; | sc_d[2][1] =0; | sc_x[2][1] =0; | size[2][1] = 48; |
| sc_e[2][2] =0; | sc_d[2][2] =-5; | sc_x[2][2] =0; | size[2][2] = 16; |
| sc_e[2][3] =10; | sc_d[2][3] =-5; | sc_x[2][3] =0; | size[2][3] = 40; |
| sc_e[2][4] =0; | sc_d[2][4] =5; | sc_x[2][4] =0; | size[2][4] = 34; |
| sc_e[2][5] =5; | sc_d[2][5] =0; | sc_x[2][5] =0; | size[2][5] = 43; |
| | | | |
| sc_e[3][0] =-5; | sc_d[3][0] =-5; | sc_x[3][0] =0; | size[3][0] = 11; |
| sc_e[3][1] =0; | sc_d[3][1] =0; | sc_x[3][1] =0; | size[3][1] = 24; |
| sc_e[3][2] =10; | sc_d[3][2] =-3; | sc_x[3][2] =0; | size[3][2] = 48; |
| sc_e[3][3] =0; | sc_d[3][3] =-3; | sc_x[3][3] =0; | size[3][3] = 20; |
| sc_e[3][4] =0; | sc_d[3][4] =-5; | sc_x[3][4] =0; | size[3][4] = 16; |
| sc_e[3][5] =-7; | sc_d[3][5] =-7; | sc_x[3][5] =0; | size[3][5] = 7; |
| sc_e[3][6] =0; | sc_d[3][6] =5; | sc_x[3][6] =0; | size[3][6] = 34; |
| sc_e[3][7] =10; | sc_d[3][7] =-5; | sc_x[3][7] =0; | size[3][7] = 44; |
| | | | |
| sc_e[4][0] =0; | sc_d[4][0] =0; | sc_x[4][0] =0; | size[4][0] = 24; |
| sc_e[4][1] =10; | sc_d[4][1] =0; | sc_x[4][1] =0; | size[4][1] = 48; |
| sc_e[4][2] =-5; | sc_d[4][2] =-5; | sc_x[4][2] =0; | size[4][2] = 11; |
| sc_e[4][3] =0; | sc_d[4][3] =-5; | sc_x[4][3] =0; | size[4][3] = 16; |
| sc_e[4][4] =0; | sc_d[4][4] =5; | sc_x[4][4] =0; | size[4][4] = 34; |
| | | | |
| sc_e[5][0] =0; | sc_d[5][0] =0; | sc_x[5][0] =0; | size[5][0] = 24; |
| sc_e[5][1] =10; | sc_d[5][1] =0; | sc_x[5][1] =0; | size[5][1] = 48; |
| sc_e[5][2] =0; | sc_d[5][2] =-5; | sc_x[5][2] =0; | size[5][2] = 20; |
| sc_e[5][3] =10; | sc_d[5][3] =-5; | sc_x[5][3] =0; | size[5][3] = 40; |
| sc_e[5][4] =-5; | sc_d[5][4] =-7; | sc_x[5][4] =0; | size[5][4] = 9; |
| sc_e[5][5] =0; | sc_d[5][5] =5; | sc_x[5][5] =0; | size[5][5] = 34; |

FIG. 57A

```
sc_e[6][0] =0;      sc_d[6][0] =0;      sc_x[6][0] =2;     size[6][0] = 26;
sc_e[6][1] =0;      sc_d[6][1] =0;      sc_x[6][1] =0;     size[6][1] = 24;
sc_e[6][2] =10;     sc_d[6][2] =0;      sc_x[6][2] =0;     size[6][2] = 48;
sc_e[6][3] =10;     sc_d[6][3] =-5;     sc_x[6][3] =0;     size[6][3] = 40;
sc_e[6][4] =0;      sc_d[6][4] =-5;     sc_x[6][4] =0;     size[6][4] = 16;
sc_e[6][5] =0;      sc_d[6][5] =5;      sc_x[6][5] =0;     size[6][5] = 34;
sc_e[6][6] =-7;     sc_d[6][6] =-7;     sc_x[6][6] =0;     size[6][6] = 7;
sc_e[6][7] =0;      sc_d[6][7] =-7;     sc_x[6][7] =0;     size[6][7] = 14;

sc_e[7][0] =0;      sc_d[7][0] =0;      sc_x[7][0] =0;     size[7][0] = 24;
sc_e[7][1] =-5;     sc_d[7][1] =-7;     sc_x[7][1] =0;     size[7][1] = 12;
sc_e[7][2] =0;      sc_d[7][2] =-5;     sc_x[7][2] =0;     size[7][2] = 16;
sc_e[7][3] =10;     sc_d[7][3] =0;      sc_x[7][3] =0;     size[7][3] = 48;
sc_e[7][4] =0;      sc_d[7][4] =5;      sc_x[7][4] =0;     size[7][4] = 34;
sc_e[7][5] =10;     sc_d[7][5] =-5;     sc_x[7][5] =0;     size[7][5] = 38;

sc_e[8][0] =0;      sc_d[8][0] =-5;     sc_x[8][0] =0;     size[8][0] = 16;
sc_e[8][1] =0;      sc_d[8][1] =0;      sc_x[8][1] =0;     size[8][1] = 24;
sc_e[8][2] =10;     sc_d[8][2] =0;      sc_x[8][2] =0;     size[8][2] = 48;
sc_e[8][3] =-5;     sc_d[8][3] =-5;     sc_x[8][3] =0;     size[8][3] = 11;
sc_e[8][4] =10;     sc_d[8][4] =10;     sc_x[8][4] =0;     size[8][4] = 68;
sc_e[8][5] =10;     sc_d[8][5] =-5;     sc_x[8][5] =0;     size[8][5] = 24;
sc_e[8][6] =0;      sc_d[8][6] =5;      sc_x[8][6] =0;     size[8][6] = 34;

sc_e[9][0] =-5;     sc_d[9][0] =0;      sc_x[9][0] =0;     size[9][0] = 5;
sc_e[9][1] =0;      sc_d[9][1] =0;      sc_x[9][1] =0;     size[9][1] = 10;
sc_e[9][2] =10;     sc_d[9][2] =0;      sc_x[9][2] =0;     size[9][2] = 20;
sc_e[9][3] =7;      sc_d[9][3] =0;      sc_x[9][3] =0;     size[9][3] = 17;

sc_e[10][0] =0;     sc_d[10][0] =0;     sc_x[10][0] =0;    size[10][0] = 10;
sc_e[10][1] =-5;    sc_d[10][1] =0;     sc_x[10][1] =0;    size[10][1] = 5;
sc_e[10][2] =10;    sc_d[10][2] =0;     sc_x[10][2] =0;    size[10][2] = 20;

sc_e[11][0] =-5;    sc_d[11][0] =0;     sc_x[11][0] =0;    size[11][0] = 5;
sc_e[11][1] =0;     sc_d[11][1] =0;     sc_x[11][1] =0;    size[11][1] = 10;
sc_e[11][2] =10;    sc_d[11][2] =0;     sc_x[11][2] =0;    size[11][2] = 20;
sc_e[11][3] =7;     sc_d[11][3] =0;     sc_x[11][3] =0;    size[11][3] = 17;

sc_e[12][0] =0;     sc_d[12][0] =0;     sc_x[12][0] =0;    size[12][0] = 10;
sc_e[12][1] =10;    sc_d[12][1] =0;     sc_x[12][1] =0;    size[12][1] = 20;
sc_e[12][2] =-5;    sc_d[12][2] =0;     sc_x[12][2] =0;    size[12][2] = 5;
```

FIG. 57B

DATA BASE:

- ## STRUCTURE-TO-ALPHA-NUMERIC MODELS:

numSubc[q], numscToC[w][v], scToC[w][v][u], cCntxt[w][v][u]

Where, q = 0, ..., 12 ; w = 0, ..., numSubc[q] – 1 ; u = 0, ..., numscToC[w][v] – 1
  And 'v' refers to each of the sub-class symbols indices

*Example:*  scToC[1][0][4] = 'M';

cCntxt[w][v][u] = 'B' (lower case), 'U' (upper case), 'A' (arithmetic), 'S' (cursive), 'Q' ('B' or 'N'), 'P' ('U' or 'B'), 'R' ('U', 'N'), 'T' (ascender), 'V' (semi-descender, i.e., '_')

- ## TOPOLOGY-TO-ALPHA-NUMERIC MODELS:

numtplToC[q], GtplToC[q][v]

Where, q = 0, ..., number of combined topological codes and separation - 1,
  $\quad$ v = 0, ..., numtplToC[q] – 1

*Example:*  GtplToC[2][1] = 'a';    refers to modeled 'a' incorporating topological code '8' with separation near '2' (+/- epsilon4, where 'epsilon4' is derived empirically)

FIG. 58A

- GENERIC AND EXEMPLAR MODELS:

gc[q], more[q], numGSOpt[q], nStruc2[w][q], CgenStruc2[w][q][u], CgenStruc4[w][q][u]

Where, q = 0, ..., numAlphaNumr – 1 referring to the number of alpha-numerics modeled
  w = 0, ..., numGSOpt[q] – 1 and u = 0, ..., nStruc2[w][q] – 1 numNtplgy[q], Ntplgy[q][w], Gtplgy[q][w][u], tplSubc1[q][w][v]

Where, q = 0, ..., numAlphaNumr – 1 ; w = 0, ..., numGSOpt[q] – 1
  And  u = 0, ..., Ntplgy[q][w] – 1 ; No upper limit is needed to be specified for 'v'

*Example:*

Gtplgy[44][4][0] = '0';   Gtplgy[44][4][1] = ',';   Gtplgy[44][4][2] = '8';
  Gtplgy[44][4][3] = ';';   Gtplgy[44][4][4] = '1';   Gtplgy[44][4][5] = ':';
  Gtplgy[44][4][6] = '1';   Ntplgy[44][4] = 7;

tplSubc1[44][4][0] = 0; tplSubc1[44][4][1] = 1;   tplSubc1[44][4][2] = 0;
  tplSubc1[44][4][3] = 2; tplSubc1[44][4][4] = 1;   tplSubc1[44][4][5] = 2;

Where, ',' signifies that arcpoly 0 (from 'tplSubc1[44][4][0]') has a connection code '0' as well as connection code '8' with arcpoly 1 (from 'tplSubc1[44][4][1]'); ';' signifies that the same arcpoly 0 has connection code '1' with arcpoly 2 (from 'tplSubc1[44][4][3]'); ':' signifies that the second arcpoly of the last arcpolys under study, namely arcpoly 1 (from 'tplSubc1[44][4][4]') has connection code '1' again with the same arcpoly of the pair, namely, arcpoly 2 (from 'tplSubc1[44][4][5]').

- COLLECTIVE EVIDENCE DATA BASE:

Evidence collected for the support of the entire handwriting recognition of alphanumeric symbols. See FIG. 37, 40, 47- 49, 51- 53, 56, and 57 for examples.

FIG. 58B

POLYLINE "p", ARCPOLY "k", LINE "l" FEATURE SET DEFINITIONS:

- kpoly[p]: number of arcpolys per polyline "p"
- xstrtc[p][k], ystrtc[p][k]: start point of arcpoly "k", polyline "p"
- xmidc[p][k], ymidc[p][k]: mid-point of arcpoly "k", polyline "p"
- xendc[p][k], yendc[p][k]: end point of arcpoly "k", polyline "p"
- lineCnt[p][k]: number of lines per arcpoly "k", polyline "p"
- ed[p][k]: extreme points direction per arcpoly "k", polyline "p"
- es[p][k]: extreme points size per arcpoly "k", polyline "p"
- depdir[p][k]: depth direction per arcpoly "k", polyline "p"
- ds[p][k]: depth size per arcpoly "k", polyline "p"
- motion_cw[p][k]: direction of motion per arcpoly "k", polyline "p"
- xL[p][k][l], yL[p][k][l]: point per arcpoly "k", polyline "p", line "l"
- edl[p][k]l]: line direction per arcpoly "k", polyline "p", line "l"
- esl[p][k][l]: line size per arcpoly "k", polyline "p", line "l"

FIG. 66

SYSTEM AND METHOD FOR AUTOMATED SYMBOLIC RECOGNITION INCLUDING MULTI-PHASE SYMBOLIC RESHAPING

I. RELATED APPLICATIONS

This application has subject matter that is related to the following applications filed on the same day:

| Title | Application No. |
| --- | --- |
| SYSTEM AND METHOD FOR AUTOMATED SYMBOLIC RECOGNITION INCLUDING DATABASE MODELING | 10/419,479 |
| SYSTEM AND METHOD FOR AUTOMATED SYMBOLIC RECOGNITION INCLUDING LOGICAL SYMBOLS | 10/419,481 |
| SYSTEM AND METHOD FOR AUTOMATED SYMBOLIC RECOGNITION INCLUDING SPATIAL REASONING | 10/419,483 |
| SYSTEM AND METHOD FOR AUTOMATED SYMBOLIC RECOGNITION INCLUDING EVIDENCE-BASED TECHNIQUE | 10/419,482 |

II. BACKGROUND OF THE INVENTION

1. Field of Invention

This invention relates generally to an apparatus for recognizing handwritten text and alphanumeric symbols, and more particularly to a method and system for recognizing handwritten text and alphanumeric symbols that includes a pen and digitizing tablet for real time entry of handwritten alphanumeric symbols by a user and in certain implementations to a system that includes a document scanner for generating scanned images of a previously created document containing handwritten alphanumeric symbols.

2. Description of the Related Technology

Computer vision encompasses a wide range of markets, applications, and customer needs. According to industry analysts, market demand is gravitating towards a system line whose production process is re-examined to achieve high cost-efficiency.

The ability to recognize handwritten text and alphanumeric symbols is very important in many applications, such as pen-based computer systems, automated mail routing systems, bank check recognition, and automatic data and text entry from business forms. Handwriting recognizers transform text in bit map representation to a high level (i.e., ASCII alphanumeric) coded representation. Pen-based computer systems translate pen motions generated by a user into a sequence of X and Y points indicating the locations of the pen on the tablet. In offline handwriting recognition systems, text on a printed surface such as a sheet of paper are typically scanned by an optical scanner which creates a bit map of the pixels (or points) belonging to the image. The recognized alphanumeric symbols may be used for analysis, editing, or other forms of processing via an application software running on a computer.

Computer-aided handwriting recognition is a technology that is continually evolving. A variety of writing styles, combined with poor penmanship continues to stymie researchers' attempts to design a robust system that can decode all forms of handwriting. Currently, texts produced by state-of-the-art handwriting recognizers contain an unacceptable frequency of errors. This prevents the technology from being efficiently used for large-volume information transfer. Today's most advanced commercial systems are at best at reading legible handwriting letters and numbers in predefined form. The reported accuracy results can be only achieved with careful writing by cooperative users.

The rapid and robust identification of alphanumeric symbols that lack standardized characteristics constitutes a development challenge for handwriting recognition systems. More particularly, shape, size, spacing and orientation of alphanumeric symbols vary widely from user-to-user, thus resulting in a distinct alphanumeric symbol that exhibit similar shapes. For example, "g" and "9" or "D" and "O" may appear with similar shapes. This problem is compounded when an alphanumeric symbol is grouped together in a sequence to form a new alphanumeric symbol. For example, a "1"-shaped number followed relatively closely by a "3"-shaped number may be identified as "B".

There are many proposed methods for handwriting recognition known in the prior art. Rejean Plamondon et. al. present a comprehensive survey of on-line and off-line handwriting recognition. The majority of these techniques that have been developed for handwriting recognition can be broadly classified as the statistical, structural and the neural network approaches as described below:

The statistical approach is based on a similarity measure that in turn is expressed in terms of a distance measure or a discriminant function involving the following three groups: explicit, implicit, and Markov modeling methods. In this context, a shape is described by a fixed amount of features defining a multi-dimensional representation space whereby different classes are described with multi-dimensional probability distributions concerning a class centroid. Several examples of the discriminant functions include linear discriminant and polynomial functions, minimum distance, nearest neighbor, and Bayes classifier. A problem associated with this approach is that discriminant function can be quite complex and may involve adjustments to the parameters under a learning scheme. Another problem identified with the statistical approach is that relationships between pattern elements are not preserved.

The fuzzy set theory has played an important role in both statistical and syntactical approaches. In the neural net approach, the amount of built-in prior knowledge of the alphanumeric recognition problem may seriously affect its generalization performance. An advantage of the neural nets is that they provide the degree of membership of the unknown object in each of the known classes. Moreover, they avoid a long and costly conventional development process.

In the structural approaches, the premise of the recognition process was primarily based on the idea that alphanumeric shape can be described in an abstract fashion. However, syntactical and structural approaches overcome the problem of preserving relationships by storing the image as a tree or graph of pattern elements and their relationships. A difficulty in implementation of these approaches is defining the pattern elements or features, and the relationships between them. In addition, each class or types of images should be separately analyzed and described.

Neural network models use a weight matrix to store information gained from the representation of known images. Ideally, as more instances and types of images are added, the system should have an improvement in performance. However, the performance of the neural nets could deteriorate after certain level of learning.

Other methods include, (i) global features (i.e., template matching, transformations), (ii) distribution of points (i.e., zoning, moments, distances), and (iii) geometrical and features. However, each of these techniques has its own drawback, as global features are highly sensitive to distortion and style variation, distribution of points are highly affected by the dynamic size and shape variations of hand printed characters, and geometrical and features are complex and sensitive to local features.

These techniques described above are narrowly focused on a particular type of recognition approach and more importantly, do not conform to the mechanisms underlying alphanumeric formation. Furthermore, these methods have not solved the signal-to-symbol transition problem and thus rely on computations that occur on information derived from images containing low semantic level, unable to contain the variability problem. Moreover, one of the tenets of vision is that choice of representation is crucial in recognition. Representations must be chosen that make relevant information explicit and allow domain constraints to emerge. In the techniques adopted, very little use is made of a priori information in images. Finally, the complexity of the task due to intrinsic and extrinsic variations present in the image, with regards to the development time-line as well as the inherent ill-defined concepts which in turn yield invalid assessments that have not been dealt with.

III. SUMMARY OF CERTAIN INVENTIVE ASPECTS

One embodiment of the present invention is a handwriting alphanumeric recognition system that includes a pen and digitizing tablet for real time entry of handwritten alphanumeric symbols by a user and, in certain implementations, a scanner for generating scanned images of a previously created document containing handwritten text or alphanumeric symbols.

The handwriting alphanumeric system of the invention includes an image processor for receiving the digitized image comprising "imgPolys" ordered polylines, each described by an ordered sequence of X and Y points. For the purposes of this disclosure, it is assumed that when using a scanner, a series of polylines, each described by a sequence of X and Y points are derived. The spatial order signifies an induced time ordered sequence of creation of the polylines of the handwritten alphanumeric symbols which emulates the sequence of creation of the alphanumeric polylines. Thereafter, the image processor operates to pre-process the image data to remove jitters and achieve smoothing.

Another embodiment of the invention is the use of a spatial reasoning approach incorporating a three phase symbolic reshaping scheme throughout the handwriting recognition process that includes: (i) deriving dissimilarity level from alphanumeric ID's net variation and the integration of each of its arcpoly structural variation(s) signifying a reasonably accurate confidence level for the goodness of recognition, (ii) determining the reshaping or transformation of an arcpoly to another arcpoly by introducing variations to the original arcpoly and deriving at each step, the new cost value as a function of variation(s) present and imposed, and (iii) determining the equivalent representation of an arcpoly by a succession of smaller and adjoining arcpoly(s) in order, or vice versa;

Another embodiment of the invention is performing the first step of a three step process that derives high-level semantic information from the image data, manifesting as an arcpoly or a sequence of arcpolys per polyline ID, and then identified by logical- and subclass symbols. The symbols are partially derived from a list of primary features, which describe the entire shape and orientation of each arcpoly, and represent another embodiment of this invention. In the step one process, each polyline or a sequence of polylines is (are) reduced to one arcpoly or a sequence of arcpolys. The arcpoly's descriptors and primary features representing the entire shape of the arcpoly(s) are computed. The process involves: a first module capable of a pre-established criteria based region growing; a second module that involves a three level post-processing technique capable of a pre-established criteria based region segmentation for over-grown arcpoly(s) to split each into two adjoining arcpolys; and a third module for computing spatial variables (i.e., text line characteristics) pertaining to the polylines and arcpolys computed above. Arcpolys are mathematically described in the "Semantics" Section and are devised in a manner so that their representation conforms as best as possible to pre-stored logical- and sub-class-symbols pairs. This first step represents the third phase of the symbolic reshaping scheme described above. Another embodiment of the invention is performing the second step of the three step process described above that includes: a first module wherein an alphanumeric ID's connection code(s) are computed to describe relationships amongst all pair(s) of arcpoly(s) and polyline(s) belonging to the alphanumeric ID; a second module whereby each arcpoly's feature size values is normalized; and a third module wherein polyline(s) and their arcpoly(s) as well as their relationship(s) are grouped (or registered) to each alphanumeric ID.

Another embodiment of the invention is the incorporation of (i) generic and exemplar models of alphanumeric symbols and (ii) support information for the entire handwriting recognition process. The database is potentially dynamic in the sense of being capable of a continual self-updating of its contents.

The database in (i) contains structural models for both generic and a selective set of exemplars for each alphanumeric symbol by employing the common-property concept in which an alphanumeric symbol is identified by primitive elements and their relationships, as described in the Introduction Section. The exemplars are determined empirically by conducting multiple experiments on multiple users.

The database in (ii) contains information to support the recognition process via efficient collecting of intelligence regarding pertinent and context dependent evidence and includes "structure-to-alphanumeric", "topology-to-alphanumeric" and "collective evidence" modules. The information compiled here is obtained by conducting multiple experiments on multiple users and in part is used for deriving a reasonably accurate set of values for ill-defined variables with a fuzzy nature. For example, as discussed in the later Sections, the computation of the (primary) relational features for the existing logical symbols representing feature variances in reference to the features pre-stored in the data-base uses the information stored in the database's "structure-to-alphanumeric" and "topology-to-alphanumeric" modules. Moreover, as discussed in the later Sections, the values associated with the extreme points codes; the "ptCode" vector is a part of the "collective evidence" database content.

Another embodiment of the invention is performing the final step of the three step process described above. This is achieved by computing logical- and subclass-symbols pair(s) from the image data, as well as by computing (primary) relational features for each arcpoly representing feature variances in reference to the features pre-stored in the data-base by using the information stored in the database's "structure-to-alphanumeric", "topology-to-alphanumeric", and "collective evidence" modules. The relational features are derived in part from a set of primary features that describe the entire shape and orientation of the arcpoly(s). The final step represents the first phase of the symbolic reshaping scheme described above.

Another embodiment of the invention involves the significant reduction of the alphanumeric candidate symbols' search range by employing an evidence-based technique that uses the information stored in the database's "generic and exemplar models" module. The current knowledge-based system for handwriting recognition contains in its database a set of links from each pair of logical-sub-class-symbols to their superset alphanumeric candidate symbols as well as a set of links from each encoding and separation pertaining to polyline and arcpoly connection code(s) to their superset alphanumeric candidate symbols. It is the premis of evidence-based strategy that for the former list, the alphanumeric symbol(s) that emerge(s) repeatedly (or commonly) for every polyline and arcpoly, and for the latter list, the alphanumeric symbol(s) that emerge(s) repeatedly for all connection code(s) per alphanumeric ID is (are) more likely to be the correct alphanumeric symbol than those that did not. Cross referencing these two lists of alphanumeric symbols may yield a shorter list of alphanumeric candidate symbols, possibly at a cost of reducing the accuracy of the resulting candidate symbols, as the encodings do not always reliably invoke the correct alphanumeric symbol due to the intrinsic and extrinsic variations present in the image data. Consequently, the determination of the alphanumeric candidate symbols at times, may exclude the list of alphanumeric candidate symbols generated by encodings.

Yet another embodiment of the invention includes database's alphanumeric candidate symbol selection: a first module capable of compiling a possibly shorter list of all such non-discarded list of alphanumeric candidate symbol(s) as derived above; a second module capable of computing their (its) secondary relational features which are used in part to recognize the alphanumeric symbol(s) via the derived alphanumeric cost (or dissimilarity) levels that serve to determine how likely the hypothesized alphanumeric symbol identified is achieved correctly; a third module capable of determining the best alphanumeric candidate symbol based on its confidence level and the number of matched pair(s) of arcpoly(s) and their logical- and subclass-symbols pair(s); and a fourth module to establish its validation.

Still another embodiment of the invention includes (i) the determination of alternative set(s) of reduced lists of alphanumeric candidate symbols per alphanumeric ID, each set accompanied by descriptors and secondary relational features as well as confidence levels, (ii) selection of the best database alphanumeric candidate symbol for each incident and (iii) validation of the alphanumeric candidate symbol for each incident; by successive symbolic transformation of logical- and subclass-symbols pair(s) to one another, or equivalently stated, reshaping/or transformation of arcpoly(s) by using the information stored in the database's "generic and exemplar models" module. The step (i) described above represents the second phase of the symbolic reshaping scheme described above and includes structural, and combined reshaping processes. Examples of such a process includes but not limited to the following: arc-to-arc rotation, line-to-line rotation, arc depth size variance, arc extreme points size variance, existence/or absence of arc extension on each (or both) extreme point(s), line extreme points size variance, variances, and combined variances.

IV. BRIEF DESCRIPTION OF THE DRAWINGS

FIG. 2 is a diagram illustrating both the low resolution encoded values derived from a 8-direction and the high resolution encoded values derived from a 16-direction code system.

FIG. 38 is a diagram listing the descriptors of an arcpoly, illustrating an example of a polyline, and a bounding box.

FIG. 41 is a diagram illustrating (i) the distances involved in establishing the Boolean variable "near" whereby "near=1" signifies merger between the double pair structures, "p1", "k1" and "p2", "k2, (ii) elevated bar- and cross-type polylines by way of example, and (iii) saddle points (local minima and maxima) by way of example.

FIG. 42 is a diagram describing an alphanumeric candidate symbol's list of secondary relational features.

FIG. 44 is a diagram illustrating invocations by way of example.

FIG. 45 is a diagram illustrating the assimilated polyline "p", arcpoly "k" features and the descriptors of alphanumeric "a".

FIG. 46 is a diagram illustrating the condition "op."

FIG. 47 is a diagram illustrating a look-up table as part of the collective evidence database to compute "codeCnc."

FIG. 48 is a diagram illustrating a look-up table as part of the collective evidence database to revise "osubcc."

FIG. 49 is a diagram illustrating a look-up table in the collective evidence database to compute "fromSubcc" and "toSubcc."

FIG. 50 is a diagram illustrating the structural reshaping by way of example.

FIG. 51 is a diagram illustrating the values for the extreme points codes, the "ptCode" vector, as part of the collective evidence database.

FIG. 52 is a diagram illustrating the computation of the point location, "rpt", "cpt", as part of the collective evidence database.

FIG. 53 is a diagram illustrating the derivation of "pt_code" by way of example, as part of the collective evidence database.

FIG. 54 is a diagram illustrating process 3704 for the computation of logical symbols.

FIG. 55 is a diagram illustrating process 3584 for the derivation of remaining sub-class symbols per logical symbol.

FIG. 56 is a diagram illustrating the results of the derived variance types and levels as part of the collective evidence database.

FIG. 57 is a diagram illustrating the list of the values for the "sc_e", "sc_d", "sc_x" and "size" vectors, as part of the collective evidence database.

FIG. 58 is a diagram illustrating a list of variables pertaining to the database's "structure-to-alphanumeric models", "topology-to-alphanumeric models", "generic and exemplar models", and "collective evidence."

FIG. 66 is a diagram illustrating the feature set definitions for polyline "p", arcpoly "k", and line "1".

V. DETAILED DESCRIPTION OF CERTAIN INVENTIVE EMBODIMENTS

Figure 1A:
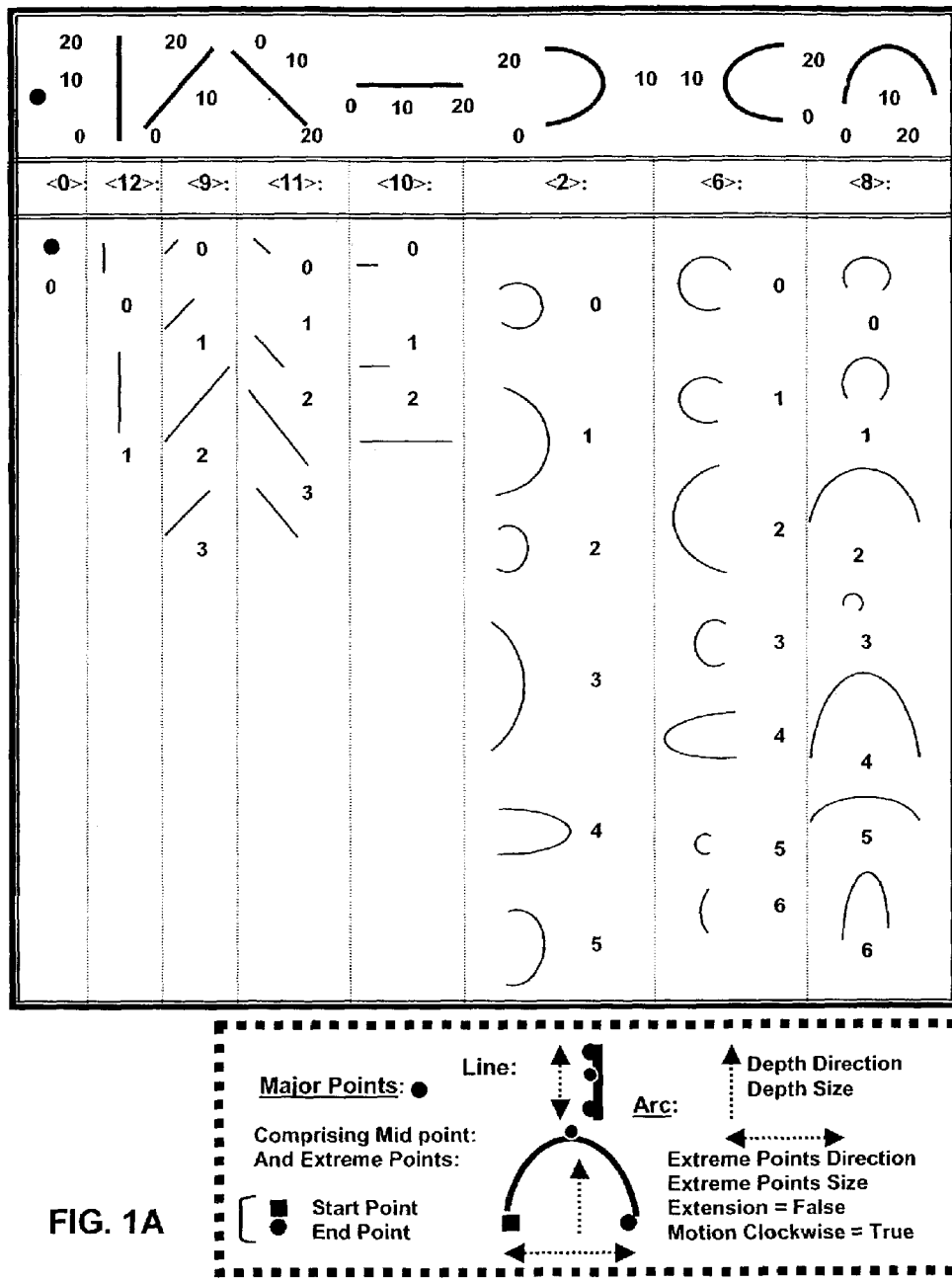
FIG. 1 is a diagram illustrating the logical- and subclass symbols and features belonging to an arcpoly.

Those of ordinary skill in the art will acknowledge that the following description of the present invention is solely illustrative and not in any way limiting. The disclosed embodiments of the present invention will readily suggest themselves to such skilled persons. Furthermore, for the purposes of this disclosure, it is assumed that the alphanumeric symbols in the image are already segmented by an alphanumeric segmenter.

The following detailed artificial intelligence approach presents a description of certain specific embodiments of the present invention. In this description, reference is made to the drawings wherein like parts are designated with like numerals throughout. The processes presented in detail incorporate mathematical/or coding notations similar to those of the C++ code and the daily common sense notations we are accustomed to. Furthermore, variables with a fuzzy nature that have been derived empirically are frequently cited, as this is a natural occurrence for most vision systems. Those of ordinary skill in the art will realize that such variables are continually in a state of flux and depend to a great extent on the resolution and accuracy of the digitizing apparatus used for the handwriting recognition process and depend on experiments performed on multiple users. The information contained in the database to support the recognition process described above was used to empirically derive a reasonably accurate set of values for such ill-defined variables with a fuzzy nature.

For convenience, the discussion of the invention is organized into following principal sections: Introduction, High-Level Semantics Part I, High-Level Semantics Part II, High-Level Semantics Part III, Candidates and Validation, and Symbolic Reshaping.

Introduction

1. Approach

The two key problems for the absence of robust image understanding algorithms are the following: (a) computations occur on low semantic levels of the image, thus unable to contain the variability problem, and (b) very little use is made of a priori information related to and present in the image. A spatial reasoning approach to handwriting recognition is able to capture high-level semantic information from the image and fully exploit the information present in each image.

As an embodiment of the invention, in order to formulate an efficient strategy for the development of handwriting recognition system that adopts a spatial reasoning approach, several interrelated issues raised earlier are addressed below and discussed in detail in the following sections:

1) It is generally known that handwriting recognition methods are more robust when they are related to the mechanisms underlying alphanumeric formation. Studies performed with preschool children suggest that alphanumeric symbols may indeed be reduced to their respective logical components before recognition can occur. Perceptual studies, the study of techniques employed by humans to distinguish between pairs of alphanumeric symbols, led to a theory of alphanumeric set based on functional attributes. From the point of view of cognitive psychology, modeling the process of handwriting recognition generation led to recognition methods using analysis-by-synthesis, and perceptual studies led to some form of pairwise-distinction methods.

Figure 1B:
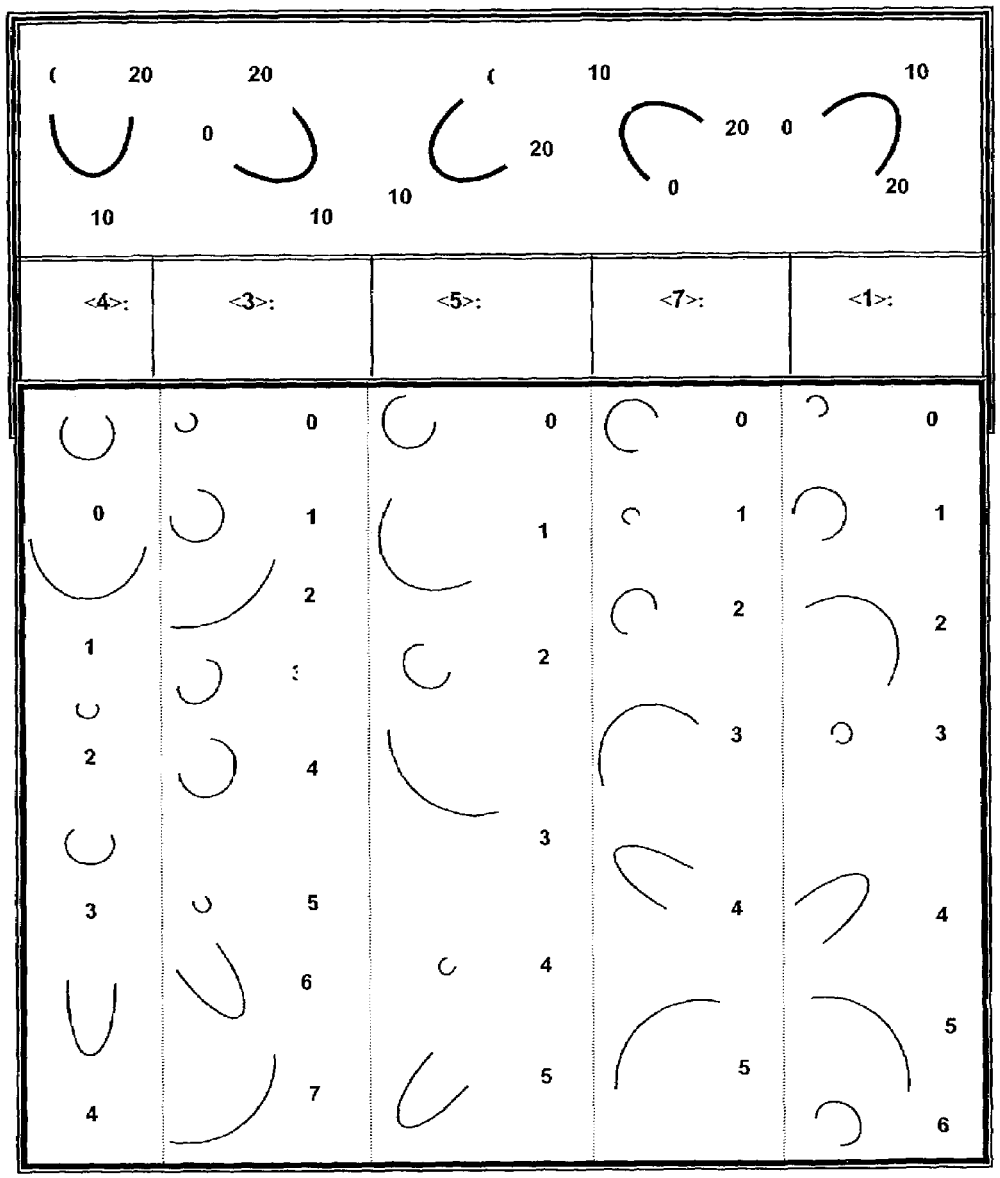

Such information constitutes supporting evidence for the use of the common-property concept, in which an alphanumeric symbol is identified by primitive elements and their relationships. An embodiment of this invention is specifying these elements, namely logical- and subclass-symbols and their major points, and encoding each logical symbol as a symbol identity, as shown in FIG. 1. Accordingly, the alphanumeric logical symbols comprise a point, a class of arc and a class of line arcpolys, mathematically described in the following section. The integer values 0, and 20 designate an arcpoly's extreme points and the integer value 10 represents an arcpoly's mid-point. The three integer values represent the arcpoly's major points. Another embodiment of this invention is establishing the relationship(s) between logical- and subclass-symbols pair(s) belonging to each modeled alphanumeric symbol.

Within each class of logical symbols, FIG. 1 illustrates a number of sub-class symbols signifying various extreme points' size and depth size variations of its class. An embodiment of this invention is specifying (i) a subset of these primitive element adaptation(s) and (ii) the manner they are positioned with respect to one another to best conform to modeled alphanumeric symbols.

2) Requiring computations to occur on high-level semantics is equivalent to solving the signal-to-symbol transition, as described in detail in the following principal sections: High-Level Semantics Parts I, II and III.

Figures 3, 3A, 3B, 3C:
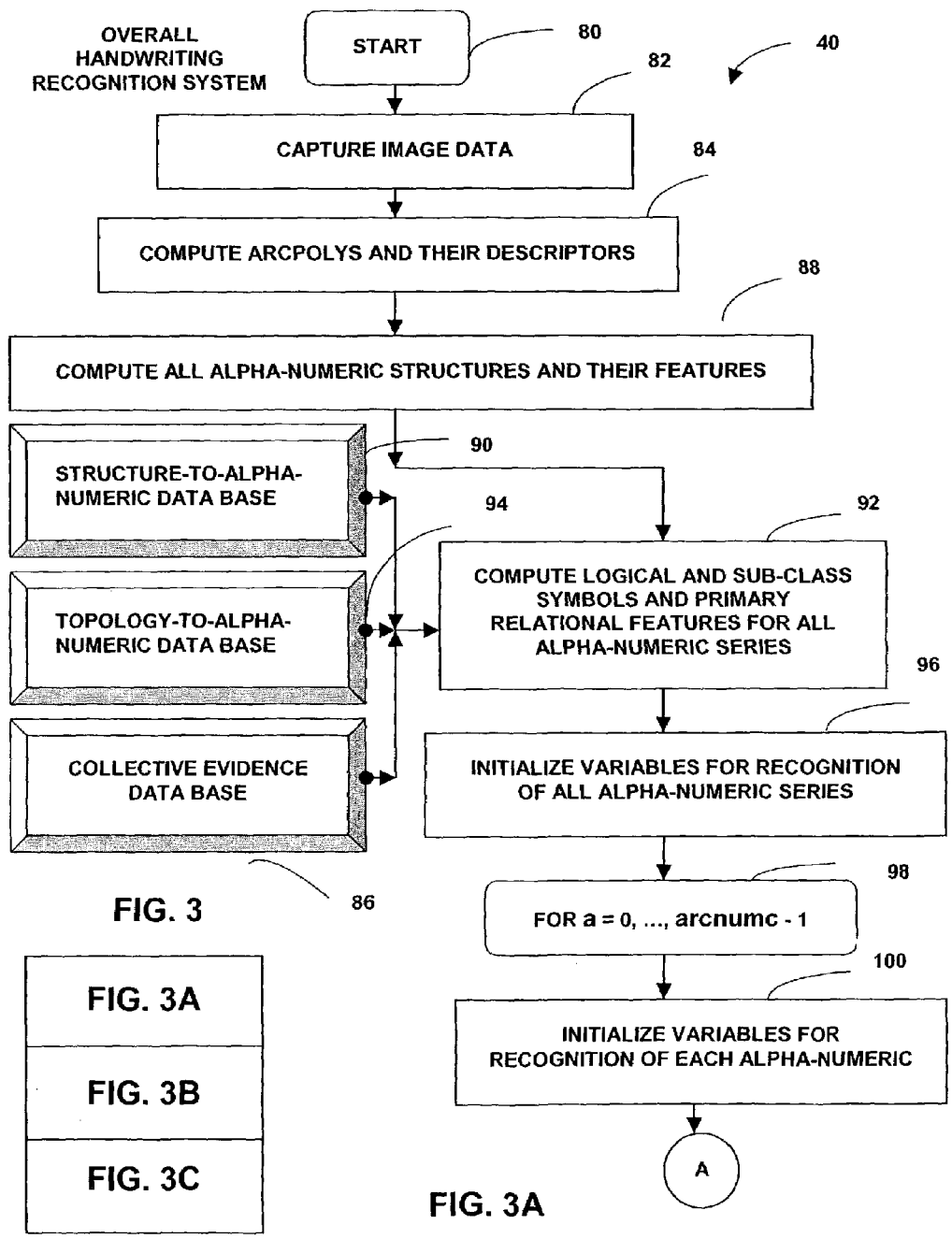
FIG. 3 is a flow diagram illustrating the overall handwriting recognition system.
Figure 3B:
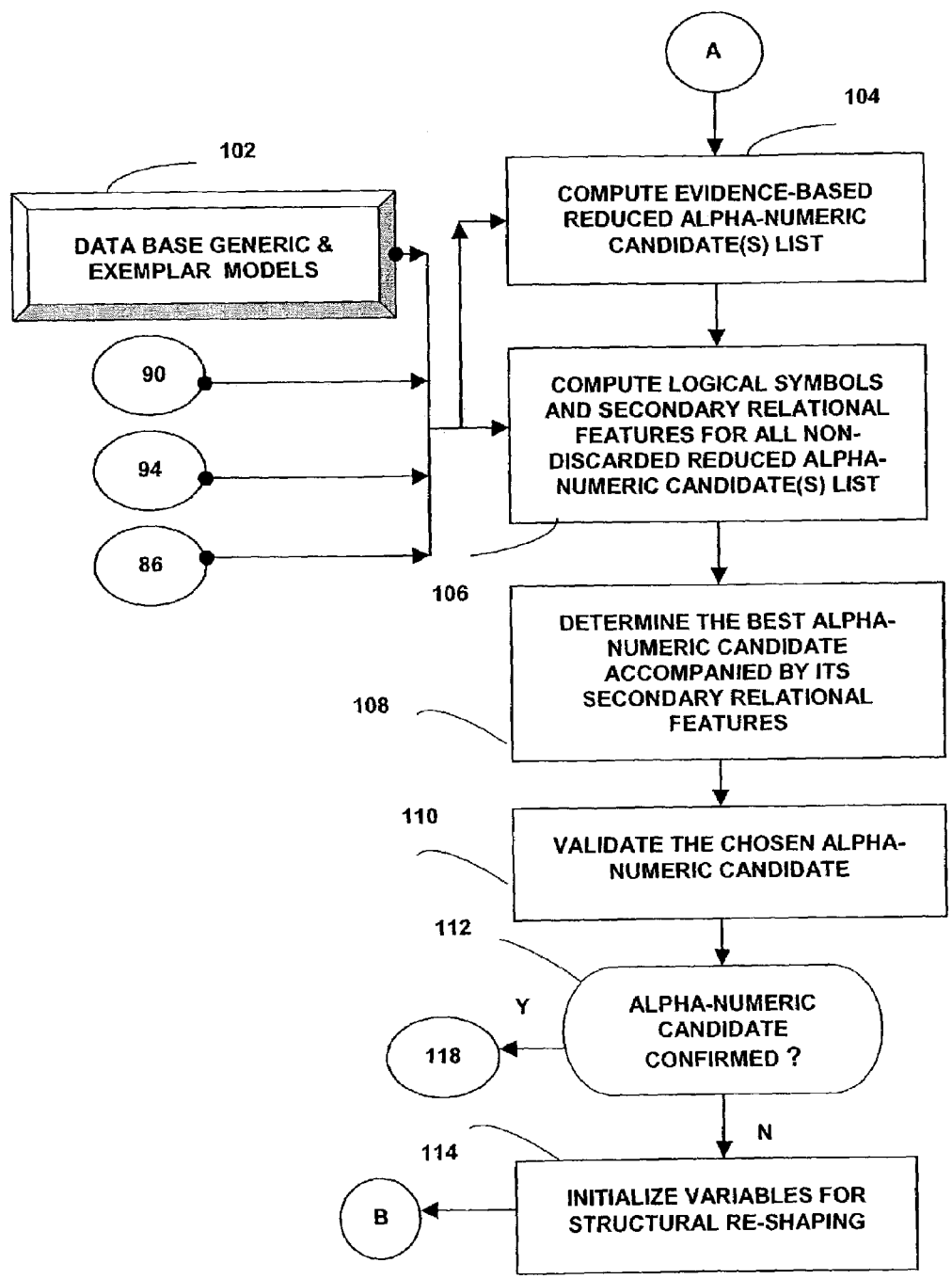
Figure 3C:
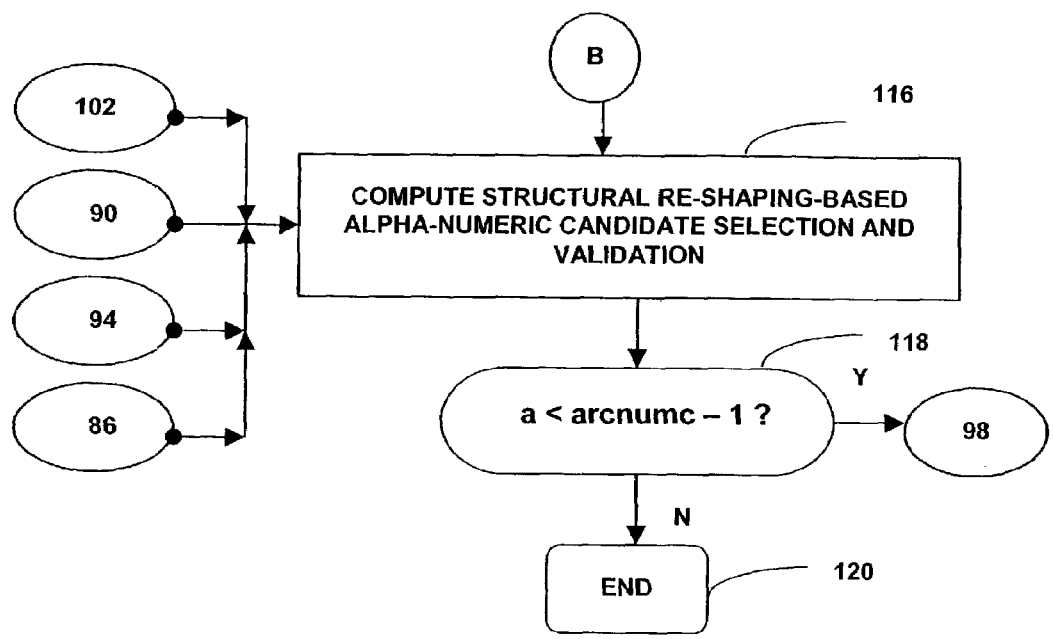

3) The effective use of a priori information involves the incorporation of (i) generic models, (ii) case (or exemplar) models, and (iii) effective use of supporting information (intelligence) (see FIG. 3).

4) Dealing with the inherent complexity issue involves the following:

i) devise a hybrid system whereby computations employed are both data-directed and model-driven (see FIG. 3), ii) incorporate multiple representations of each alphanumeric in the database by identifying a finite number of generic and exemplar representations per alphanumeric symbol, iii) devise the basis for the system's feature set (see FIG. 1) by identifying (a) a set of logical symbols comprising a finite class of arcpolys (lines and arcs and a point) that to the exclusion of the point, each member class has a unique (distinct) orientation, and (b) a set of subclass symbols per logical class of symbol representing a finite subclass of arcpolys (lines and arcs and a point) that to the exclusion of the point, each subclass member has a unique (distinct) extreme points' size and/or depth size iv) establish a hierarchical hypothesis-and-verification technique during various stages of the handwriting recognition process, whereby a series of initial assessments are made based on the information availed upon them and later during processing they are validated or rejected depending on the degree in which preset milestones were satisfied and are followed by a sequence of alternative hypotheses in the event of failure of the latest hypothesis until they are satisfied (i.e., post-processing processes 156, 158, and 160), v) adopt an evidence-based technique to reduce the alphanumeric candidate symbol list significantly (see candidates and validation section), vi) incorporate a three phase symbolic reshaping scheme during the handwriting recognition process that includes (i.e., see FIG. 50): (a) deriving dissimilarity level from alphanumeric ID's net variation and the integration of each of its arcpoly structural variation(s) signifying a reasonably accurate confidence level for the goodness of recognition, thus establishing a mechanism that derives dissimilarity level (or cost value) between image and database features including shape, size and relationship (i.e., see FIG. 56), (b) determining the reshaping or transformation of an arcpoly to another arcpoly by introducing variations to the original arcpoly to alter its shape and orientation and deriving at each step, the new cost value as a function of variation(s) present and imposed, and (c) determining the equivalent representation of an arcpoly by a succession of smaller and adjoining arcpoly(s) in order, or vice versa;

There are several remarkable issues in connection with the symbolic reshaping scheme, as discussed in item (vi) above.

1. The reshaping or transformation of an arcpoly (represented by its descriptors and secondary relational features that include the logical- and sub-class-symbols pair(s)) to another arcpoly (with a new set of descriptors and secondary relational features that may include revised pair(s) of logical- and sub-class-symbols) can be attained symbolically. This is achieved by taking into account the structural reshaping process incrementally and then combining each step's effect to achieve a new arcpoly. Note that at each step, the cost value is computed by determining the type of variation present and while taking into account the costs associated during matching (if any) with database missed logical and sub-class symbol pair(s) and/or surplus (or extra) image logical and sub-class symbol pair(s) per arcpoly. Thus, the additional dissimilarity level derived is integrated into the net dissimilarity level to generate each alphanumeric candidate symbol's cost value (or dissimilarity level) as a representation of the goodness of recognition.

2. There is no cost value (dissimilarity level) associated with the third phase of the symbolic reshaping scheme.

3. The incorporation of the three phases of the symbolic reshaping scheme in concert throughout the handwriting recognition system can significantly improve the system's capability, as they represent a powerful tool for the recognition process.

2. Semantics (Glossary)

The hierarchical descriptions of geometrical structures are presented below:

A) Point—Ordered pair (i, j). Note that the point shown as a logical symbol and subclass symbol in FIG. 1 is in a practical sense, a very small arcpoly described in Step H below.

B) Element—Two ordered pairs ((i,j), (i+v,j+w)), where:
$v=-1, 0,$ or $1$,
$w=-1, 0,$ or $1$, and
$v!=0$ if: $v=w$.

C) Element Direction—Low resolution encoded value derived from a 8-direction code system, an adaptation of "Freeman Chain Codes," as illustrated in the top portion of FIG. 2,
$dv_{(k)}=f(m_{(k)}, n_{(k)})$, where:
$m_{(k)}=(i_{(k+1)}-i_{(k)})$
$n_{(k)}=(j_{(k+1)}-i_{jk})$ D) Line—Set of elements $[(i_{(k)}, i_{(k)}), ((i+V)_{(k)}, (j+w)_{(k)})]$, for all $k=1, \ldots, n$, subject to:
a) connectivity:
$((i+v)_{(k)}=(i)_{(k+1)}$ for all $k=1, \ldots, n-1$
$((j+w)_{(k)}=(j)_{(k+1)}$
b) equal directions:
$dv_{(k)}=dv_{(k+1)}$ for all $k=1, \ldots, n-1$, where n is the number of elements.

E) Line Direction—High resolution encoded value derived from a 16-direction code system, as illustrated in the bottom portion FIG. 2,
$dv_{(k)}=f(m_{(k)}, n_{(k)})$, where:
$m_{(k)}=(i_{(k+1)}-i_{(k)})$
$n_{(k)}=(j_{(k+1)}-i_{jk})$ F) Clockwise motion—A Boolean variable that describes the direction change of a structure's $(k+1)^{th}$ line with respect to its $k^{th}$ line:
$cw_{(k)}$=true, if: $dv_{(k+1)}=(dv_{(k)}+u)_{modular\ m}$, where $m=8$ or $16$
$cw_{(k)}$=false, otherwise
where, in general:
$(v)_{modular\ m}=v-m$, if: $v>m$
$(v)_{modular\ m}=v+m$, if: $v<1$
$(v)_{modular\ m}=v$, otherwise G) Arc—Set of Lines, subject to
a) connectivity:
$((i+u)_{s(k)}=(i)_{s(k)+1}$ for all $k=1, \ldots, n-1$
$((j+w)_{s(k)}=(j)_{s(k)+1}$
where, n is the number of lines and s(k) refers to the number of consecutive elements up to the $k^{th}$ line.
b) $consistent_{(n)}$=true, or equivalently, $cw_{(k+1)}=cw_{(k+2)}$ for all $k=0, \ldots, n-2$.

H) Net Gradient Directions—The accumulation of direction differences in an 8/or 16 direction code system of all adjoining pairs of lines belonging to an arc I) Arcpoly—Comprises an arc, line, or a point and is constrained by its net gradient directions not exceeding a pre-specified value (see FIG. 1).

J) Polyline—Set of arcpoly(s) subject to,
a) connectivity:
$((i+u)_{(v(s(k)))}=(i)_{(v(s(k))+1)}$ for all $k=1, \ldots, n$
$((j+w)_{(v(s(k)))}=(j)_{(v(s(k))+1)}$
where, n is the number of arcpolys and s(k) refers to the number of lines up to the $k^{th}$ arcpoly, and v(s(k)) is the number of elements up to the $s(k)^{th}$ line.
b) $consistent_{(s(n))}$=false.

K) Image Structure—Comprises a point, line, arc, arcpoly, or polyline.

L) Descriptors—Description of an image structure via the sub-structures that make up the image structure (i.e., an arcpoly described by its successive lines that make up its structure) as well as its features.

M) Relational Features—A gradient feature set between database features and arcpoly features derived from the image that enable the derivation of the dissimilarity values between the two arcpolys.

N) High-Level Semantic Information—Refers to each of the derived logical- and subclass-symbols pairs and their features with the following characteristics:
a) Targets the largest image structure derived to generate an arcpoly from the image data, while at the very least adhering to the definition of arcpolys described in this Section described above (via region growing and in some situations followed by region splitting).
b) Each arcpoly derived is uniquely described.
c) The description contains a rich semantic content whereby no higher representation can be derived from the current feature set without compromising the alphanumeric symbols' discrimination capability.

O) Logical Symbols—Represents a finite class of arcpolys (lines and arcs and a point) that to the exclusion of the point, each member class has a unique (distinct) orientation (see FIG. 1).

P) Subclass Symbols—Represents a finite subclass of arcpolys (lines and arcs and a point) that to the exclusion of the point, each subclass member has a unique (distinct) extreme points' size and/or depth size (see FIG. 1).

3. Overall System Flow Diagram

FIG. 3 is a flow diagram illustrating the handwriting recognition system according to a presently preferred embodiment of the invention. For the purposes of this disclosure, it is assumed that the alphanumeric symbols are hand printed, or cursive and have been already segmented by an alphanumeric segmenter. The overall process begins at a start state 80 and then moves to state 82 wherein handwritten input is collected using a digitizing tablet and a pen, and in certain implementations, a scanner for generating scanned images of a previously created document containing handwritten text or alphanumeric symbols. The digitized image comprises "imgPolys" polylines, each described by a sequence of X and Y points. For the purposes of this disclosure, it is assumed that when using a scanner, a series of polylines, each described by a sequence of X and Y points are derived.

Next, as another preferred embodiment of the invention, the process 40 moves to state 84 to compute the first step of a three step process that derives high-level semantic information from the image data to generate arcpolys in a manner that best conforms to their database counter parts and those listed and illustrated in FIG. 1. Thus, another embodiment of this invention is that each polyline is reduced to one or a sequence of arcpoly(s), and then each arcpoly's descriptors and primary features representing the entire shape and orientation are computed, as listed in FIG. 45.

As another preferred embodiment of the invention, the primary features comprise (i) extreme points' direction, (b) extreme points' size, (iii) depth direction, (iv) depth size, (v) extension, (vi) motion clockwise. Thereafter, the process 40 moves to state 88 to perform the second step to compute high-level semantic information from the image data wherein relationship(s) are computed, each arcpoly's feature values describing structural sizes is normalized, and polyline(s) and their arcpoly(s) as well as their relationship(s) are grouped to each alphanumeric ID. Structural features comprise a set of features that describe each arcpoly's entire shape and orientation. Note that terms used during this presentation such as "alphanumeric ID" refers to the 'ID+1'$^{th}$ alphanumeric derived from the image and "candidate alphanumeric symbols" refers to modeled alphanumeric symbols stored in the database.

Next, the process 40 moves to state 92 to compute the final step of the derivation of high-level semantic information from the image data. This is achieved by computing logical- and subclass symbols pair(s) per arcpoly from the image data for all alphanumeric IDs, as well as by computing (primary) relational features for the existing symbols representing feature variances in reference to the features pre-stored in the data-base. As another preferred embodiment of the invention, this is achieved by accessing information (i) pertaining to prestored symbolic representations of alphanumeric symbols representing all sets of characters stored in the database and (ii) using the database's "structure-to-alphanumeric", "topology-to-alphanumeric," and "collective evidence" modules illustrated as states 90, 94 and 86, respectively (see FIG. 58). The current knowledge-based system for handwriting recognition contains "structure-to-alphanumeric", "topology-to-alphanumeric" links from alphanumeric members of the stored candidate alphanumeric list to symbolic representations derived from arcpolys.

The database is potentially dynamic in the sense of being capable of a continual self-updating of its contents. Each alphanumeric symbol is modeled by employing the common-property concept in which an alphanumeric symbol is identified by primitive elements and their relationships, as described in the Introduction Section. The exemplars are determined empirically by conducting multiple experiments on multiple users.

The relational features are derived in part from a set of primary features that describe the entire shape and orientation of the arcpoly. The states 84-to-94 represent the entire "signal-to-symbol" transition. The process 40 moves to state 96 to initialize the variables pertaining to all arcpolys and then moves to state 98 wherein allows states 100-to-118 to be performed repeatedly, once for each alphanumeric. The number of alphanumeric symbols, "arcnumc" was determined earlier by the process 92. The process 40 moves to state 100 to initialize variables that pertain to the recognition of each alphanumeric symbol.

Next, the process 40 moves to states 104 and then to state 106. In state 104, the process 40 reduces the candidate alphanumeric symbols' search range by employing an evidence-based technique and using the information stored in all four of the database modules, as depicted by states 90, 94, 86, and 102. Thus, another embodiment of this invention is the reduction of candidate alphanumeric symbols. FIG. 58 describes the databases shown in states 90, 94, 86 and 102 by way of example. State 102 incorporates generic and exemplar models of alphanumeric symbols, as opposed to states 90, 94 and 86 which provide information to support the recognition process via efficient collecting of intelligence which is both pertinent and context dependent. As another preferred embodiment of the invention, there are multiple models for each hybrid category of generic and exemplar models stored in the database. This information is compiled by conducting multiple experiments on multiple users.

In state 106, as another preferred embodiment of the invention, the process 40 compiles a list of all such non-discarded list of candidate alphanumeric symbol(s), and computes their (its) secondary relational features described in connection with FIG. 42 which are used in part to recognize the alphanumeric symbol(s) via the derived alphanumeric inferred confidence (or cost or dissimilarity) levels that serve to determine how likely the hypothesized alphanumeric symbol identified is computed correctly. In state 106, alphanumeric cost (or dissimilarity) levels are generated that can determine how likely the hypothesized alphanumeric symbol identified was achieved correctly, according to the presently preferred embodiment of the invention. In state 106, the process 40 uses the information stored in all four of the database modules, as depicted by states 90, 94, 86, and 102. The process 40 moves to state 108 wherein the best candidate alphanumeric symbol is determined based on its confidence level and the number of matched arcpolys, and then moves to state 110 to establish its validation, representing another preferred embodiment of the invention. This is achieved by a two step process (see FIG. 42 and FIG. 58):

1. thrsh=confdnce*nStruc2 [Copt[a][idxc1]][idxc1];
   Where, 10<confdnce<20, and 'confdnce' is empirically determined.
2. If: TscVL[a][idxc1]<=thrsh→validation is achieved.
   Otherwise→validation fails.

Thereafter, the process 40 moves to the decision state 112. If a determination is made in the decision state 112 that the chosen alphanumeric symbol is not confirmed, as another preferred embodiment of the invention, the process 40 moves to state 114 to initialize the reshaping module and then moves to state 116 to (i) determine alternative set(s) of reduced lists of alphanumeric candidate symbols and their descriptors and secondary relational features as well as their confidence levels, (ii) for each incident, select the best alphanumeric candidate symbol and (iii) for each incident, validate the alphanumeric candidate symbol. Steps (i)-to-(iii) above are achieved by successive symbolic transformation of pair(s) logical- and subclass-symbols to one another, or equivalently stated, reshaping of arcpoly(s). In state 116, the process 40 uses the information stored in all four of the database modules, as depicted by states 90, 94, 86, and 102.

Next, the process 40 moves to the decision state 118. In the decision state 112, if a determination is made that the chosen alphanumeric symbol is confirmed, the process 40 moves to the decision state 118. If the result of the decision state 118 is in the affirmative, the process 40 moves to state 98 to begin another cycle. Otherwise, the process 40 terminates at an end state 120.

While the present invention has been described and shown in connection with specific embodiments thereof, it will be understood that it is capable of further modification, and this application is capable of further modification to recognize alphanumeric symbols which are either cursive or printed and is capable of receiving digital information via one of: a scanner, a memory, a storage device, a wireless communication device.

High-Level Semantics Part I

The first of a three step process for the signal-to-symbol transition is presented in this section. In step 1, as another preferred embodiment of the invention, for each polyline, a sequence of arcpoly(s) and their semantically high level descriptors are primarily computed by detecting rotation changes and segmenting the arcpoly(s) at the point where rotation change(s) occurred (if any) each time into two new arcpolys. Next, each new set of arcpolys is identified.

As another preferred embodiment of the invention, arcpoly(s) are hypothesized for further refinement by performing a criteria-based (i) region growing and (ii) split process for over-grown arcpoly(s) which either extend "significantly" beyond a half circle or may be comprised of two or more stored arcpolys. As another preferred embodiment of the invention, this process is followed by the derivation of spatial variables. Arcpolys are mathematically described in the "Semantics" Section and are devised in a manner so that they conform as best as possible to pre-stored pairs of logical-sub-class-symbols, shown in FIG. 1.

Figure 4:
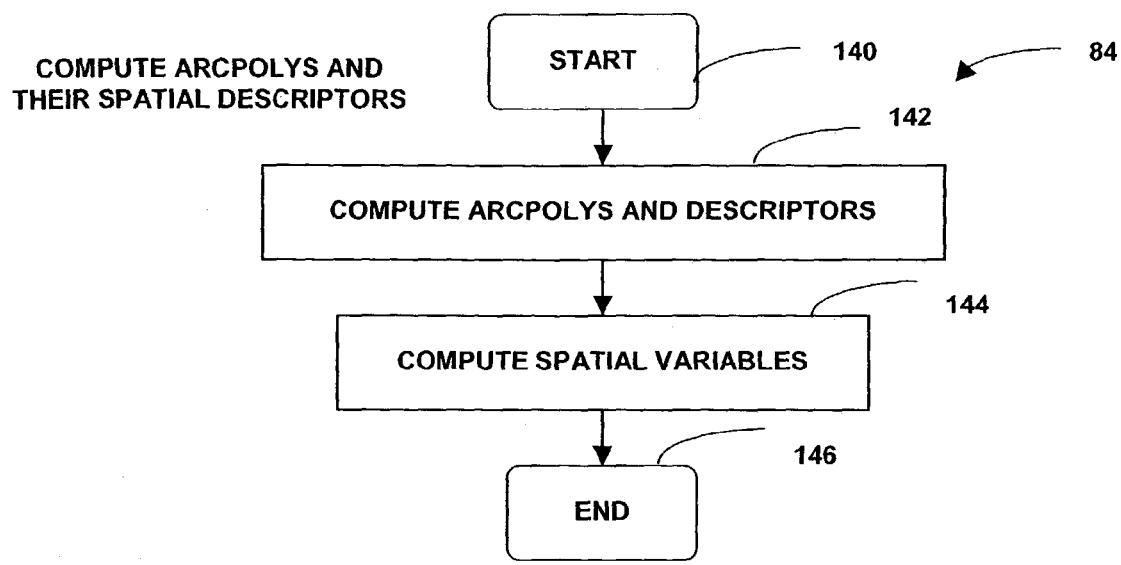
FIG. 4 is a flow diagram illustrating the computation of arcpolys and their spatial descriptors.

FIG. 4 illustrates state 84 of FIG. 3. The process 84 begins at a start state 140 and then moves to state 142 wherein an arcpoly or a series of arcpolys are computed. The process 84 moves to state 144 to compute spatial variables pertaining to each line of text and each polyline including the computation of text characteristic lines (i.e., base line, core line, ascender line, and descender line levels) for one or more lines of text within the image (see FIG. 39 for definitions). Baseline is an average line whereby the bottom of each alphanumeric symbol in the word rests, excluding any alphabet ascenders, descenders, or diacritical marks. The overall process 84 terminates at an end state 146.

Figure 5:
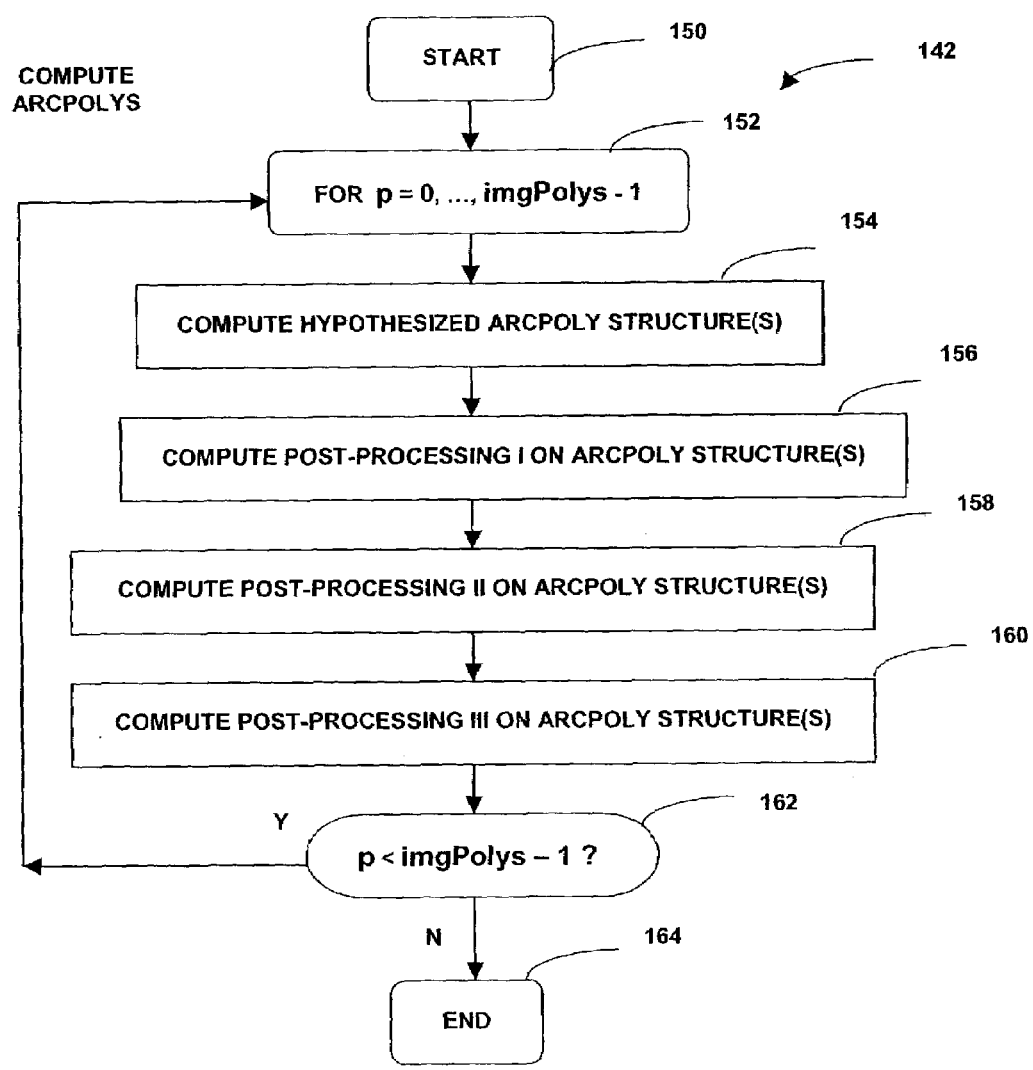
FIG. 5 is a flow diagram illustrating the computation of arcpolys.

FIG. 5 is a flow diagram illustrating process 142 shown as state 142 in FIG. 4. The process 142 begins at a start state 150 and moves to state 152 wherein allows states 154-to-162 to be performed repeatedly, once for each polyline. The process 142 moves to state 154 wherein each polyline is reduced to one or a series of hypothesized arcpoly via region growing, the third phase of the symbolic reshaping scheme, as another preferred embodiment of the invention (see FIG. 38 for an arcpoly's descriptor set and an example and FIG. 66 for an arcpoly's feature set definitions). The process 142 moves to state 156, followed by state 158 and then to state 160 wherein arcpolys' are revised using a three step post-processing process to split over-grown arcpoly(s) using criteria-based techniques, again the third phase of the symbolic reshaping scheme. The process 142 moves to the decision state 162. If a determination is made at the decision state 162 that "p>=imgPolys−1", then the process 142 terminates at an end state 164. Otherwise the process 142 moves to state 152 to begin the next cycle.

Figure 6:
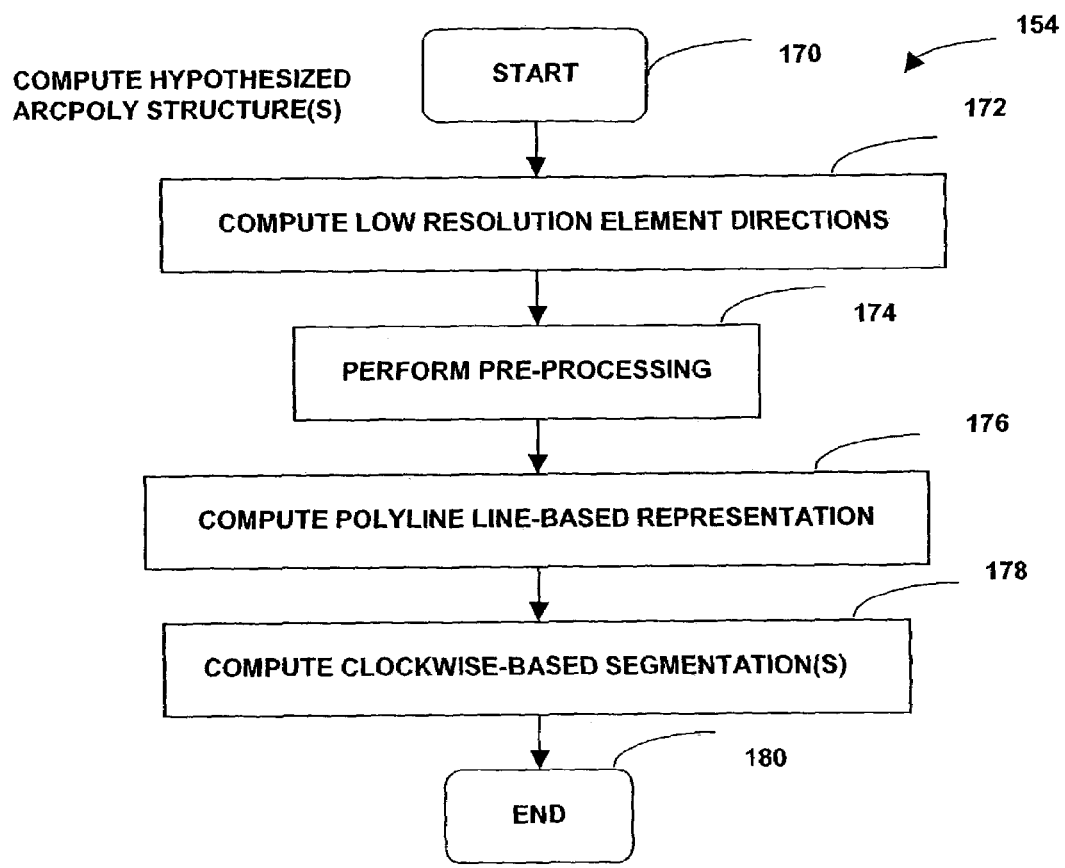
FIG. 6 is a flow diagram illustrating the computation of hypothesized arcpoly(s).

FIG. 6 illustrates process 154 shown as state 154 in FIG. 5. The process 154 begins at a start state 170 and moves to state 172 to compute a series of accurate low resolution element directions from a sequence of adjoining pairs of X and Y points (see top portion of FIG. 2) whereby each direction is represented by one of eight equally divergent vectors. Accurate, because of the noise introduced by the digitizing apparatus, consecutive points may not be adjacent, thus according to the embodiments of the present invention a new technique is devised to achieve further precision by deriving the direction most accurately associated with each of the two elements' relative location(s) with respect to each another, as element(s) between the pair(s) of points may not occur on any of the eight coded directions.

As another preferred embodiment of the invention, there are mappings and inverse mappings stored in the database from/to point location to/from a multi-resolution (8 or 16 resolution) directional value. The multi-resolution directional values are graphically depicted in FIG. 2. Every such low resolution line direction has a value ranging between 1-to-8 representing one of eight equally divergent vectors, as illustrated in top portion of FIG. 2. The process 154 then moves to state 174 to preprocess the element directions computed in state 172. This is achieved by performing smoothing techniques whereby jitters due to noise are removed, as another preferred embodiment of the invention. The process 154 moves to state 176 to compute polyline 'line-based' representation, in contrast to the image polyline 'point-based' representation. The process described above represents the core of the region growing process described earlier. As the process 154 moves to state 178, segmentation(s) may occur at derived line ID(s) to establish a unique clockwise motion in-between the computed segmentation points (see 'arcpolys' in the Semantics Section), thus producing an arcpoly or a series of inconsistent pairs of adjoining arcpolys, and determining their descriptors (see FIG. 38 and FIG. 66). The process 154 terminates at an end state 180.

Figure 7A:
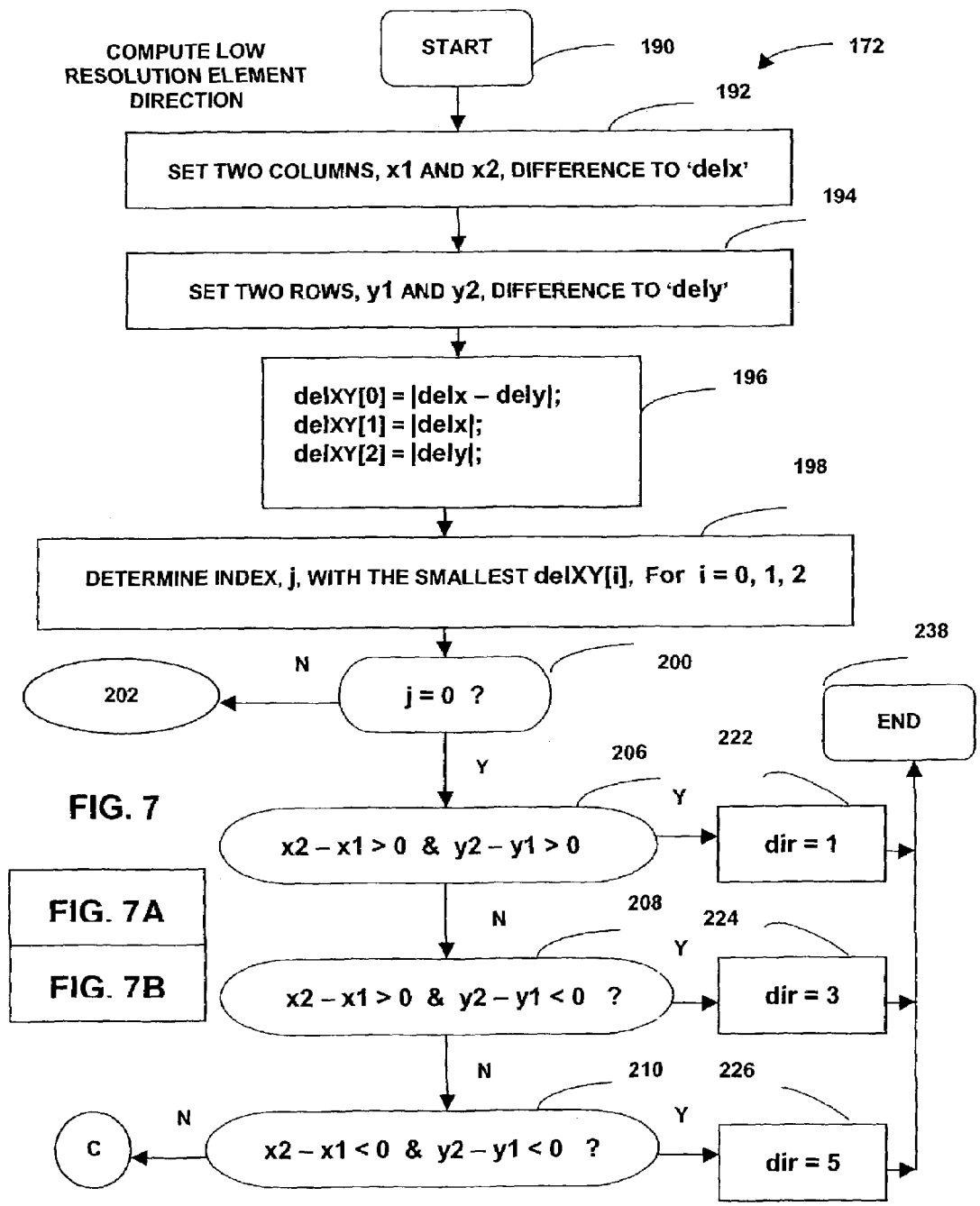
FIG. 7 is a flow diagram illustrating the computation of low resolution element direction.
Figure 7B:
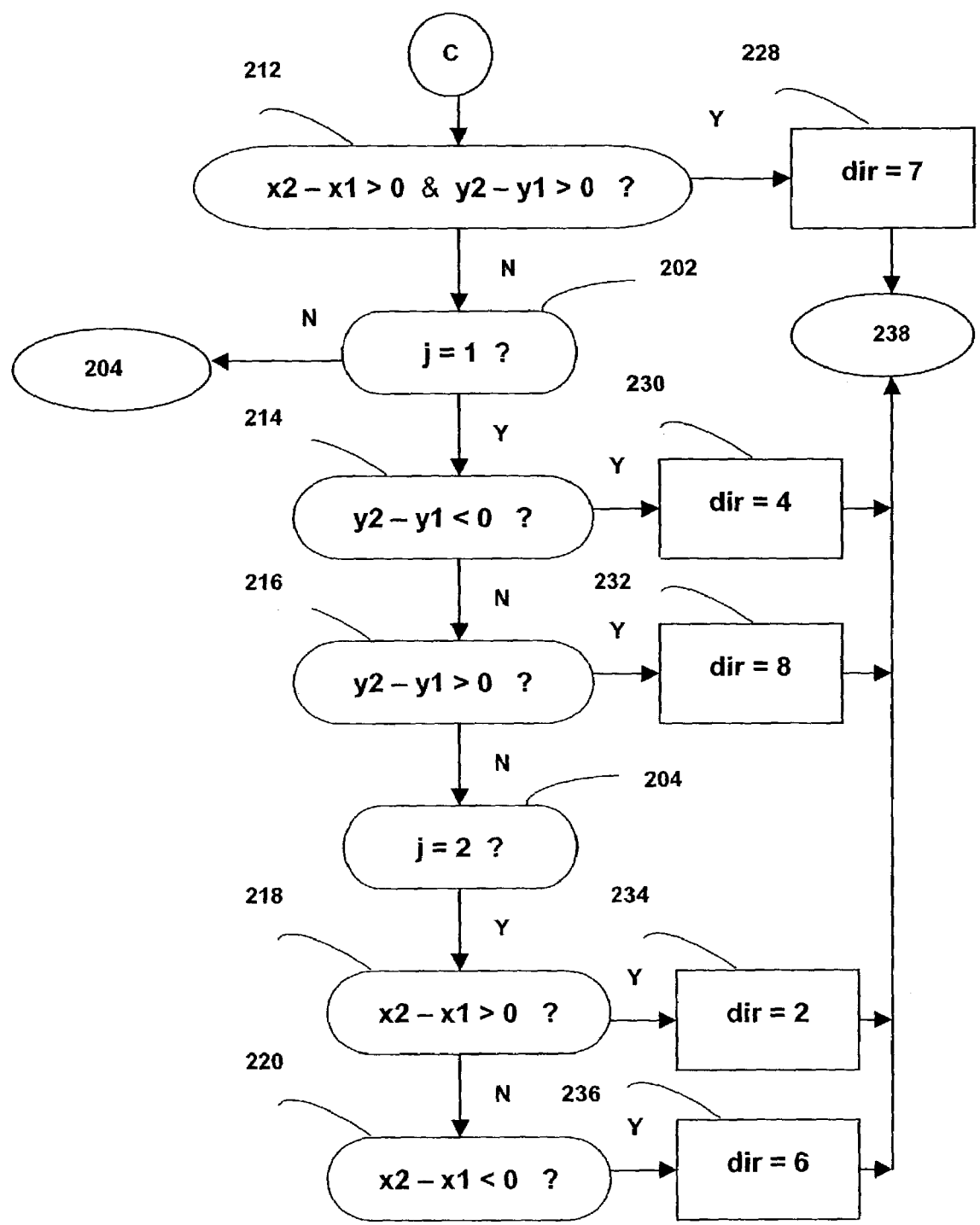

FIG. 7 illustrates the process 172 to compute a low resolution element direction from a pair of point locations, described as state 172 in FIG. 6. According to a preferred embodiment of the present invention the most accurate direction for adjacent as well as non-adjacent pairs of points (if any) is derived. The input to process 172 comprises two pairs of points, namely (x1, y1) and (x2, y2). The process 172 begins at a start state 190 and moves to state 192 wherein the difference between "x2" and "x1" is set to "delx". The process 172 then moves to state 194 wherein the difference between "y2" and "y1" is set to "dely". The process 172 moves to state 196 wherein "delxy[0]", "delxy[1]" and "delxy[2]" are determined from the values of "delx" and "dely". The process 172 moves to state 198 wherein "j" for "delxy[i]" is determined such that "delxy[i]" has the smallest value, for i=0, 1, and 2. The process 172 then moves to the decision state 200, followed by the decision state 202 provided that "j" is not equal to zero, and then to the decision state 204 provided that "j=2". Eventually, the process 172 moves to one of eight states, namely states 222, 224, 226, 228, 230, 232, 234, or 236 depending on the values of "j", "x2−x1" and "y2−y1", and establishes a value for "dir", namely the low resolution element direction which can take 1-of-8 values. The process 172 terminates at an end state 238.

Figure 8A:
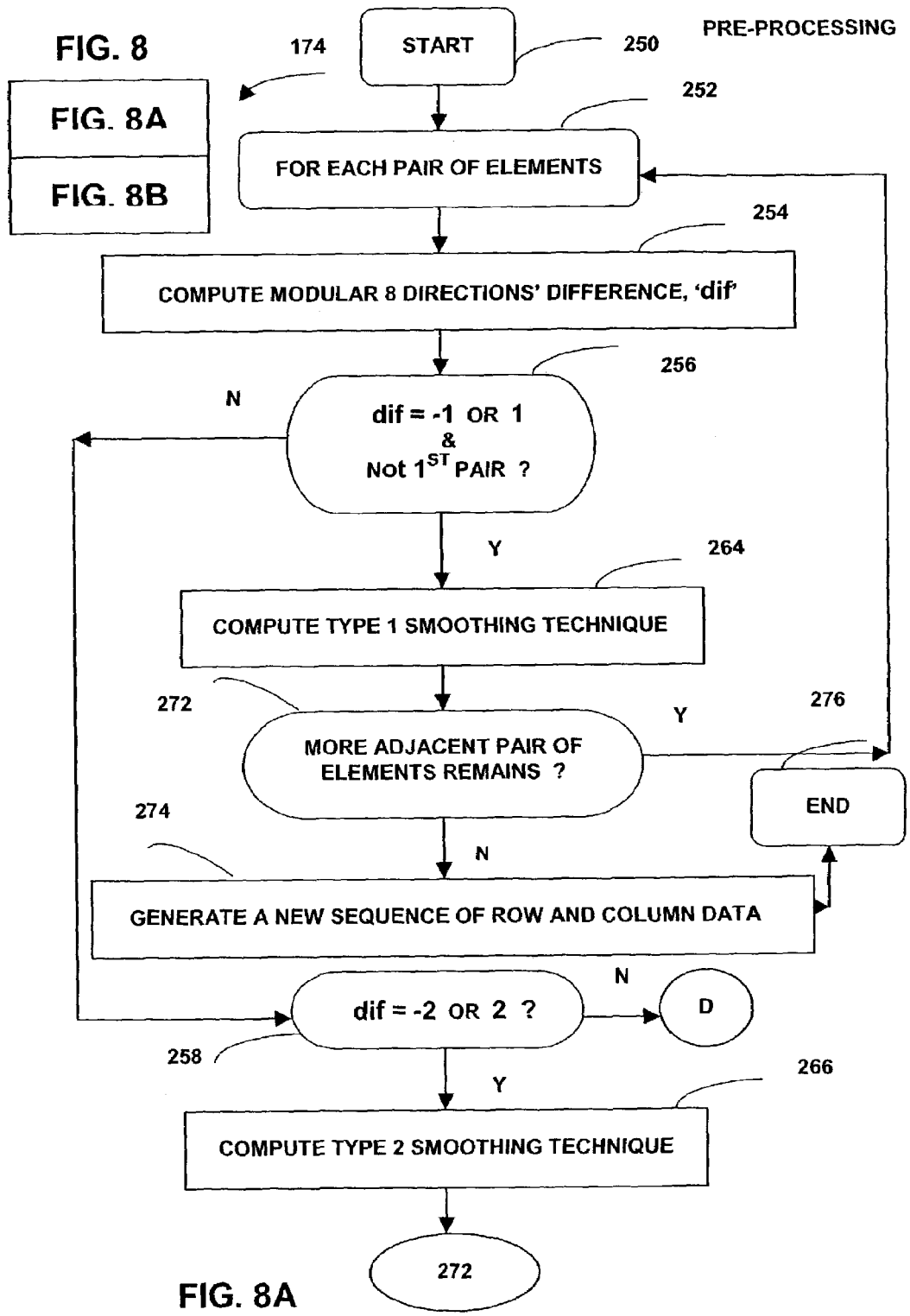
FIG. 8 is a flow diagram illustrating the preprocessing techniques.
Figure 8B:
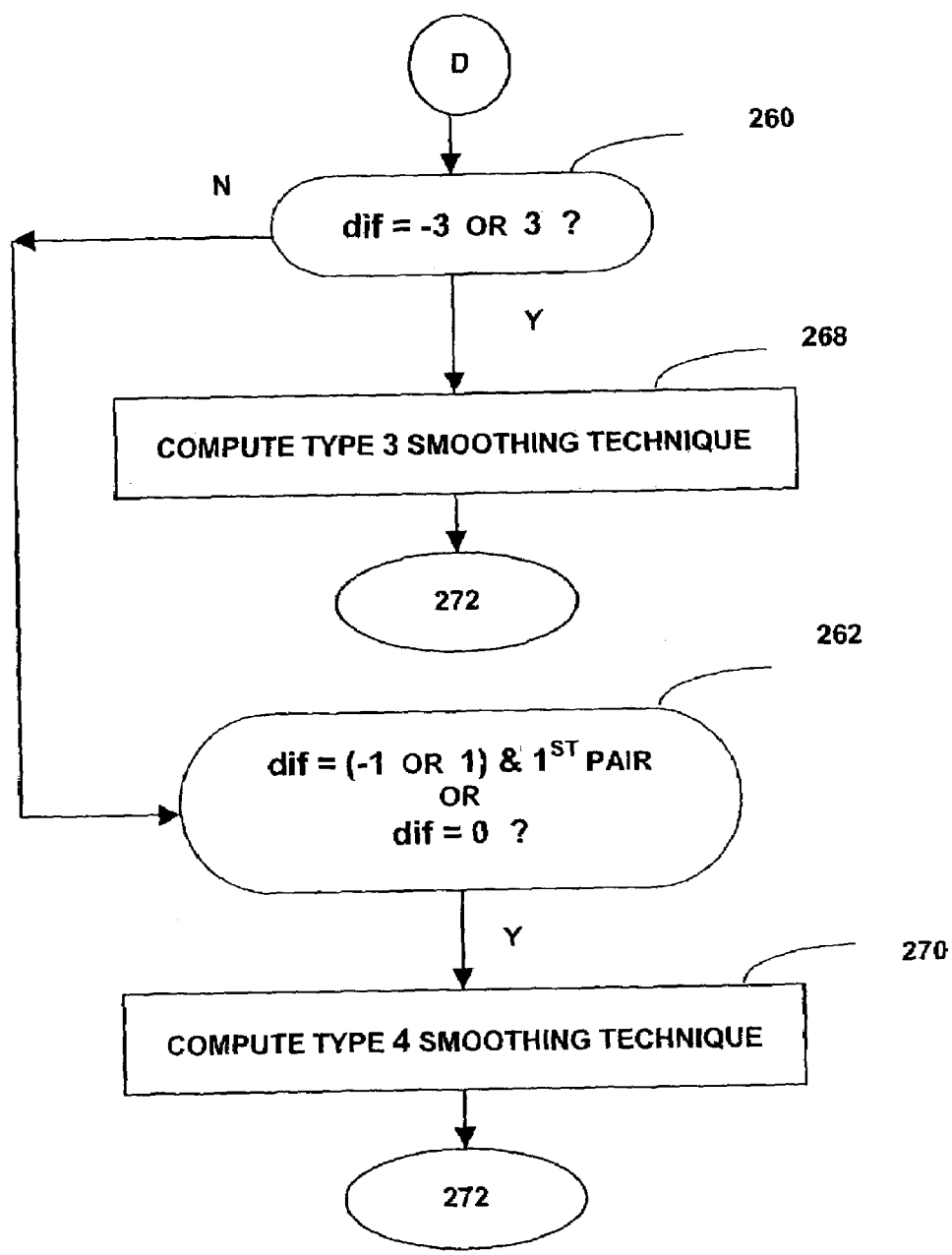
Figure 36:
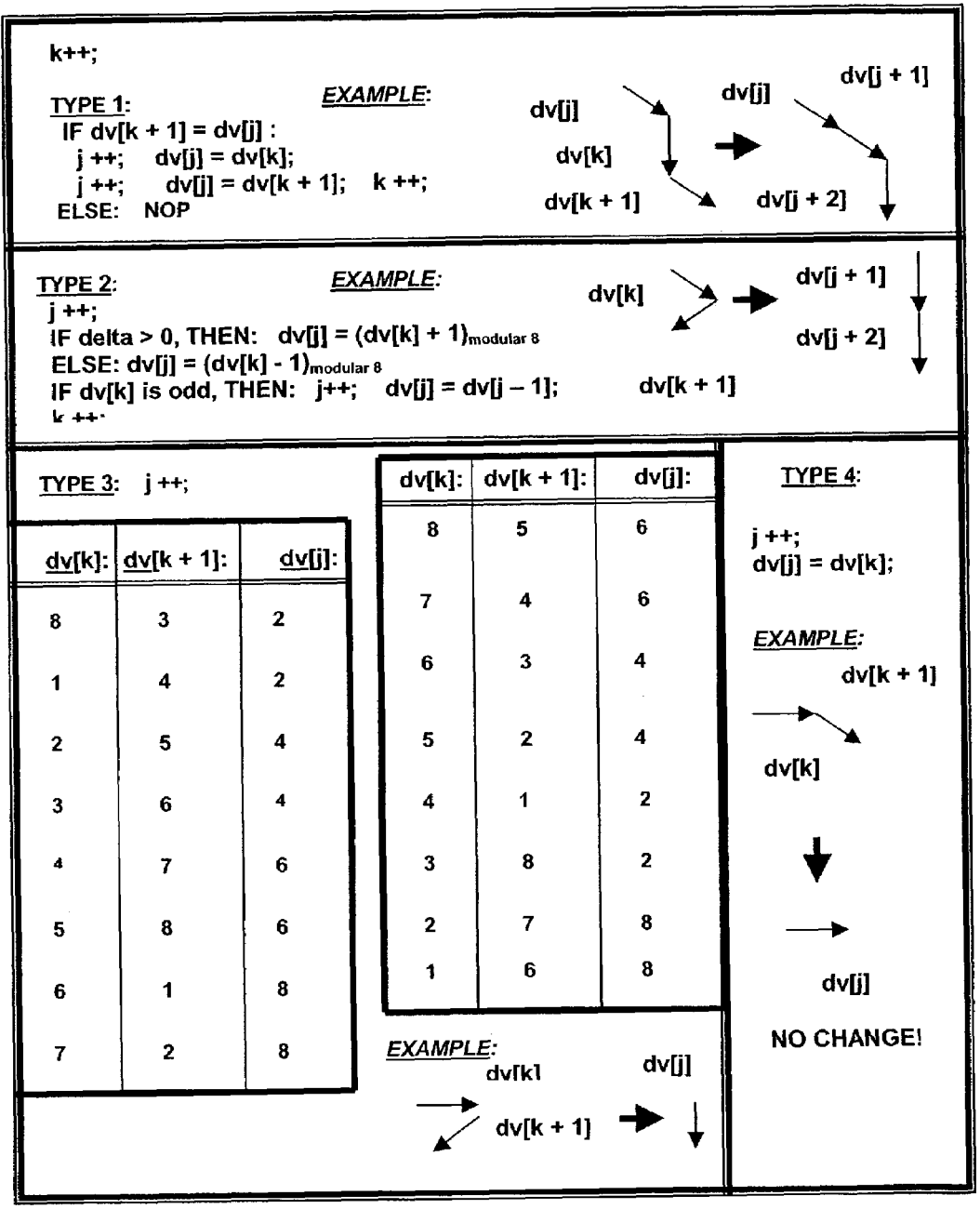
FIG. 36 is a diagram illustrating the type of smoothing that is selected for the given element directions' gradient.
Figure 37:
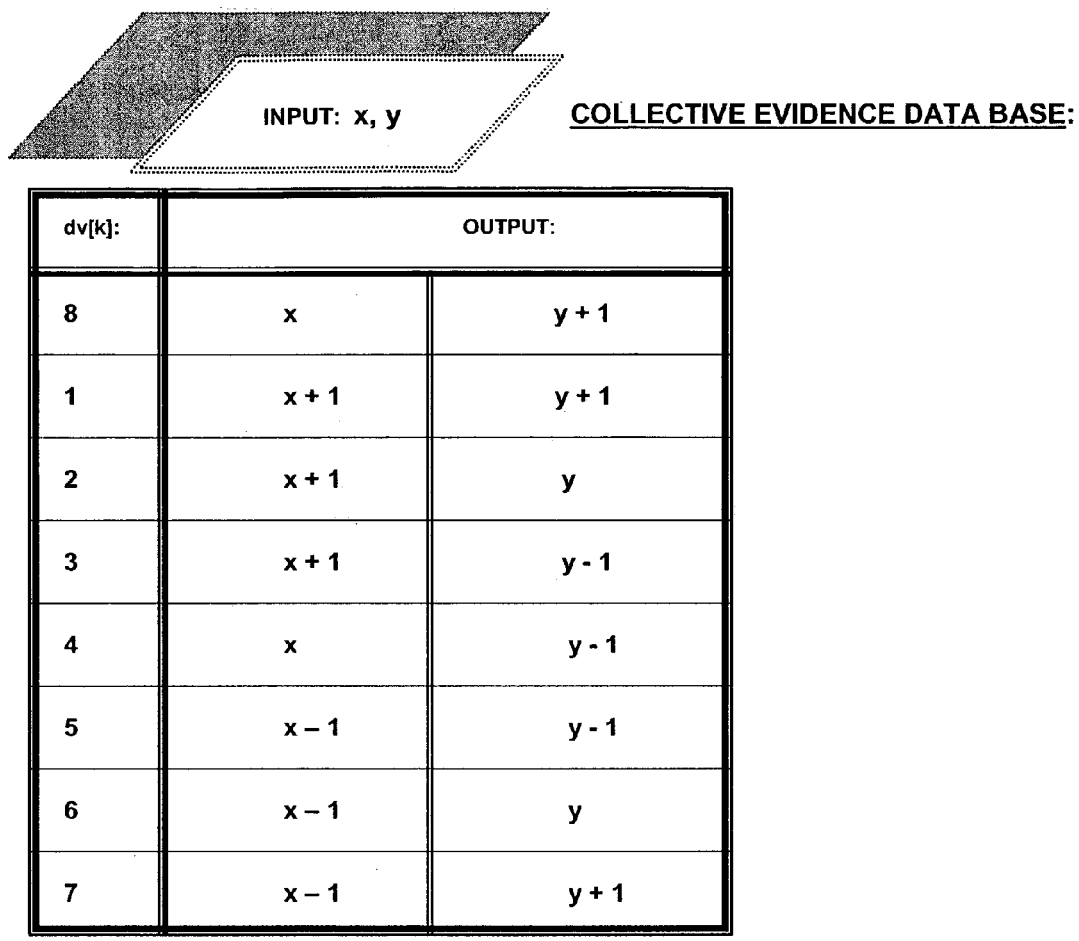
FIG. 37 is a diagram illustrating a look-up table as part of the collective evidence database for the computation of a new sequence of X and Y point locations from the revised series of low resolution directions.

The process 174 is a flow diagram shown as state 174 in FIG. 6 that describes in detail one of several cycles that collectively achieve polyline smoothing, as illustrated in FIG. 8. The input to the process 174 comprises a sequence of low resolution element directions. The number of cycles described above is empirically determined. The process begins at a start state 250 and then moves to state 252 wherein allows states 254-to-272 to be performed repeatedly, once for each pair of elements. The process 174 moves to state 254 wherein the modular 8 difference between the last element's direction and its immediate predecessor is set to "dif". The process 174 then moves to the decision state 256, followed by the decision state 258 provided that the result of the decision state 256 is not in the affirmative, and then to the decision state 260 provided that "dif" is either −3, or 3 and finally to the decision state 262 provided that the result of the decision state 260 is not in the affirmative, as well. Next, process 174 moves to state 264, 266, 268, or 270 depending on the affirmative response of decision states 256, 258, 260, and 262, respectively. The states 264, 266, 268, and 270 represent the type of smoothing that is selected for the given element directions' gradient, as shown in FIG. 36. The process 174 then moves to the decision state 272. If a determination is made at the decision state 272 that states 254-to-272 were repeated for all adjacent pairs of elements, the process 174 moves to state 274 wherein a new sequence of X and Y points are generated from the revised series of low resolution directions via a look-up table shown in FIG. 37. The process 174 finally terminates at an end state 276. If the result of the decision state 272 is in the affirmative, the process 174 moves to state 252 to begin another cycle.

Figure 9:
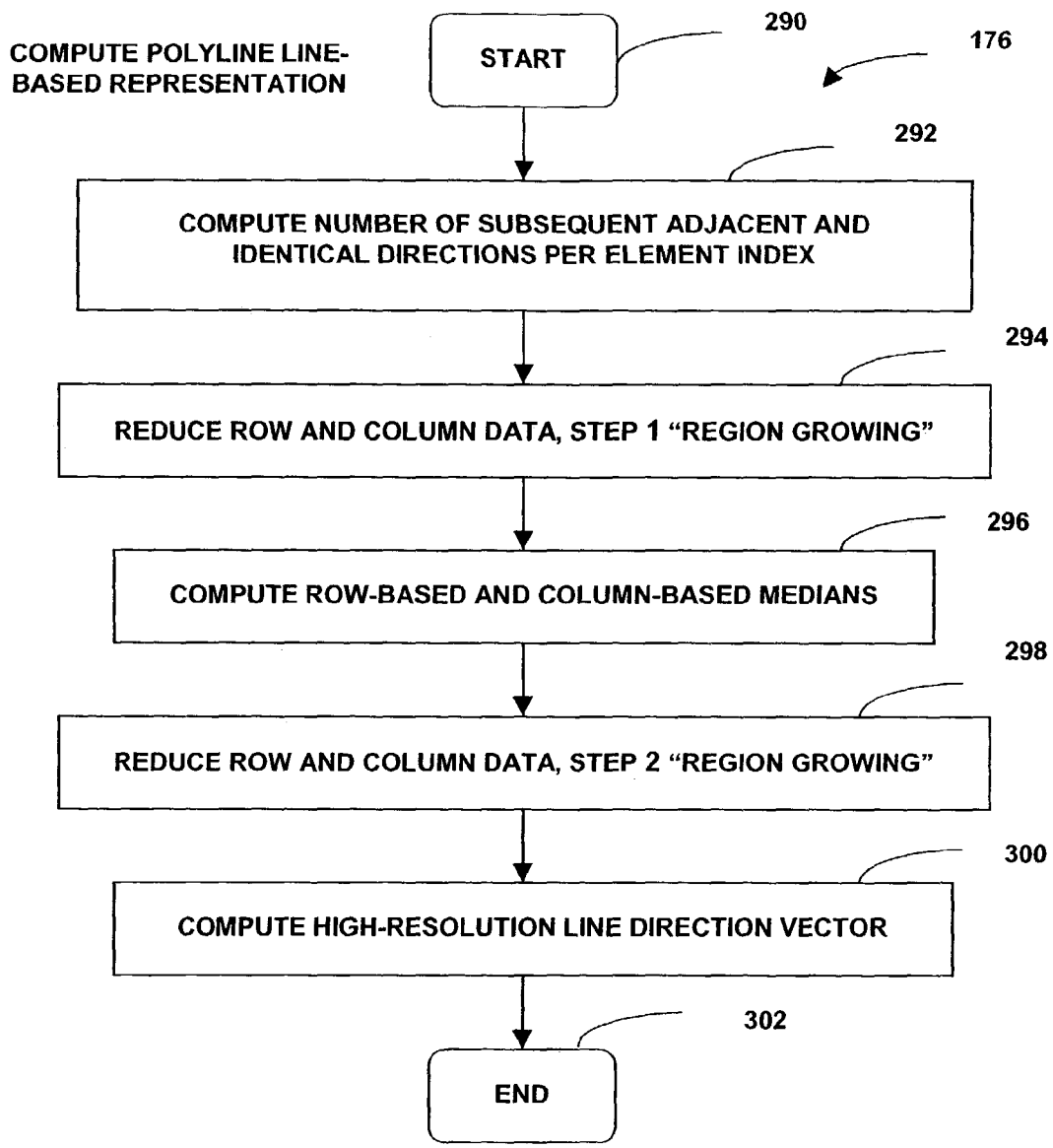
FIG. 9 is a flow diagram illustrating the computation of polyline "line-based" representation.

The process 176 achieves region growing by computing polyline line-based representation, as illustrated in FIG. 9. The process 176 begins at a start state 290 and moves to state 292 wherein the amount of adjoining identical element directions is determined for every element of the polyline whose direction differs from its immediate predecessor (direction shift) or that it is the starting element of the polyline. Those skilled in the art recognize such a procedure. The process 176 then moves to state 294 which is the first of a two step merger process to reduce the series of "X" and "Y" points computed above, belonging to a polyline ID, thereby establishing a specified distance between each newly computed consecutive points. During this process, each polyline's start point and end point are preserved. In state 294, a threshold is determined by assigning it to $1/n^{th}$ of the smaller of the two differences representing the row difference of the polyline ID's extreme points and the column difference of the polyline ID's extreme points. Here, "n" is determined empirically (2<n<6). The process to compute the number of points skipped between each point and the next candidate point belonging to each polyline, uses a new "threshold" equaling to the larger of the two values, namely the threshold derived empirically in state 294 and the number of consecutive identical element directions associated with the point as derived in state 294 to establish the distance that determines the next point. Within this cyclic process, state 294 assigns the computed candidate point as its present point and computes the new "threshold" accordingly, and uses it to compute the next candidate point, and finally terminates when this point matches with (or is at the proximity of) polyline ID's end point Next, the process 176 moves to state 296 wherein two distinct series of saddle points, the first pertaining to the row aspect of points and the second to the column aspect of the points computed above. Each series of saddle points, comprises a sequence of local maxima and minima. Those skilled in the art recognize such a procedure. Next, median values of these two series are averaged together. A new "threshold" is derived empirically from this new "average" using a pre-defined deterministic rule based on experiments performed on multiple users. Finally, if the polyline ID is not the first polyline, this new "threshold" is refined by averaging across all preceding polyline IDs' "thresholds". The process 176 then moves to state 298 wherein the second step to further reduce the series of X and Y points is achieved by using the new "threshold" described above to skip points, where appropriate, similar to the process described in state 294. Accordingly, the process 176 derives "midDelX[p]" which represents a typical value for an arcpoly length. "midDelX[p]" is equal to the median value, up to polyline "p" of the median of the saddle points belonging to the column data.

The process 176 moves to state 300 to compute a series of high resolution accurate line directions from every pair of consecutive points belonging to polyline ID. Accurate, because consecutive points are not adjacent, thus a new technique is devised here to achieve further precision by deriving a direction that is most accurately associated with the each of the pair(s) of points' relative location(s), as line(s) between the pair(s) of points may not occur on any of the sixteen coded directions. Every high resolution line direction has a value ranging between 1-to-16 representing one of sixteen equally divergent vectors, as illustrated in bottom portion of FIG. 2.

Figures 10, 10A, 10B, 10C, 10D:
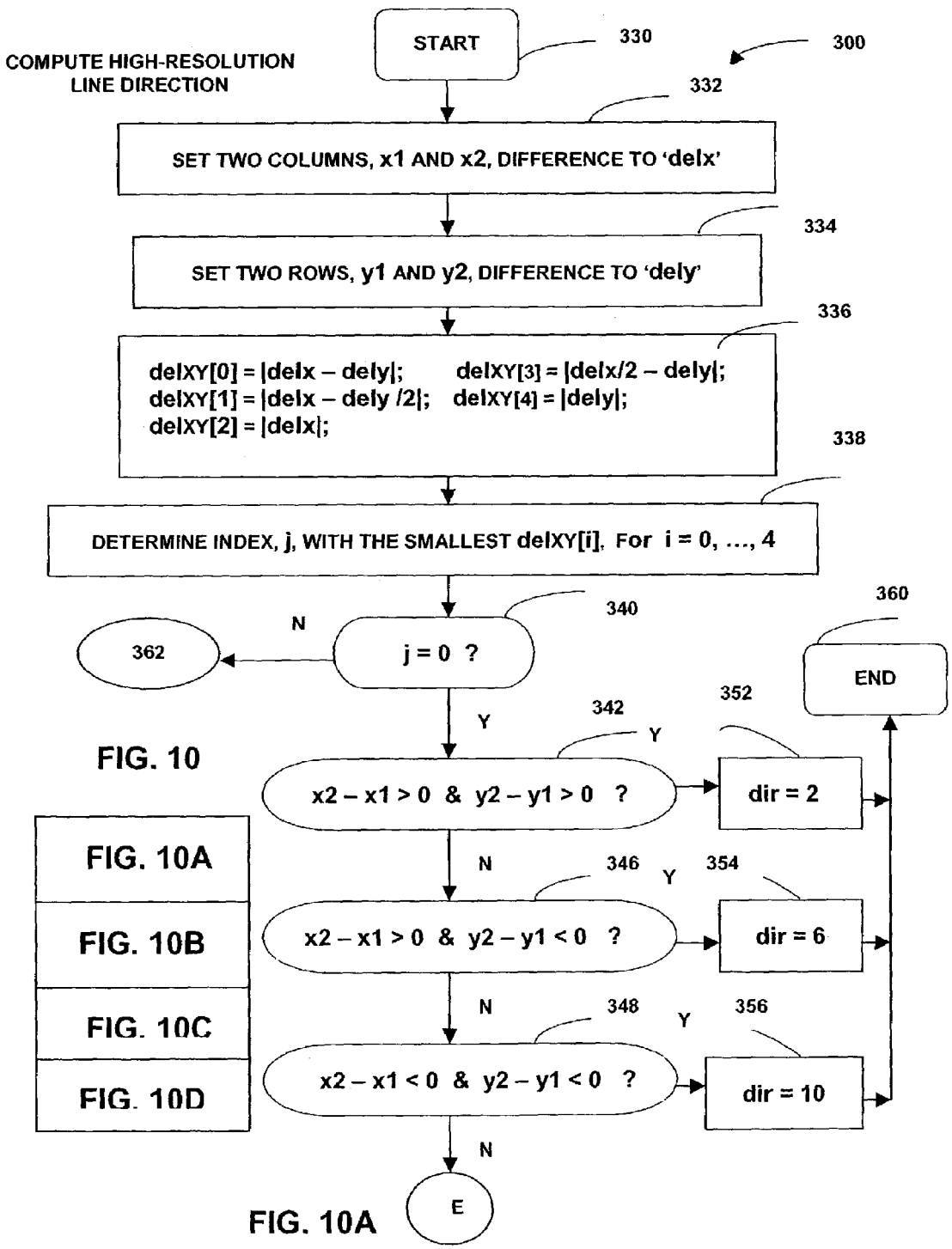
FIG. 10 is a flow diagram illustrating the computation of high resolution line direction.
Figure 10B:
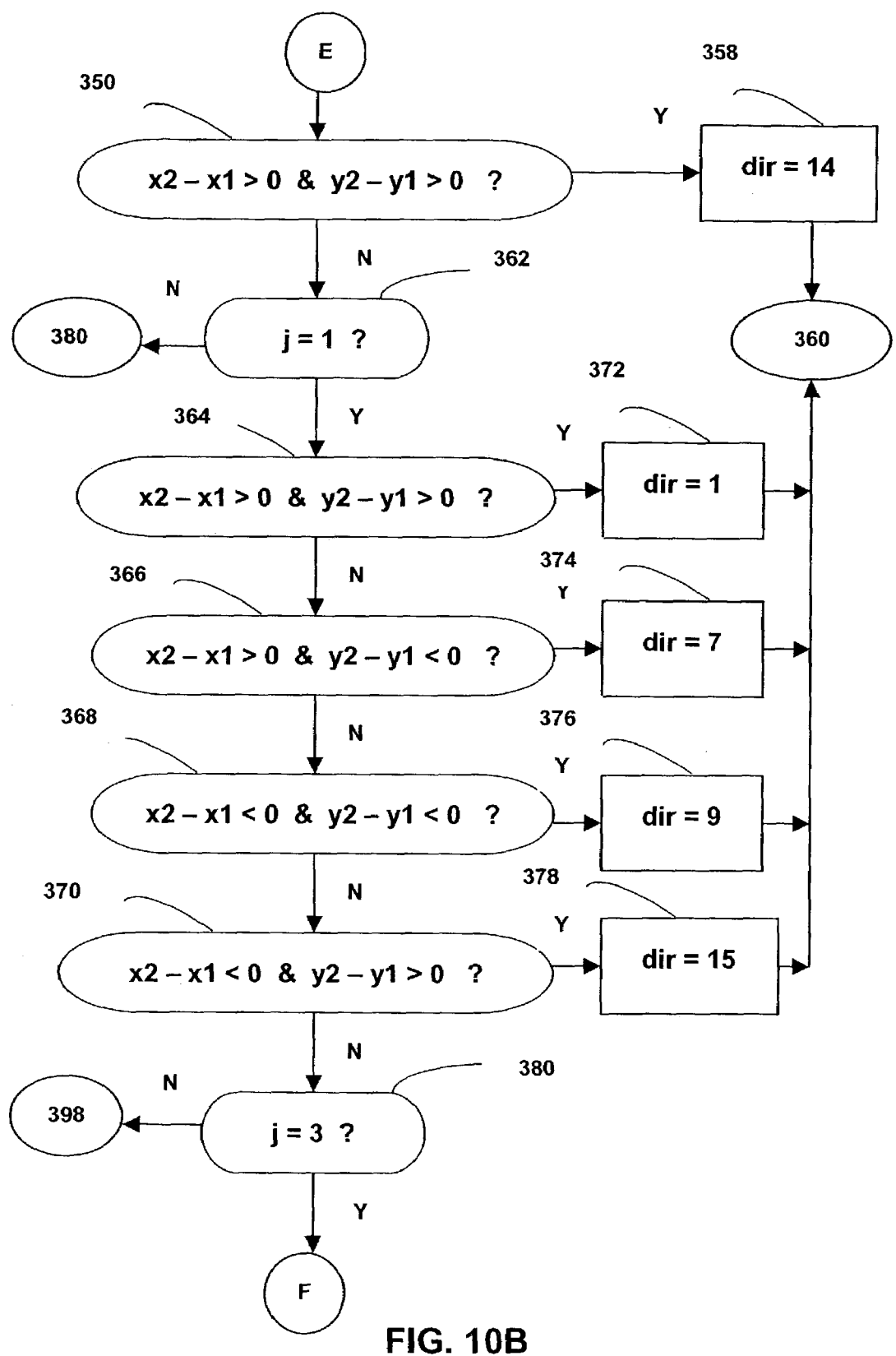
Figure 10C:
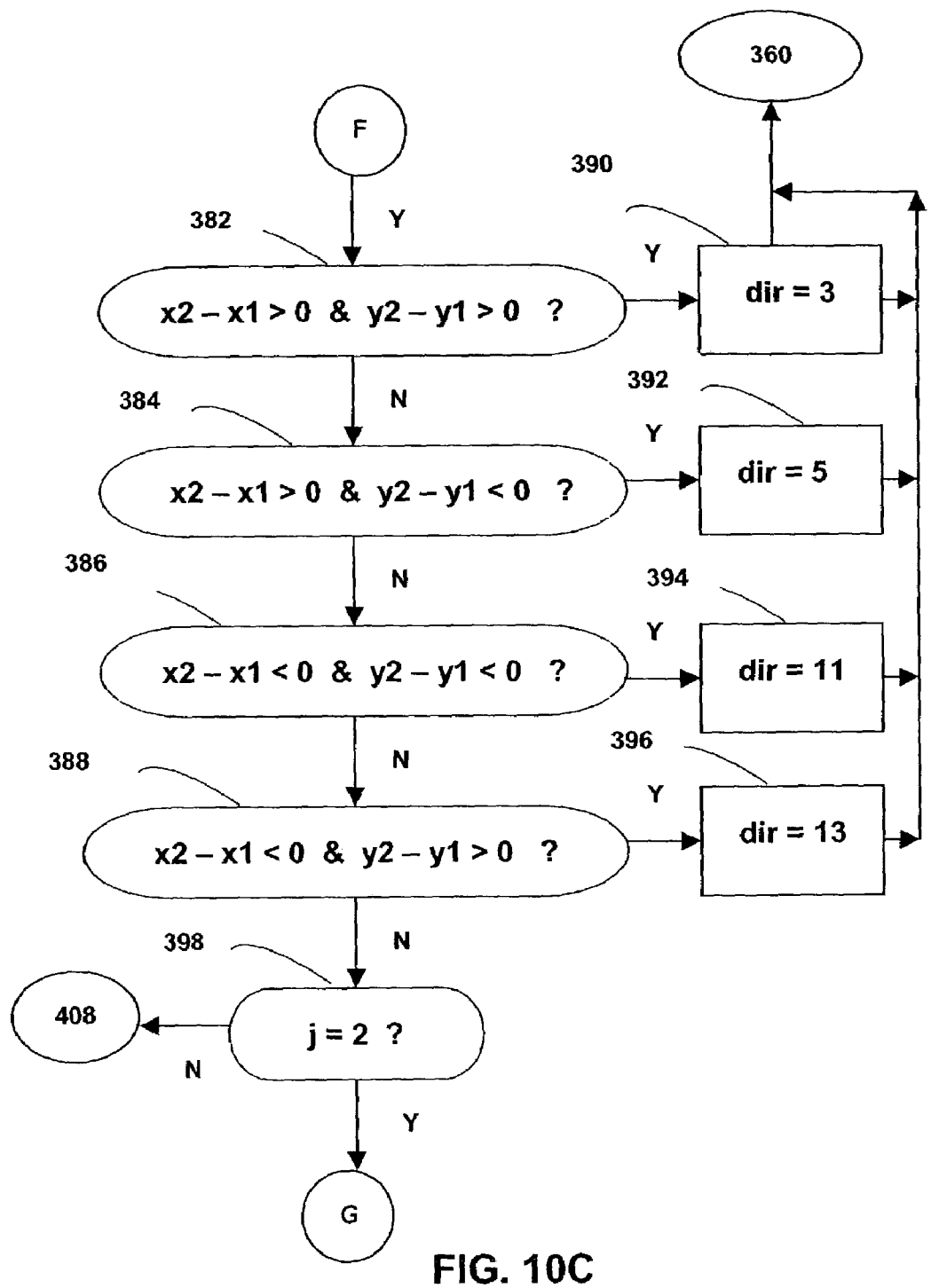
Figure 10D:
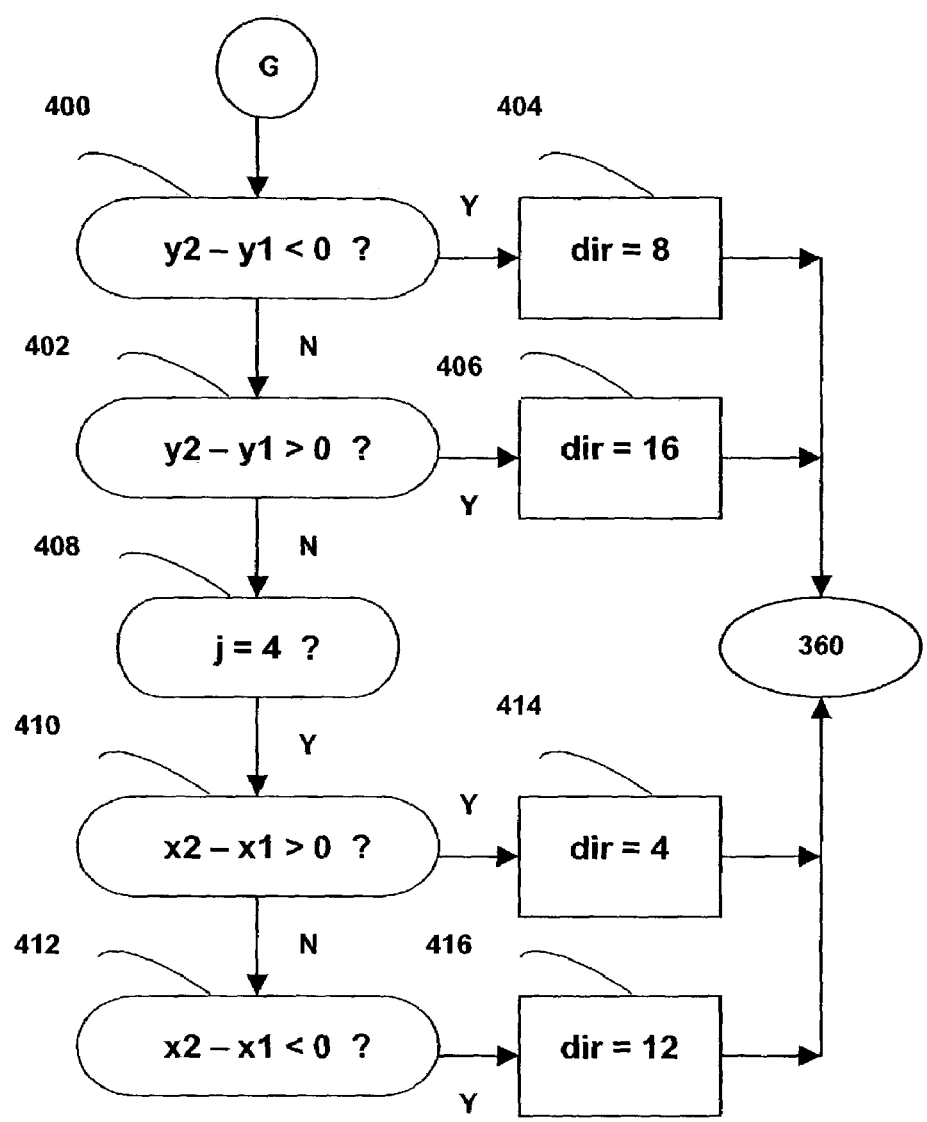

The state 300 of process 176 is illustrated in FIG. 10. The input to process 300 comprises two pairs of points, namely (x1, y1) and (x2, y2). The process 300 begins at a start state 330 and moves to state 332 wherein the difference between "x2" and "x1" is set to "delx". The process 300 then moves to state 334 wherein the difference between "y2" and "y1" is set to "dely". The process 300 moves to state 336 wherein "delXY[0]", "delXY[1]", "delXY[2]", "delXY[3]" and "delXY[4]" are determined. The process 300 moves to state 338 wherein "j" for "delXY[i]" is determined such that it has the smallest value, for i=0, 1, 2, 3, and 4. Next, the process 300 moves to the decision state 340, and then to the decision state 362 provided that "j=1", followed by the decision state 380 provided that "j=3", followed by the decision state 398 provided that "j=2", and finally to the decision state 408 provided that "j=4". The process 300 finally moves to one of sixteen states, namely states 352, 354, 356, 358, 372, 374, 376, 378, 390, 392, 394, 396, 404, 406, 414, or 416 depending on the values of "j", "x2–x1" and "y2–y1", thus establishing a value for "dir", the high resolution line direction which can take 1-of-16 values. The process 300 terminates at an end state 360. The process 176 terminates at an end state 320.

Next, the process 142 moves to state 156 wherein each arcpoly is selectively refined in this first of a three step post-processing process. The process 156 operates on all successive arcpoly(s) to merge successive arcpoly(s) when adjoining arcpolys have equal direction of motion and there is a minor direction change between the last line direction of the former arcpoly and the first line direction of the latter arcpoly such that the combined arcpoly has one direction of motion, as described in the Semantics Section. Moreover, the process 156 performs other forms of post-processing using pre-defined deterministic rules that are based on such factors as successive arcpoly(s)' clockwise motions and extreme points' sizes, as well as modular 16 difference between the arcpoly(s)' extreme points' directions. The rules were established based on experiments performed on multiple users.

Figure 11A:
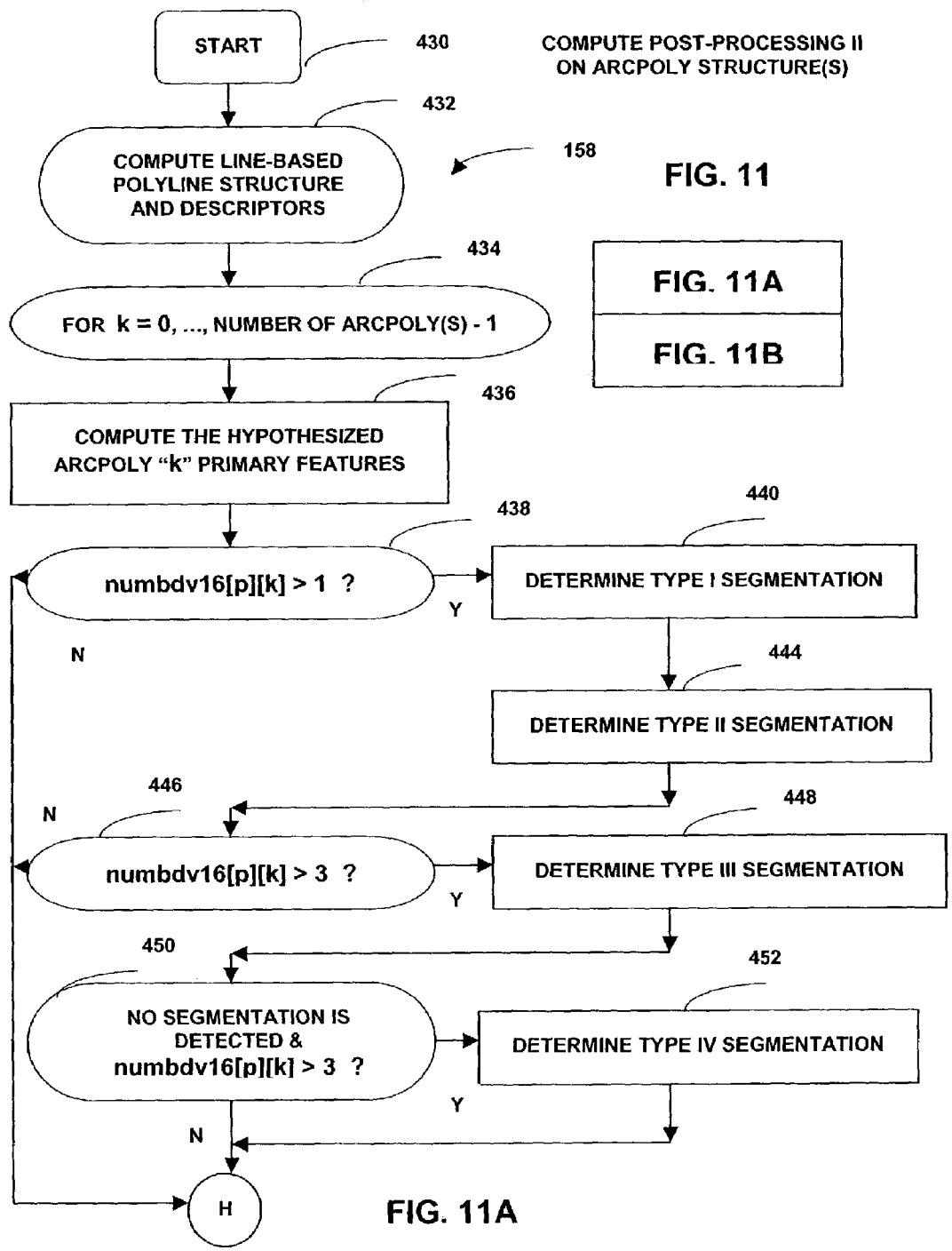
FIG. 11 is a flow diagram illustrating the computation of post-processing II on arcpoly(s).
Figure 11B:
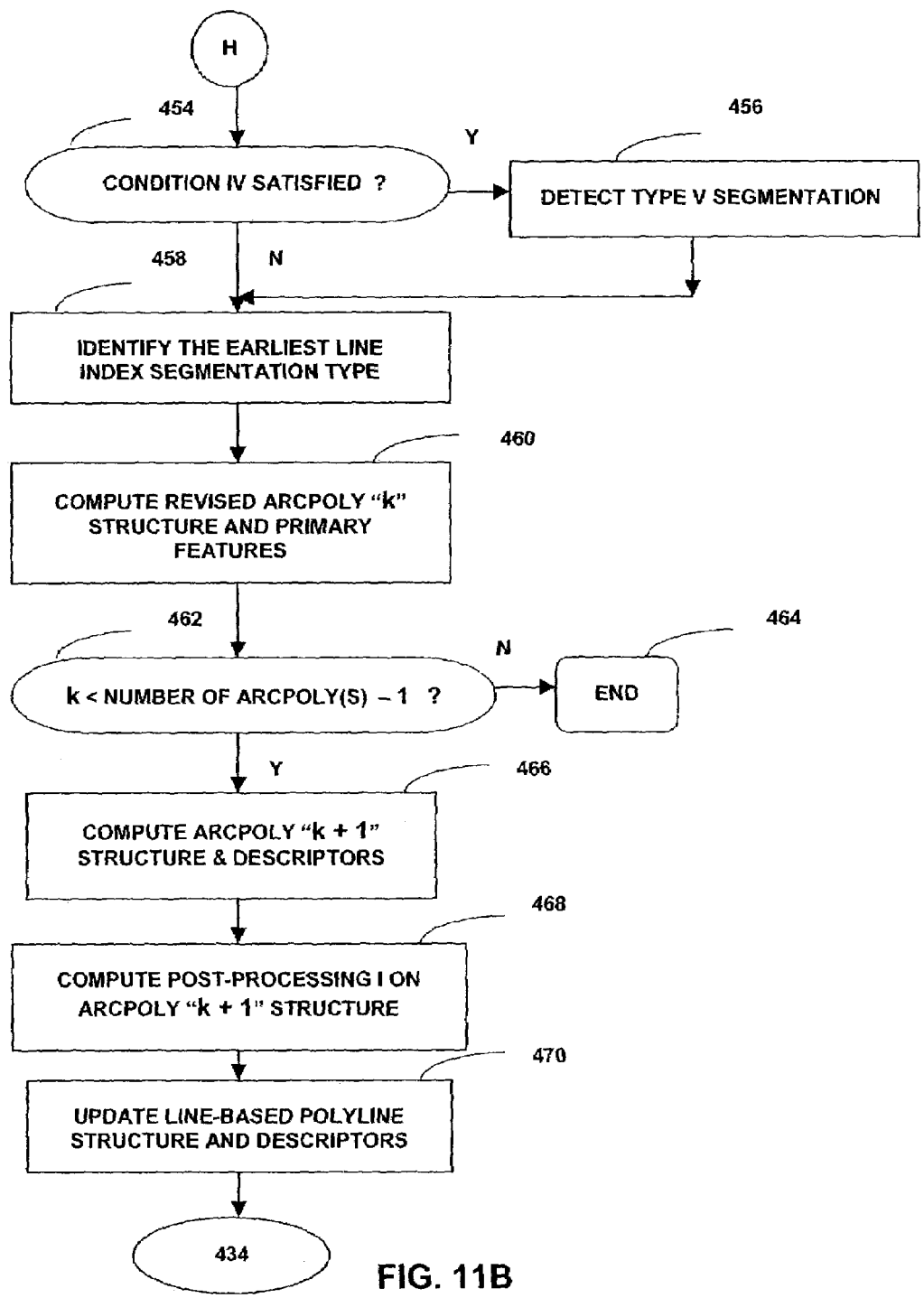

The state 158 of process 142 is illustrated in FIG. 5. The process 158 is illustrated in FIG. 11 wherein selective arcpoly(s)' are structurally (i.e., shape, size, orientation, etc.) further refined using this second step of the post-processing process whereby over-grown arcpoly(s) may be split into two adjacent arcpolys based on a pre-defined criteria in connection with the detection of structural anomalies between the modeled alphanumeric symbols and the derived arcpoly(s), such as the detection of significant "bends" within each arcpoly. The process 158 represents the third phase of the symbolic reshaping scheme and begins at a start state 430 and moves to state 432 wherein a line-based polyline is determined comprising a series of line points and line directions. The process 158 then moves to state 434 wherein allows states 436-to-462 of the process 158 to be performed repeatedly, once for each arcpoly. The number of arcpolys and "numbdv16[p][k]" are established within the process 158. Next, the process 158 moves to state 436 wherein primary features are computed for the hypothesized arcpoly ID comprising: (i) extreme points' direction, (ii) depth direction, (iii) extreme points' size, (iv) depth size, and (v) clockwise motion relative to the start point. Note that the fifth feature is mainly used to derive other features and the sixth unlisted primary feature, namely, extension is inferred later during the overall process. As another preferred embodiment of the invention, the six primary features are stored in the database for each arcpoly, describing the arcpoly's entire shape and orientation (or pose).

The process 158 then moves to the decision state 438. Next, the process 158 moves to state 440 to detect segmentation typeI whereby significant "bends" in the handwritten input are detected and then moves to state 444 to detect segmentation, contingent upon the affirmative response of the decision state 438 typeII whereby direction reversal is detected. The process 158 moves to the decision state 446. If the result of the decision state 446 is in the affirmative the process 158 moves to state 448 to detect segmentation typeIII whereby "significant" combined size and "small" direction shift of the first two lines of the arcpoly are detected and then moves to the decision state 450. If the results of the decision state 450 are in the affirmative the process 158 moves to state 452 to detect segmentation typeIV whereby arcpoly's first or last line "significance" is detected, signifying the existence of a line arcpoly adjacent to an arc (i.e., "d") arcpoly and then moves to the decision state 454 wherein condition IV is empirically determined from experiments performed on multiple users, as it depends on such factors as arcpoly "k"'s (i) largest pair-wise modular 16 direction difference, (ii) median, (iii) maximum line size, and (iv) the number of lines. Otherwise, the process 158 moves directly to the decision state 454. If the results of the decision state 454 are in the affirmative, the process 158 moves to state 456 to detect segmentation type V whereby arcpoly's first line "significance" is detected solely, signifying the existence of a line and arc/or line arcpoly and then moves to state 458. Otherwise, the process 158 moves directly to state 458. If the result of the decision state 438 is not in the affirmative, the process 158 moves to the decision state 454. If the result of the decision state 446 is not in the affirmative, the process 158 moves to the decision state 454.

The states 440, 444, 448, 452, and 456 can serve to revise the originally hypothesized arcpoly "k" by identifying arcpoly "k"'s (i) segmentation line index, "bIndex" and (ii) computing the segmentation confidence level, "probab", both exclusive to their segmentation type routine. The process 158 moves to state 458 to detect the segmentation type ID (i.e., segmentation type IV) that generates arcpoly "k"'s smallest (or earliest) segmentation line ID while imposing a condition whereby segmentation confidence level generated by each segmentation type must exceed 50. The process 158 then moves to state 460 to compute the primary features for the current (revised) arcpoly "k". The process 158 then moves to the decision state 462. If the result of the decision state 464 is not in the affirmative, the process 158 terminates at an end state 464. Otherwise, the process 158 moves to state 466 to compute the next arcpoly ID and its descriptors, as described earlier. The process 158 then moves to state 468 wherein step1 post-processing is performed on the next arcpoly ID, as described earlier. Next, the process 158 moves to state 470 to update the line-based polyline and descriptors described above by excluding the current arcpoly ID. Finally, the process 158 moves to state 434 to begin another next cycle.

Figure 12:
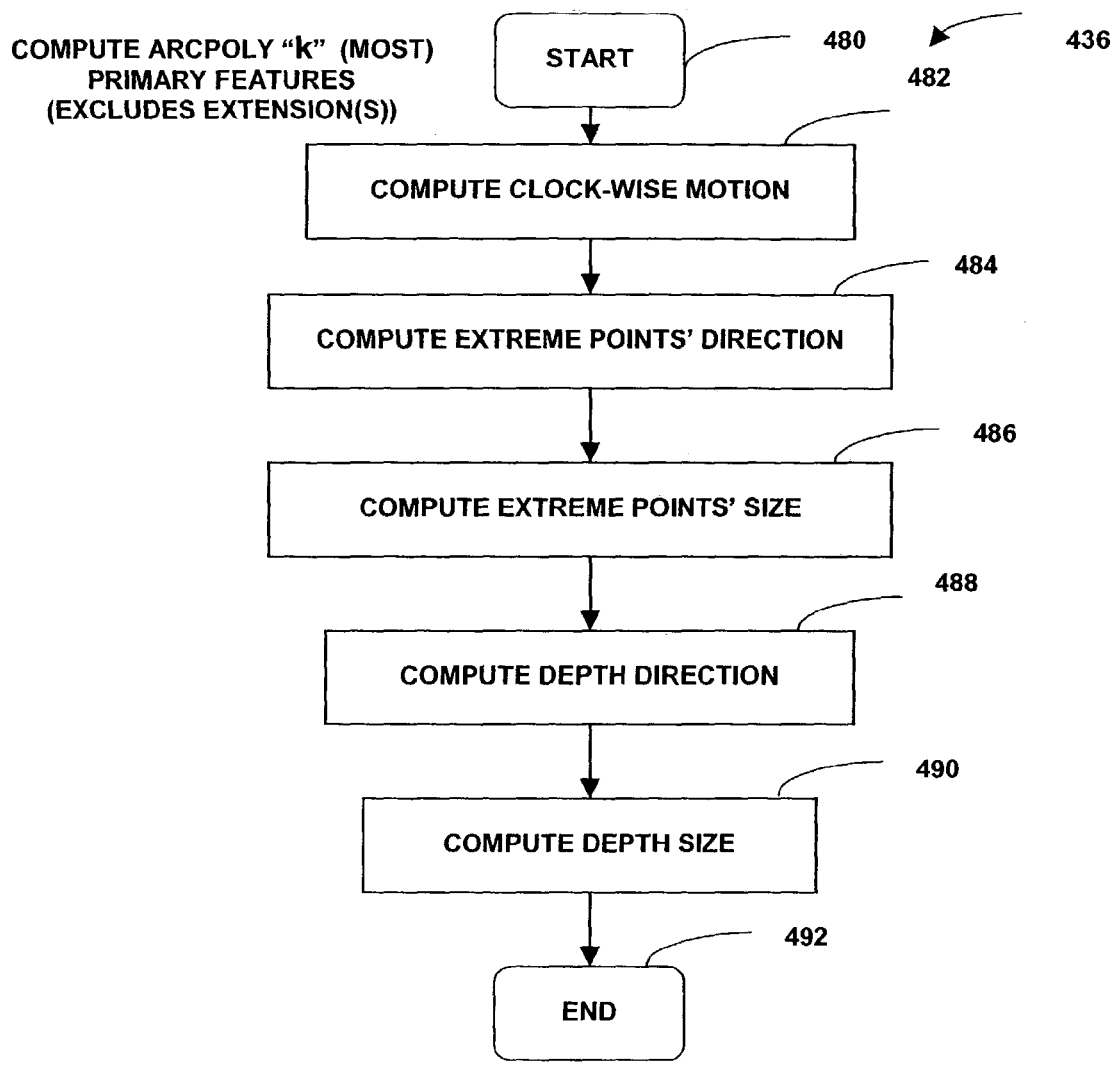
FIG. 12 is a flow diagram illustrating the computation of arcpoly "k" primary features that exclude the determination of extension(s).
Figure 39:
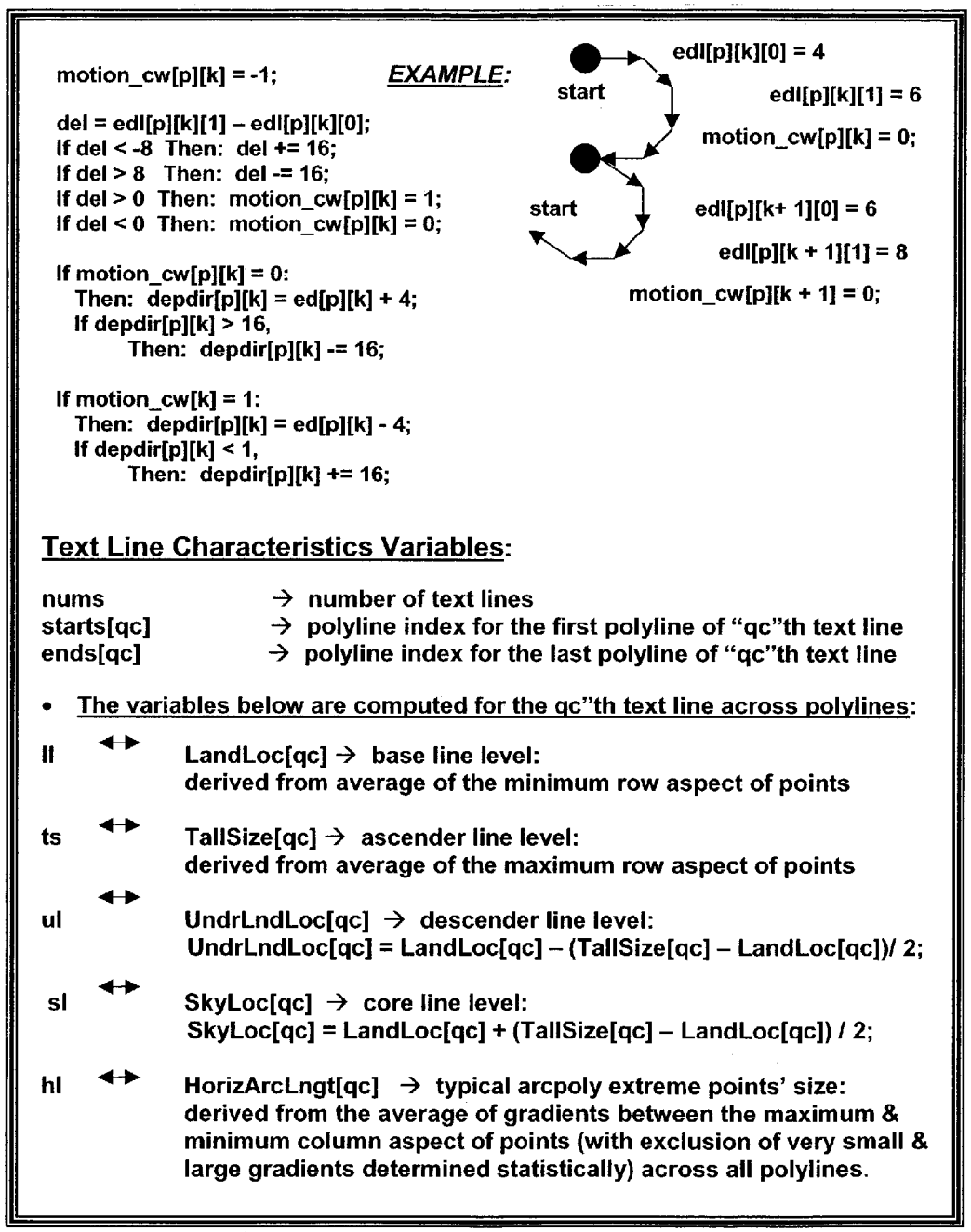
FIG. 39 is a diagram illustrating (i) the derivation of the motion clockwise direction (or the direction of rotation) and the depth direction by way of example, and (ii) the text characteristic lines for one or more lines of text within the image.

The state 436 of process 158 is illustrated in FIG. 12. The process 436 begins at a start state 480 and moves to state 482 wherein clockwise motion of arcpoly "k" is determined by way of an example in FIG. 39. The process 436 then moves to state 484 to compute extreme points' high resolution direction as described in the process 300. The process 436 moves to state 486 wherein extreme points' size is computed. Next, the process 436 moves to state 488 to compute depth direction as shown in FIG. 39 and then moves to state 490 to compute depth size and finally terminates at an end state 492.

Figure 13:
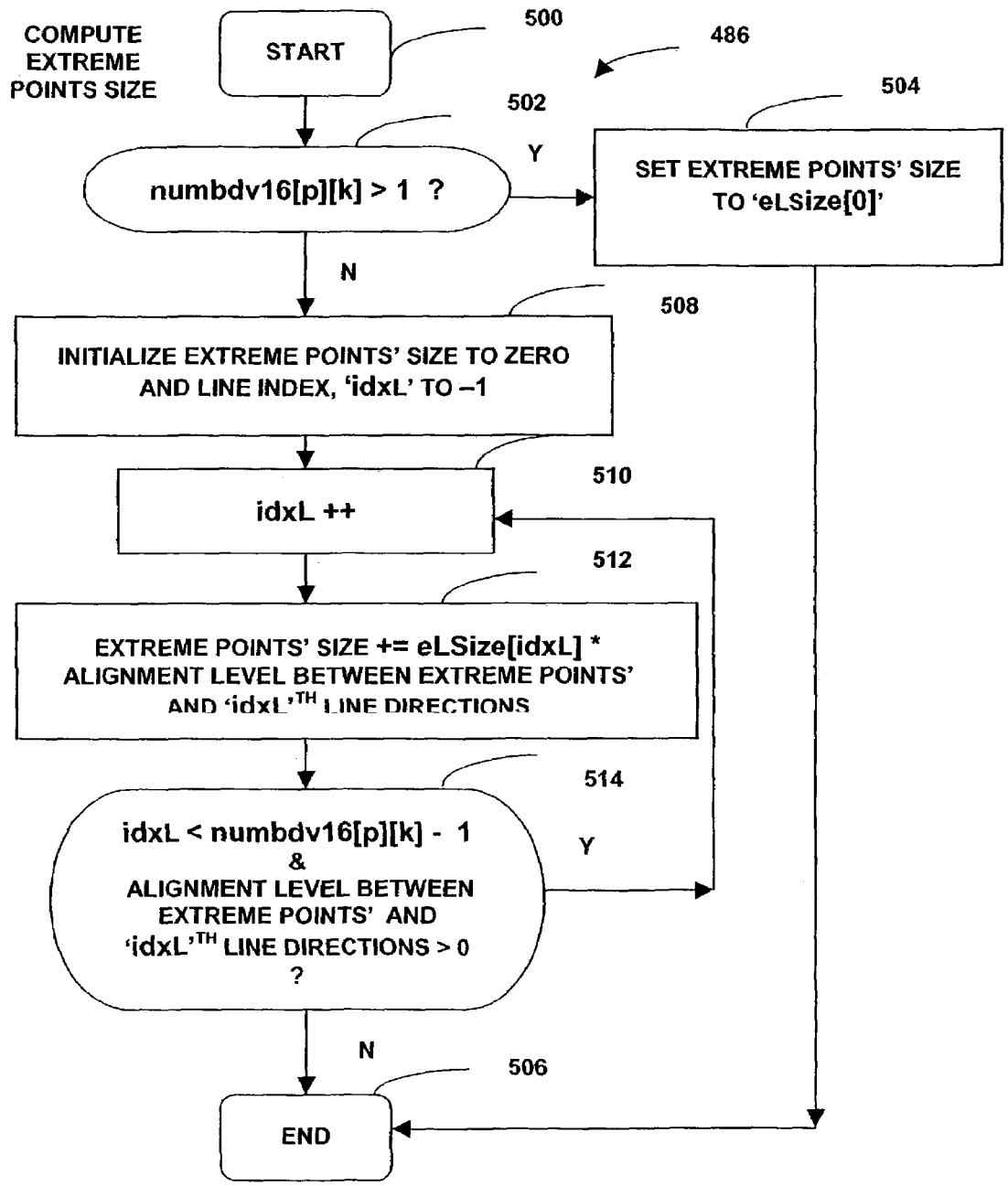
FIG. 13 is a flow diagram illustrating the computation of extreme points size.

The state 486 of the process 436 is illustrated in FIG. 13. The extreme points' size derived using the following technique is considerably more accurate than its trivial counterpart of computing the distance from the two extreme points, because when these points somewhat converge towards each other, their distance under-estimates the size of the arcpoly. The process 486 begins at a start state 500 and moves to the decision state 502. If a determination is made at the decision state 502 that "numbdv16[p][k]=1", then line 0 size is set to the extreme points' size and then the process 486 terminates at an end state 506. Otherwise, the process 486 moves to state 508 wherein the extreme points' size is initialized to zero. The process 486 then moves to state 510 wherein "idx" is incremented by one and then moves to state 512 to revise extreme points' size. The process 486 moves to the decision state 514. If a determination is made at the decision state 514 that the polarity of the alignment level has changed from positive-to-negative or that "idxL=numbdv16[p][k]−1", the process 486 terminates at the end state 506. Otherwise, the process 486 moves to state 510 to begin another cycle.

Figure 14A:
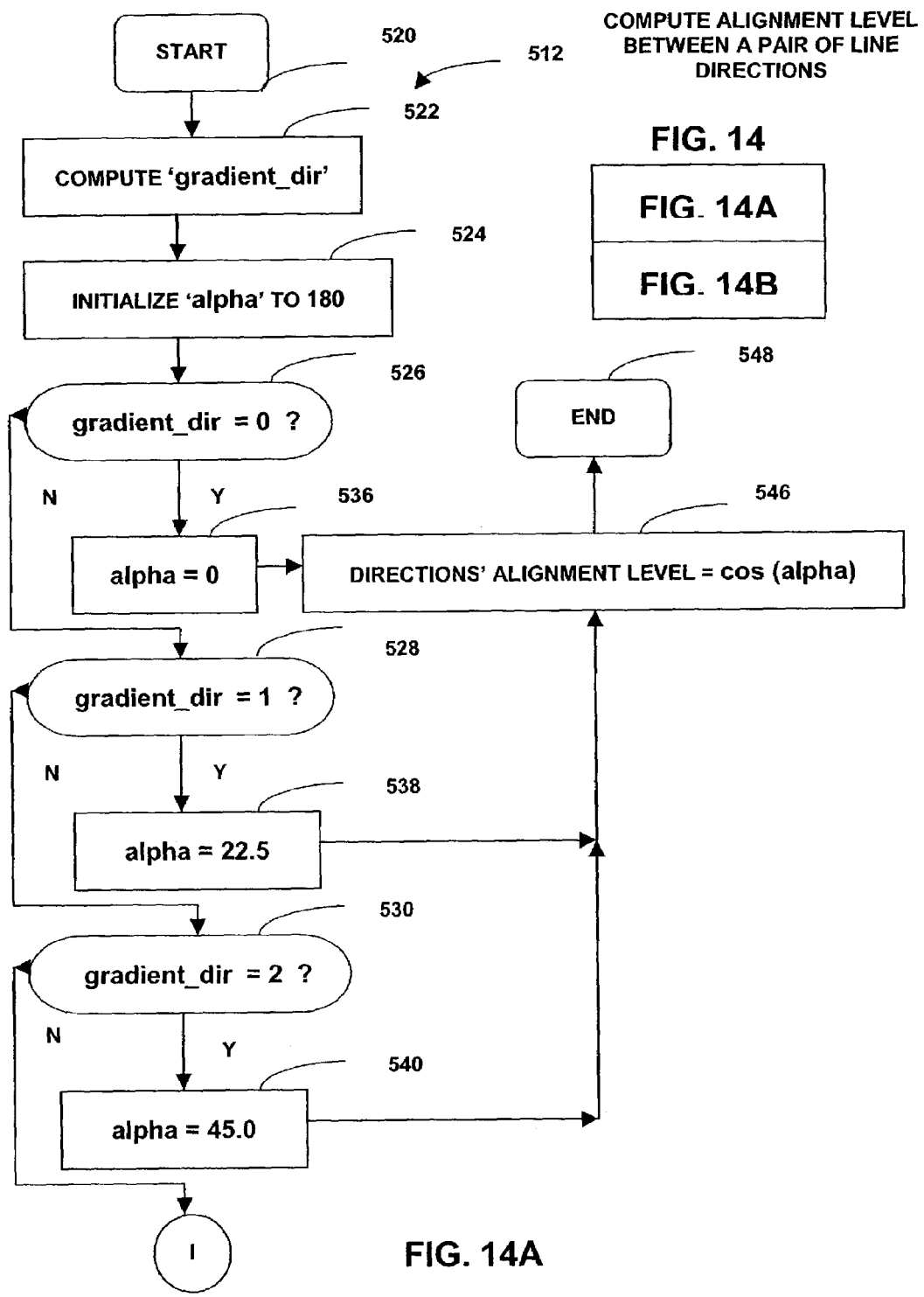
FIG. 14 is a flow diagram illustrating the computation of alignment level between a pair of line directions.
Figure 14B:
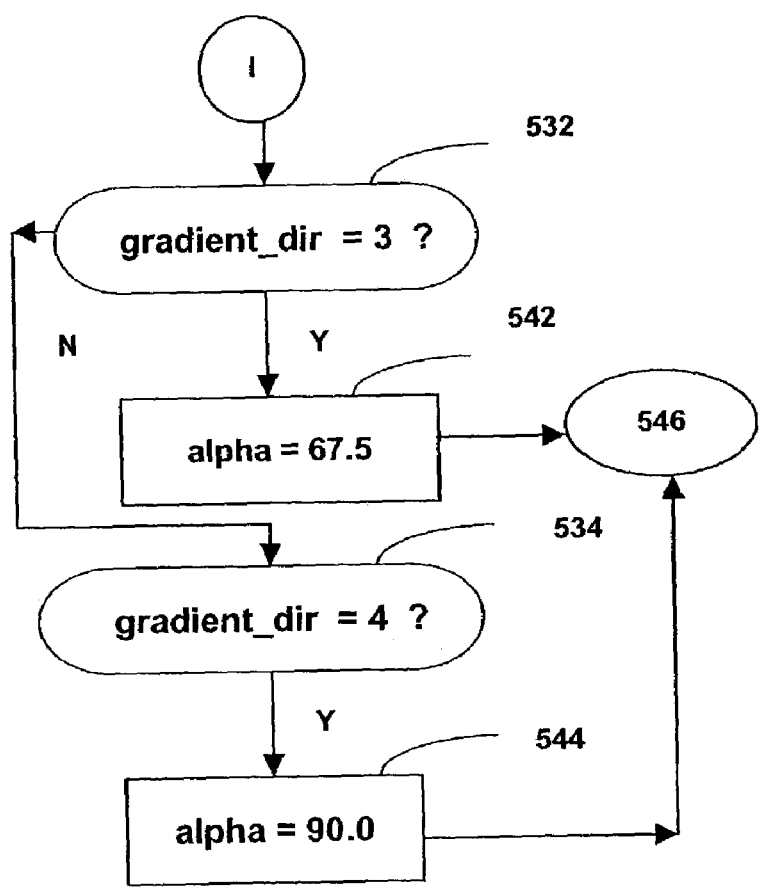

The aspect of state 512 of the process 486 that computes alignment level between a pair of line directions is illustrated in FIG. 14. The process 512 begins at a start state 520 and moves to state 522 wherein a gradient direction is computed equal to the modular 16 difference between a pair of line directions. The process 512 then moves to state 524 wherein "alpha" is initialized to 180. Next, the process 512 moves to the decision state 526. The process 512 moves to state 536 to assign zero to "alpha" contingent upon the affirmative response of state 526. The process 512 moves to the decision state 528. If the result of the decision state 528 is in the affirmative, the process 512 moves to state 538 to set "alpha" to 22.5 and then moves to state 546 to set "cos(alpha)" to the degree of alignment between the two directions. Otherwise, the process 512 moves to the decision state 530. If the result of the decision state 530 is in the affirmative, the process 512 moves to state 540 to set "alpha" to 45 and then moves to state 546. Otherwise, the process 512 moves to the decision state 532. If the result of the decision state 532 is in the affirmative, the process 512 moves to state 542 to set "alpha" to 67.5 and then moves to state 546. Otherwise, the process 512 moves to the decision state 534. If the result of the decision state 534 is in the affirmative, the process 512 moves to state 544 to set "alpha" to 90 and then moves to state 546. The process 142 finally terminates at an end state 548.

The process to compute depth size is the same as the process to compute extreme points' size, with the following exceptions: (i) when arcpoly "k" comprises one line, then depth size is set to zero, (ii) the gradient direction is the modular 16 difference between depth direction and $1^{th}$ line direction, where l=0, . . . , numbdv16[p][k]−1 and (iii) the cumulative process terminates when line ID's direction modularly (modular 16) exceeds depth direction.

Figure 15:
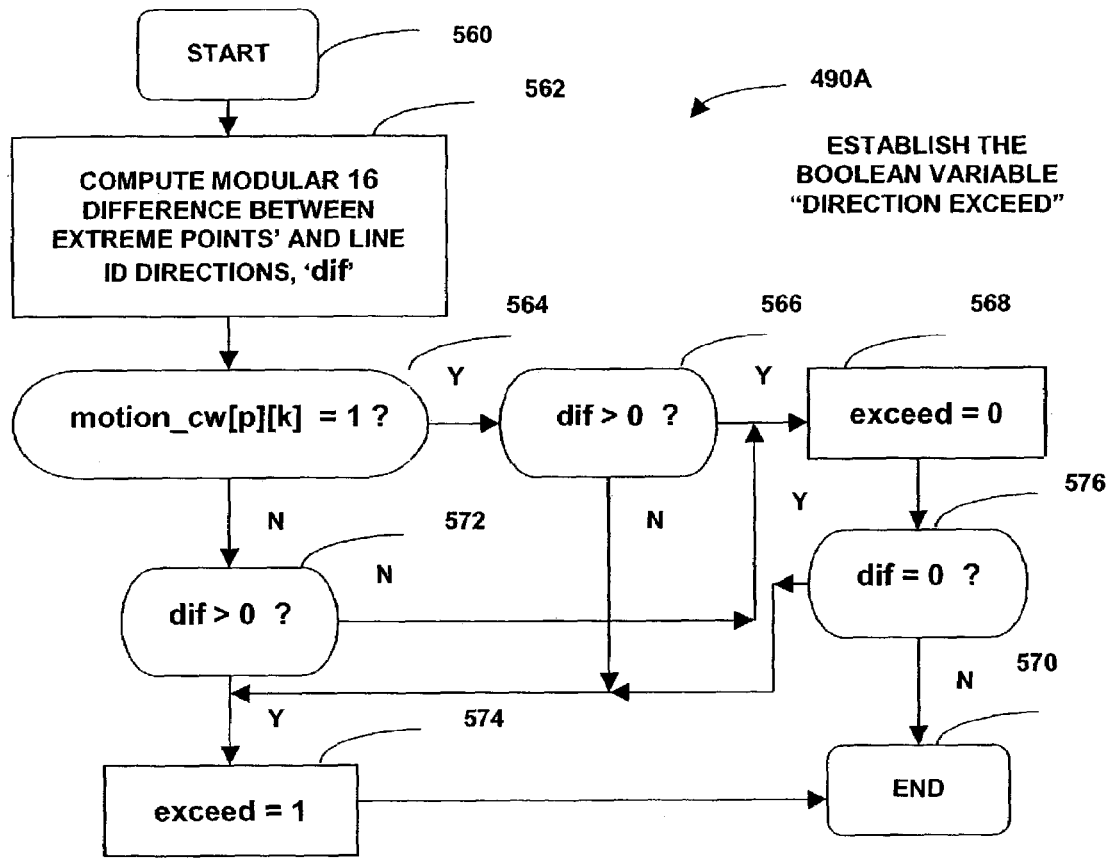
FIG. 15 is a flow diagram illustrating the determination of the Boolean variable "direction exceed".

The "establish direction exceed" aspect of "compute depth size" described in state 490 of FIG. 12 is denoted as state 490A and is illustrated in detail in FIG. 15. According to the FIG. 15, exceed is set to zero, if (i) arcpoly "k"'s motion is clockwise and the gradient direction equivalent to the modular 16 difference between two directions is greater than zero, or (ii) arcpoly "k"'s motion is counter clockwise and the gradient direction is less than zero. However, exceed is set to one, if (i) arcpoly "k"'s motion is clockwise and the gradient direction is less than zero, (ii) arcpoly "k"'s motion is counter clockwise and the gradient direction is greater than zero, or (iii) the gradient direction is zero.

Figure 16B:
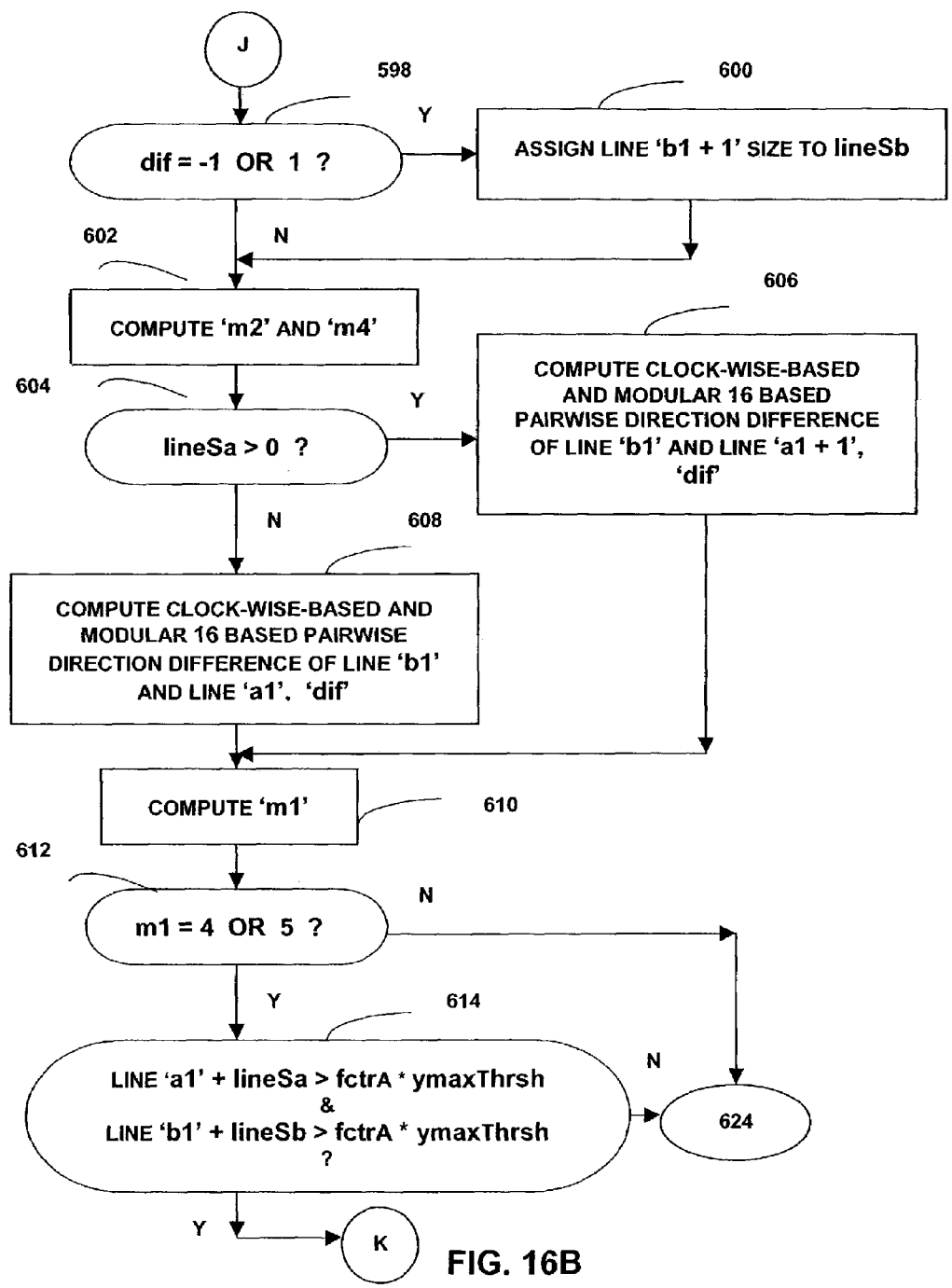
FIG. 16 is a flow diagram illustrating the determination of type I segmentation.
Figure 16C:
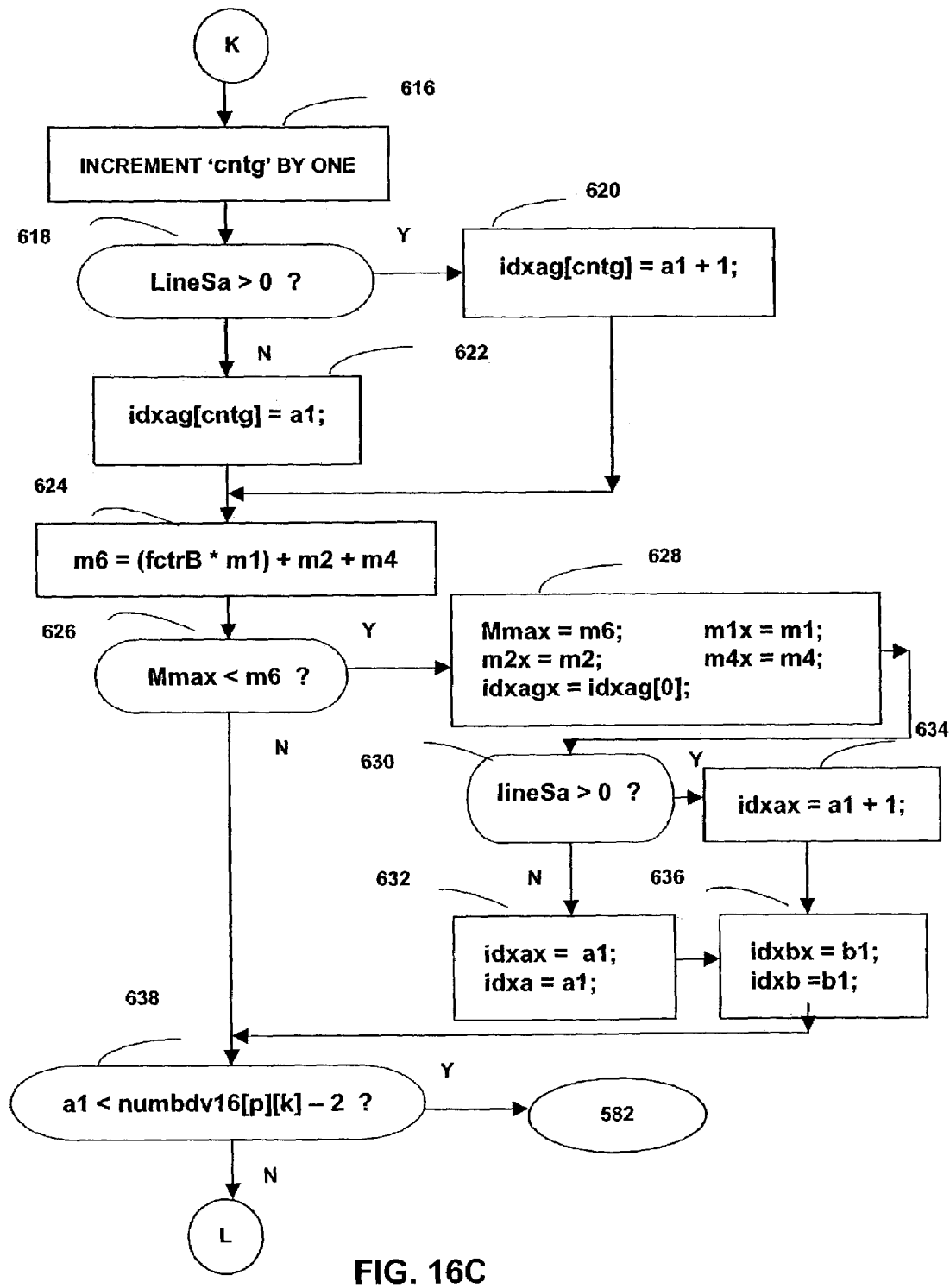
Figure 16D:
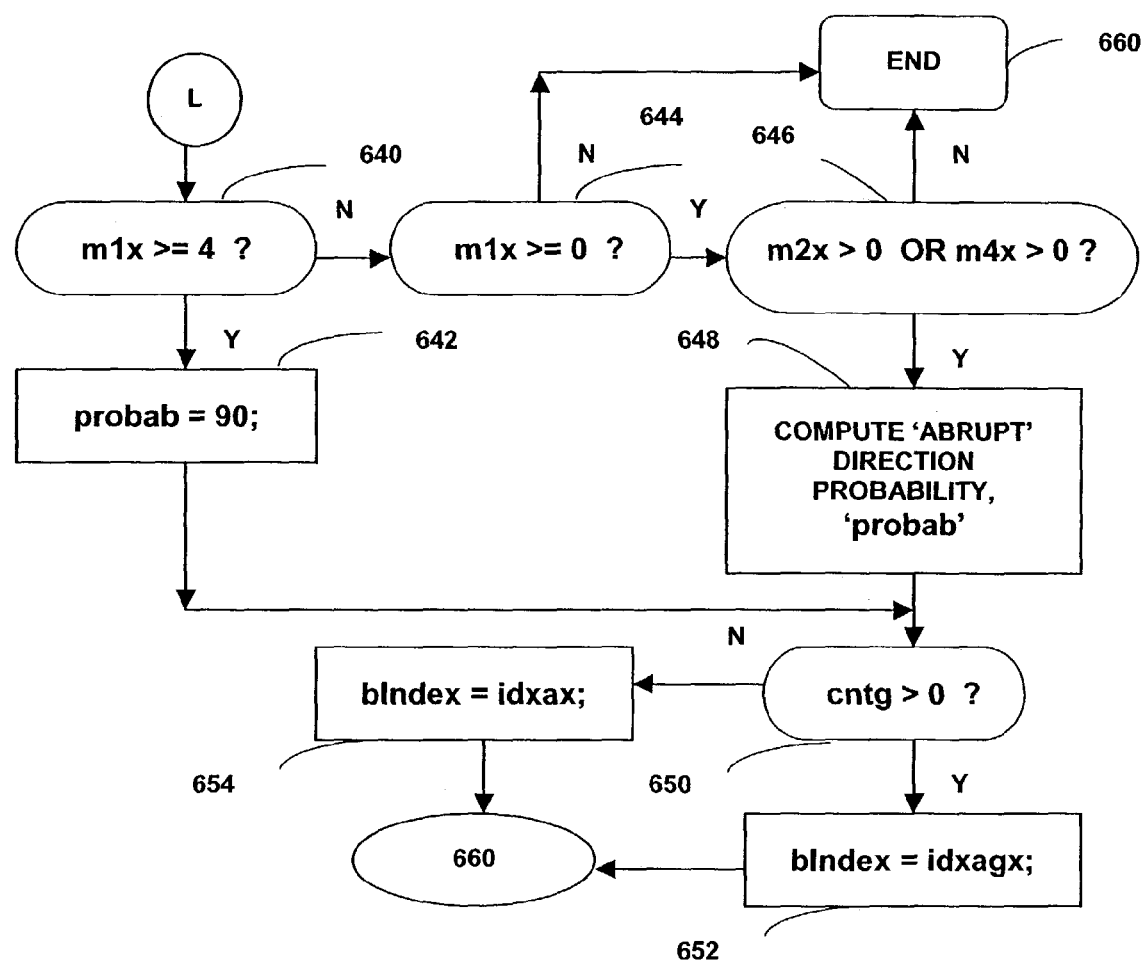

FIG. 16 illustrates the overall process to determine segmentation type I based on the identification of significant "bend(s)" in the handwritten input, as illustrated in state 440 of FIG. 11. In summary, the process 440:

1) focuses on all pairs of consecutive lines to determine (i) each of the two lines' size indicator, "m2" and "m4", (ii) the two lines' "bend" strength indicator, "m1" and (iii) "m6" which is a function of "m1", "m2", and "m4", and then 2) determines the type I segmentation (i) line segment index, "bIndex" that belongs to arcpoly "k"'s first line of the pair of lines, contingent upon coinciding with the maximum of all "m6" values computed during the cycle(s) described in step (1), and (ii) confidence level, "probab".

The process 440 is described in detail as follows:

The process 440 begins at a start state 578 and moves to state 580 to initialize a subset of the variables used during process 440. The process 440 moves to state 582 wherein allows states 584-to-638 to be performed repeatedly, once for each number of lines of arcpoly "k" minus one. The process 440 moves to state 584 to initialize a subset of the variables used during each cycle within the process 440. The process 440 then moves to state 586 to compute clockwise-based and modular 16-based pair-wise difference between line "a1" size and line "b1" size and assigns it to "dif". The process 440 then moves to the decision state 588. If the result of the decision step 588 is in affirmative and a determination is made in the decision state 590 that b1+1<numbdv16[p][k] the process 440 moves to state 592 wherein line "b1" size is set to "lineSa" and "b1" is incremented by 1 and then the process 440 moves to the decision state 594. If the result of the decision step 588 is not in affirmative and a determination is made in state 590 that b1+1<numbdv16[p][k] then the process 440 moves to state 596 to compute clockwise-based and modular 16-based pair-wise difference between line "b1" and line "b1+1" and assigns it to "dif". If the result of the decision state 594 is not in the affirmative, the process 440 moves to state 602 to compute "m2" and "m4". The process 440 then moves from state 596 to the decision state 598. If a determination is made at the decision state 598 that "dif=−1 or 1" then the process 440 moves to state 600 to set line "b1+1" size is set to "lineSb". The process 440 from state 598 provided that its result is not in the affirmative or from state 600 moves to state 602 to compute "m2" and "m4" empirically using a pre-defined deterministic rule that is based on factors such as line "a1" size, "lineSa", difference between polyline "p"'s top-most and bottom-most points, a preset "threshold", line "b1" size and "lineSb." Here, "m2" and "m4" are size indicators for line "a1" and line "b1", respectively.

Thereafter, the process 440 moves to the decision state 604. If a determination is made that "lineSa" is greater than zero, the process 440 moves to state 606 to compute clockwise-based and modular 16-based pair-wise difference between line "b1" and line "a1+1" and assigns it to "dif", otherwise, the process 440 moves to state 608 to compute clockwise-based and modular 16-based pair-wise difference between line "b1" and line "a1" and assigns it to "dif". Next, the process 440 moves from either state 606 or state 608 to state 610 to compute "m1" empirically based on such factors as "dif" and a preset "threshold". The process 440 then moves to the decision state 612. If a determination is made at the decision state 612 that "m1=4 or 5", the process 440 moves to the decision state 614, otherwise the process 440 moves to state 624. If result of the decision state 614 is not in the affirmative, the process 440 moves to state 624, otherwise the process 440 moves to state 616 wherein "cntg" is incremented by one and then the process 440 moves to the decision state 618. If a determination is made that in state 618 that "lineSa" exceeds zero, the process 440 moves to state 620, wherein "idxag[cntg]" is set to "a1+1", otherwise the process 440 moves to state 622, wherein "idxag[cntg]" is set to "a1". From either of the states 620 or 622, the process 440 moves to the decision state 624 to compute "m6" from "m1", "m2", "m4" and an empirically derived "fctrB". The process 440 then moves to the decision state 626. If a determination is made that in the decision state 626 that Mmax<m6, then the process 440 moves to state 628 wherein the values of "m6", "m1", "m2", "m4" and "idxag [0]" are assigned to "Mmax", "m1x", "m2x", "m4x" and "idxagx". The process 440 then moves to the decision state 630. If a determination is made that in the decision state 630 that "lineSa">0, then the process 440 moves to state 634 to assign "a1+1" to "idxax", otherwise the process 440 moves to state 632 to assign "a1" to "idxax" as well as to "idxa". From either of the states 632 or 634, the process 440 moves to state 636 wherein "b1" is assigned to "idxb" as well as to "idxbx". Next, the process 440 moves to the decision state 638. If the result of the decision state 626 is not in affirmative, then process 440 moves to the decision state 638.

If the result of the decision state 638 is not in the affirmative, the process 440 moves to the decision state 640. If a determination is made that in the decision state 640 that "m1x>4" then the process 440 moves to state 642 wherein "probab", representing the segmentation confidence level, is set to 90. The process 440 then moves to the decision state 650. If a determination is made at the decision state 650 that cntg>0 then the process 440 moves to state 652 wherein "bIndex", representing the segmentation line index is set to "idxagx", otherwise the process 440 moves to state 654 wherein "bIndex" is set to "idxax". From either of the states 652 or 654, the process 440 terminates at an end state 660.

If the result of the decision state 640 is not in the affirmative, then the process 440 moves to the decision state 644. If the result of the decision state 644 is not in the affirmative, then the process 440 terminates at the end state 660. Otherwise, the process 440 moves to the decision state 646. If the results of the decision state 646 are not in the affirmative, the process 440 terminates at the end state 660. Otherwise, the process 440 moves to state 648 to compute "probab" empirically. The process 440 then moves to the decision state 650.

Figure 17:
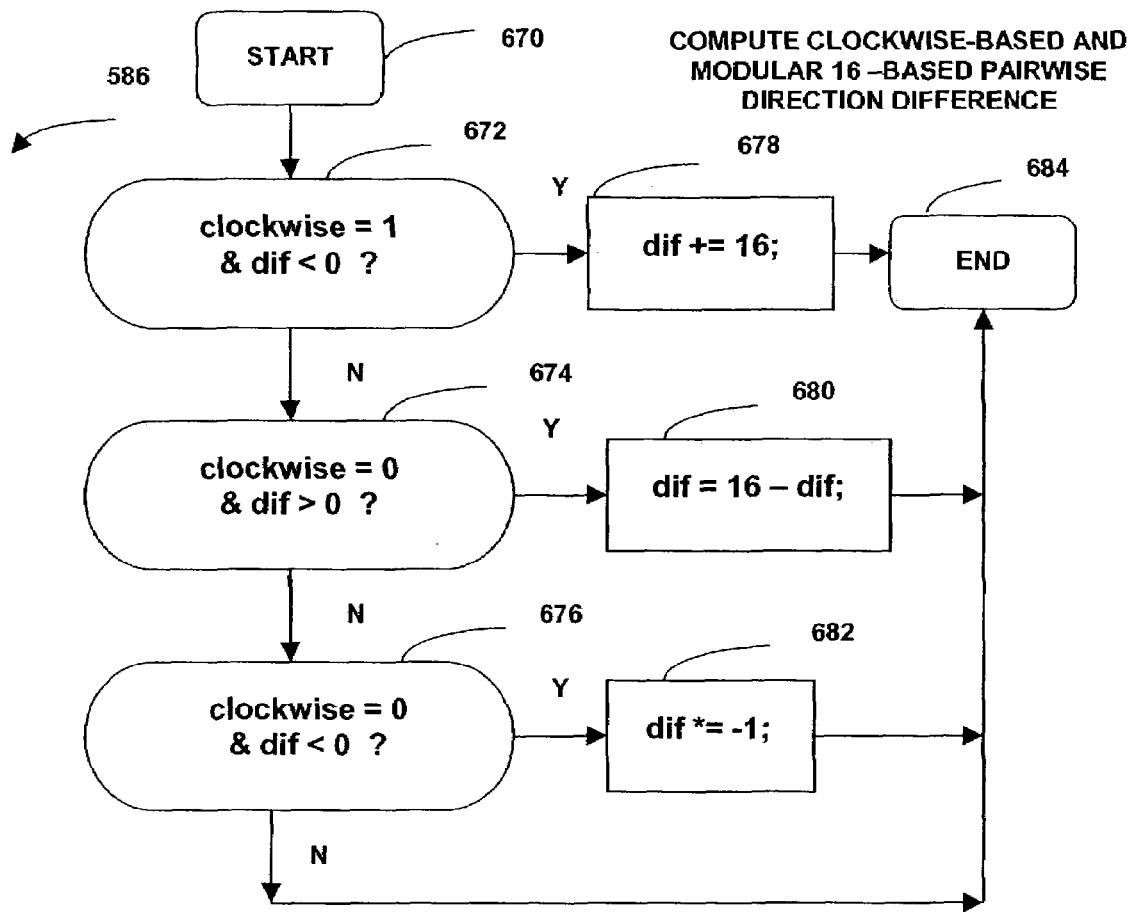
FIG. 17 is a flow diagram illustrating the computation of clockwise-based and modular 16-based pair-wise direction difference.

FIG. 17 illustrates the overall process to compute clockwise-based and modular 16-based pair-wise difference between two directions as described in states 586, 596, 606 and 608 of FIG. 16. This technique determines the number of directions that needed to shift the first direction to the second in (i) a pre-specified clockwise motion and (ii) using the 16 direction codes. The process 586 begins at a start state 670 and moves to the decision states 672. If the results of the decision state 672 are in the affirmative, the process 586 moves to state 678 to increment "dif" by 16 and then terminates at an end state 684. Otherwise, the process 586 moves to the decision state 674. If the results of the decision state 674 are in the affirmative, the process 586 moves to state 680 to revise "dif" by setting it to "16−dif" and then terminates at an end state 684. Otherwise, the process 586 moves to the decision state 676. If the results of the decision state 676 are in the affirmative, the process 586 moves to state 682 to revise "dif" by multiplying it by −1 and then terminates at an end state 684. Otherwise, the process 586 moves to the end state 684.

Figures 18, 18A, 18B:
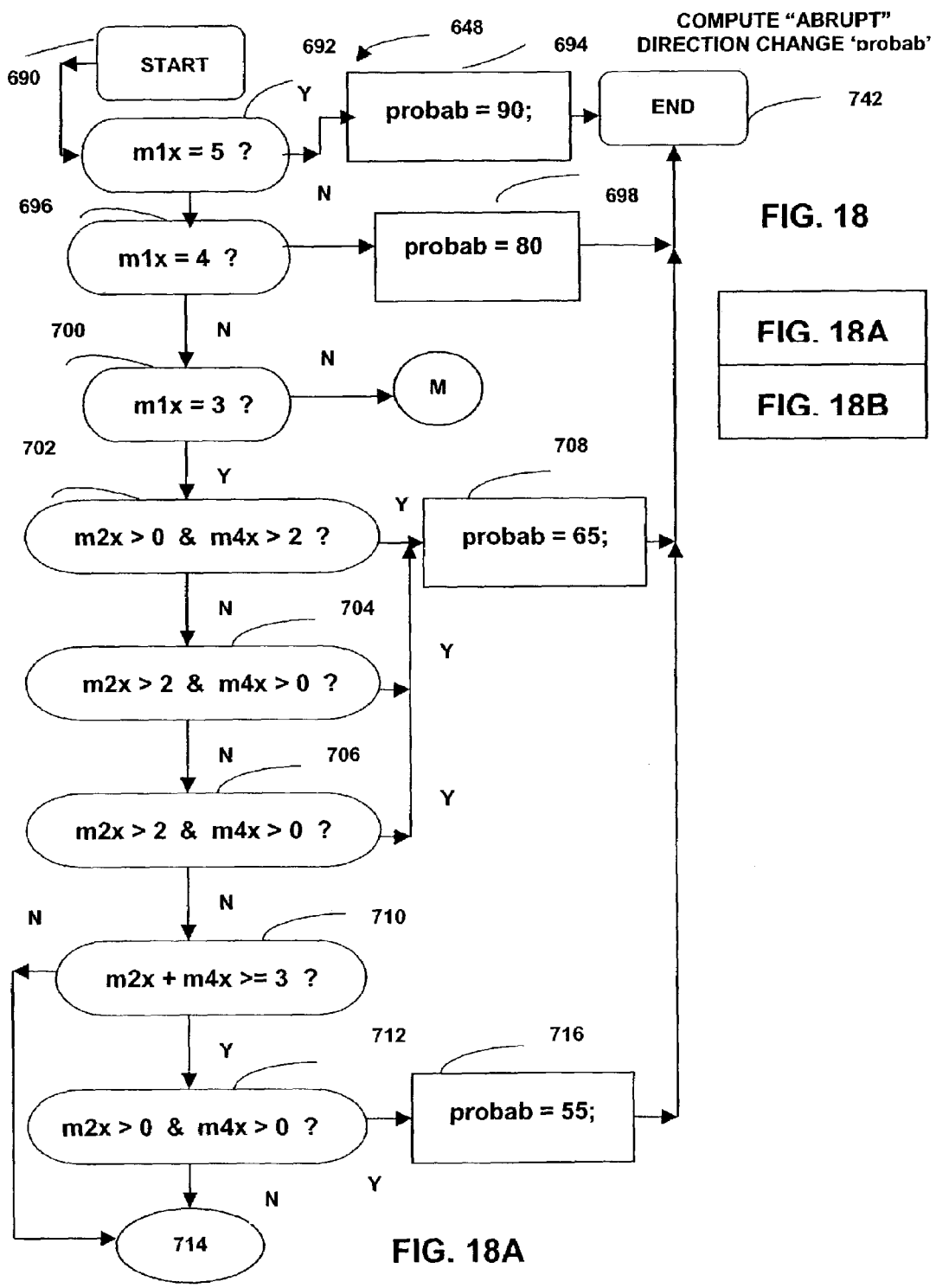
FIG. 18 is a flow diagram illustrating the computation of the probability associated with the derived value for the abrupt direction change.
Figure 18B:
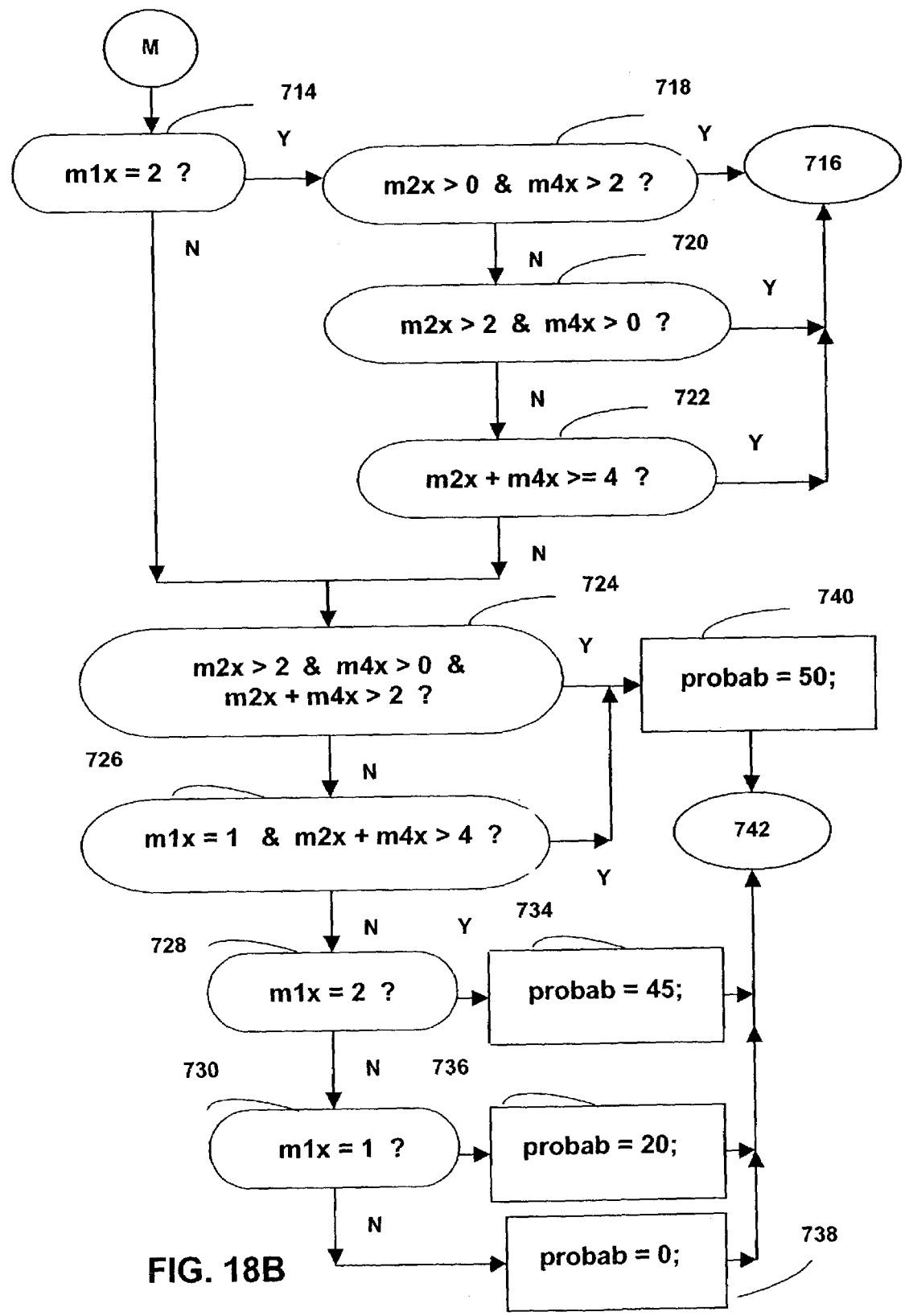

The empirically derived process of state 648 shown in FIG. 16 is illustrated in detail in FIG. 18. The process 648 begins at a start state 690 and moves to the decision state 692. If the outcome of the state 692 is in the affirmative, the process 648 moves to state 694 wherein "probab=90" and then terminates at an end state 742. Otherwise, the process 648 moves to the decision state 696. If the outcome of the state 696 is in the affirmative, the process 648 moves to state 698 wherein "probab=80" and then terminates at the end state 742. Otherwise, the process 648 moves to the decision state 700. If the outcome of the state 700 is in the affirmative, the process 648 moves to the decision state 702. If the outcome of the state 702 is in the affirmative, the process 648 moves to state 708 wherein "probab=65" and then terminates at the end state 742. Otherwise, the process 648 moves to the decision state 704. If the outcome of the state 704 is in the affirmative, the process 648 moves to state 708 wherein "probab"=65 and then terminates at the end state 742. Otherwise, the process 648 moves to the decision state 706. If the outcome of the state 706 is in the affirmative, the process 648 moves to state 708 wherein "probab=65" and then terminates at the end state 742.

Otherwise, the process 648 moves to the decision state 710. If the outcome of the state 710 is in the affirmative, the process 648 moves to the decision state 712. If the outcome of the state 712 is in the affirmative, the process 648 moves to state 716 wherein "probab=55" and then terminates at the end state 742. Otherwise, the process 648 moves to the decision state 714. If the outcome of the decision state 710 is not in the affirmative, the process 648 moves to state 714. If the outcome of the state 714 is in the affirmative, the process 648 moves to the decision state 718. If the outcome of the state 718 is in the affirmative, the process 648 moves to state 716 wherein "probab=55" and then terminates at the end state 742. Otherwise, the process 648 moves to the decision state 720. If the outcome of the state 720 is in the affirmative, the process 648 moves to state 716 wherein "probab=55" and then terminates at the end state 742. Otherwise, the process 648 moves to the decision state 722. If the outcome of the state 722 is in the affirmative, the process 648 moves to state 716 wherein "probab=55" and then terminates at the end state 742.

Otherwise, the process 648 moves to the decision state 724. If the outcome of the state 724 is in the affirmative, the process 648 moves to state 740 wherein "probab=50" and then terminates at the end state 742. Otherwise, the process 648 moves to the decision state 726. If the outcome of the state 726 is in the affirmative, the process 648 moves to state 740 wherein "probab=50" and then terminates at the end state 742. Otherwise, the process 648 moves to the decision state 728. If the outcome of the state 728 is in the affirmative, the process 648 moves to state 734 wherein "probab=45" and then terminates at the end state 742. Otherwise, the process 648 moves to the decision state 730. If the outcome of the state 730 is in the affirmative, the process 648 moves to state 736 wherein "probab=20" and then terminates at the end state 742. Otherwise, the process 648 moves to state 738 wherein "probab=0" and terminates at the end state 742.

Figure 19:
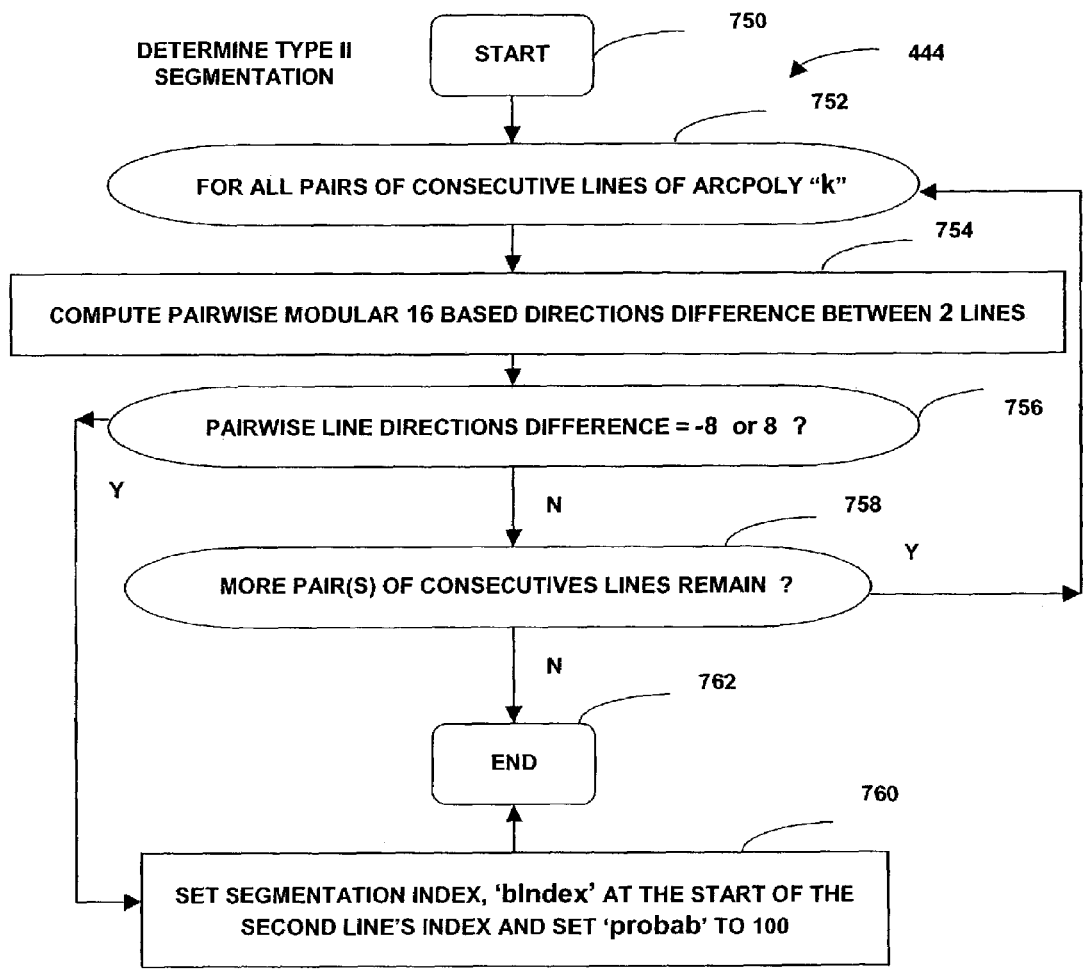
FIG. 19 is a flow diagram illustrating the determination of type II segmentation.

FIG. 19 illustrates the overall process to detect segmentation type II based on the identification of any pair of consecutive lines' with direction reversal, as shown in state 444 of FIG. 11. The process 444 begins at a start state 750 and moves to state 752 wherein allows states 754-to-758 to be performed repeatedly, once for each pair of consecutive lines. The process 444 moves to state 754 to compute modular 16-based pairwise difference between the lines. Next, the process 444 moves to the decision state 756. If the result of the decision state 756 is in the affirmative the process 444 moves to state 760 wherein the segmentation line index is set to the second of the pair of lines with a confidence level of 100 and then terminates at an end state 762. Otherwise, the process 444 moves to the decision state 758. If the result of the decision state 758 is in the affirmative, the process 444 moves to state 752 to begin another cycle. Otherwise, the process 444 terminates at the end state 762.

Figure 20:
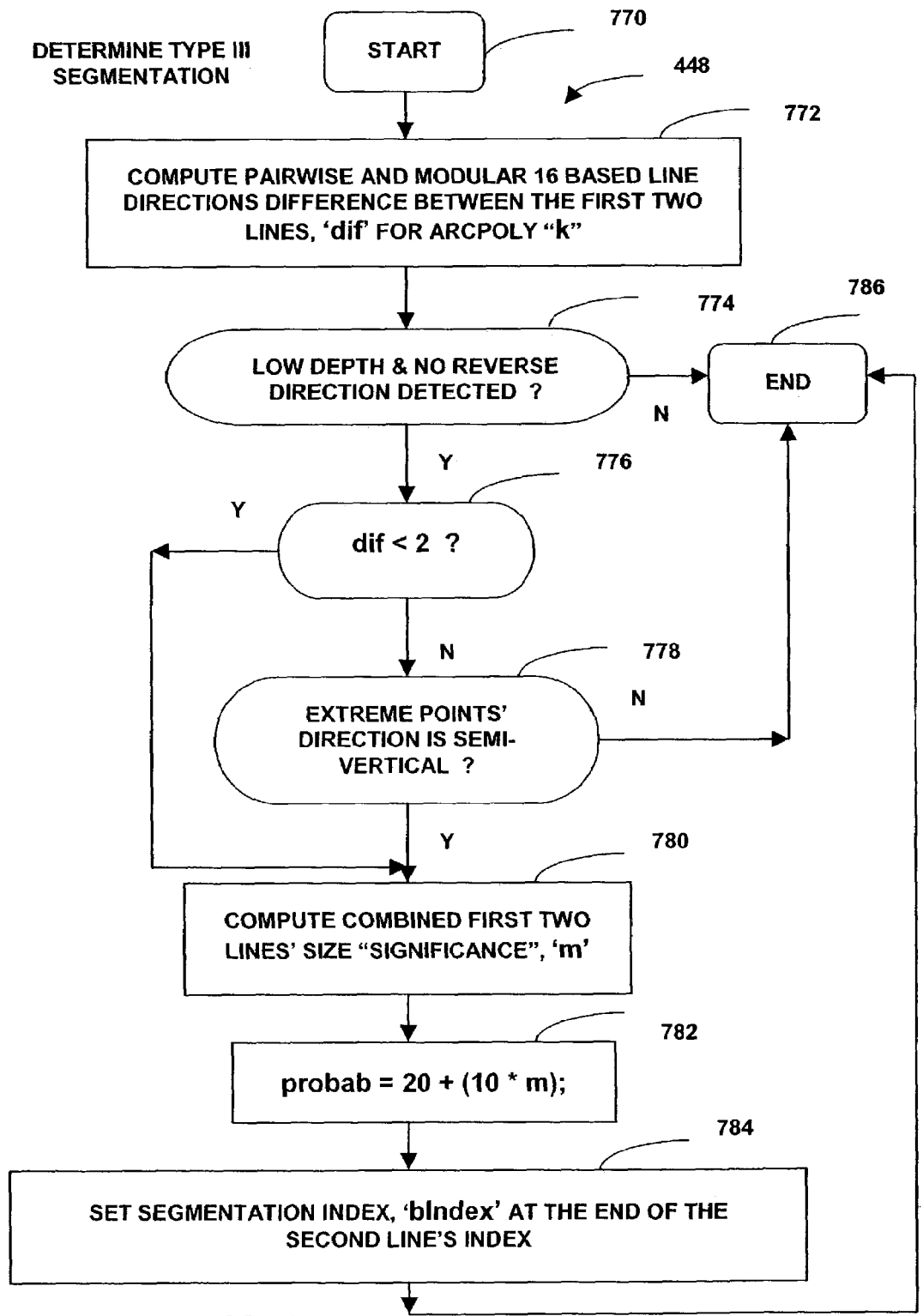
FIG. 20 is a flow diagram illustrating the determination of type III segmentation.

FIG. 20 illustrates the overall process to detect segmentation type III based on the identification of size "significance" for the combined first two lines of arcpoly "k", as shown in state 448 of FIG. 1. The process 448 begins at a start state 770 and moves to state 772 to compute modular 16-based pair difference between the first pair of lines, assign it to "dif". The process 448 moves to the decision state 774. If a determination is made at the decision state 774 that "dif!=−8 and 8" and neither of the lines' depth sizes exceeds an empirically derived threshold thus indicating as having "low" depth sizes, then the process 448 moves to the decision state 776. If a determination is made at state 776 that dif<2, then the process 448 moves to state 780 to compute the combined line size "significance" indicator, "m" empirically, whereby "m" ranges from zero-to-six.

Next, the process 448 moves to state 782 to determine the segmentation confidence level, "probab" from the value of "m". The process 448 moves to state 784 wherein the segmentation line index, "bIndex" is set to a value that indicates segmentation occurs at the end of the second line. The process 448 then terminates at an end state 786. If the results of the decision state 774 are not in the affirmative, the process 448 moves to the end state 786. If the results of the decision state 776 are not in the affirmative, the process 448 moves to the decision state 778. If a determination is made that "dir" described above is "semi-vertical" or equivalently "dir"=15, 16, 1, 7, 8, or 9 then the process 448 moves to state 780. Otherwise, the process 448 moves to the end state 786.

Figure 21:
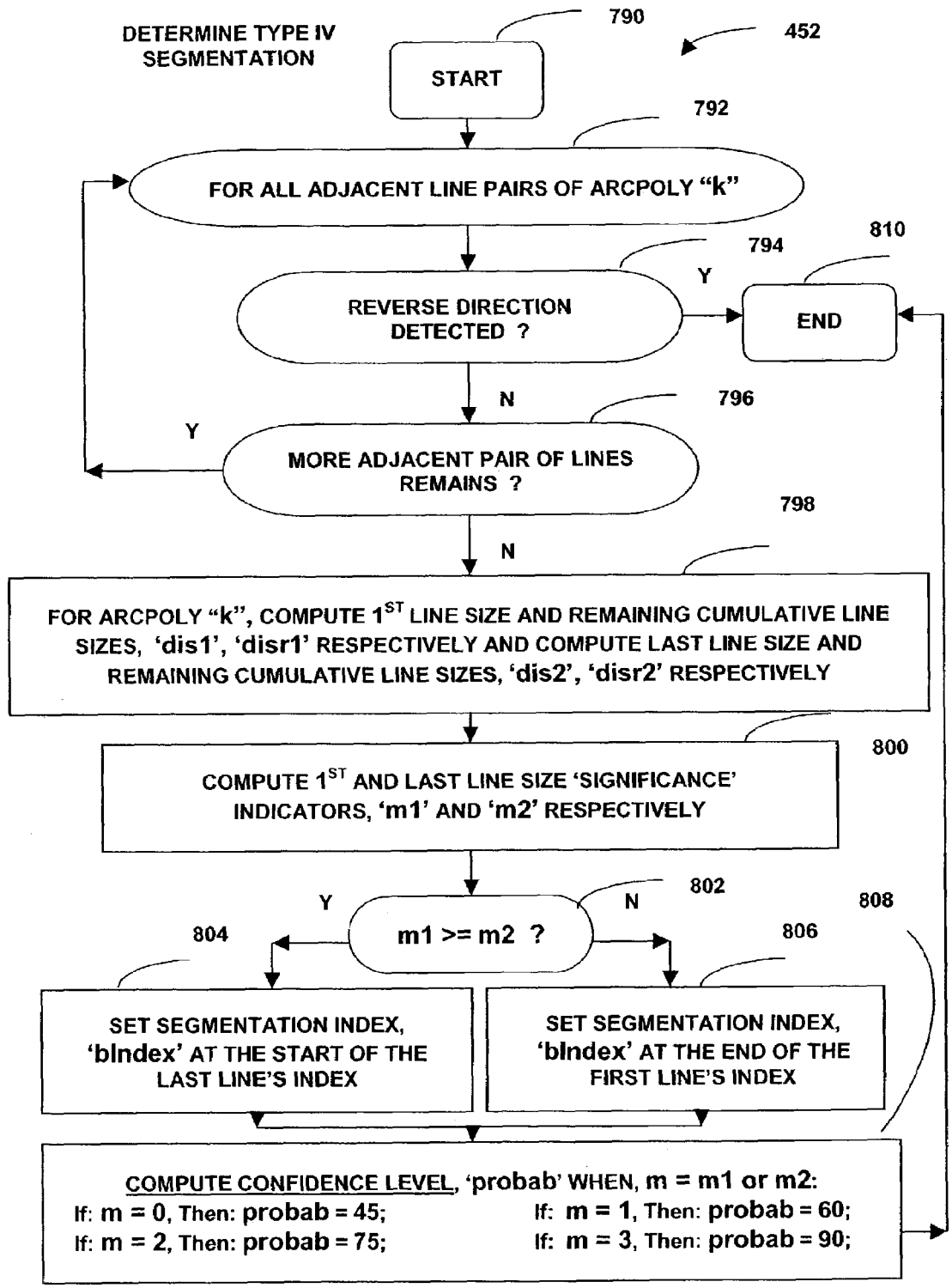
FIG. 21 is a flow diagram illustrating the determination of type IV segmentation.

FIG. 21 illustrates the overall process to detect segmentation type IV based on the identification of size "significance" specifically for the first line or the last line of arcpoly "k", as shown in state 452 of FIG. 11. The process 452 begins at a start state 790 and moves to state 792 that allows state 794 to be repeated for all adjacent pairs of lines. The process 452 then moves to the decision state 794. If a determination is made that a reversal of direction for the pair of lines has occurred, the process 452 terminates at an end state 810. Otherwise, the process 452 moves to the decision state 796. If a determination is made that there is more pair(s) of lines, the process 452 then moves to state 792 to begin another cycle. Otherwise, the process 452 moves to state 798 wherein arcpoly "k"'s first line's size, "dis1", extreme points' size, "disr1" that excludes the first line's size, last line's size, "dis2" and extreme points' size, "disr2" that excludes the last line's size are computed. Next, the process 452 moves to state 800 to compute "m1" and "m2" empirically (based on the results of state 798). "m1" and "m2" take on values that range between 0-to-4 and represent arcpoly "k"'s first and last line size "significance" indicators, respectively. The process 452 then moves to the decision state 802. If the result of the decision state 802 is in the affirmative, the process 452 moves to state 804 wherein specifies "bIndex" to indicate segmentation occurs at the start point of the last line. Otherwise, the process 452 moves to state 806, wherein specifies "bIndex" to indicate segmentation occurs at the end point of the first line. Next, the process 452 from either state 804 or state 806 moves to state 808 to determine the segmentation confidence level, "probab" from the empirically derived value of "m1" or "m2". Finally, the process 452 terminates at the end state 810.

Figure 22:
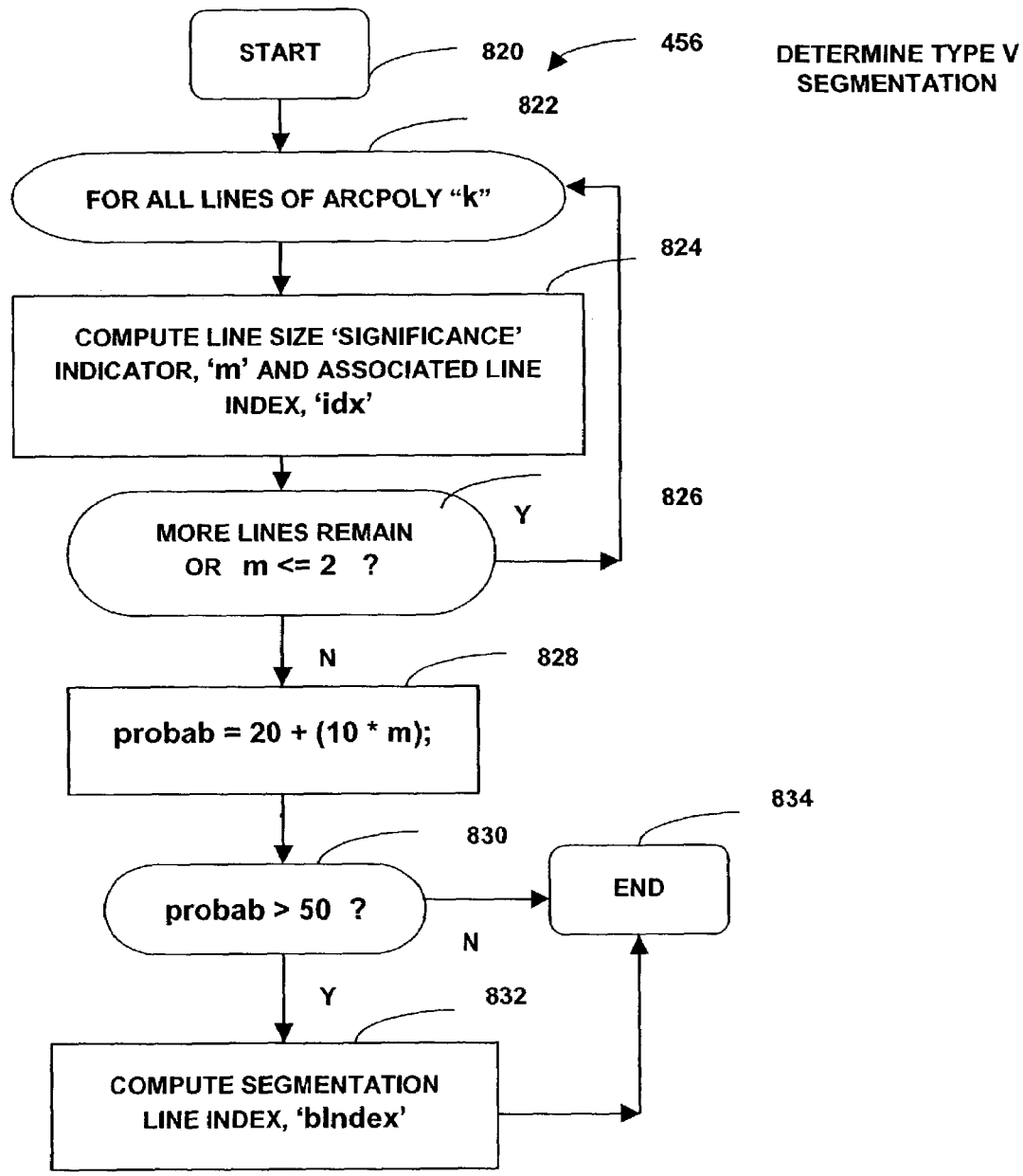
FIG. 22 is a flow diagram illustrating the determination of type V segmentation.

FIG. 22 illustrates the overall process to detect segmentation type V based on the identification of size "significance" for any line of arcpoly "k", as shown in state 456 of FIG. 11. The process 456 begins at a start state 820 and moves to state 822 wherein allows state 824 and state 826, to compute line size "significance" indicator, "m" empirically, and the associated line index, "idx", repeatedly for a maximum of all lines belonging to arcpoly "k". The process 456 moves to the decision state 826. If the result of the decision state 826 is in the affirmative, the process 456 moves to state 822 to begin another cycle. Otherwise, the process 456 moves to state 828 to compute the segmentation confidence level, "probab" based on the value of "m" described above. The process 456 then moves to the decision state 830. If the result of the state 830 is in the affirmative, the process 456 moves to state 832 wherein the segmentation line index, "bIndex" is computed based on the value of "idx". Otherwise, the process 456 terminates at an end state 834. From state 832, the process 456 terminates at the end state 834.

Figure 23A:
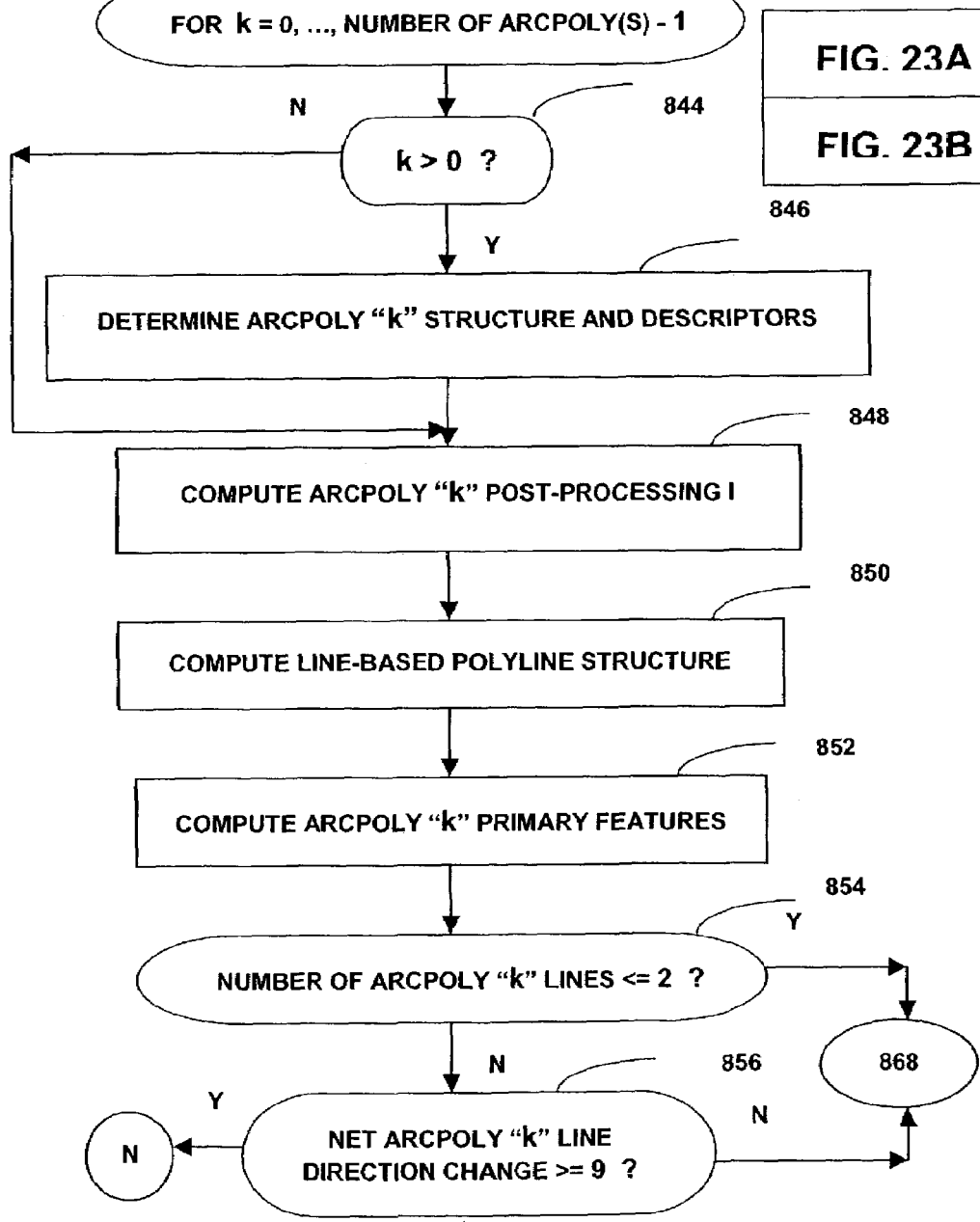
FIG. 23 is a flow diagram illustrating the computation of arcpoly "k" post-processing III.
Figure 23B:
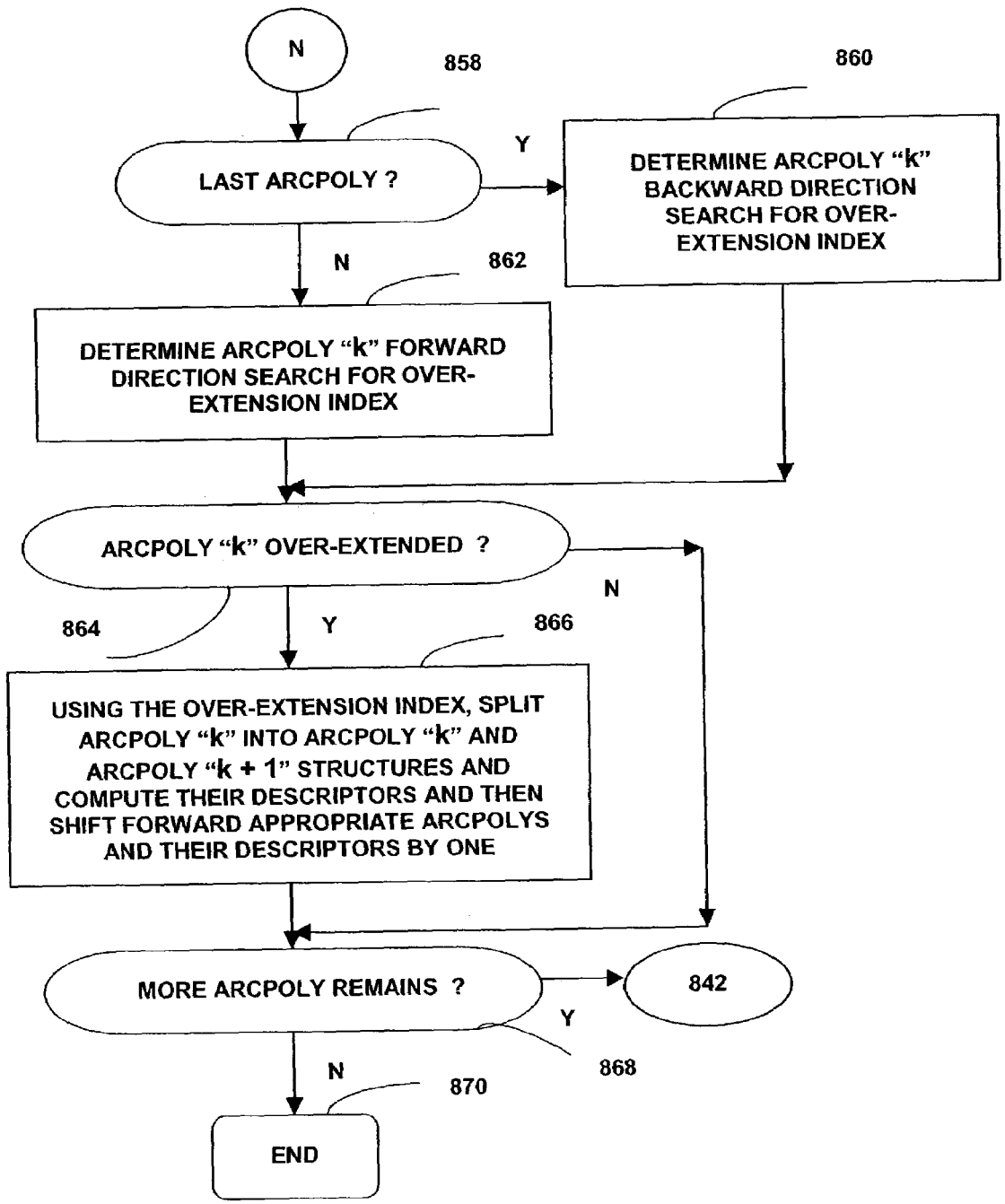

FIG. 23 illustrates the overall process to detect post-processing III as shown in state 160 of FIG. 5. The process 160 represents the third phase of the symbolic reshaping scheme, as it detects "over-extended" arcpolys for segmentation such that each arcpoly's net gradient direction(s) does not exceed a pre-specified value determined empirically. The process 160 begins at a start state 840 and moves to state 842 wherein allows states 844-to-868 to be repeated for all arcpolys. The process 160 moves to the decision state 844. If a determination is made in state 824 that "k" is greater than zero, the process 160 moves to state 846 to compute the hypothesized arcpoly "k" as described above and then moves to state 848 to perform post-processing I on arcpoly "k", as described earlier. Otherwise, the process 842 moves directly to state 848. The process 160 then moves from state 848 to state 850 to update the line-based polyline by excluding arcpoly "k" to generate a new sequence of line direction(s) and line extreme points. Next, the process 160 moves to state 852 to compute arcpoly "k"'s primary features, as described earlier. The process 160 moves to the decision state 854. If a determination is made in the decision state 854 that the number of lines of arcpoly "k" exceeds two, then the process 854 moves to the decision state 856. If the result of the decision state 856 is in the affirmative, the process 160 moves to the decision state 858. If a determination is made that arcpoly "k" is not the last arcpoly of polyline "p" in the decision state 858, then the process 160 moves to state 862 wherein forward direction arcpoly "k" over-extension is established. Otherwise, the process 160 moves to state 860 wherein backward direction arcpoly "k" over-extension is established. In states 860 and 862 by using two different methods, the segmentation line index, "idx" is determined for an over-extension that may have occurred.

In summary, this is achieved by the following five step process:

i) Compute mean and standard deviation, "std" of all lines belonging to arcpoly "k".

ii) Determine "m1" line index: From the start point of arcpoly "k", scan forward until either end point of arcpoly "k" is detected or at the detection of the line index, "m1" whereby "std" exceeds line "m1" size.

iii) Determine "m2" line index: From the end point of arcpoly "k", scan backward until either start point of arcpoly "k" is detected or at the detection of a line index, "m2" whereby "std" exceeds line "m2" size.

iv) Scan forward arcpoly "k"'s lines starting from the "m1" line index, and scan backward arcpoly "k"'s lines starting from the "m2" line index, and compute the cumulative change in line directions.

v) If the net change in line directions exceeds (or equals to) ten, over-extension has occurred and thus it makes this arcpoly a viable candidate for segmentation at the computed line indices, "m1" or/and "m2".

The process 160 then moves to the decision state 864. If the result of the decision state 864 is in the affirmative, then the process 160 moves to state 866 wherein arcpoly "k" and arcpoly "k+1" are generated by splitting the current arcpoly "k" at the segmentation line index, "idx" described above. The process 160 then moves to the decision state 868. If the result of the decision state 868 is in the affirmative, the process 160 moves to state 842 to begin another cycle. Otherwise, the process 160 terminates at an end state 870. If the result of the decision state 864 is not in the affirmative, then the process 160 moves directly to state 868. If the result of the decision state 854 is in the affirmative, then the process 160 moves to state 868. If the result of the decision state 856 is not in the affirmative, then the process 160 moves to state 868.

Figure 24:
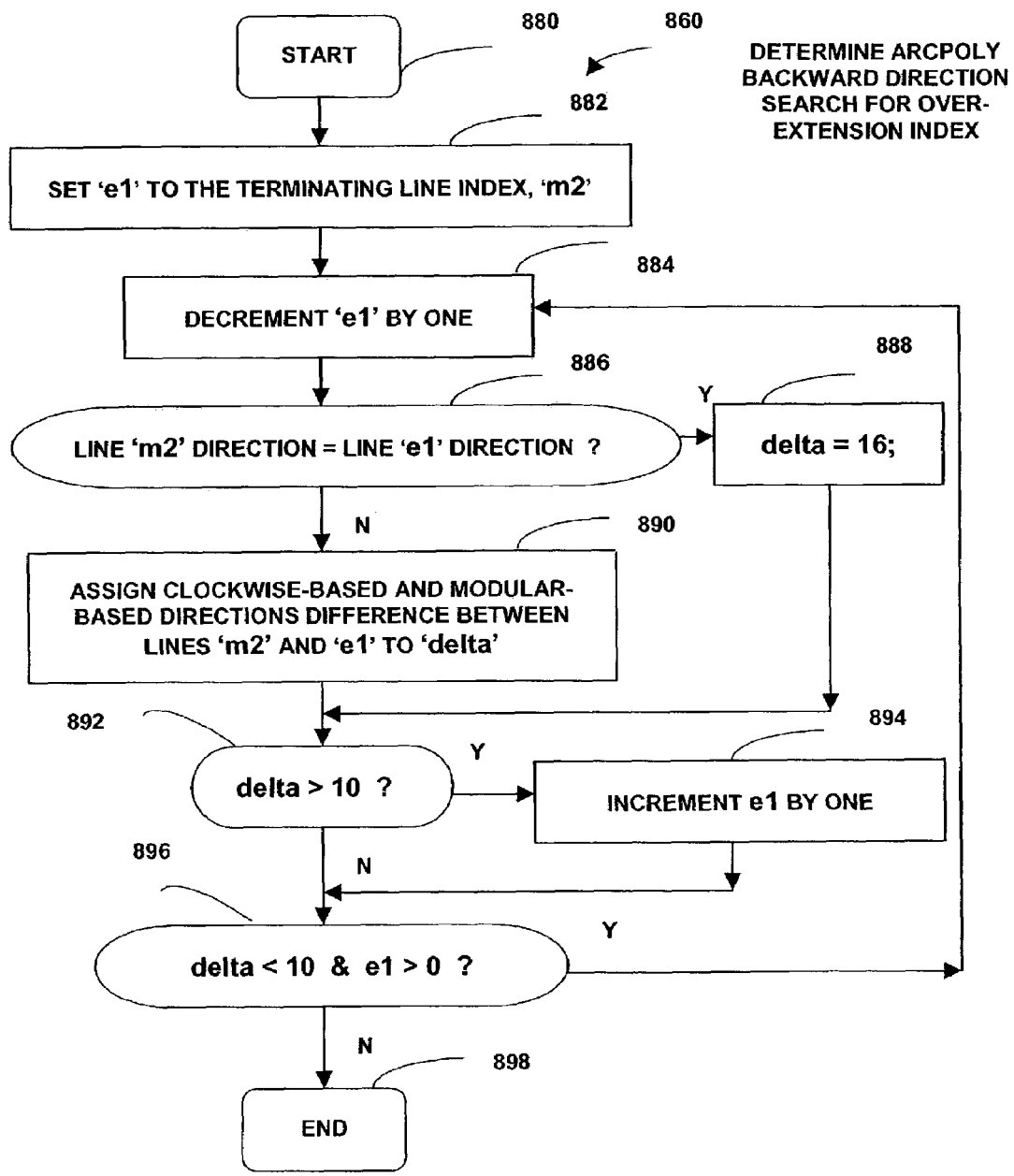
FIG. 24 is a flow diagram illustrating the determination of arcpoly backward direction search for over-extension index.

FIG. 24 illustrates the overall process of state 860 of process 160, shown in FIG. 23. The process 860 begins at a start state 880 and moves to state 882 to set "e1" to the pre-specified line index, "m2" whereby the backward scanning initiates, as described below. The process 860 moves to state 884 wherein "e1=e1−1". The process 860 then moves to the decision state 886. If the result of the decision state 886 is in the affirmative, the process 860 moves to state 888 to assign 16 to "delta". Otherwise, the process 860 moves to state 890 to assign the clockwise-based and modular 16 based line "m2" direction minus line "e1" direction to "delta". The process 860 then moves to the decision state 892. If a determination is made in the decision state 892 that "delta" exceeds ten, then the process 860 moves to state 894 wherein "e1=e1+1" and then moves to the decision state 896. Otherwise, the process 860 moves directly to the decision state 896. If the result of the decision state 896 is in the affirmative, the process 860 moves to state 884 to begin another cycle. Otherwise, the process 860 terminates at an end state 898.

Figure 25:
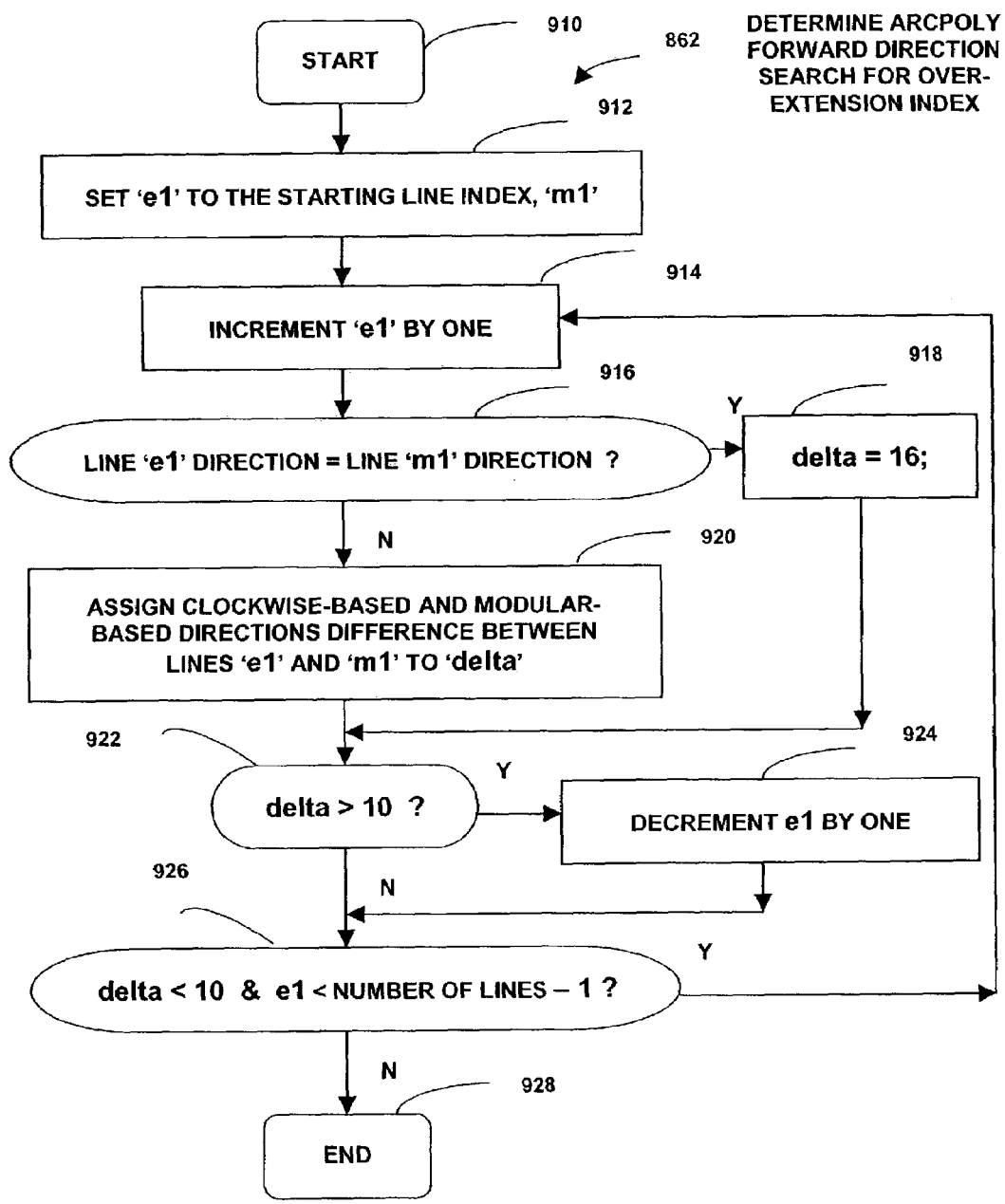
FIG. 25 is a flow diagram illustrating the determination of arcpoly forward direction search for over-extension index.

FIG. 25 illustrates the overall process of state 862 of process 160, shown in FIG. 23. The process 862 begins at a start state 910 and moves to state 912 to set "e1" to the pre-specified line index, "m1" whereby the forward scanning initiates, as described below. The process 862 moves to state 914 wherein "e1=e1+1". The process 862 then moves to the decision state 916. If the result of the decision state 916 is in the affirmative, the process 862 moves to state 918 to assign 16 to "delta". Otherwise, the process 862 moves to state 920 to assign the clockwise-based and modular 16 based line "e1" direction minus line "m1" direction to "delta". The process 862 then moves to the decision state 922. If a determination is made in the decision state 892 that "delta" exceeds ten, the process 862 moves to state 924 wherein "e1=e1−1" and then moves to the decision state 926. Otherwise, the process 862 moves directly to the decision state 926. If the result of the decision state 926 is in the affirmative, the process 862 moves to state 914 to begin another cycle. Otherwise, the process 862 terminates at an end state 928.

Figure 26:
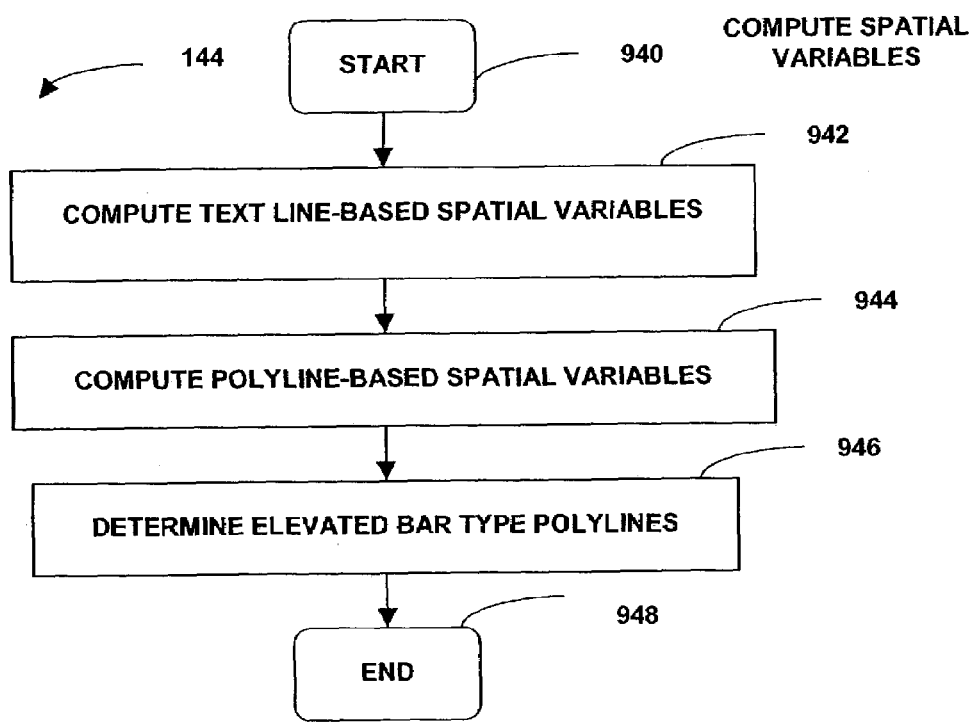
FIG. 26 is a flow diagram illustrating the computation of spatial variables.

The process 84 moves to state 144 wherein spatial variables are computed. FIG. 26 illustrates the overall process of the state 144 of process 84, shown in FIG. 4. The process 144 begins at a start state 940 and moves to state 942 to compute text line characteristics, representing another preferred embodiment of the invention (as defined earlier). The process 144 moves to state 944 wherein polyline-based spatial variables and descending regions are computed such as "underLine[p]" (or descender line level), "baseLine[p]" (or baseline level), "midLine[p]" (or core line level), "topLine[p]" (or ascender line level), as well as the descender marks, "gyjTypeq1[qc][j]", where j=0, . . . , gyjcnt[qc]-1 where "gyjcnt[qc]" refers to the number of the descenders per text line, "qc". Next, the process 144 moves to state 946 wherein "elevated-bar" type polylines are detected, empirically (see FIG. 41). Accordingly, a predefined deterministic rule is used based on the following cues: (i) semi-horizontal extreme points' direction that can take on one of the following values: 3, 4, 5, 11, 12, 13 and (ii) the lowest point of the potential "elevated-bar" candidate polyline "p" to exceed an empirically derived threshold computed from the bounding box corners of any of the neighboring polyline(s), namely, the "bar-holder". Finally, the process 144 terminates at an end state 948.

Figure 27A:
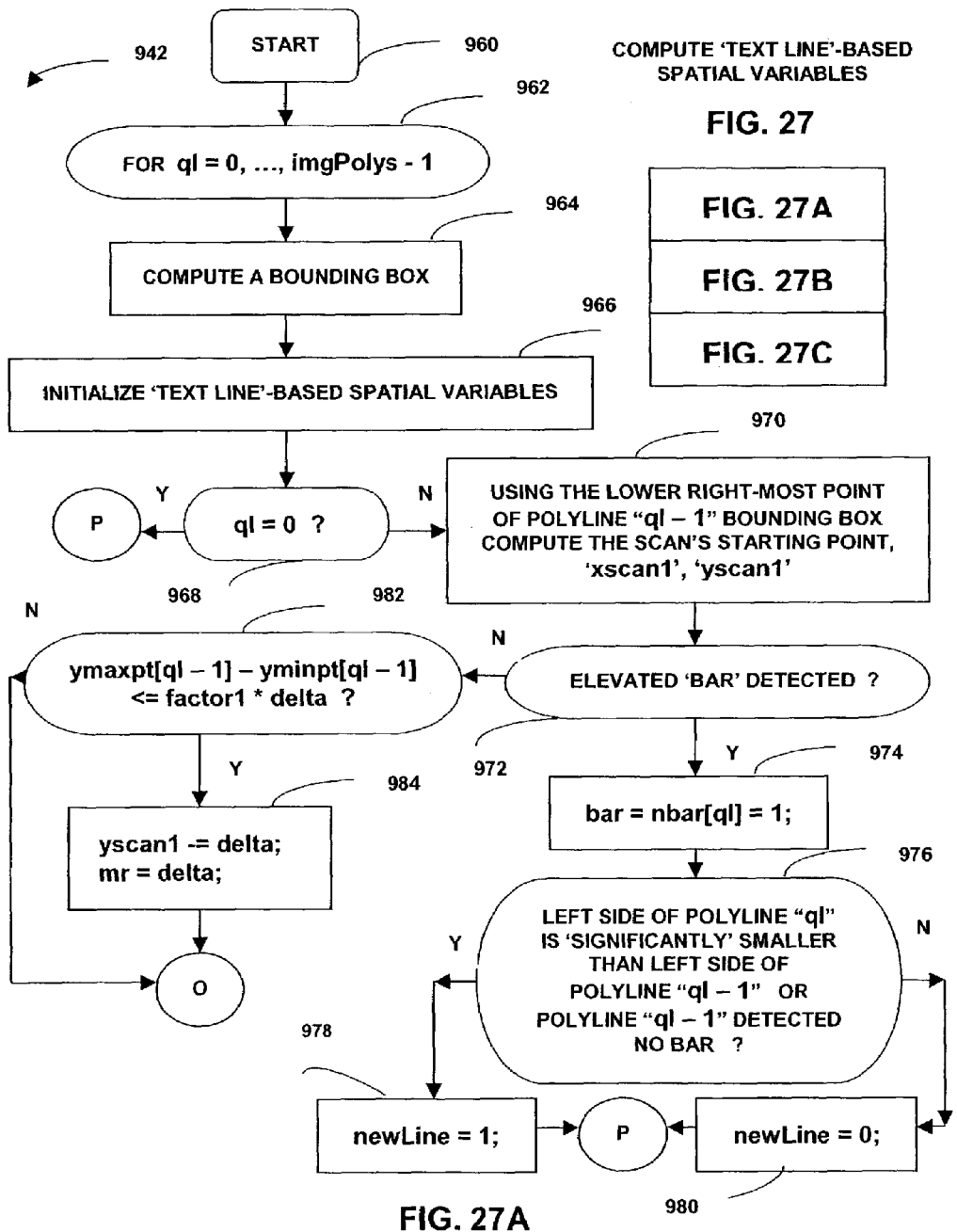
FIG. 27 is a flow diagram illustrating the computation of 'text line'-based spatial variables.
Figure 27B:
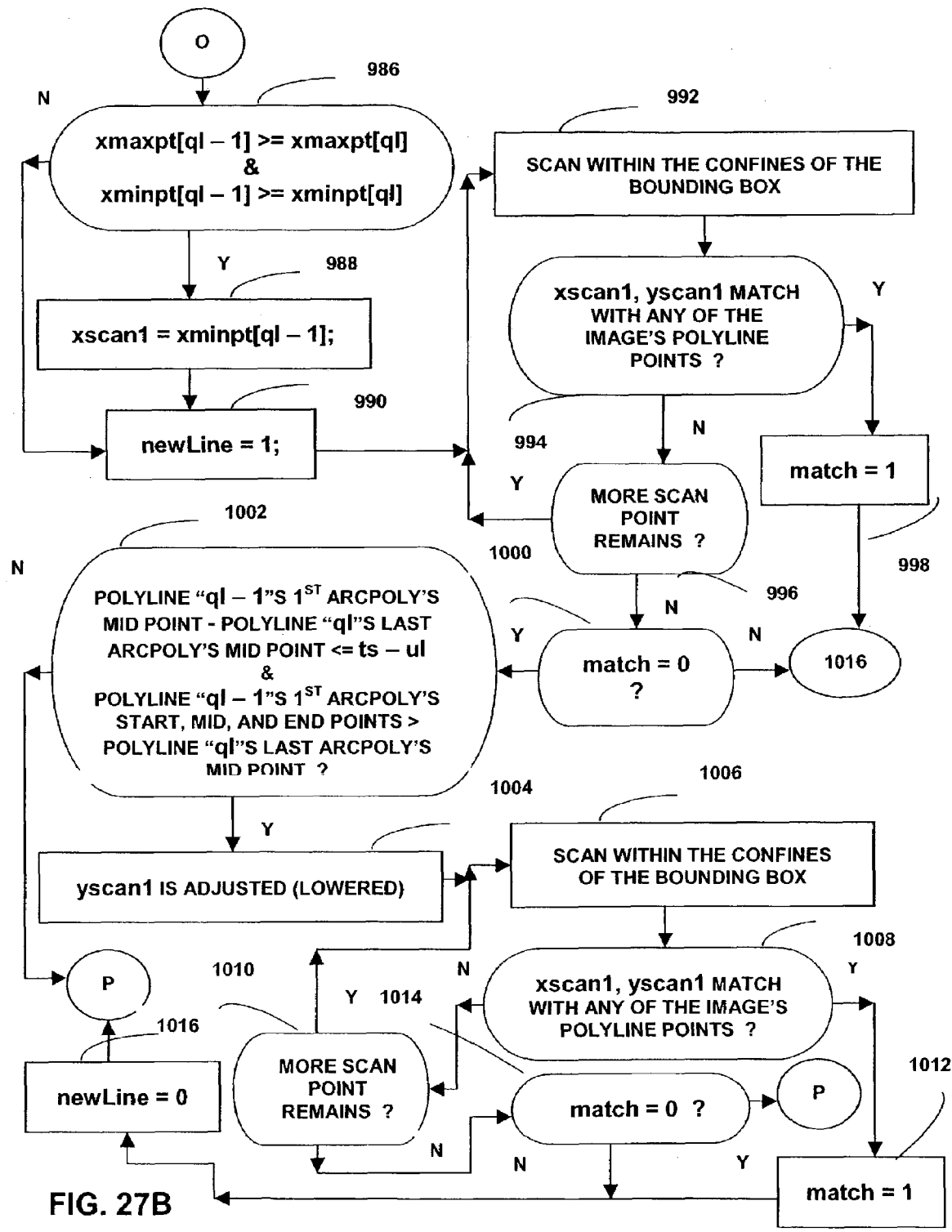
Figure 27C:
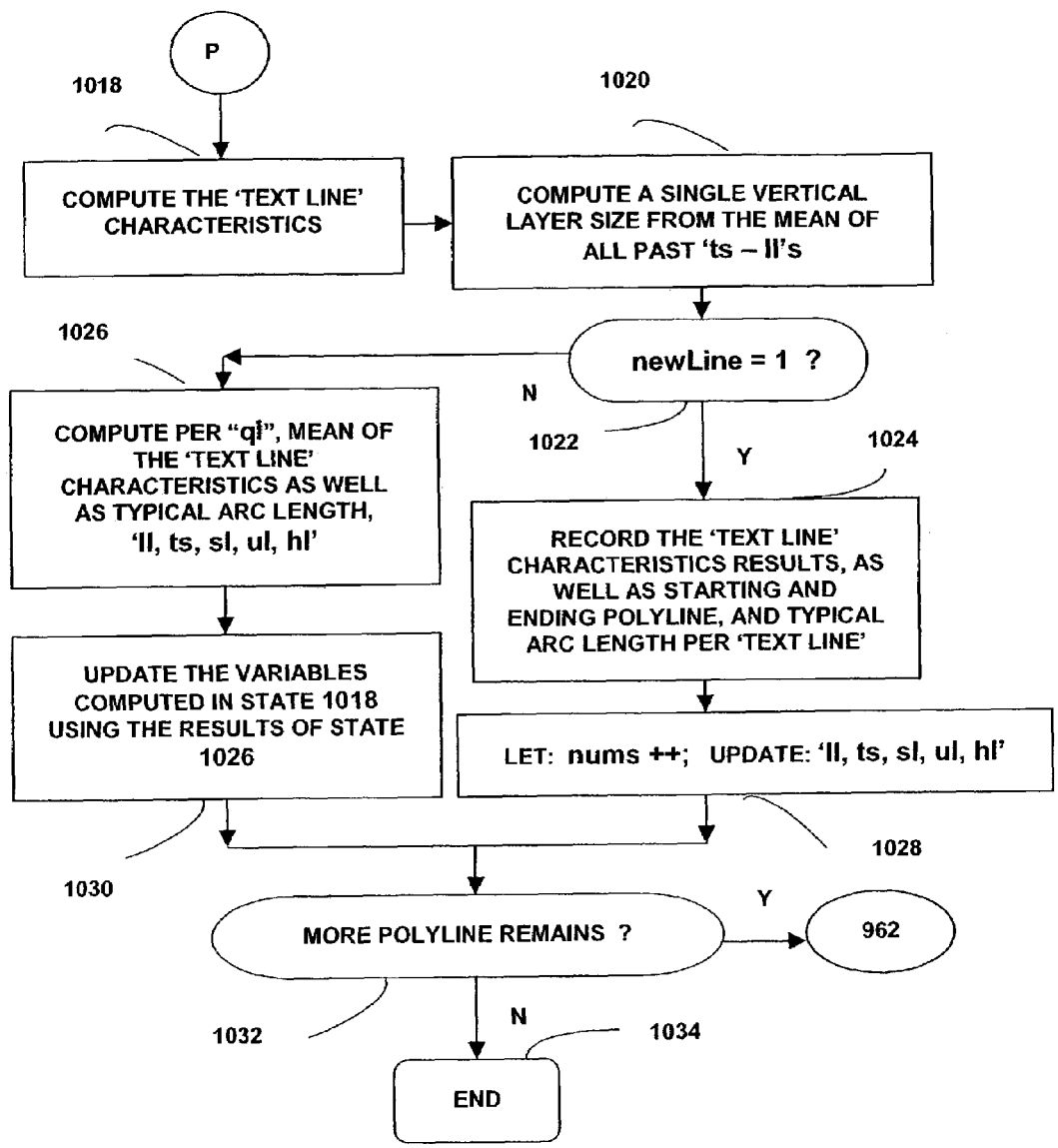

FIG. 27 illustrates the overall process of state 942 of process 144, shown in FIG. 26. The process 942 begins at a start state 960 and moves to state 962 wherein allows states 964-to-1032 to be repeated for all polylines. The process 942 moves to state 964 wherein a bounding box is obtained for polyline "q1" (see top portion of FIG. 40). The derivation of a bounding box is well known to those skilled in the art. The process 942 moves to state 966 to initialize a subset of the text line characteristics variables. The process 942 then moves to the decision state 968. If a determination is made that in the decision state 968 that "q1" is not equal zero, the process 942 moves to state 970 to assign the lower left-most point of the bounding box for polyline "q1" to "xscan1" and "yscan1". This is achieved by setting (i) "yscan1" to "u1" minus a value derived empirically, during the previous cycle, for polyline "q1-1", and (ii) "xscan1" to "xmaxpt[q1-1]". In (ii), "xscan1" is refined by decreasing it by "ts-11" derived empirically when "xscan1" exceeds the column aspect of polyline "q1" and arcpoly "0"'s start point or end point, and when ts-11>threshold ("ts", "u1", "s1", and "11" were derived during the previous cycle for polyline "q1-1"), otherwise, if ts-11<=threshold, then "xscan1" is decreased by "threshold", where "threshold" is empirically determined.

Next, the process 942 moves to the decision state 972. If a determination is made that in the decision state 972, an "elevated-bar" is detected (as described in connection with the mid-portion of FIG. 41) by establishing that its extreme points' direction is semi-horizontal, as well as establishing that either the vertical length of polyline "q1"'s bounding box is less than "factor1 multiplied by "ts-s1" or that (i) the right-most point of polyline "q1"'s bounding box is larger than the left-most point of polyline "q1-1"'s bounding box and (ii) the left-most point of polyline "q1"'s bounding box is less than the right-most point of polyline "q1-1"'s bounding box, then the process 942 moves to state 974 wherein polyline "q1" is designated as an "elevated-bar". In the decision state 972, "factor1" is empirically derived. The process 942 moves to the decision state 976. If the results of the decision state 976 are in the affirmative, the process 942 moves to state 978 wherein "newLine=1" and then moves to state 1018. Otherwise, the process 942 moves to state 980 wherein "newLine=0" and then moves to state 1018.

Next, if the result of the decision state 972 is not in the affirmative, then the process 942 moves to the decision state 982. If a determination is made in the decision state 982 that the vertical length of polyline "q1-1"'s bounding box is less than "factor1", described above, multiplied by "delta" determined in the previous cycle for polyline "q1-1", then the process 942 moves to state 984 to decrease the value of "yscan1" by "delta" and assign the result to "mr". Next, the process 942 moves to the decision state 986. If the result of the decision state 982 is not in the affirmative, the process 942 moves to the decision state 986. If a determination is made in the decision state 986 that polyline "q1-1"'s right-most point exceeds polyline "q1"'s right-most point and polyline "q1-1"'s left-most point is less than polyline "q1"'s left-most point, then the process 942 moves to state 988 wherein "xscan1" is set to polyline "q1-1's left-most point and then moves to state 990 wherein "newLine=1". If the results of the decision state 986 are not in the affirmative, the process 942 moves directly to state 990.

Figure 40:
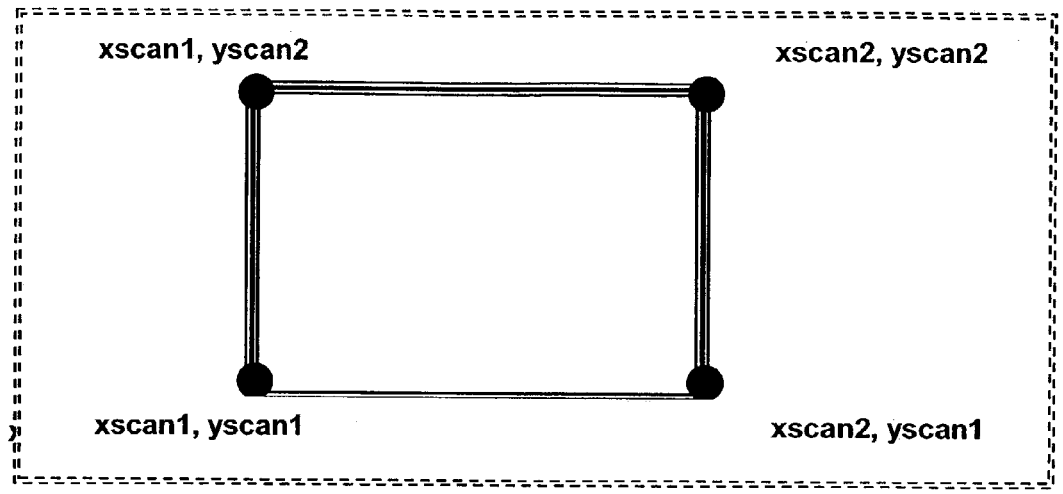
FIG. 40 is a diagram illustrating (i) a look-up table as part of the collective evidence database for the derivation of the connection status (code) for adjoining arcpoly(s) (if any) pertaining to all the double pairs and the first connection and option, and (ii) the determination of a bounding box for polyline "q1".

Next, the process 942 moves to state 992 wherein allows state 994-to-996 to be repeated for all scan values within the confines of the bounding box, as shown in the top portion of FIG. 40. The process 942 moves to the decision state 994. If a determination is made in the decision state 994 that "xscan1" and "yscan1" matches any of the image points within the scan box's limit, the process 942 moves to state 998 to set "match" to one and then moves to state 1016. Otherwise, the process 942 moves to the decision state 996. If the result of the decision state 996 is in the affirmative, the process 942 moves to state 992 to begin another cycle. Otherwise, the process 942 moves to the decision state 1000. If a determination is made in the decision state 1000 that "match=0", then the process 942 moves to state 1016. Otherwise, the process 942 moves to the decision state 1002. If the results of the decision state 1002 are in the affirmative, the process 942 moves to state 1004 to reduce the value of "yscan1" by "ts-11". Next, the process 942 moves to states 1006-to-1014, in a manner similar to states 992-to-1000. The process 942 from state 1012 or 1014 moves to state 1016 wherein "newLine" is set to zero and then to state 1018 wherein text characteristic lines (i.e., base line, core line, ascender line, descender line levels) as well as "typical" arc length are compute (see FIG. 39). If the results of the decision state 1002 are not in the affirmative, the process 942 moves to state 1018. If the result of the decision state 968 is in the affirmative, the process 942 moves to state 1018.

Next, the process 942 moves to state 1020 to compute a single transition "layer" (i.e., the row associated with the core line level minus the row associated with the base line level, or the row associated with the ascender line level minus the row associated with the core line level, etc.) from the mean value of all past "ts-11"'s. Next, the process 942 moves to the decision state 1022. If a determination is made in the decision state 1022 that "newLine=1", the process 944 moves to state 1024 to record for polyline "q1" the following spatial variables: text characteristic lines, typical arc length, as well as the polyline "q1"s' that correspond to the start of each text line and end of each text line (see bottom portion of FIG. 39). Next, the process 944 moves to state 1028 to update "11", "ts", "s1", "u1", and "h1" by setting them to values derived in state 1018 and increments the number of text lines by one and then moves to the decision state 1032.

If the result of the decision state 1022 is not in the affirmative, the process 942 moves to state 1026 to compute an average of the text characteristic lines and typical arc length across all past polylines, and assign them to "l1", "ts", "s1", "u1", and "h1" respectively (see bottom portion of FIG. 39). Next, the process 942 moves to state 1030 wherein the updated values of text characteristic lines and typical arc length are recorded for polyline "ql". The process 942 moves to the decision state 1032. If the result of the decision state 1032 is in the affirmative, the process 942 moves to state 962 to begin another cycle. Otherwise, the process 942 terminates at an end state 1034.

The overall process of state 944 illustrated in FIG. 26 as process 144 is described below as a 16 step detailed process, where "ql" signifies the polyline index and "qc" refers to the text line index:

[0196] Step1: Compute "dthrsh" representing the average single transition "layer" for text line ID, "qc".

[0197] Step2: Set delxy to half of a typical arc length (or "midDelX[ql]"), as described earlier, where "ql" is the polyline index.

[0198] Step3: Determine a polyline representation of line points and directions as described below:
x1[i], y1[i], where i = 0, . . ., num where, 'num' refers to the number of polyline "ql"'s lines

[0199] Step4: Compute "saddle" points or local maxima and minima as described below (see bottom of FIG. 41):
Category I: ymin[i1], where i1 = 0, . . ., cntn − 1  Local Minima
Category II: ymax[i2], where i2 = 0, . . ., cntx − 1  Local Maxima

[0200] Step5: Modify "saddle" points by migrating elements from one category to another when a "significant" size change is detected between this element and the remaining elements of the category. Here, significance is declared when:
1) the size change exceeds 1/5 of the average arc length determined above, where 5 represents the number of lines that make up a "typical arc".
2) the cumulative size changes between this element and other elements' within this category exceeds the cumulative size change between this element and the largest element of the other category.

[0201] Step6: Rank the members of the two categories in an ascending order.

[0202] Step7: nmajor = xmajor = 0;
If: num > 3 & (cntn + cntx) > 3 & cntn > 1 & cntx > 1:
If: (ymax[cntx − 1] − ymax[0]) >= (fctr9 * dthrsh) || (ymax[cntx − 1] − ymax[0]) >= (ymax[cntx − 1] − ymin[0])/4:
    xmajor = 1;
If: (ymin[cntn − 1] − ymin[]) >= (fctr9 * dthrsh) || (ymin[cntn − 1] − ymin[0]) >= (ymax[cntx − 1] − ymin[0])/4:
    nmajor = 1;
Where, .5 < fctr9 < 1.0 and is empirically derived.

[0203] Step8: qdel = 0;
If: (ql − starts[qc]) > 0 & ql > 1:
    For: q = starts[qc], . . ., ql:  qdel = qdel + qdelta[q]; (see Step 15)
    qdel (qdel/(ql − starts[qc])) * 1.5;

[0204] Step9: If: ql > starts[qc]:
Set variables 'one', 'two', 'three' and 'four' to the average of at most 4 of the last polylines' text characteristic lines that include, 'underLine[ql]', 'baseLine[ql]', 'midLine[ql]', and 'topLine[ql]', respectively, contingent upon all belonging to the same text line ID, "qc".

[0205] Step10: If: ql <= starts[qc] & num > 3:
If: cntn > 1:
    If: difference between maximum and median values of category I is
    less than fctr9 * dthrsh OR if the following is satisfied: 'cntn > 6 &
    difference between maximum and median values of category I is less
    than fctr10 * dthrsh':
        baseLine[ql] is set to the median value of category I.
    Else:
        baseLine[ql] is set to category I's median and maximum value
        average.
    midLine[ql] = baseLine[ql] + (dthrsh, SkyLoc[qc] − LandLoc[qc])$_{maximum}$;
    where, 1 < fctr10 < 1.5 and is derived empirically derived.
If: cntx > 1 & cntn = 1:
    midLine[ql] is set to the median value of category II.
    baseLine[ql] is set to the lowest value of category I.
    Note, 'midLine[ql]' will be slightly increased, by an empirically
    derived value if its difference to 'baseLine[ql] is less than 'dthrsh'.
If: cntn = cntx = 1:
    midLine[ql] is set to the highest value of category II.
    baseLine[ql] is set to the lowest value of category I.
    Note, 'midLine[ql]' will be slightly increased, by an empirically
    derived value, if its difference to 'baseLine[ql] is less than 'dthrsh'.
topLine[ql] = midLine[ql] + (midLine[ql] baseLine[ql]);
underLine[ql] = baseLine[ql] (midLine[ql] baseLine[ql]);

-continued

[0206] Step11: If: ql > starts[qc] & xmajor = 1 & nmajor = 1:
   If: 'three' is closer in value to the highest value of category II than to the
   'four':
      'midLine[ql]' is set to the highest value of category II.
      'baseLine[ql] is set to the lowest value of category II.
      underLine[ql] = baseLine[ql] dthrsh;
      topLine[ql] = midLine[ql] + dthrsh;
   Else:
      'midLine[ql]' is set to the lowest value of category II.
      'topLine[ql] is set to the highest value of category II.
      baseLine[ql] = midLine[ql] − dthrsh;
      underLine[ql] = baseLine[ql] − dthrsh;
[0207] Step12: If: ql <= starts[qc] & num <= 3:
   baseLine[ql] = LandLoc[qc];
   midLine[ql] = SkyLoc[qc];
   topLine[ql] = TallSize[qc];
   underLine[ql] = UndrLndLoc[qc];
[0208] Step13: If: ql > starts[qc] & num <= 3:
   baseLine[ql] = two;
   midLine[ql] = three;
   topLine[ql] = four;
   underLine[ql] = one;
[0209] Step14: If: ql > starts[qc] & num > 3 & (nmajor = 0 || xmajor = 0):
   dif2 = dif5 = 10000;
   dif1 = 'two' minus lowest value of category I.
   If: cntn > 1:
      dif2 = 'two' minus highest value of category I.
   dif4 = 'three' minus lowest value of category II.
   If: cntx > 1:
      dif5 = 'four' minus lowest value of category II.
   dif6 = 'four' minus highest value of category II.
   If: 'dif1' or 'dif2' has the smallest value relative to 'dif4' & 'dif5' & 'dif6'':
      If: 'dif1' is smaller than 'dif2':
         set 'baseLine[ql]' to the average of 'two' and the lowest value
            of category I.
      Else:
         set 'baseLine[ql]' to the average of 'two' and the highest value
            of category I.
   difc = difd = 10000;
   difa = 'three' minus lowest value of category II.
   difb = 'four' minus lowest value of category II.
   If: cntx > 1:
      difc = 'three' minus highest value of category II.
   If: cntx > 1:
      difd = 'four' minus highest value of category II.
   alpha = beta = gama = delta = 0;
   If: 'difa' is smaller than 'difb', 'difc', and 'difd':
      alpha = 1;
   If: 'difb' is smaller than 'difa', 'difc', and 'difd':
      beta 1;
   If: 'difc' is smaller than 'difb', 'difa', and 'difd':
      gama = 1;
   If: 'difd' is smaller than 'difb', 'difc', and 'difa':
      delta = 1;
   If: beta = 1 || delta = 1 || (beta = delta = 0 & ql > 1& (lowest value of category
            II minus baseLine[ql]) >= qdel)
      If: beta = 1:
         topLine[ql] is set to the lowest value of category II.
      If: delta = 1:
         topLine[ql] is set to the highest value of category II.
      If: beta = 0 & delta = 0:
         If: (topLine[q] − baseLine[ql] + epsilon1) <= (2 *
               dthrsh) & ql > 0:
            topLine[ql] = baseLine[ql] + (2 * dthrsh) −
               epsilon2;
   Else:
      If: alpha = 1:
         midLine[ql] is set to the lowest value of category II.
      If: gama = 1:
         midLine[ql] is set to highest value of category II.
      If: alpha = 1 || gama = 1:
         If: midLine[q] − baseLine[ql] + epsilon1 <= dthrsh & ql >
               0:
            midLine[ql] baseLine[ql] + dthrsh − epsilon2/
               2;

-continued

```
            If: alpha = 1 || gama = 1:
                    midLine[ql] = topLine[ql] – (topLine[ql] –
                            baseLine[ql])/2;
                    underLine[ql] = baseLine[ql] – (midLine[ql] –
                            baseLine[ql])/2;
If: 'dif4' or 'dif5' has the smallest value relative to 'dif1' & 'dif2' &
   'dif6":
    If: 'dif4' is smaller than 'dif5':
            set 'midLine[ql]' to the average of 'three' and the
                    lowest value of category II.
        Else:
            set 'midLine[ql]' to the average of 'three' and the
                    highest value of category II.
    difa = 'two' minus lowest value of category II.
    difb = 'two' minus highest value of category I.
    difc = 'two' minus median value of category I.
    difd = 'one' minus lowest value of category I.
    alpha = beta = gama = delta = 0;
    If 'difa' is smaller than 'difb', 'difc', and 'difd':
            alpha = 1;
    If: 'difb' is smaller than 'difa', 'difc', and 'difd':
            beta = 1;
    If: 'difc' is smaller than 'difb', 'difa', and 'difd':
            gama = 1;
    If: 'difd' is smaller than 'difb', 'difc', and 'difa':
            delta = 1;
    If: alpha = 1:
            baseLine[ql] is set to the lowest value of category II.
    If: beta = 1:
            baseLine[ql] is set to the highest value of category II.
    If: alpha = 1 || beta = 1:
            If: midLine[q] – baseLine[ql] + epsilon1 <= dthrsh & ql >
                    0:
                    baseLine[ql] midLine[ql] – dthrsh – epsilon2/
                            2;
    If: gama = 1:
        underLine[ql] is set to the lowest value of category I.
                    If: alpha = 1 || beta = 1:
            topLine[ql] = midLine[ql] + (midLine[ql] –
                    baseLine[ql]);
            underLine[ql] = baseLine[ql] – (midLine[ql] –
                    baseLine[ql]);
        Else:
            baseLine[ql] = midLine[ql] – (midLine[ql] –
                    underLine[ql])/2;
            topLine[ql] = midLine[ql] + (midLine[ql] –
                    baseLine[ql]);
If: 'dif6' has the smallest value relative to 'dif1', 'dif2', 'dif4' &
    'dif5':
    Set 'topLine[ql]' to average of 'four' and the lowest value of
            category II.
    difa = 'three' minus lowest value of category I.
    difb = 'three' minus highest value of category I.
    dife = 'three' minus median value of category I.
    difc = 'two' minus lowest value of category I.
    difd = 'two' minus highest value of category I.
    diff = 'two' minus median value of category I.
    alpha = beta = beta2 = gama = delta = delta2 = 0;
    If: 'difa' is smaller than 'difb', 'difc', 'difd', 'dife', and 'diff':
            alpha = 1;
    If: 'difb' is smaller than 'difa', 'difc', 'difd', 'dife', and 'diff':
            beta = 1;
    If: 'dife' is smaller than 'difb', 'difa, 'difc', 'difd', and 'diff':
            beta2 = 1;
    If: 'difc' is smaller than 'difa', 'difb', 'difd', 'dife', and 'diff':
            gama =1;
    If: 'difd' is smaller than 'difa', 'difb', 'difc', 'dife', and 'diff':
            delta = 1;
    If: 'diff' is smaller than 'difa', 'difb', 'difc', 'difd', and 'dife':
            delta2 = 1;
    If: alpha = 1:
        midLine[ql] is set to the lowest value of category I.
    If: beta2 = 1:
        midLine[ql] is set to the median value of category I.
    If: beta = 1:
        midLine[ql] is set to the highest value of category I.
```

-continued

```
If: alpha = 1 || beta2 = 1 || beta = 1:
    baseLine[ql] – midLine[ql] – (topLine[ql] –
        midLine[ql]);
    underLine[ql] = baseLine[ql] – (midLine[ql] –
        baseLine[ql]);
If: (topLine[q] – midLine[ql] + epsilon1) <= dthrsh & ql > 0:
    midLine[ql] = topLine[ql] – dthrsh – epsilon2/2;
If: gama = 1:
    baseLine[ql] is set to the lowest value of category I.
If: delta = 1:
    baseLine[ql] is set to the highest value of category I.
If: delta2 = 1:
    baseLine[ql] is set to the median value of category I.
If: gama = 1 || delta = 1 || delta2 = 1:
    If: topLine[q] – baseLine[ql] + epsilon1 <= 2 * dthrsh
        & ql > 0:
                            topLine[ql] = baseLine[ql] + (2 * dthrsh) –
                                epsilon2;
                            midLine[ql] = topLine[ql] – (topLine[ql] –
                                baseLine[ql])/2;
                            underLine[ql] = baseLine[ql] – (midLine[ql] –
                                baseLine[ql]);
[0210]   Step15:    qdelta[ql] = topLine[ql] – midLine[ql];
If: lowest value of category I < underLine[ql] & lowest value of category I + epsilon1 >=
underLine[ql]:
    underLine[ql] is reduced by 10;
    baseLine[ql]] is reduced by 10;
[0211]   Step16:    If: num > 1 & lowest value of category I < underLine[ql] &
(baseLine[ql] – underLine[ql]) > 10:
    gyjcnt[[qc] is incremented by 1.
    gyjTypeql[qc][gyjcnt[[qc] – 1] = ql;
```

Note that 2 < epsilon1 < 8 and .5 < epsilon2 < 4 are both derived empirically.

High-Level Semantics Part II

The second step of the three step process for the signal-to-symbol transition is presented in this section. In this step, as another preferred embodiment of the invention, a feature set is computed whereby features are normalized and connection codes comprising one-of-nine integers and "connection" separation are computed. Furthermore, each alphanumeric ID is assigned to a specified series of polyline ID(s), a sequence of arcpoly(s) and their semantically high-level descriptors, as listed in FIG. 45. State 88 of the process 40 is illustrated in FIG. 3.

Figure 28:
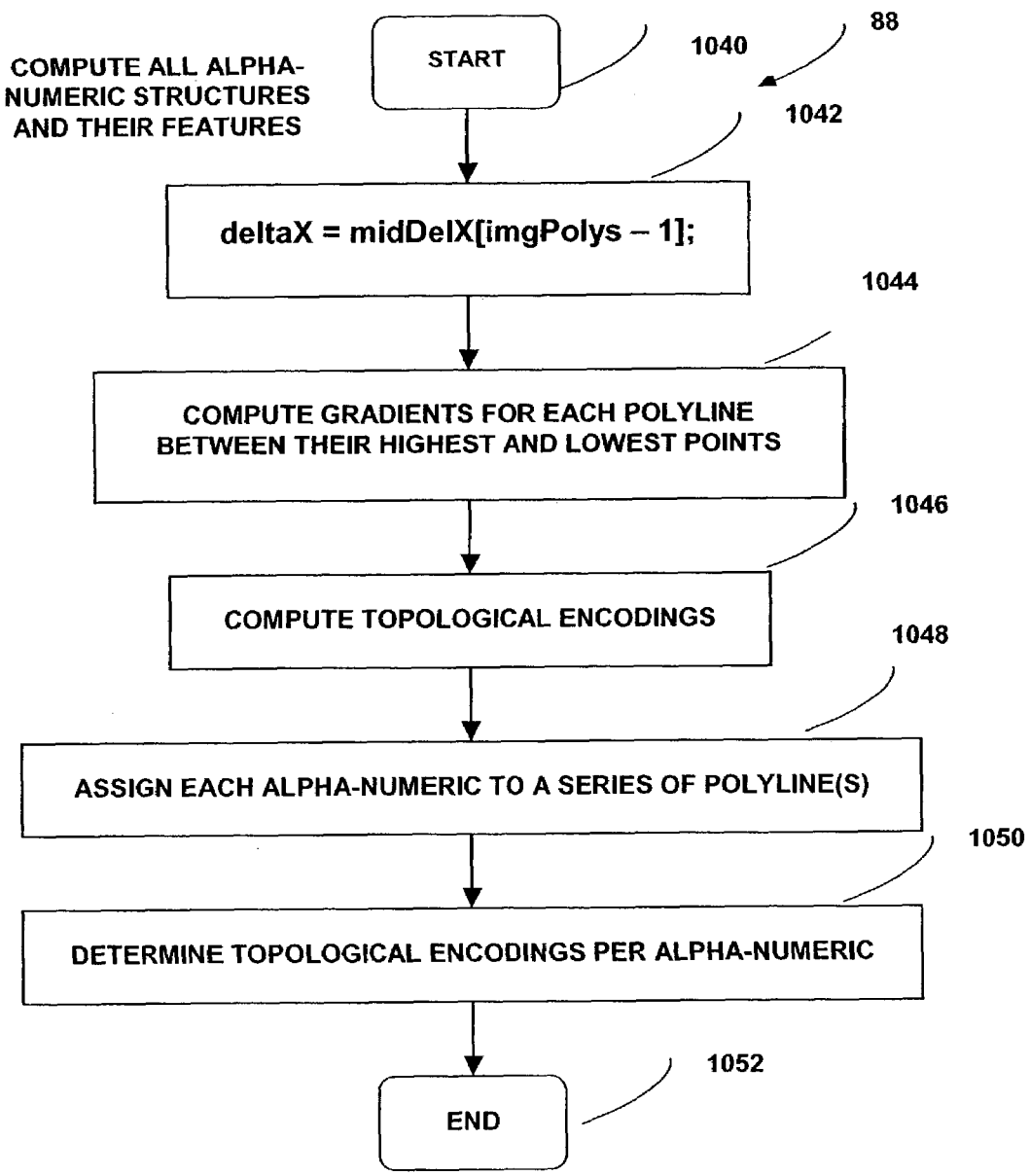
FIG. 28 is a flow diagram illustrating the computation of all alpha-numeric IDs and their features.

FIG. 28 illustrates the overall process 88 as it begins at a start state 1040 and moves to state 1042 wherein the size of a typical arc, "midDelX[imgPolys–1]" is assigned to "deltaX". The process 88 moves to state 1044 wherein each polyline ID's vertical length representing the gradient associated with the highest and the lowest polyline ID's points are computed. The process 88 then moves to state 1046 to generate a series of encodings pertaining to relationships amongst the neighboring polyline IDs. Next, the process 88 moves to state 1048 to register (or group) polyline ID(s) and their arcpoly(s) to each alphanumeric ID and then to normalize their size descriptors. The process 88 moves to state 1050 to register (or group) to each alphanumeric ID, the encoding(s) pertaining to the relationships associated with the grouped polyline ID(s) and their arcpoly(s) using the results of state 1046. Finally, the process 88 terminates at an end state 1052.

Figure 29B:
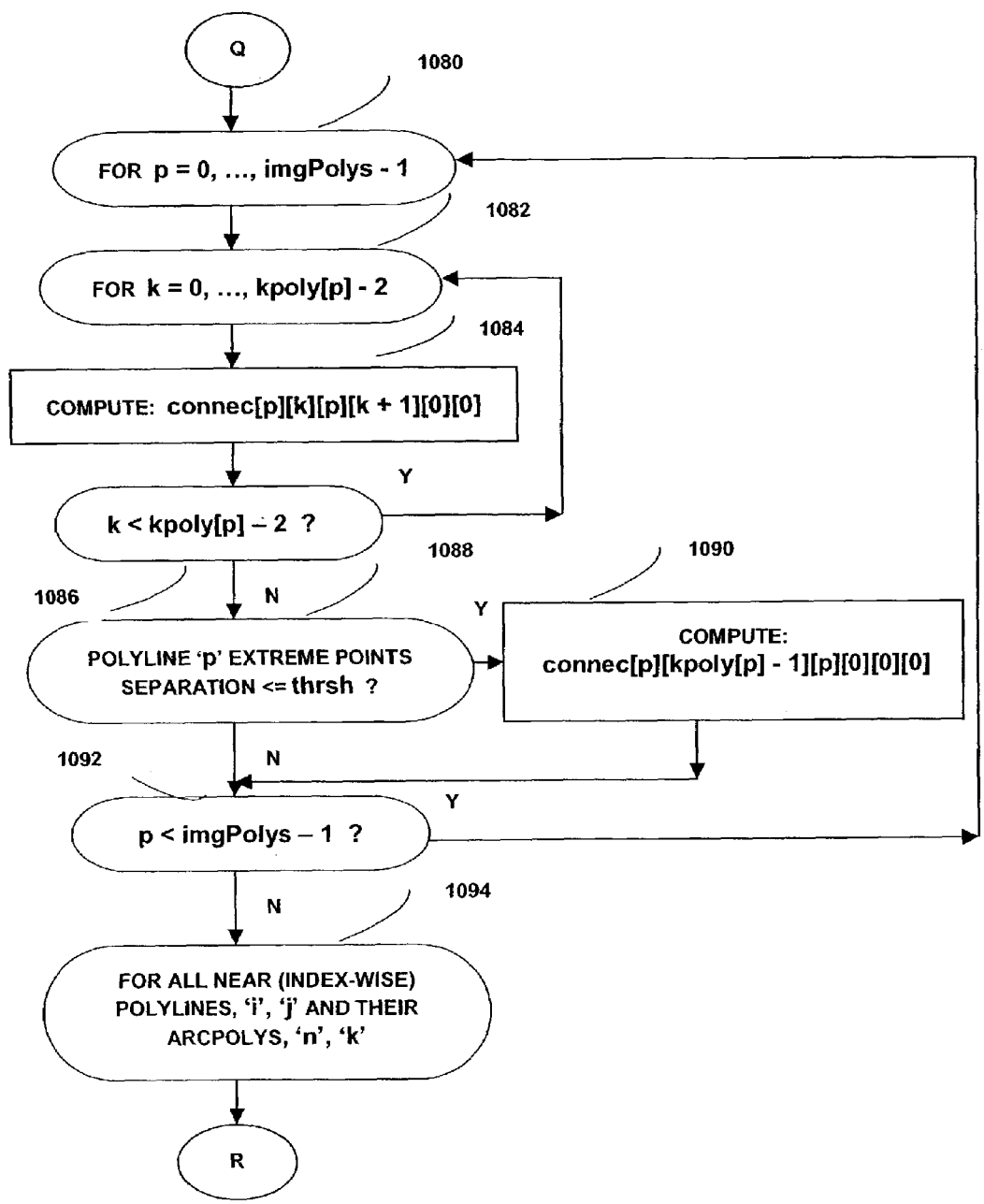
FIG. 29 is a flow diagram illustrating the computation of encodings.
Figure 29C:
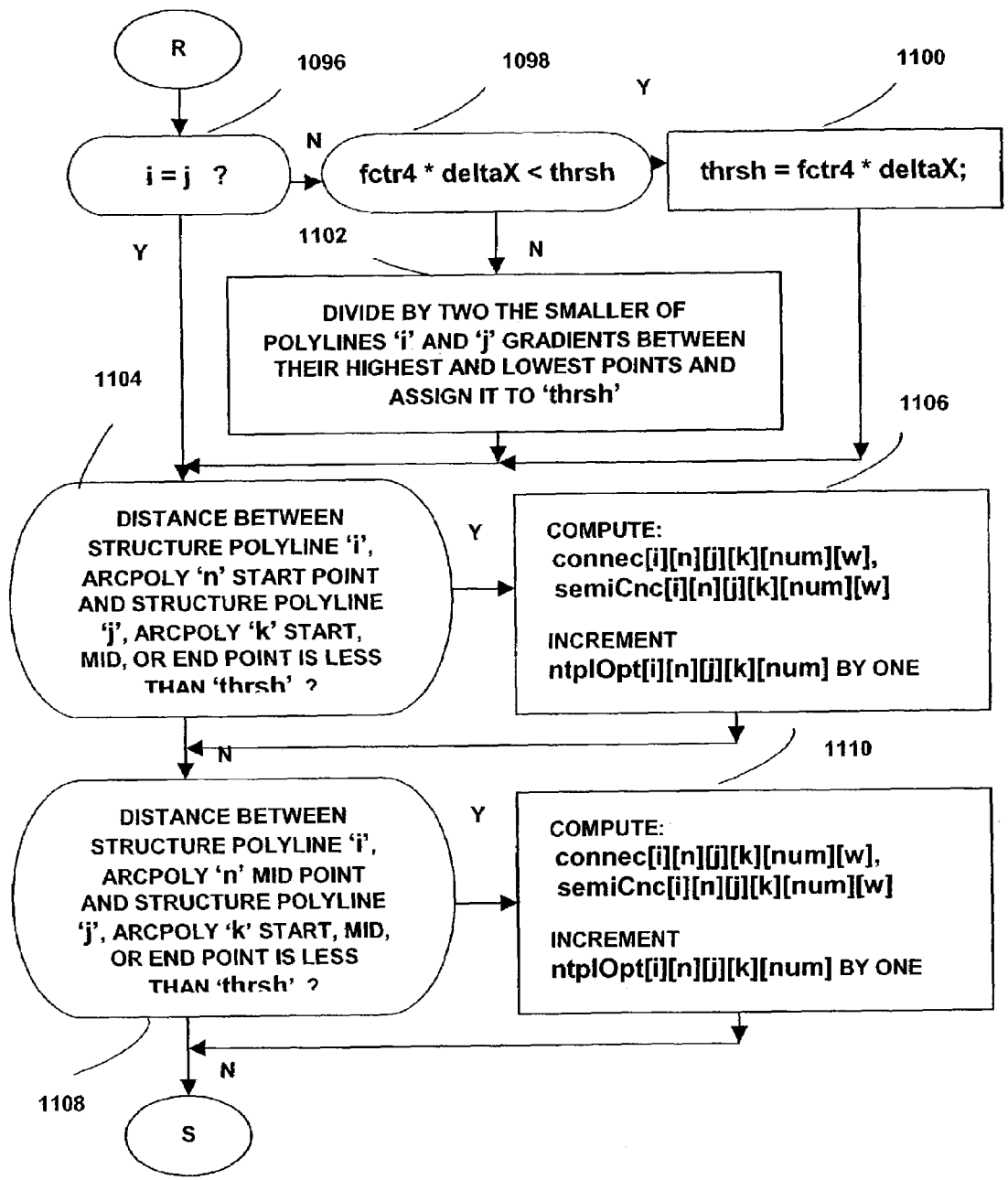
Figure 29D:
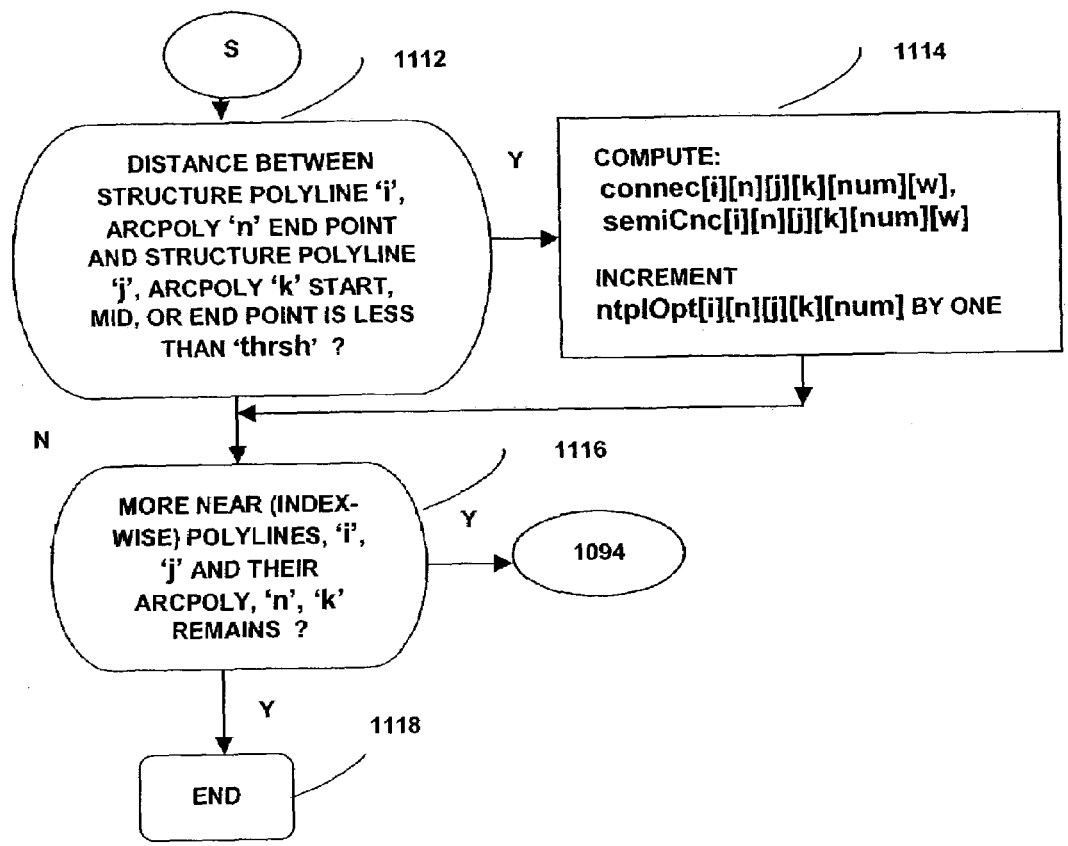
Figure 30A:
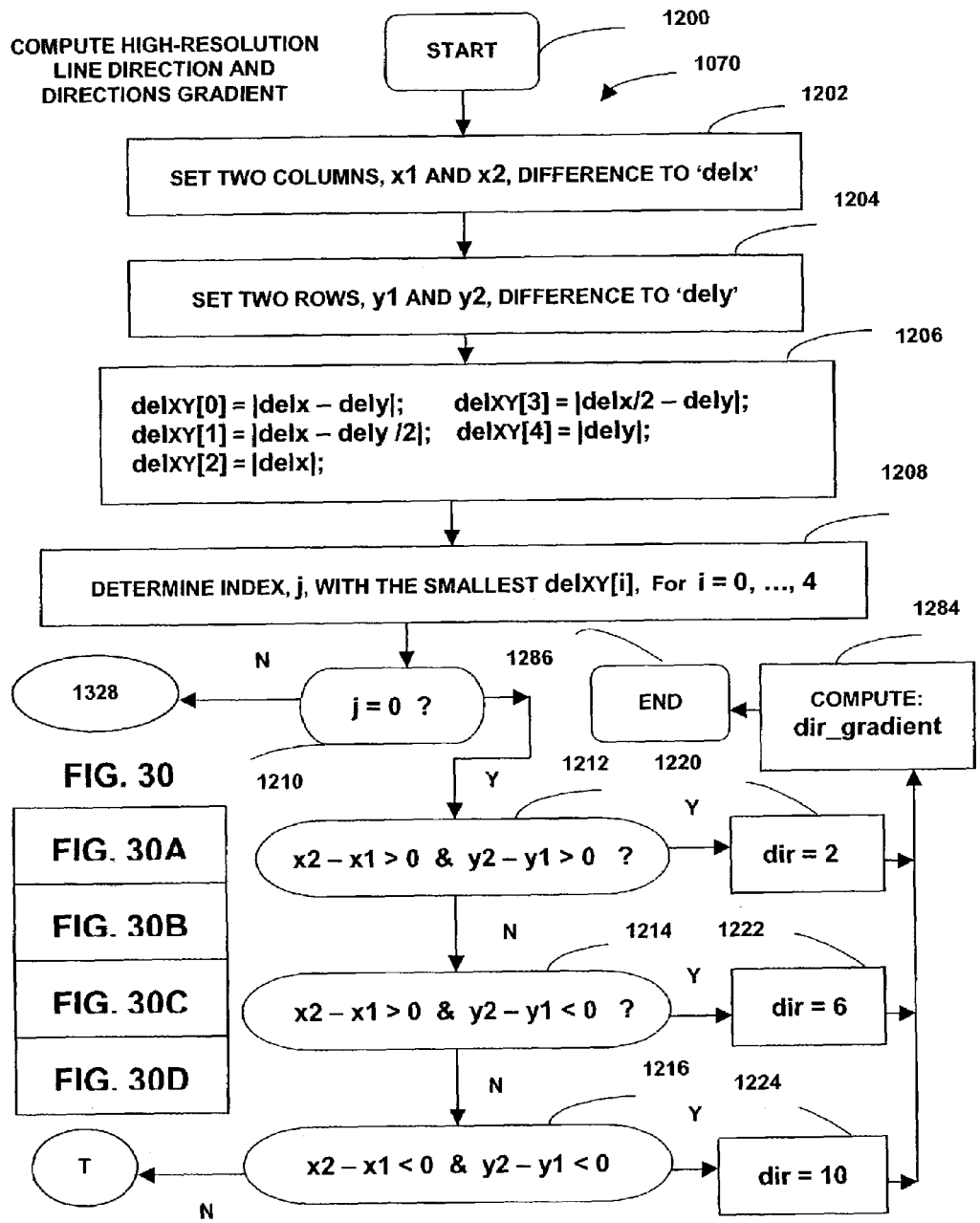
FIG. 30 is a flow diagram illustrating the computation of high-resolution line direction and directions gradient.
Figure 30B:
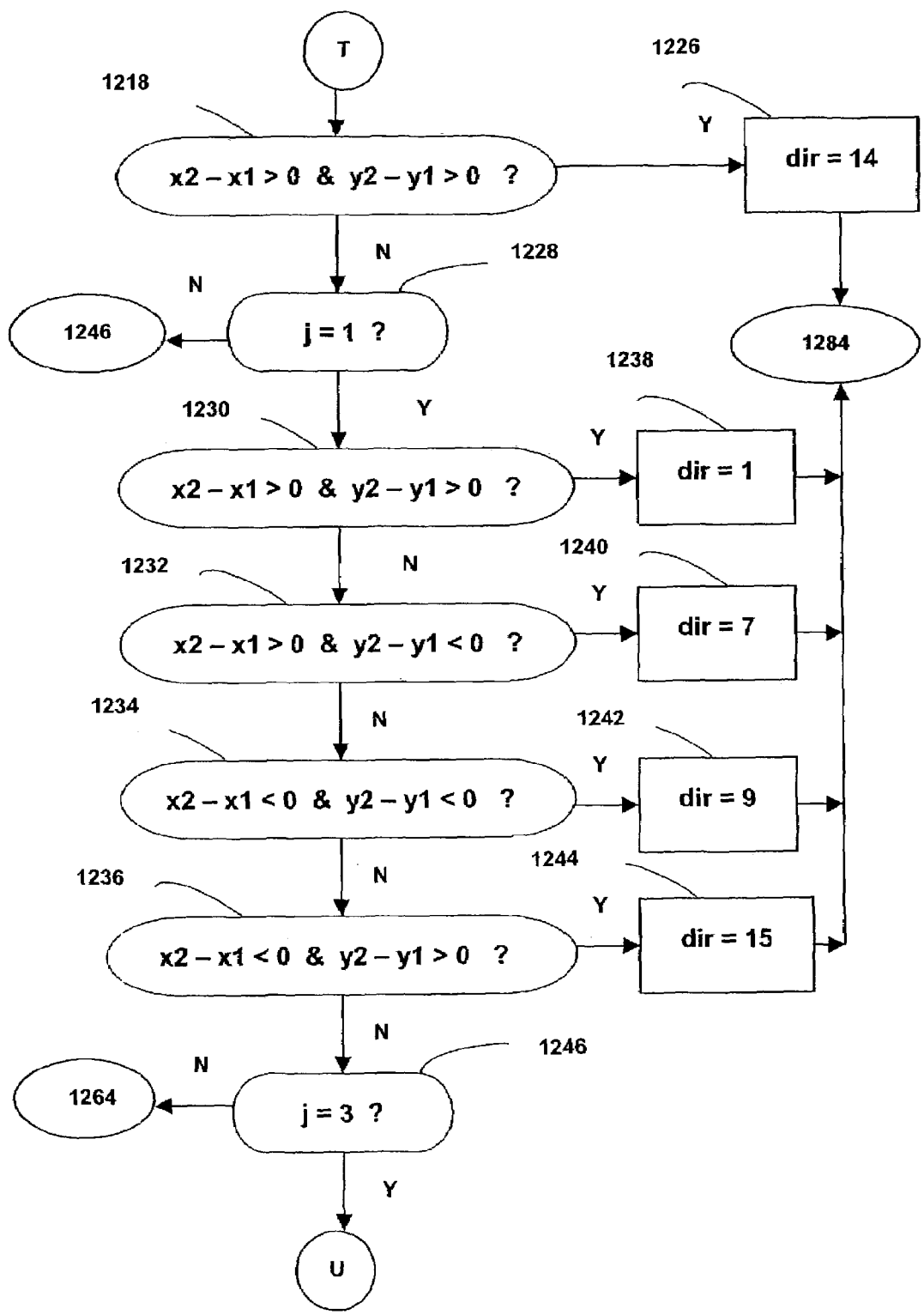
Figure 30C:
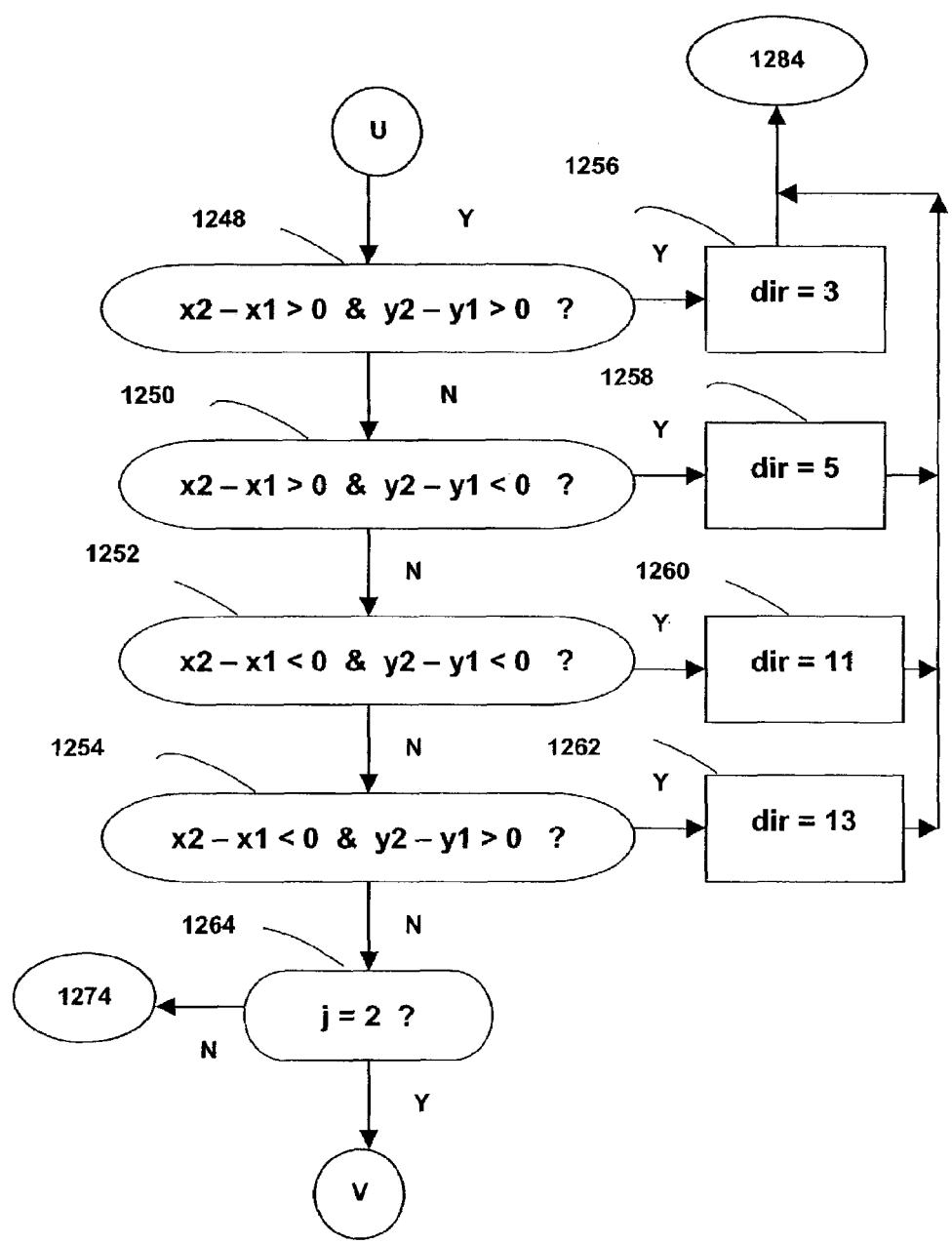
Figure 30D:
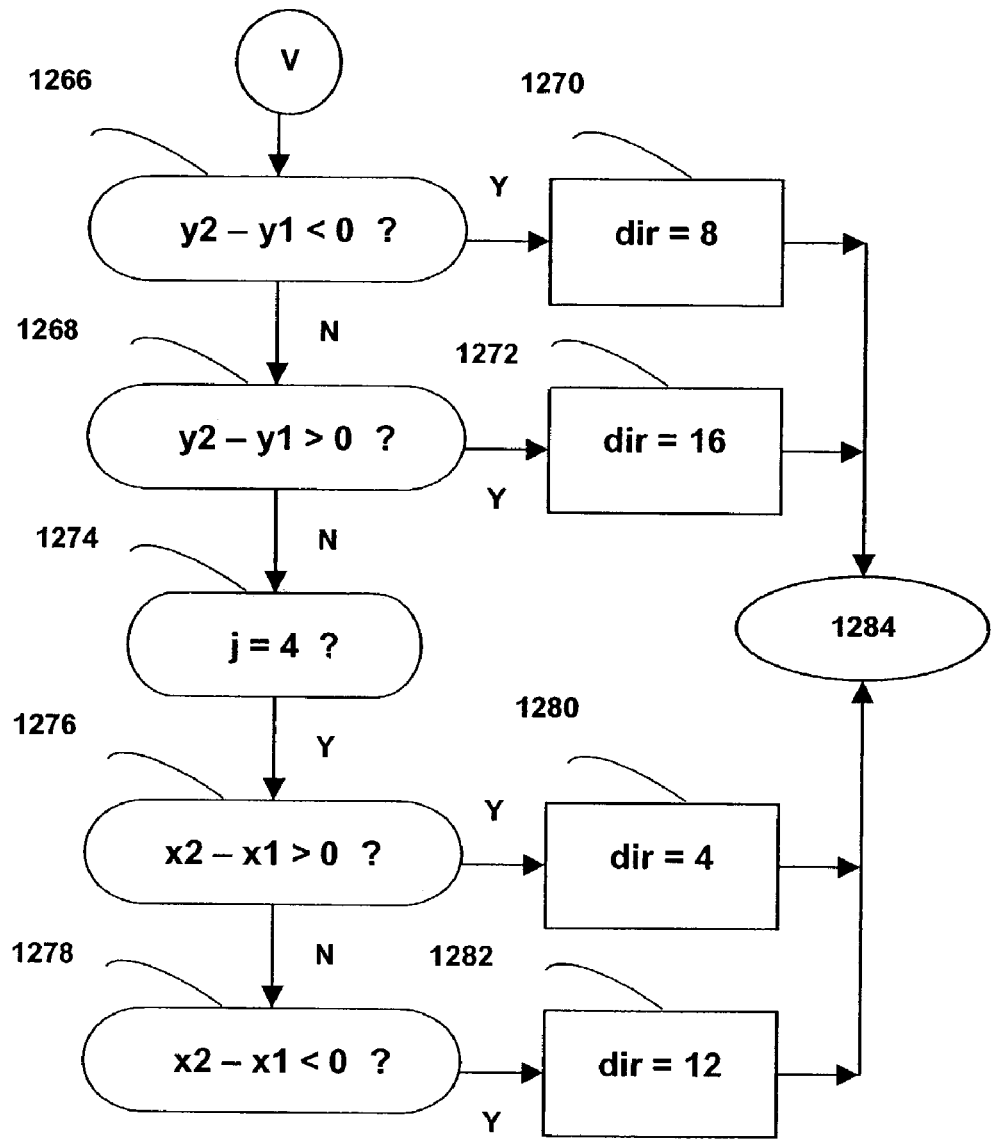

FIG. 29 illustrates the overall process of state 1046 shown in FIG. 28. The process 1046 begins at a start state 1060 and moves to state 1062 wherein "thrsh=delX/5" is derived empirically. The process 1046 moves to state 1064 wherein allows states 1066-to-1076 to be performed repeatedly, once for each polyline. The process 1046 moves to state 1066 wherein allows states 1068-to-1074 to be performed repeatedly, once for each arcpoly. The process 1046 moves to state 1068 to encode polyline and arcpoly pair's mid point, "tplgy[p][k][1]" as ten, as shown in FIG. 1 and then moves to state 1070 to compute extreme points' direction. Next, the process 1046 moves to state 1072 wherein polyline and arcpoly pair's start point and end point are encoded as "tplgy[p][k][0]=0" and "tplgy[p][k][2]=20" for all extreme points' direction except those with values ranging between 8-to-15 whereby they are encoded as "tplgy[p][k][0]=20" and "tplgy[p][k][2]=0". The process 1046 then moves to the decision state 1074. If the result of the decision state 1074 is in the affirmative, the process 1046 moves to state 1064 to begin another cycle. Otherwise, the process 1046 moves to the decision state 1076. If the result of the decision state 1076 is in the affirmative, the process 1046 moves to state 1066 to begin another cycle. Otherwise, the process 1046 moves to state 1078 for initialization. Next, the process 1046 moves to state 1080 wherein allows states 1082-to-1092 to be performed repeatedly for all polylines. The process 1046 moves to state 1082 wherein allows states 1084-to-1086 to be performed repeatedly for all arcpolys. The process 1046 moves to state 1084, wherein a connection status (code) for each adjacent arcpoly (if any) pertaining to all the double pairs (in general, $1^{st}$ pair structure: polyline "p1", arcpoly "k1"; $2^{nd}$ pair structure: polyline "p2", arcpoly "k2") per first connection- and option-indices are computed, according to the look-up table shown in FIG. 40.

As another preferred embodiment of the invention, there are mappings and inverse mappings stored in the database from/to a pair of topological codes, each code belonging to a major point of one of two arcpolys to/from topological connection code. The process 1046 then moves to the decision state 1086. If the result of the decision state 1086 is in the affirmative, then the process 1046 moves to state 1080 to begin another cycle. Otherwise, the process 1046 moves to the decision state 1088. If the result of the decision state 1088 is in the affirmative, the process 1046 moves to state 1090 to determine the connection status for the start and end arcpoly(s) belonging to the same polyline "p" and the first connection and option, according to the look-up table shown in FIG. 40 and then moves to the decision state 1092. Otherwise, the process 1046 moves directly to the decision state 1092. If the result of the decision state 1092 is in the affirmative, the process 1046 moves to state 1080 to begin another cycle. Otherwise, the process 1046 moves to state 1094 wherein allows states 1096-to-1116 to be performed repeatedly for all double pairs described above, subject to the two polylines' indices not differing by larger than four, as derived empirically.

Next, the process 1046 moves to the decision state 1096. If a determination is made in the decision state 1096 that the polyline indices are not equal, the process 1046 moves to the decision state 1098. If a determination is made in the decision state 1098 that fctr4*deltax<thrsh, then the process 1046 moves to state 1100 wherein "thrsh=fctr4*deltax" and then moves to the decision state 1104. "fctr4" is derived empirically using a predefined deterministic rule. Otherwise, the process 1046 moves to state 1102 to assign one half of polyline "i"'s vertical size determined from its highest and lowest points' gradient to "thrsh" and then moves to the decision state 1104. If the result of the decision state 1096 is not in the affirmative, the process 1046 moves to the decision state 1104. "thrsh" is derived empirically.

If the results of the decision state 1104 are in the affirmative, the process moves to state 1106 to compute the double pairs' first option connection code and separation", incrementing the connection index by one for each of the results of the decision state 1104 which is in the affirmative. Subsequently, state 1106 increments the option index and then the process 1046 moves to the decision state 1108. If the results of the decision state 1104 are not in the affirmative, the process 1046 moves directly to the decision state 1104. If the results of the decision state 1108 are in the affirmative, the process 1046 moves to state 1110 to compute the double pairs' present option's connection code and separation", incrementing the connection index by one for each of the results of the decision state 1108 which is in the affirmative. Subsequently, state 1110 increments the option index and then the process 1046 moves to the decision state 1112. If the results of the decision state 1112 are in the affirmative, the process 1046 moves to state 1114 to compute the double pairs' present option's connection code and separation", incrementing the connection index by one for each of the results of the decision state 1112 which is in the affirmative. Subsequently, state 1114 increments the option index and then the process 1046 moves to the decision state 1116. If the results of the decision state 1112 are not in the affirmative, the process 1046 moves to the decision state 1116. If the results of the decision state 1116 are in the affirmative, the process 1046 moves to state 1094 to begin another cycle. Otherwise, the process 1046 terminates at an end state 1118.

FIG. 30 illustrates the overall process of state 1070 shown in FIG. 29. The process 1070 is identical to the process 300 shown in FIG. 10, except that in states wherein "dir"s are computed they are followed by a 20 step process to compute the direction gradient, "dir_gradient" as described below. Subsequently, the value of "dir_gradient" will affect "dir" as described below in steps 21 and 22:

| | | |
|---|---|---|
| 1) | If: dir = 2 or 10 & delx > dely | → dir_gradient = 1. |
| 2) | If: dir = 2 or 10 & delx < dely | → dir_gradient = −1. |
| 3) | If: dir = 6 or 14 & delx > dely | → dir_gradient = 1. |
| 4) | If: dir = 6 or 14 & delx < dely | → dir_gradient = −1. |
| 5) | If: dir = 1 or 9 & delx > dely/2 | → dir_gradient = 1. |
| 6) | If: dir = 1 or 9 & delx > dely/2 | → dir_gradient = −1. |
| 7) | If: dir = 7 or 15 & delx < dely/2 | → dir_gradient = 1. |
| 8) | If: dir = 7 or 15 & delx > dely/2 | → dir_gradient = −1. |
| 9) | If: dir = 8 & delx < 0 | → dir_gradient = 1. |
| 10) | If: dir = 8 & delx > 0 | → dir_gradient = −1. |
| 11) | If: dir = 16 & delx > 0 | → dir_gradient = 1. |
| 12) | If: dir = 16 & delx < 0 | → dir_gradient = −1. |
| 13) | If: dir = 3 or 11 & delx > 2* dely | → dir_gradient = 1. |
| 14) | If: dir = 3 or 11 & delx < 2* dely | → dir_gradient = −1. |
| 15) | If: dir = 5 or 13 & delx < 2* dely | → dir_gradient = 1. |
| 16) | If: dir = 5 or 13 & delx > 2* dely | → dir_gradient = −1. |
| 17) | If: dir = 4 & dely < 0 | → dir_gradient = 1. |
| 18) | If: dir = 4 & dely > 0 | → dir_gradient = −1. |
| 19) | If: dir = 12 & dely > 0 | → dir_gradient = 1. |
| 20) | If: dir = 12 & dely < 0 | → dir_gradient = −1. |
| 21) | If: dir_gradient = 1 | → dir ++ modular 16* |
| 22) | If: dir_gradient = −1 | → dir −− modular 16* |

The overall process of state 1048 illustrated in FIG. 28 as process 88 is described below as a 14 step detailed process, wherein polyline(s), their arcpoly(s) and their connection code(s) are grouped to each alphanumeric ID:

| | | |
|---|---|---|
| [0220] | Step1: | -p1strt = a = 0; -pnum[a] = 1; |
| [0221] | Step2: | For p1 = 0, . . ., imgPolys − 1: |
| [0222] | Step3: | -Set "amnt" to the smaller of the following: p1strt + 4 OR imgPolys − 1<br>-Compute p2s[j], wherej = p1strt, . . ., amnt − 1 |
| [0223] | Step4: | For v = 0, . . ., amnt − 1: |
| [0224] | Step5: | p2 = p2s[v]; |
| [0225] | Step6: | For k1 = 0, . . ., kpoly[p1] − 1: |
| [0226] | Step7: | For k2 = 0, . . ., kpoly[p2] − 1: |
| [0227] | Step8: | -Establish the Boolean variable "near" for the double pair of structures<br>(as described below)<br>Determine "bar" & "cross" type polylines (see mid-portion of FIG. 41) |
| [0228] | Step9: | -If near = 1:<br>-Assimilate "p2" index into "a" (provided it has not been assimilated before, by using a list primarily devised to account for the polyline indices that have been thus far designated as belonging to "a"): |

-continued

```
                        -pnum[a] ++;
                        -lclToGlblPolys[a][pnum[a] − 1] = p2;
                -Determine the next starting polyline index, "p1strt"
                -Assimilate the features and descriptors shown in FIG. 45
                        for polyline "p2" and all arcpoly(s) belonging to
                        polyline "p2".
                -Go to step 12.
```

Figure 31:
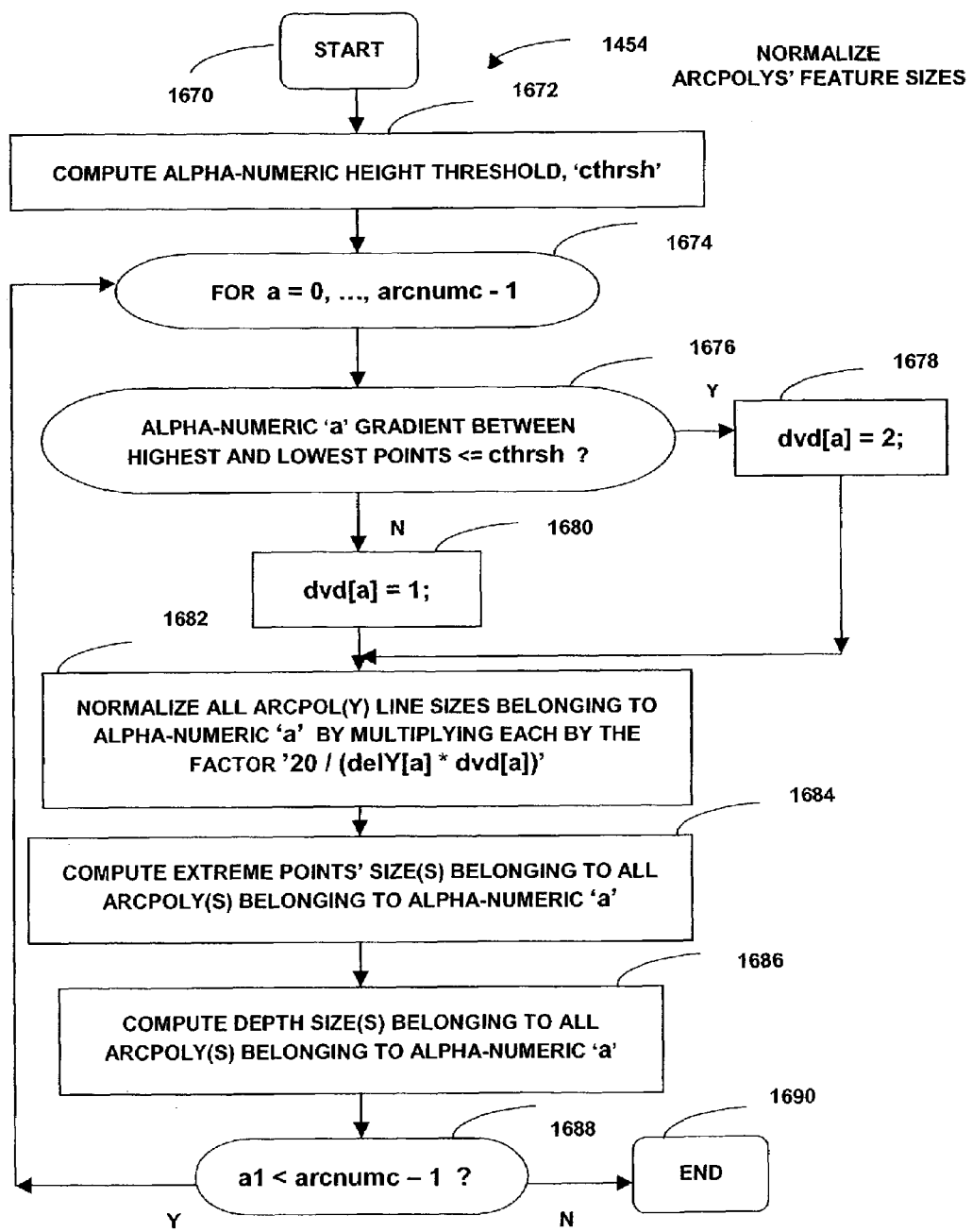
FIG. 31 is a flow diagram illustrating the normalization of arcpolys' feature sizes.

[0229] Step10: -If k2 < kpoly[p1] − 1, go to step 7, otherwise go to step 11.
[0230] Step11: -If k1 < kpoly[p2] − 1, go to step 6, otherwise go to step 12.
[0231] Step12: -If v < amnt − 1, got to step 4, otherwise go to step 13.
[0232] Step13: -Set "p1" to "p1strt" and move to step2 if p1 < imgePolys − 1, otherwise go to step14.
[0233] Step14: -Set "arcnumc" to "a + 1" and normalize all size features belonging to each arcpoly using process 1454 illustrated in FIG. 31.

[0234] The process to establish the Boolean variable "near" as described in step8 above, whereby "near = 1" signifies merger between the double pair structures with indices, "p1", "k1" and "p2", "k2" is described below as a 16 step detailed process (see top portion of FIG. 41):

[0235] Step1: thrsh = fctrE * midDelX[imgPolys − 1]; where, 0 < fctrE < 1, derived empirically.
[0236] Step2: near = pnear = nprobII = sameLine = txbarmtch[p1] = txbarmtch[p2] = 0;
    nprobIV = 60;
    dif1 = dif2 = dif3 = dif4 = dif5 = dif6 = dif7 = dif8 = dif9 = 1000;
[0237] Step3: Establish whether "p1" and "p2" belong to the same text line, "idqc","sameLine=1"
[0238] Step4: If sameLine = 1, move to step 5, otherwise move to step 16.
[0239] Step5: For u = 0, . . ., tcnt[idqc] − 1, determine whether (see top portion of FIG. 41):
    tTypeql[idqc][u] = p2 OR txHolderql[idqc][p2] = p1 ←
            txbarmtch[p1] = 1;
    tTypeql[idqc][u] = p1 OR txHolderql[idqc][p1] = p2 ←
            txbarmtch[p2] = 1;
[0240] Step6: If txbarmtch[p1] = 1 OR txbarmtch[p2] = 1 ← extraNnProb[a] = 5;
    Move to step 16.
    Else, move to step 7.
[0241] Step7: Compute "pnear", "nprobII" and "nprobIV" starting from step 8-to-step 15.
[0242] Step8: Compute "dif[j]", where j = 1, . . ., 9, as illustrated in the portion of FIG. 41 by way of example, provided that each point belonging to the pair of points to compute "dif[j]" exceeds "underLine[pq]", where q = 1 if the point belongs to "p1", otherwise q = 2.
[0243] Step9: If dif1 <= thrsh ← pnear ++;
    If nprobIV < 70 & (dif1 < fctrE1 * thrsh OR dif2 < fctrE1 * thrsh
        OR dif3 < fctrE1 * thrsh) ← nprobIV = 70;
    If nprobIV < 80 & (dif1 < fctrE2 * thrsh OR dif2 < fctrE2 * thrsh
        OR dif3 < fctrE2 * thrsh) ← nprobIV = 80;
    If nprobIV < 90 & (dif1 < fctrE3 * thrsh OR dif2 < fctrE3 * thrsh
        OR dif3 < fctrE3 * thrsh) ← nprobIV = 90;
    Else,
        If nprobII < 70 & (dif1 < fctrE4 * thrsh OR dif2 < fctrE4 * thrsh OR
            dif3 < fctrE4 * thrsh) ← nprobII = 70;
        If nprobII < 60 & (dif1 < fctrE5 * thrsh OR dif2 < fctrE5 * thrsh OR
            dif3 < fctrE5 * thrsh) ← nprobII = 60;
        If nprobII < 50 & (dif1 < fctrE6 * thrsh OR dif2 < fctrE6 * thrsh OR
            dif1 < fctrE6 * thrsh) ← nprobII = 50;
        If nprobII < 40 & (dif1 < fctrE7 * thrsh OR dif2 < fctrE7 * thrsh OR
            dif3 < fctrE7 * thrsh) ← nprobII = 40;
    Where, 0 < fctrE1 < 1, 0 < fctrE2 < 1, 0 < fctrE3 < 1 and
        1 < fctrE4 < 2, 1 < fctrE5 < 2, 1 < fctrE6 < 2, 1 < fctrE7 < 2 and
        fctrE1 > fctrE2 > fctrE3 and fctrE4 < fctrE5 < fctrE6 < fctrE7.
[0244] Step10: Repeat step9, except replace "dif1", "dif2", and "dif3" by "dif4", "dif5", and "dif6", respectively.
[0245] Step11: Repeat step9, except replace "dif1", "dif2", and "dif3" by "dif7", "dif8", and "dif9", respectively.
[0246] Step12: thrshy = baseLine[p2] + fctrF * (midLine[p2] − baseLine[p2]), where 0 < fctrF < 1.
[0247] Step13: If dif1 <= fctrG * thrsh & ystrt[p2][k2] >= thrshy & ymid[p2][k2] >= thrshy & yend[p2][k2] >= thrshy ← pnear ++;
    If dif2 <= fctrG * thrsh & ystrt[p2][k2] >= thrshy & ymid[p2][k2] >= thrshy & yend[p2][k2] >= thrshy ← pnear ++;
    If dif3 <= fctrG * thrsh & ystrt[p2][k2] >= thrshy & ymid[p2][k2] >= thrshy & yend[p2][k2] >= thrshy ← pnear ++;
    Where, 0 < fctrG < 1.
[0248] Step14: Repeat step13, except replace "dif1", "dif2", and "dif3" by "dif4", "dif5", and "dif6", respectively.
[0249] Step15: Repeat step13, except replace "dif1", "dif2", and "dif3" by "dif7", "dif8", and "dif9", respectively.

-continued

[0250] Step16: If pnear < 2 ← If pnear = 1 & nprobII < 50 ← missNnProb[a] = 50;
Else ← missNnProb[a] = nprobII;
Else ← If txbarmtch[p1] = txbarmtch[p2] = 0 & pnear = 3 ← extraNnProb[a] = 2;
Else ← extraNnProb[a] = 100 − nprobIV;
near = 1;

Note, in the process described above to compute "near", thresholds such as "fctrE", "fctrF", "fctrE2", "fctrE3", "fctrE4", "fctrE5", "fctrE6", "fctrE7", "fctrF" and "fctrG" are derived empirically.

At this stage of the handwriting recognition process, the derivation of a highly accurate depth direction is critical, as a slight deviation of a depth direction from its true value may adversely impact the accuracy of such a process, as it can later erroneously identify a logical symbol as the true logical symbol for an arcpoly. The aspect of step 9 of the process 1048 that "computes accurate depth direction", "depdirc[a][p][k]" listed in FIG. 45 as part of the assimilation process for polyline "p" and "arcpoly "k", is described below as an eight step process:

The process 1454 moves to state 1674 wherein allows states 1676-to-1688 to be repeated for all alphanumeric symbols, namely "arcnumc" derived earlier. The process 1454 then moves to the decision state 1676. If the result of the decision state 1676 is in the affirmative, the process 1454 moves to state 1678 to set "dvd[a]" to two. Otherwise, the process 1454 moves to state 1680 to set "dvd[a]" to one.

Next, the process 1454 moves to state 1682 wherein the line size features of all arcpolys belonging the alphanumeric "a" are normalized by multiplying them each by the factor,

[0252] Step1: Compute the mid-point location, "xml" and "yml" between the extreme points.
[0253] Step2: Compute "bdryEs" representing half of the total size of all lines.
[0254] Step3: Starting from the first line and proceeding incrementally, determine the line index subject to either esl1 <= bdryEs <= esl2 or esl2 > bdryEs, where "esl1" refers to the cumulative line size up to the current line index and "esl2" refers to the cumulative line size up to the next line index.
[0255] Step 4: If: esl1 <= bdryEs <= esl2 or esl2 > bdryEs:
   idx = line index + 1;
   residue = bdryEs − esl1;
If esl2 > bdryEs:
   idx = line index;
   residue = bdryEs;
[0256] Step5: residue = residue/line "idx"'s size
[0257] Step6: If: idx > 0:
1) Multiply the difference between the column aspect of the end point of line "idx − 1" and the column aspect of the end point of line "idx" by "residue" and add the result to the column aspect of the end point of line "idx − 1" and then assign the result to "xm2".
2) Multiply the difference between the row aspect of the end point of line "idx − 1" and the row aspect of the end point of line "idx" by "residue" and add it to the row aspect of the end point of line "idx − 1" and then assign the result to
If: idx <= 0:
1) Multiply the difference between the column aspect of the first point of line 0 and the column aspect of the end point of line "idx" by "residue" and add the result to the column aspect of the first point of line 0 and then assign the result to "xm2".
2) Multiply the difference between the row aspect of the first point of line 0 and the row aspect of the end point of line "idx" by "residue" and add the result to the row aspect of the first point of line 0 and then assign the result to "ym2".
[0258] Step7: Compute the high resolution direction, as described in the process 300.
[0259] Step8: Set the high resolution direction computed in Step7 to the next (nearest) even value direction and assign the result to "depdirc[a][p][k]".

FIG. 31 illustrates the overall process of state 1454 described in step 14 of the process 1048 to "normalize each arcpoly's feature values pertaining to sizes", as listed in FIG. 45. The process 1454 begins at a start state 1670 and moves to state 1672 wherein a threshold, namely "cthrsh" representing a height threshold to classify alphanumeric symbols into a class whose polyline "p" generally extend vertically up to, but not beyond "midLine[p]" and a class whose polyline "p" generally extend vertically up to "topLine[p]".

"20/(delY[a]*dvd[a])". The process 1454 moves to state 1684 to compute the extreme points' sizes for all arcpolys belonging to the alphanumeric "a" as derived earlier. Next, the process 1454 moves to state 1686 to compute depth sizes for all arcpolys belonging to the alphanumeric "a" as described earlier. The process 1682 moves to the decision 1688. If the result of the decision state 1688 is in the affirmative, the process 1454 moves to state 1674. Otherwise, the process 1454 terminates at an end state 1690.

Figure 32:
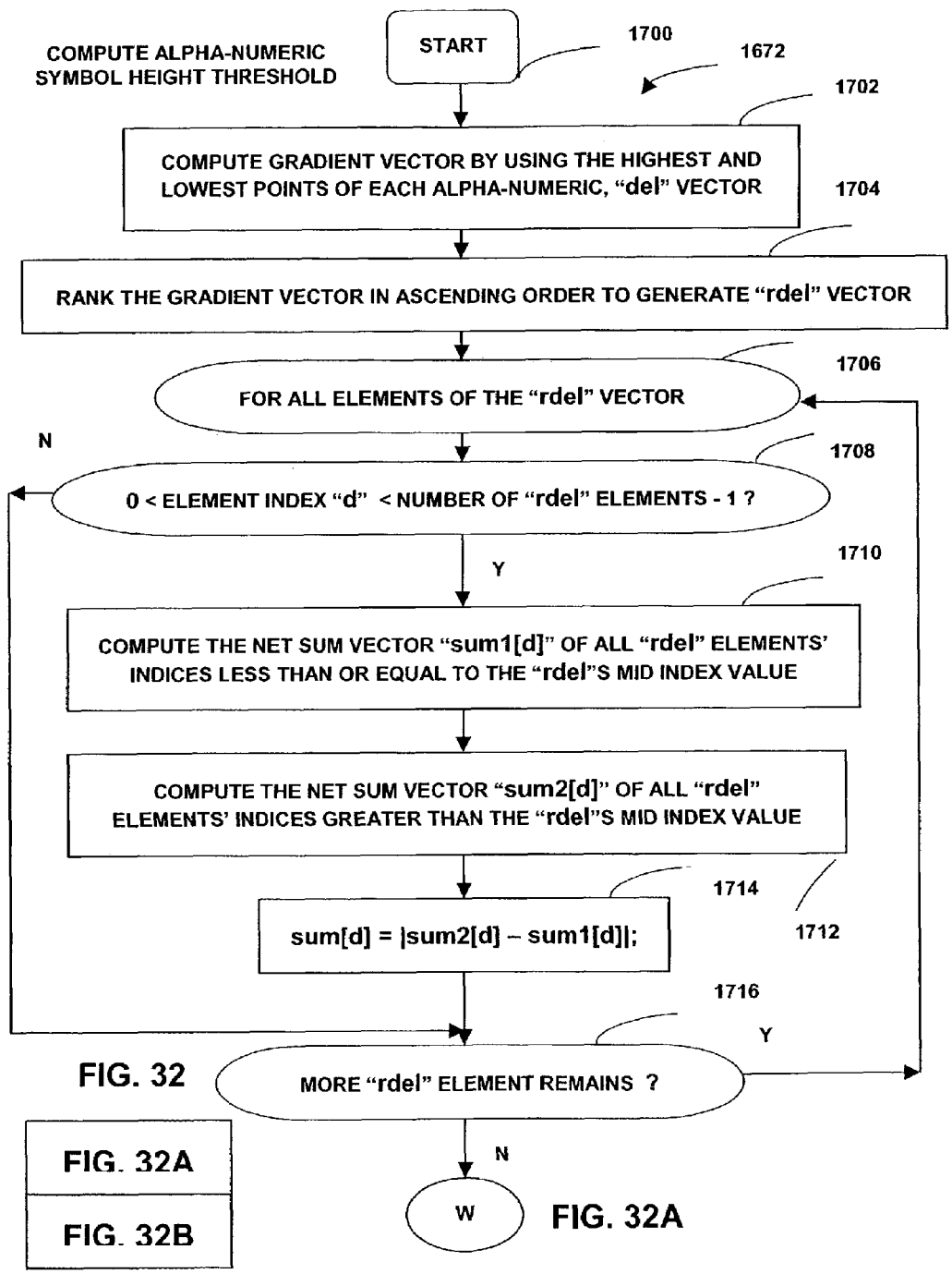
FIG. 32 is a flow diagram illustrating the computation of alphanumeric symbols' height threshold.
Figure 32B:
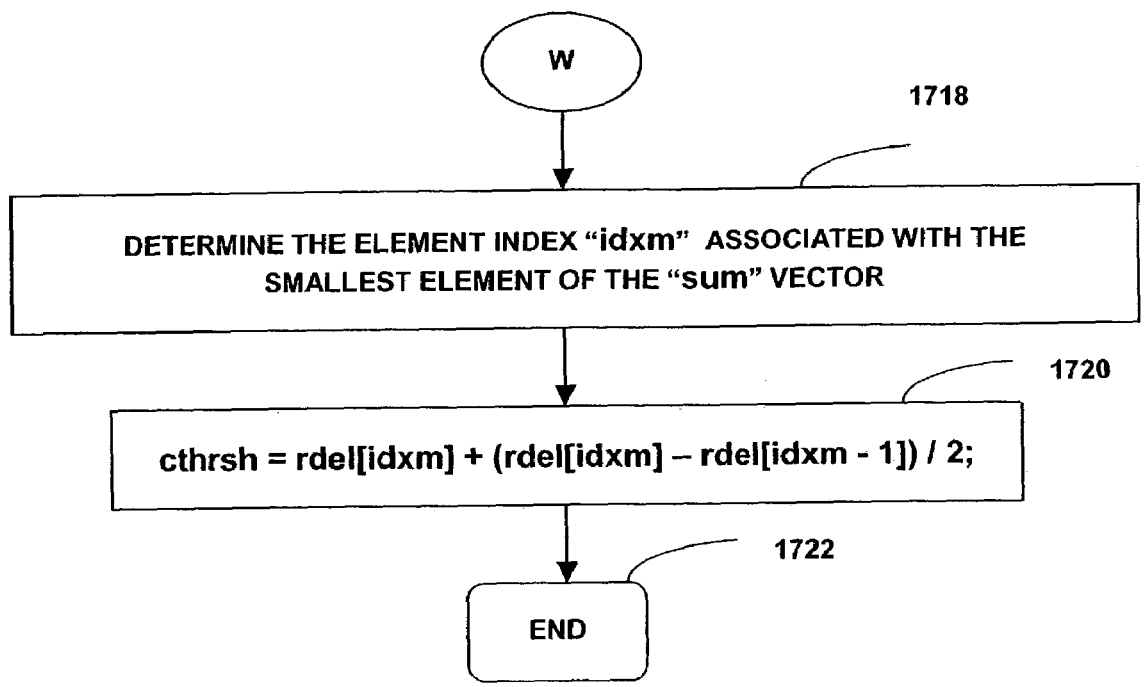

FIG. 32 illustrates the overall process of state 1672 shown in FIG. 31. The process 1672 begins at a start state 1700 and moves to state 1702 wherein the vertical distance between the highest point and lowest point of each alphanumeric "a" is assigned to "del[a]", where a=0, ..., arcnumc−1. The process 1672 moves to state 1704 to rank the elements of the "del" vector in an ascending order to generate the "rdel" vector. The process 1672 then moves to state 1706 wherein allows states 1708-to-1716 to be repeated for all elements of the "rdel" vector. The process 1672 moves to the decision state 1708. If a determination is made in the decision state 1708 that the element index, "d" of the "rdel" vector exceeds zero and is less than the number of elements of vector "rdel" minus one, then the process 1672 moves to state 1710 wherein the net sum of all values of the elements of "rdel" with indices less than or equal to the index associated with the median value of the "rdel" vector, "sum1[d]" is computed. The process 1672 moves to state 1712 wherein the net sum of all values of the elements of "rdel" with indices larger than the index associated with the median value of the "rdel" vector, "sum2[d]" is computed. Next, process 1672 moves to state 1714, wherein "sum[d]=absolute value (sum1[d]−sum2[d]). The process 1672 moves to the decision state 1716. If the results of the decision state 1708 are not in the affirmative, the process 1672 moves to the decision state 1716. If the result of the decision state 1716 is in the affirmative, the process 1672 moves to state 1706 to begin another cycle. Otherwise, the process 1672 moves to state 1718 to determine the index of the "rdel" vector element, "idxm" that generates the smallest value for the "sum" vector. Next, the process 1672 moves to state 1720 set "cthrsh=del[idxm]+(del[idxm+1]−del[idxm])/2". Finally process 1672 terminates at an end state 1722.

Figure 33B:
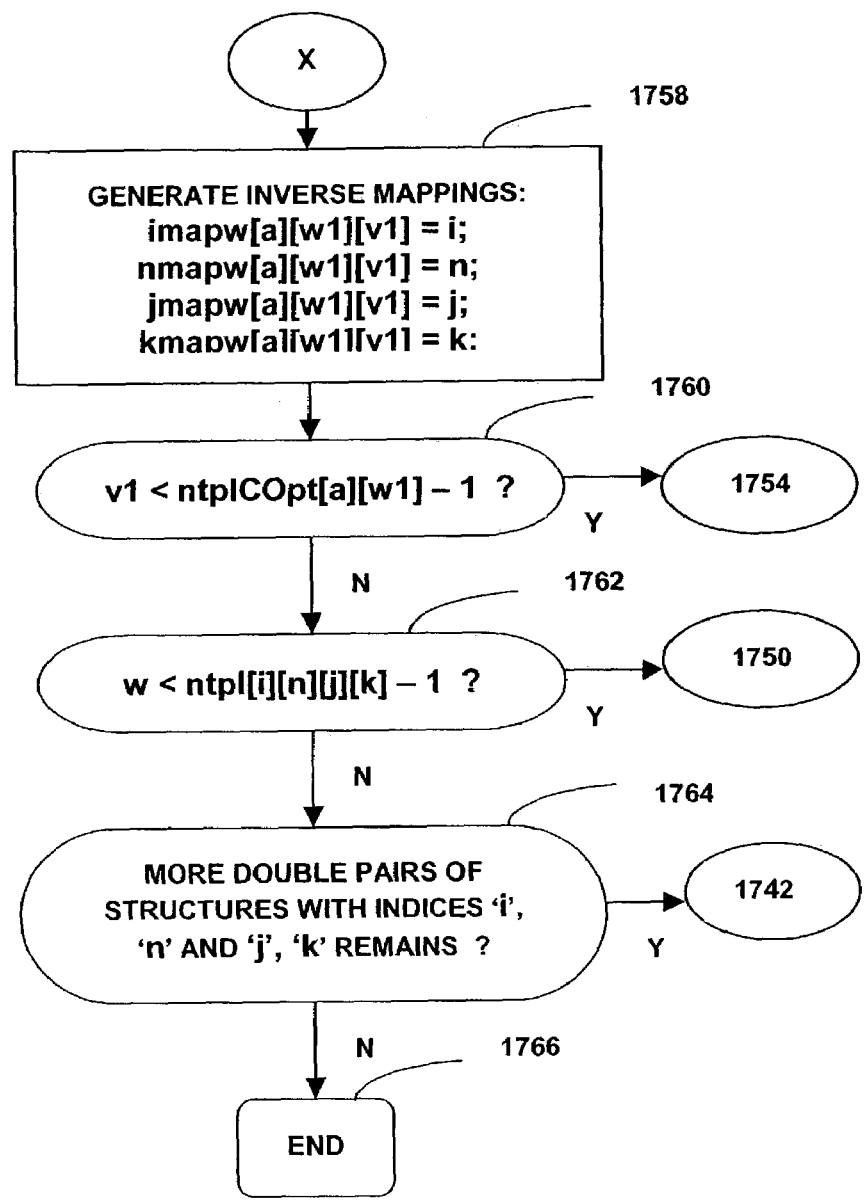
FIG. 33 is a flow diagram illustrating the determination of encoding(s) for each alphanumeric symbol.

FIG. 33 illustrates the overall process of state 1050 shown in FIG. 28. The process 1050 begins at a start state 1740 and moves to state 1742 wherein allows states 1744-to-1764 to be repeated for all double pair structures, such as polyline "i", arcpoly "n" and polyline "j", arcpoly "k". The process 1050 moves to the decision state 1744. If a determination is made in the decision state 1744 that "ntpl[i][n][j][k]" exceeds zero, the process 1050 moves to the decision state 1746. If the result of the decision state 1746 is in the affirmative, the process 1050 moves to state 1748 to compute the number of connection codes per alphanumeric "a", "ntplC[a]" from the accumulation of all "ntpl[i][n][j][k]"s subject to "i" and "j" belonging to "a". Next, the process 1050 moves to state 1750 wherein allows states 1752-to-1762 to be repeated for all "ntpl[i][n][j][k]"s and then moves to state 1752 wherein "ntplCOpt[a][w1]" is updated. Here, w1=0, ..., numw−1, where "numw" refers to the accumulation of all "ntplOpt[i][n][j][k]"s subject to "1" and "j" belonging to "a". The process 1050 moves to state 1754 wherein allows states 1756-to-1760 to be repeated for all "ntplOpt[i][n][j][k]"s and then moves to state 1758 wherein four inverse mappings from "w1", and "v1" per "a" to (i) "i", (ii) "n", (iii) "j" and (iv) "k" are generated.

Next, the process 1050 moves to the decision state 1760. If the result of the decision state 1760 is in the affirmative, the process 1050 moves to state 1754 to begin another cycle. Otherwise, the process 1050 moves to the decision state 1762. If the result of the decision state 1762 is in the affirmative, the process 1050 moves to state 1750 to begin another cycle. Otherwise, the process 1050 moves to the decision state 1764. If the results of the decision state 1764 are in the affirmative, the process 1050 moves to state 1742 to begin another cycle. Otherwise, the process 1050 terminates at an end state 1766. If the results of the decision state 1744 or the decision state 1746 are not in the affirmative, the process 1050 terminates at the end state 1766.

High-Level Semantics Part III

The final step of the three step process for the signal-to-symbol transition is presented in this section to compute logical symbols, as listed in FIG. 54. As another preferred embodiment of the invention, a set of logical- and subclass-symbols are stored in the database comprising a finite class of arcpolys, as illustrated in FIG. 1, and described as the process 3704 (except here, "invc[a]=0" and "optsubcc" and "optsubc" are set to −1). As another preferred embodiment of the invention, arcpoly(s) of alphanumeric ID are automatically classified into one or more pairs of logical- and subclass-symbols. The pair of logical- and subclass-symbols are characterized by the set of primary features described above.

Here, the parameters passed include the following: (1) "ed" as extreme points' direction, (2) "es" as extreme points' size, (3) "dd" as depth direction, (4) "ds" as depth size, (5) "x1=xstrtc[a][p][k]", "y1=ystrtc[a][p][k]", "x2=xendc[a][p][k]", and "y2=yendc[a][p][k]." Each time this process is invoked, a maximum of a single 'logical symbol option' and a pre-selected number of 'sub-class symbols options' generating one logical symbol and at most generating a few subclass symbols are computed.

This conservative approach limits the number of database alphanumeric symbols produced later during the handwriting recognition process, thus minimizing the occurrence of erroneously identified alphanumeric symbols. When at a later stage of the handwriting recognition process, a suitable database alphanumeric symbol is not identified then this process (process 3704A) may be invoked again, until the desired result is achieved. This process employs the first phase of the symbolic reshaping scheme, as another preferred embodiment of the invention. The variables computed during the process 3704A (see FIG. 54) for each alphanumeric "a", polyline "p" and arcpoly "k" are the following: (i) logical symbols, (ii) sub-class symbols and (iii) primary relational features, as listed in the Steps below, as they include (but not limited to) variables with the indices, "[a][p][k]". Note that "rota" shown below represents the additive bi-polar auxiliary rotation ranging between 0-to-4 units, described earlier. As another preferred embodiment of the invention, primary relational features are computed from the alphanumeric ID's feature set per arcpoly.

The process 3704A is described below using a detailed 26 step process that includes the following major steps: compute (i) logical symbol, shown below as "subcc[a][p][k][optsubcc]" from extreme points' size and in certain situations from depth size per 'logical symbol option,' shown below as "numSubClassOpt[a][p][k]" or equivalently "optsubcc," (ii) sub-class symbol per 'sub-class symbols option' shown below as "numSCopt[a][p][k]" or equivalently "optsubc," (iii) arcpoly structural variance cost value, and (iv) 'logical symbol and sub-class symbol(s) options' discard criteria:

[0269] Step1: Initialize a subset of variables for the final step of the signal-to symbol transition.
[0270] Step2: optsubcc = strtsubcc = numSubClassOpt[a][p][k] − 1;
optsubc = strtsubc = numSCopt[a][p][k] − 1;
optsubcc ++;
[0271] Step3: dd8 = dd;
If lineCntc[a][p][k] > 1 ← Compute "dd" using the aspect of step 9 of the process 1048 described earlier that "computes accurate depth direction".
[0272] Step4: If dd = dd8 ← samedir = 1;
If motion_cw[a][p][k] = 1 ← ed = (dd + 4)$_{Modular\ 16}$;
Else ← ed = (dd − 4)$_{Modular\ 16}$;
Else ← samedir = 0;
[0273] Step5: dd += rota$_{Modulalr\ 16}$;
ed += rota$_{Modular\ 16}$;
[0274] Step6: If samedir = 1 & ds <= thrsh_lineArc:
Compute "dirplus" using the process 300 to compute high resolution direction.
If ds > 0 & 'dd' is odd ← If dirplus = 1 ← dd ++$_{Modular\ 16}$;
If dirplus = −1 ← dd −−$_{Modular\ 16}$;
If 'ed' is odd ← If dirplus >= 0 ← ed ++$_{Modular\ 16}$;
Else ← ed −−$_{Modular\ 16}$;
scc_dirPlus = 1;
[0275] Step7: Compute number of unit rotations, "rt" from the values of "ed", "edi", "rota" and "dirplus".
[0276] Step8: see_e = es − 10;
scc_d = ds − 10;
scc_x = ext;
min = 10000;
scc_rotVL[a][p][k][optsubcc] = 2 * xsize * Sin (gama/2); (see FIG. 56)
Where, xsize = es;
gama = (rt * (360/16))/57.2957795;
[0277] Step9: Compute "scclass":
If ds <= thrsh lineArc:
If ed = 2 or 10 ← scclass = 9;
If ed = 4 or 12 ← scclass = 10;
If ed = 6 or 14 ← scclass = 11;
If ed = 8 or 16 ← scclass = 12;
line = 1;
sec_dptSizeVL[a][p][k][optsubcc] = ds;
Else:
scclass = dd/2;
line = 0;
scc_dptSizeVL[a][p][k][optsubcc] = scc_d;
subcc[a][p][k][optsubcc] = scclass;
[0278] Step10: If scc_rotVL[a][p][k][optsubcc] > 0 ← rotaP[a][p][k]optsubcc] = 1;
Else ← rotaP[a][p][k][optsubcc] = 0;
[0279] Step11: For j = 0, . . ., numSubc[scclass] − 1:
[0280] Step12: If line = 1 ← del_d[j] = scc_dptSizeVL[a][p][k][optsubcc];
Else ← If ds > 20 & sc_d[scclass][j] = 10 ← del_d[j] = 10;
Else ← del_d[j] = scc_d − sc_$_{1\ d[scclass][j]}$;
[0281] Step13: del_e[j] = scc_e − sc_e[scclass][j];
[0282] Step14: If scc_x = sc_x[scclass][j] ← del_x[j] = 0;
Else ← del_x[j] = 5;
If scc_x = 0 & sc_x[scclass][j] = 4 OR scc_x = 4 & sc_x[scclass][j] = 0:
del_x[j] = 10;
[0283] Step15: dpthP[j] = eP[j] = 1;
If del_e[j] < 0 ← del._3e[j] *= −1;
eP[j] = 0;
If del_d[j] < 0 ← del_d[j] *= −1;
dpthP[j] = 0;
del_d[j] *= 2;
[0284] Step16: If del_e[j] − ExDelE <= Irgvar_e OR del_d[j] − ExDelD <= Irgvar_d OR
del_x[j] − ExDelX <= Irgvar_x ← ndelta[j] = delta[j] = del_e[j] + del_d[j] + del_x[j];
Else ← ndelta[j] = delta[j] = 1000;
[0285] Step17: If min > delta[j] ← idx1 = j;
min = delta[j];
[0286] Step18: If j < numSubc[scclass] − 1 ← move to step 11, otherwise move to step 19.
[0287] Step19: Repeat a process similar to steps 11, 17, and 18 to derive "idx2" representing the second smallest element of the "delta" vector.

```
[0288]   Step20:   optsubc ++;
                   delE[a][p][k][optsubc] = del_e[idx1];
                   delD[a][p][k][optsubc] = del_d[idx1];
                   delX[a][p][k][optsubc] = del_x[idx1];
                   subc[a][p][k][optsubc] = indx1[a][p][k][optsubc] = idx1;
                   endptP[a][p][k][optsubc] = eP[idx1];
                   depthP[a][p][k][optsubc] = dpthP[idx1];
                   If del_d[idx1] – ExDelD > 10 ← delD[a][p][k][optsubc] += delDPlus;
                   Where, "delDPlus" is derived empirically.
[0289]   Step21:   optsubc ++;
                   delE[a][p][k][optsubc] = del_e[idx2];
                   delD[a][p][k][optsubc] = del_d[idx2];
                   delX[a][p][k][optsubc] = del_x[idx2];
                   subc[a][p][k][optsubc] = indx2[a][p][k][optsubc] = idx2;
                   endptP[a][p][k][optsubc] = eP[idx2];
                   depthP[a][p][k][optsubc] = dpthP[idx2];
                   If del_d[idx2] – ExDelD > 10 ← delD[a][p][k][optsubc] += delDPlus;
[0290]   Step22:   sc_VL[a][p][k][optsubc – 1] = ndelta[idx1];
                   sc_VL[a][p][k][optsubc] = ndelta[idx2];
                   If del_d[idx1] – ExDelD > 10 ← sc_VL[a][p][k][optsubc – 1] +=
                              delDPlus;
                   If del_d[idx2] – ExDelD > 10 ← sc_VL[a][p][k][optsubc] += delDPlus;
[0291]   Step23:   useless = 0;
                   If sc_VL[a][p][k][optsubc – 1] > 1000 & sc_VL[a][p][k][optsubc] >=
                              1000:
                      optsubcc --;
                      optsubc -= 2;
                      useless = 1;
[0292]   Step24:   If useless = 0 ← Compute the following variables
representing the number of remaining sub-class symbols per "scclass" and each of the
remaining sub-class symbols (per "scclass"):
                   "numOsubcs[a][p][k][scclass]"
                   "othrSubcs[a][p][k][scclass][numOsubes[a][p][k][scclass] – 1]"
[0293]   Step25:   Equivalently, if invc[a] = 1 ← Compute:
                   "osnum[a][p][k][scclass]"
                   "othrSC2[a][p][k][scclass][osnum[a][p][k][scclass] – 1]"
[0294]   Step26:   numSubClassOpt[a][p][k] = optsubcc + 1;
                   numSCopt[a][p][k] = optsubc + 1;
```

As another preferred embodiment of the invention, the process 3704A devised a set of variances comprising a set of arcpoly variance types, a set of counterpart dissimilarity values and a dissimilarity value per pair of arcpolys' relative location. Here, variances and dissimilarities stored in the database are structural and topological multi-type variances and counterpart dissimilarity values comprising: (a) unit change extreme points' size, (b) unit change depth size, (c) extra image structure size, (d) missing stored symbol size, (e) unit change single extreme point position, (f) unit change single extreme point extension, and (g) unit rotation.

The process 3704A solely at this stage of the overall process to recognize alphanumeric symbols has initially set "level[a][p][k]" to zero, thus it is invoked twice, once for passing "thrsh_lineArc" as zero and second as 1000, thus allowing both line and arc representations, and in both cases "rota=0".

Candidates and Validation

As described in the preceding Sections, every polyline "p" and arcpoly "k" belonging to alphanumeric "a" generates "numSubClassOpt[a][p][k]" logical symbols and "numSCopt[a][p][k]" sub-class symbols. As another preferred embodiment of the invention, the first of the series of elimination of candidate alphanumeric symbols comprises discarding those symbols which do not match the structural and/or toplgical features of the alphanumeric ID.

According to the preferred embodiment of this invention, the current knowledge-based system for handwriting recognition contains in its database a set of links from each pair of logical symbols and sub-class symbols to their superset candidate alphanumeric symbol(s) (see FIG. 58). Thus, according to the preferred embodiment of the invention, for each of the polyline "p" and arcpoly "k", a set of reduced list of alphanumeric symbols may be generated by undergoing multiple series of elimination of candidate alphanumeric symbols.

Moreover, the reduce list of candidate alphanumeric symbols is computed based on the symbolic representation of the alphanumeric ID. It is the premis of evidence-based strategy that the alphanumeric symbol(s) that emerge(s) repeatedly (or commonly) for every polyline "p" and arcpoly "k" is (are) more likely to contain the correct alphanumeric symbol than symbols that are not members of this list (see FIG. 43).

In addition, according to the preferred embodiment of this invention, the current knowledge-based system for handwriting recognition contains in its database a set of links from each encoding and separation pertaining to relationships to their superset alphanumeric candidate symbols (see FIG. 58). Thus, for each "q1", where q1=0, ... ntplCOpt [a][q]–1 another set of alphanumeric symbols are produced for each connection code, "q" where q=0, ..., ntplC[a]–1 (see FIG. 44).

It is the premis of evidence-based strategy that the alphanumeric symbol(s) that emerge(s) repeatedly (or commonly) for every "q" is (are) more likely to contain the correct alphanumeric symbol than those that did not. By combining these two lists (or cross-referencing) to establish the alphanumeric symbols which emerge in both lists, a shorter list of alphanumeric candidate symbol(s) can be generated as viable alphanumeric symbol(s), whereby the list is more likely to contain the correct alphanumeric symbol than symbols that are not a member of this list. In some cases, for either of the above invocations, or the combined invocation, there may be no alphanumeric candidate symbol generated.

Due to intrinsic and extrinsic variations, the encodings do not always reliably invoke the correct alphanumeric symbol. Consequently, the determination of the alphanumeric candidate symbols at times, may exclude the list of alphanumeric candidate symbols generated by encodings, when the parameter "tplInvctn" is passed as a one, otherwise, when "tplInvctn" is passed as a zero, this list will be included to generate the alphanumeric candidate symbols. For every alphanumeric "a", initially "tplInvctn" is set to one, and in later attempts when validation fails "tplInvctn" is set to zero to broaden the scope of alphanumeric candidate symbols detection.

Figure 43:
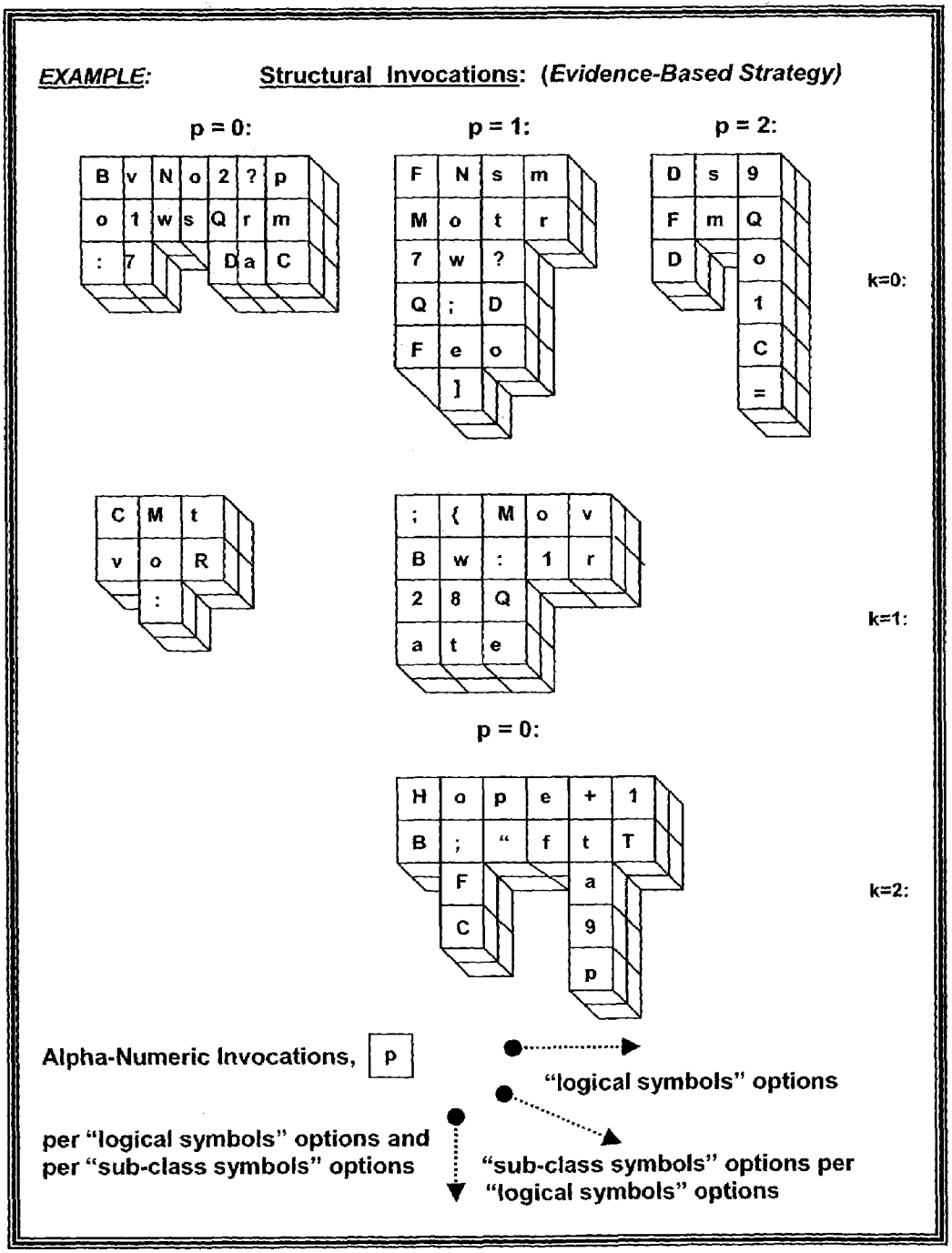
FIG. 43 is a diagram illustrating structural invocations by way of example.
Figure 59A:
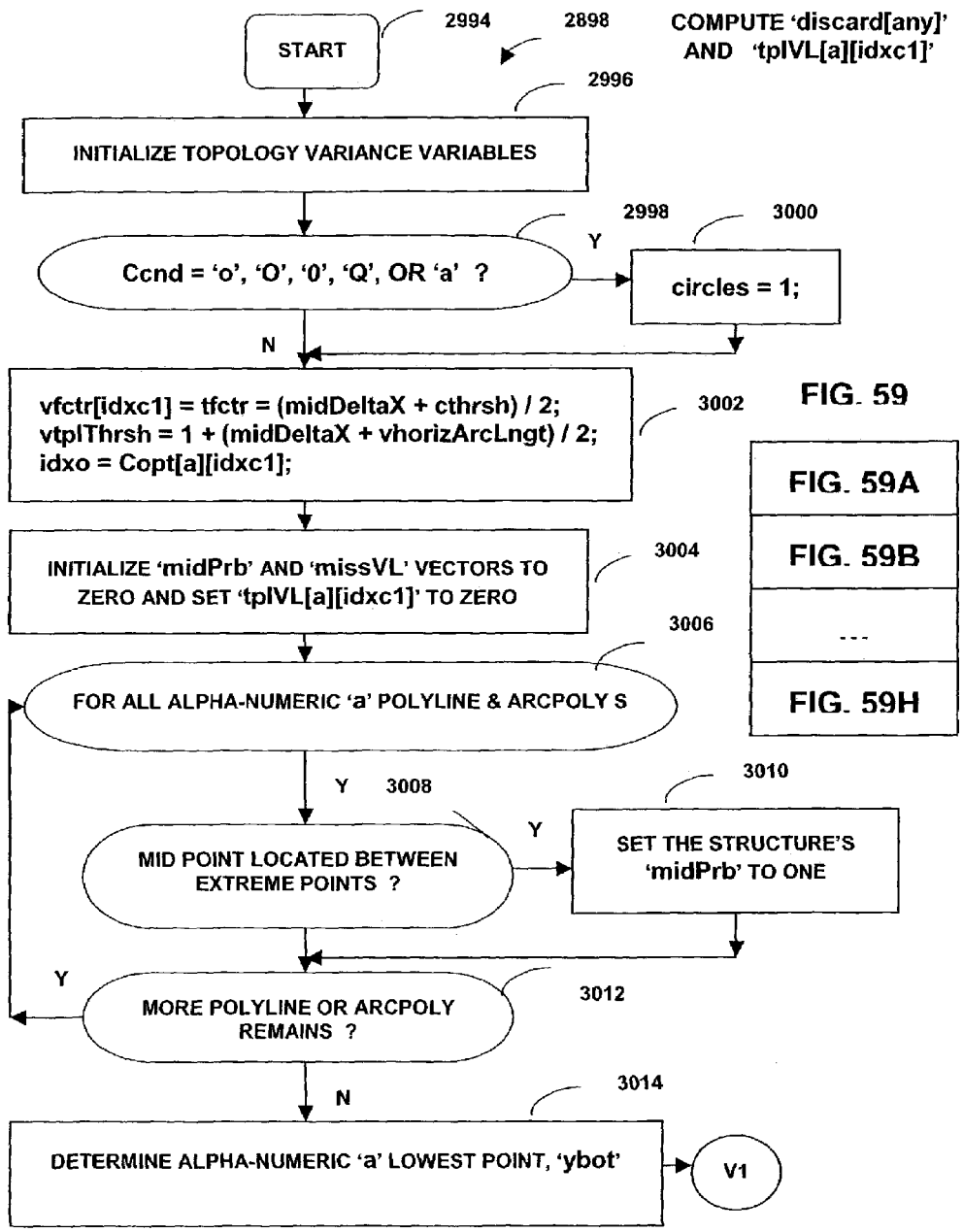
FIG. 59 is a flow diagram illustrating the computation of "discard[any]" and "tplVL[a][idxc1]."
Figure 59B:
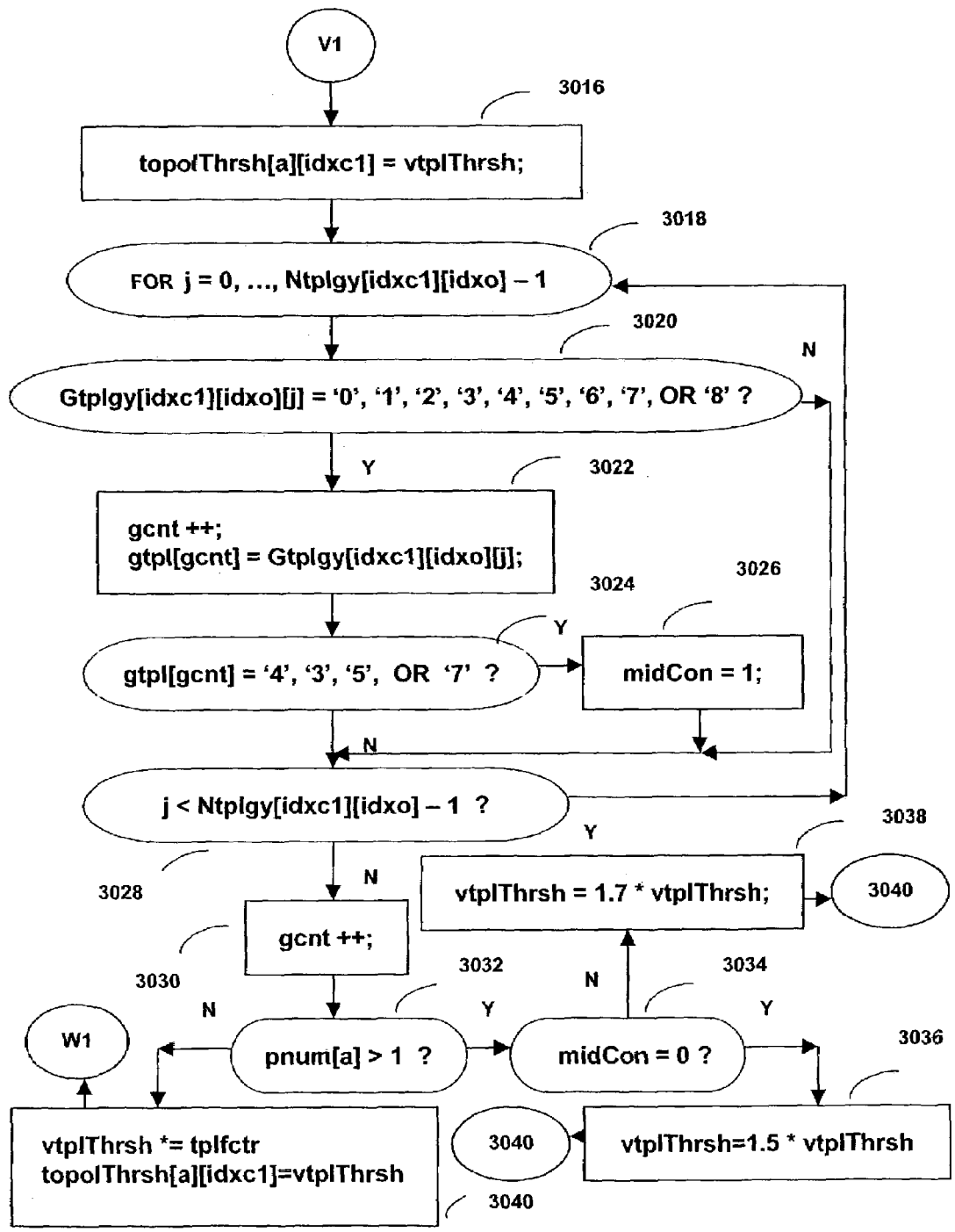
Figure 59C:
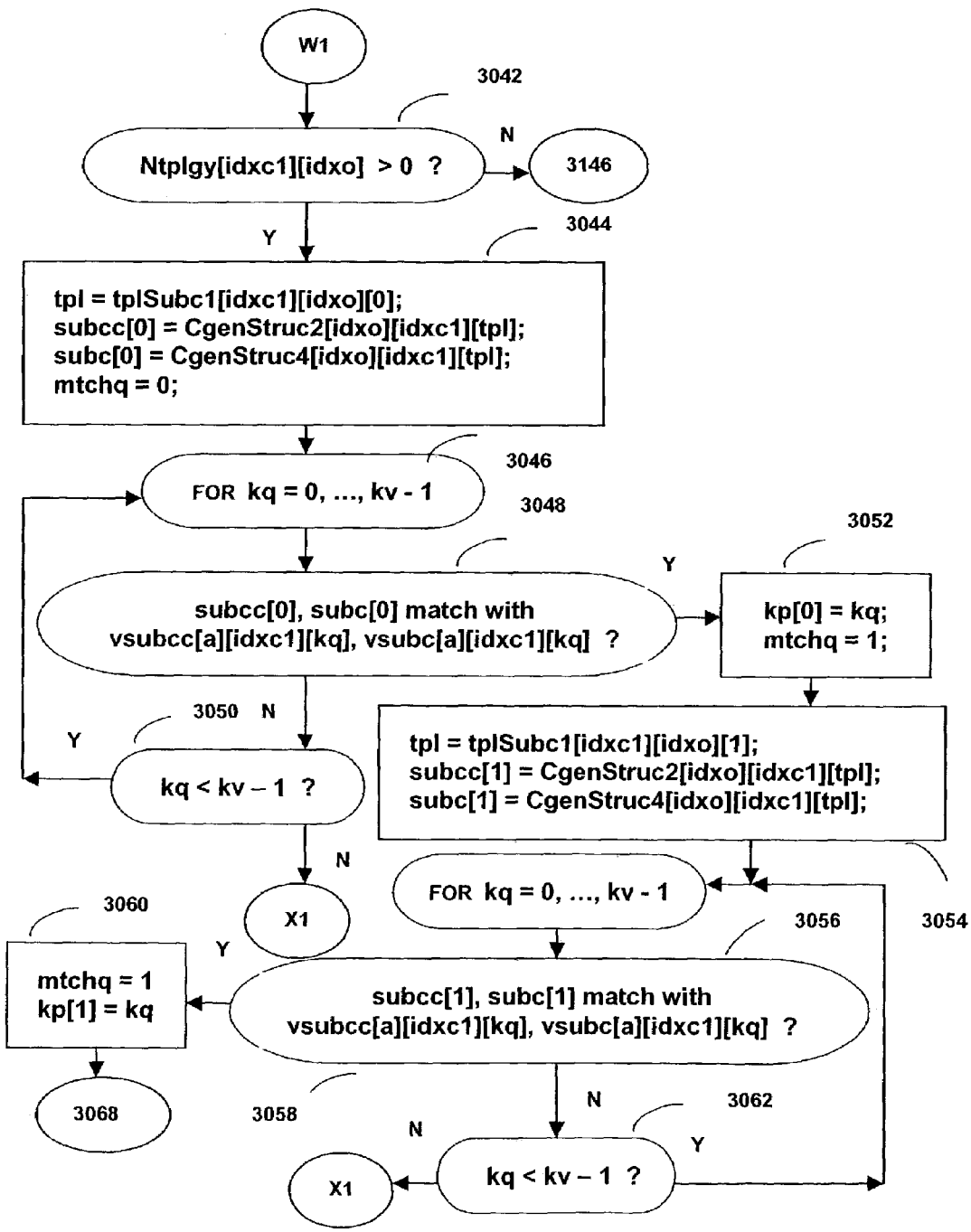
Figure 59D:
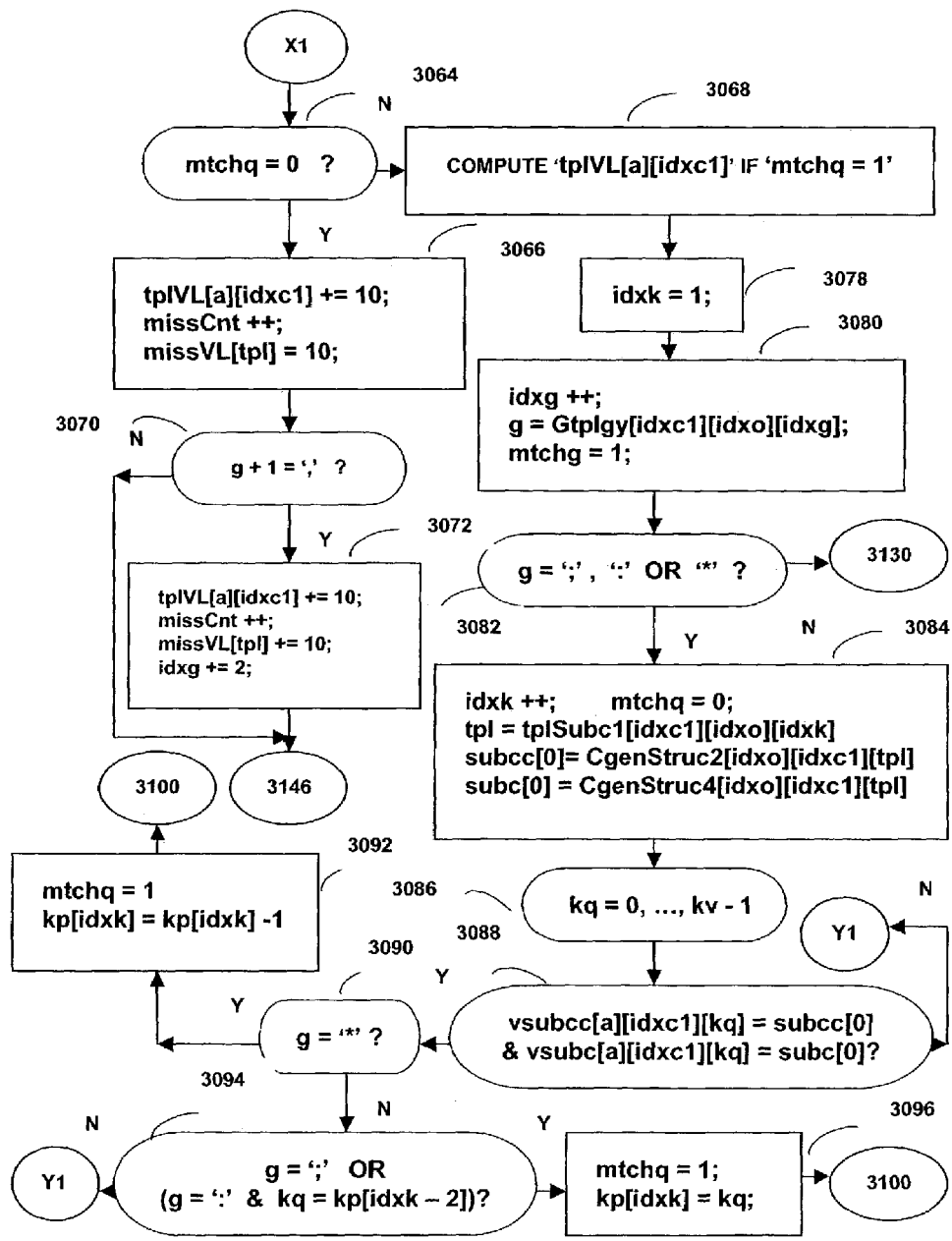
Figure 59E:
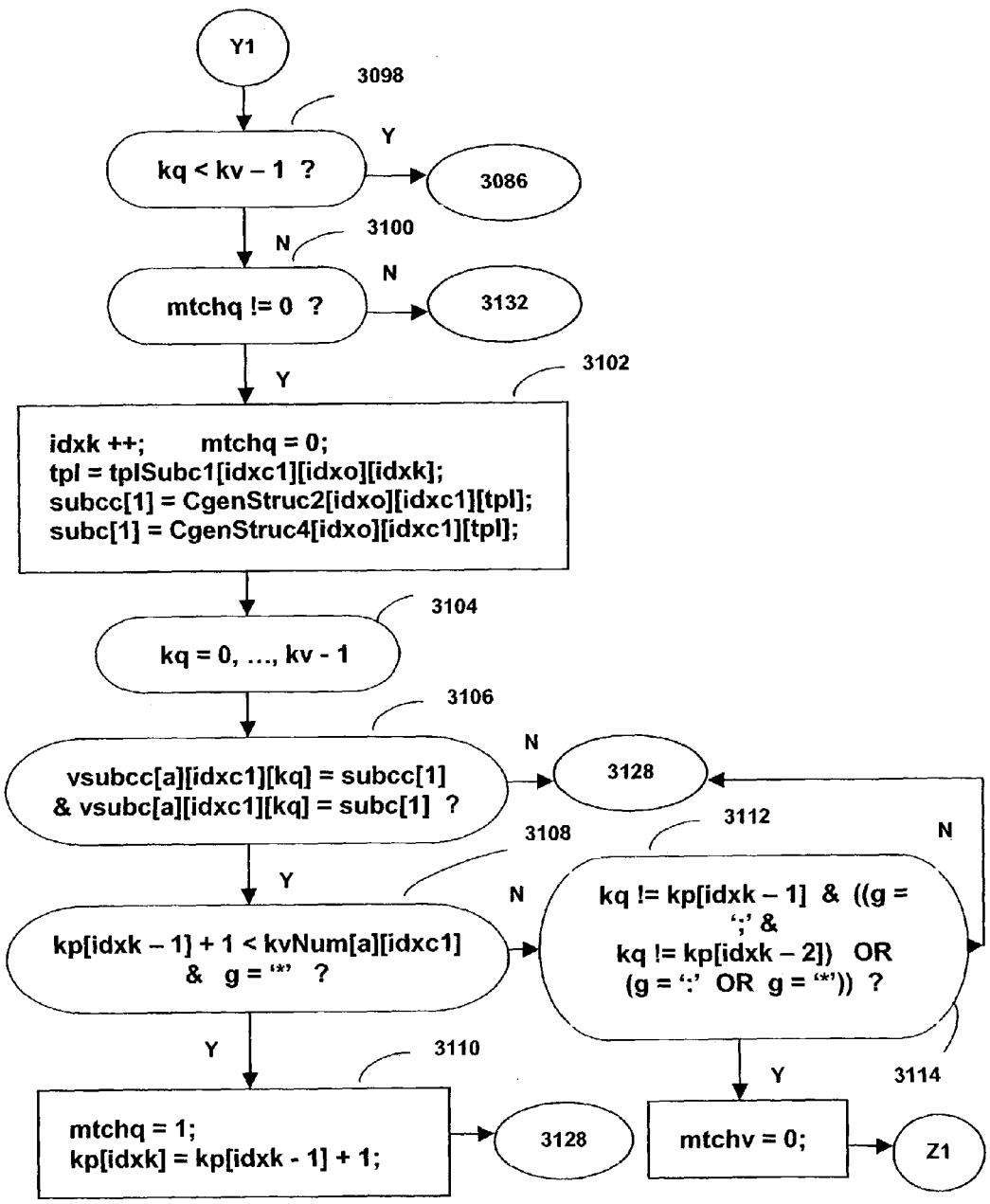
Figure 59F:
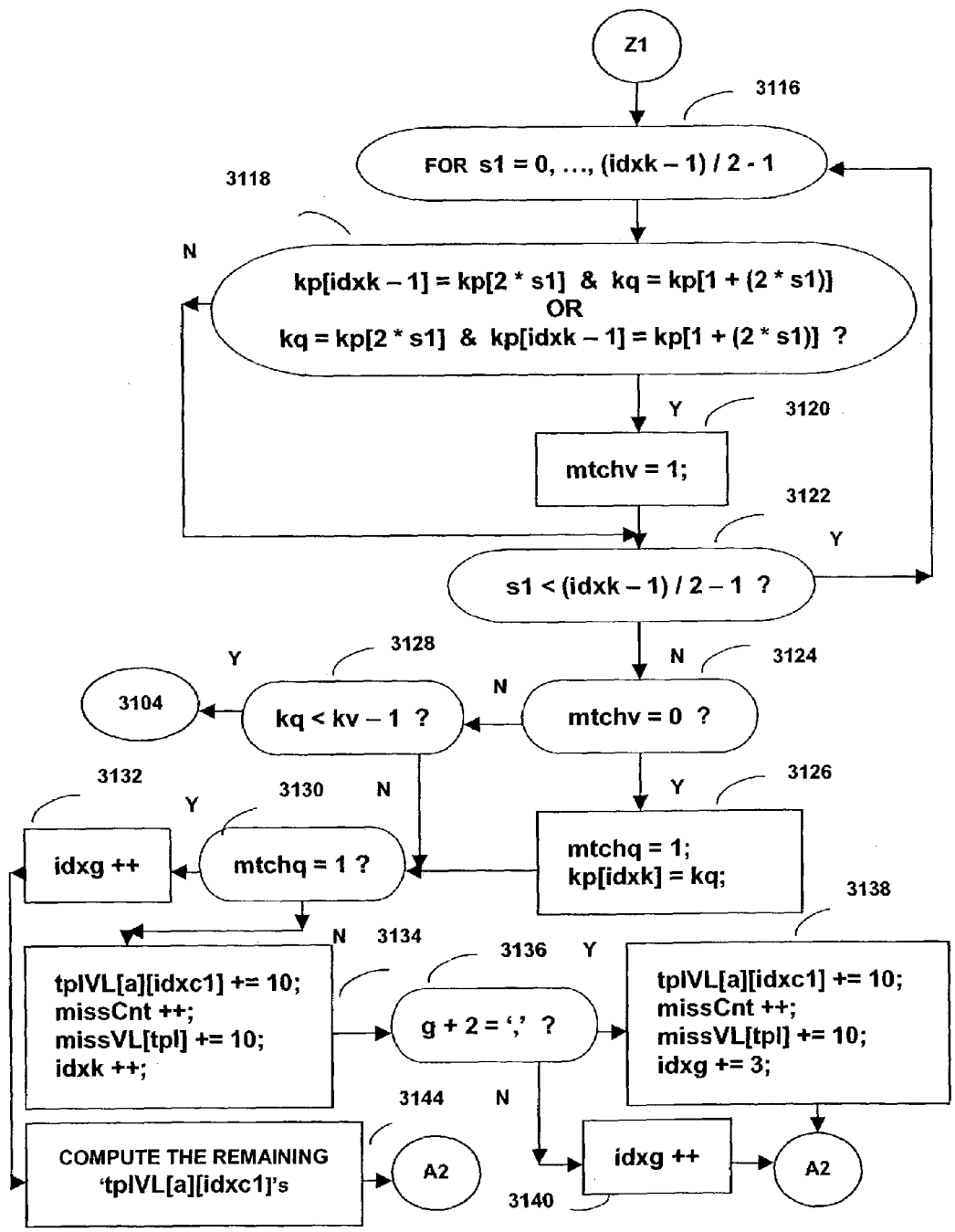
Figure 59G:
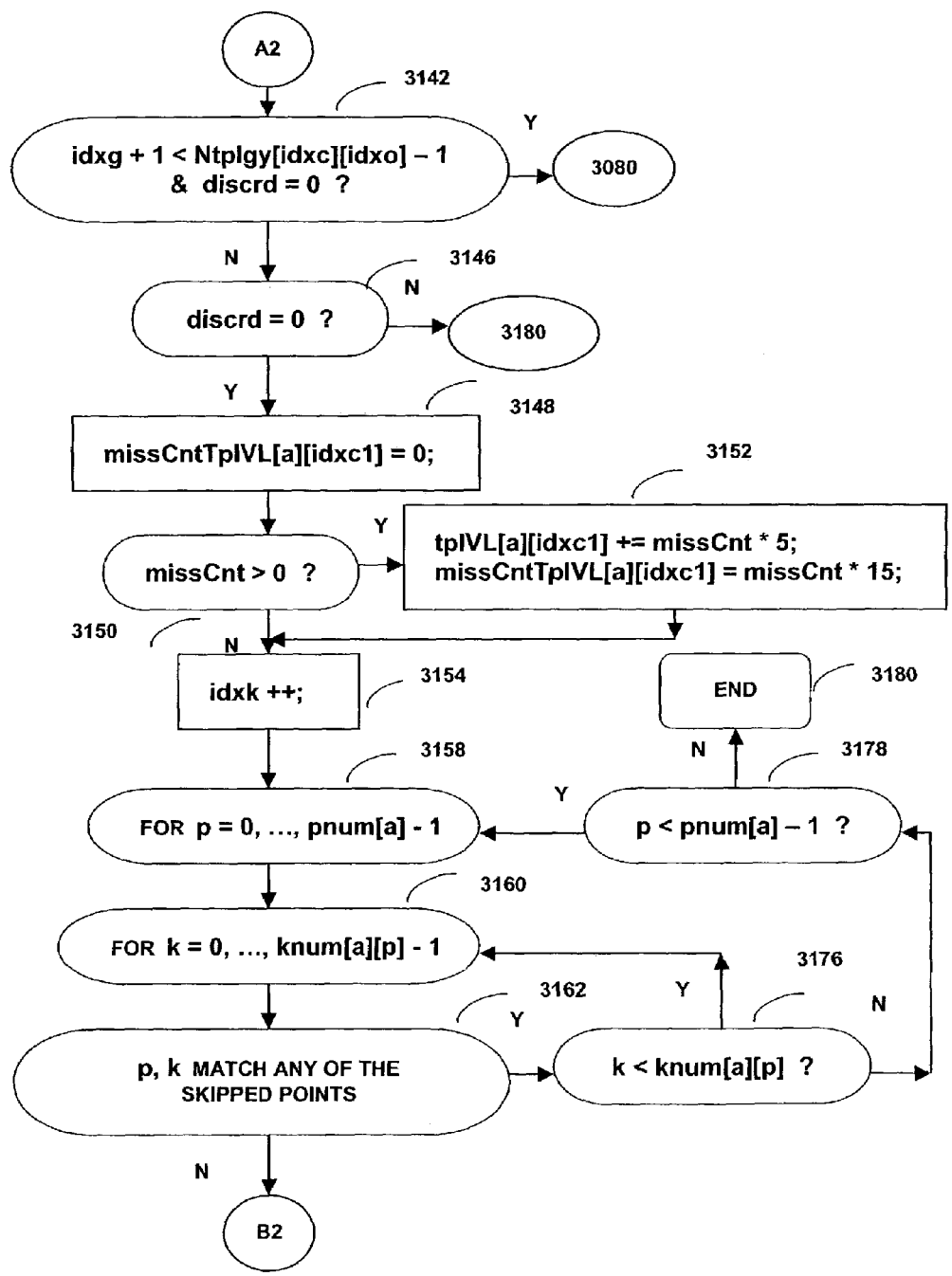
Figure 59H:
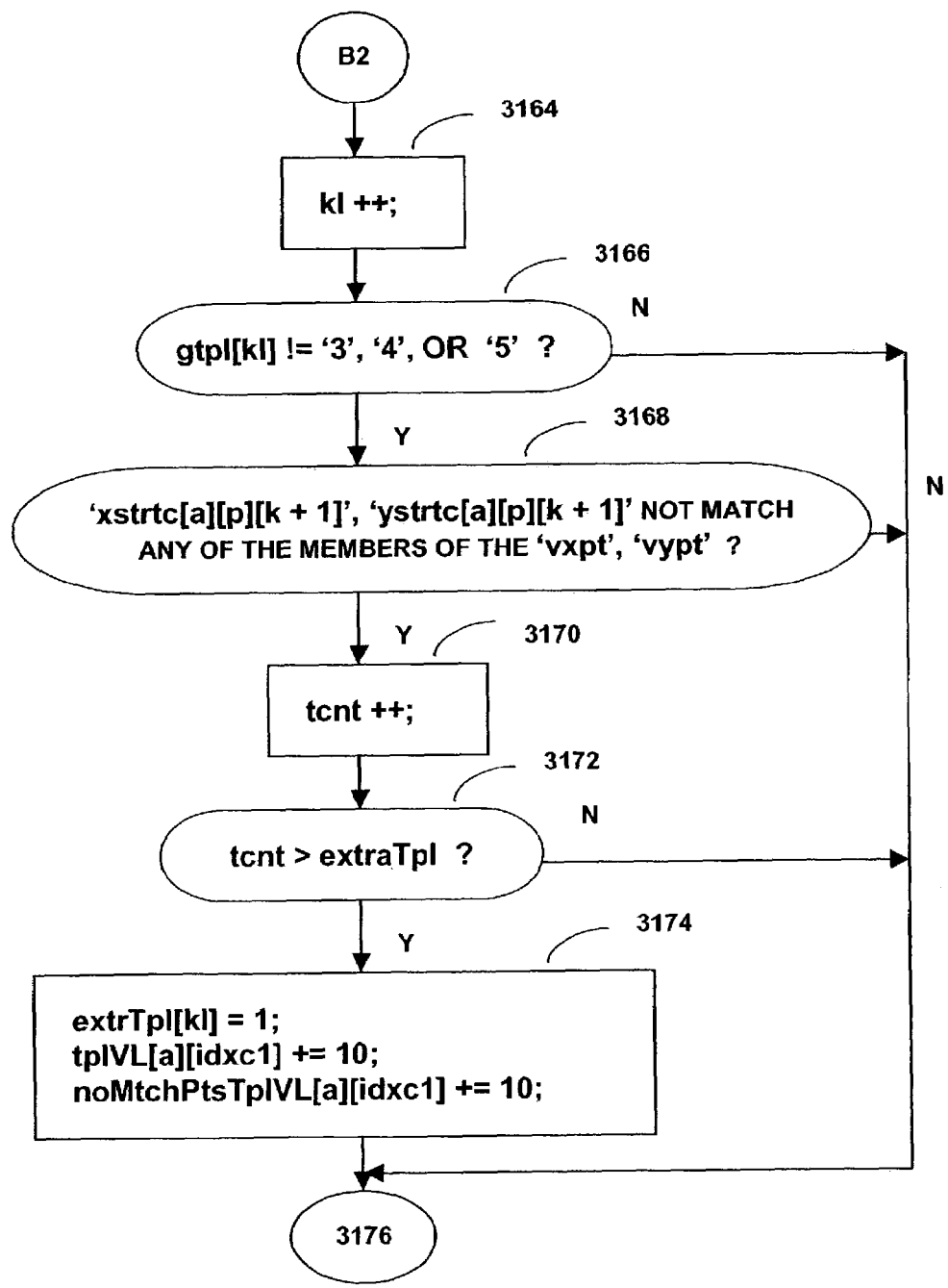
Figure 60A:
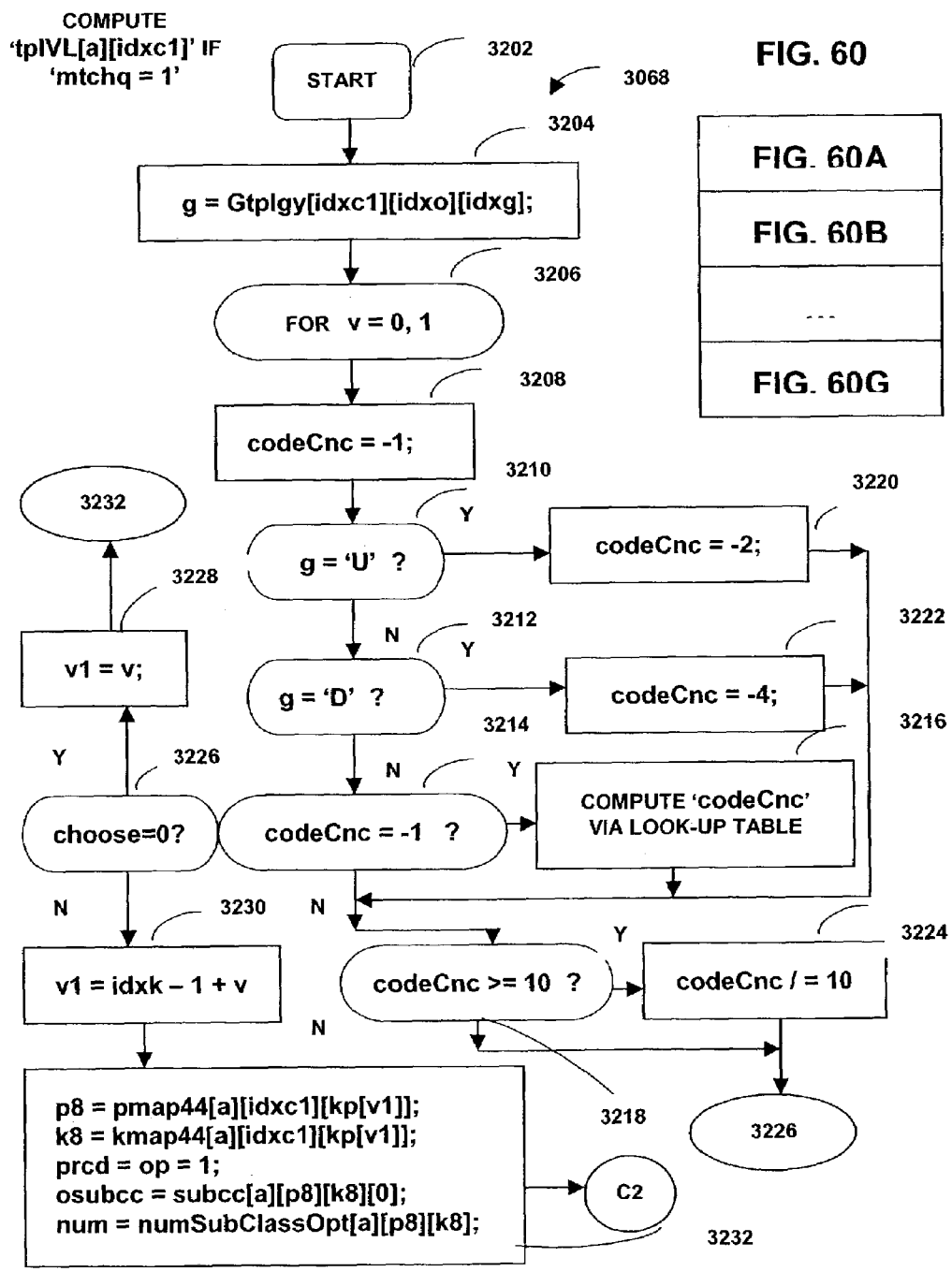
FIG. 60 is a flow diagram illustrating the computation of "tplVL[a][idxc1]" provided that "mtchq" has a value of one.
Figure 60B:
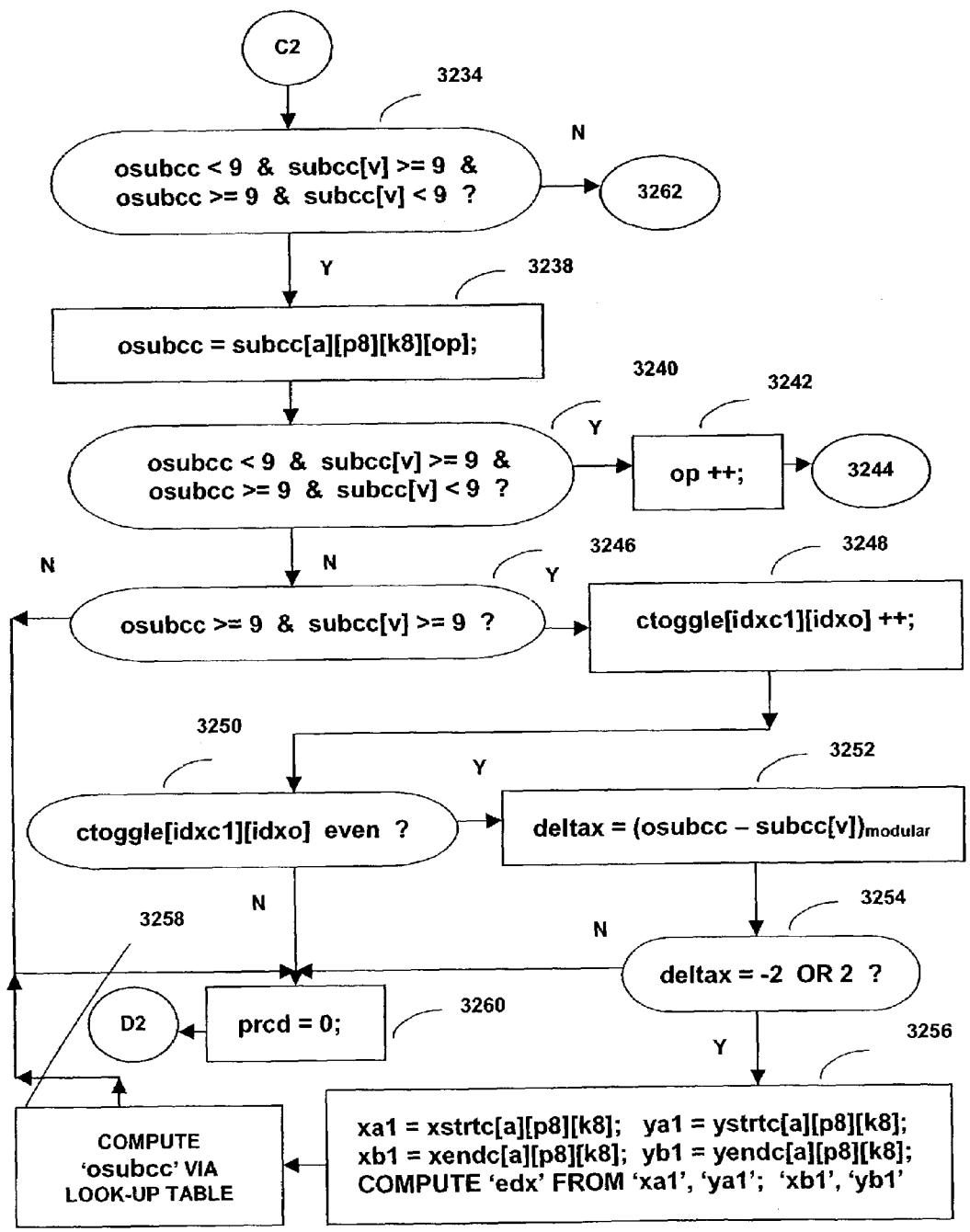
Figure 60C:
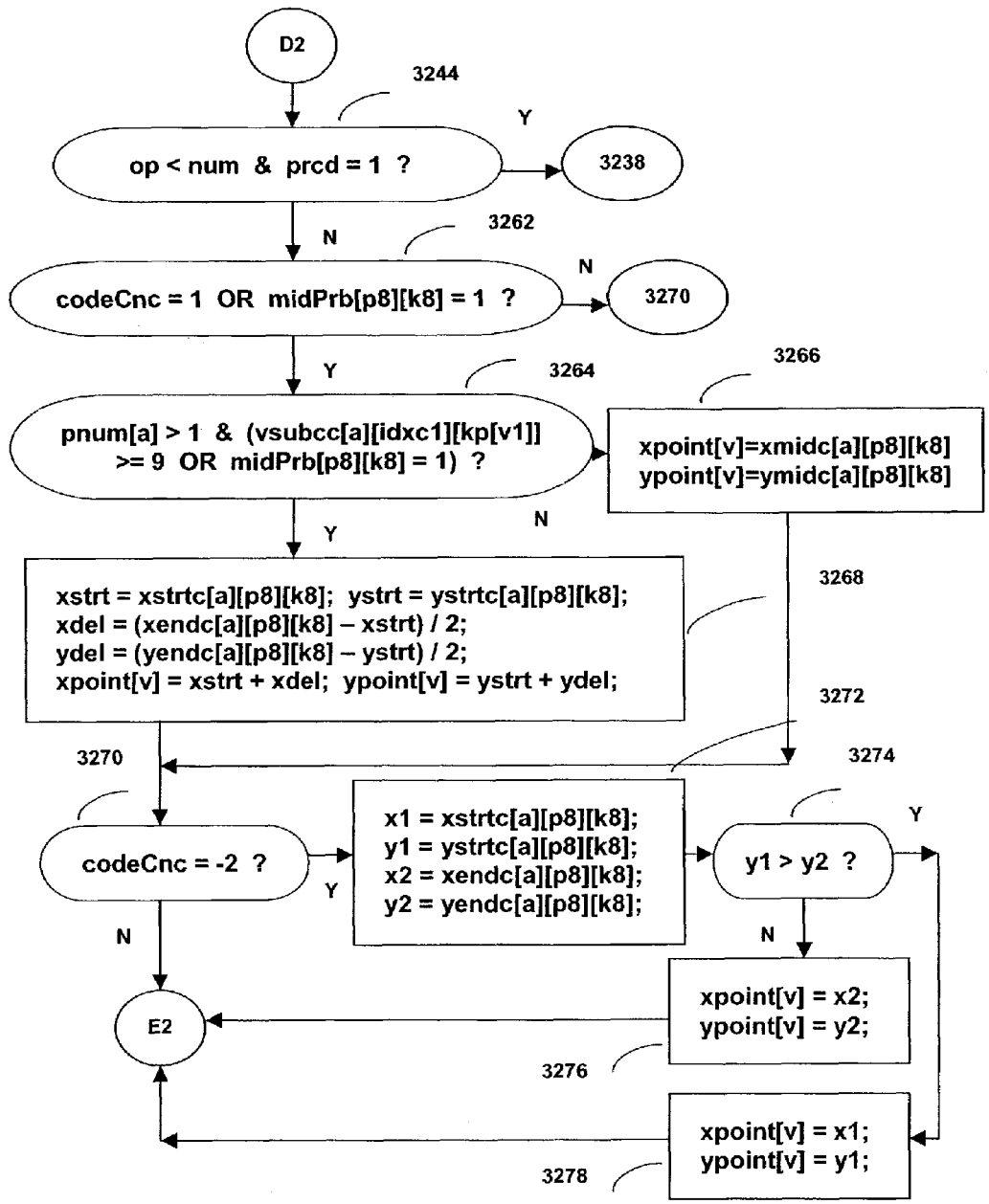
Figure 60D:
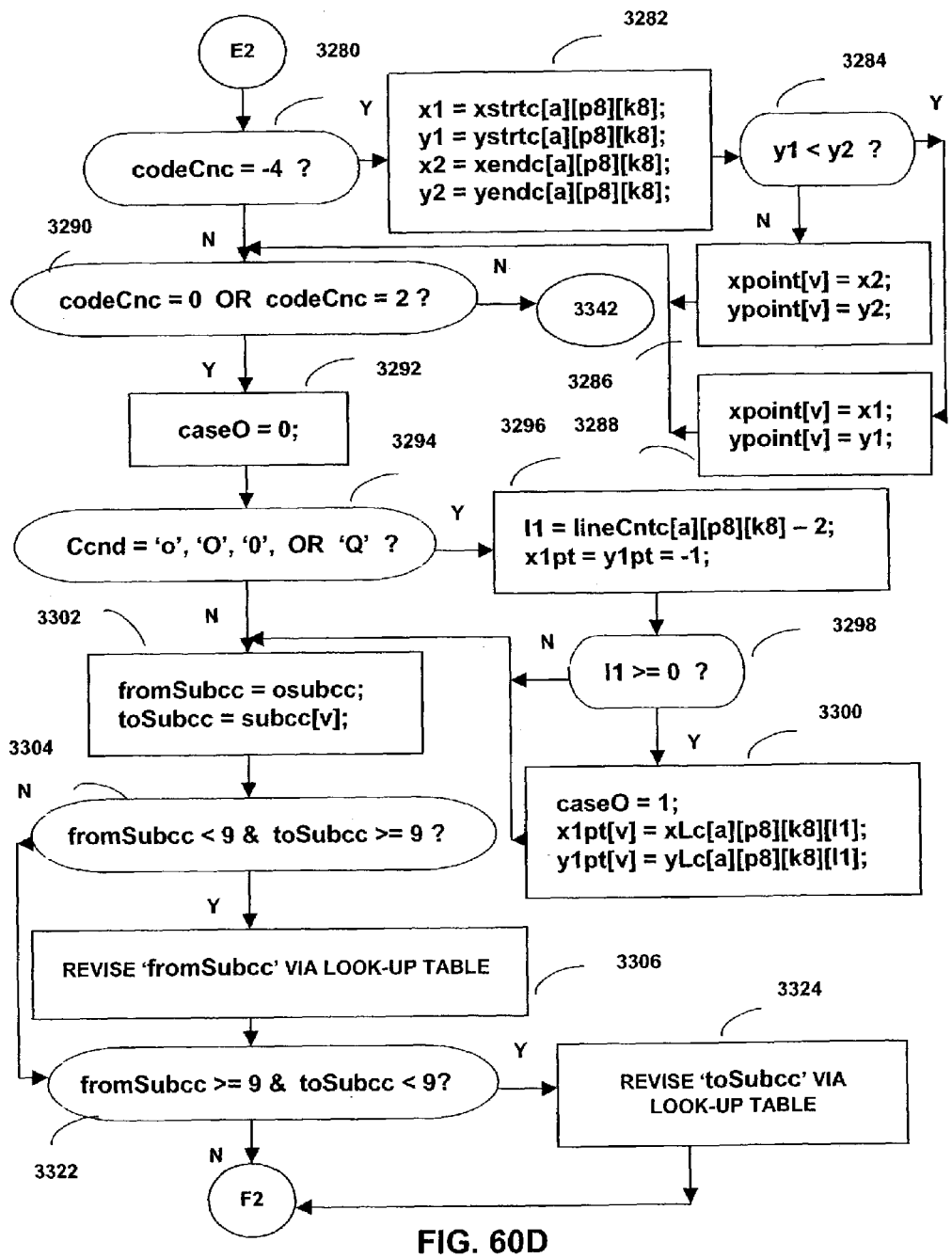
Figure 60E:
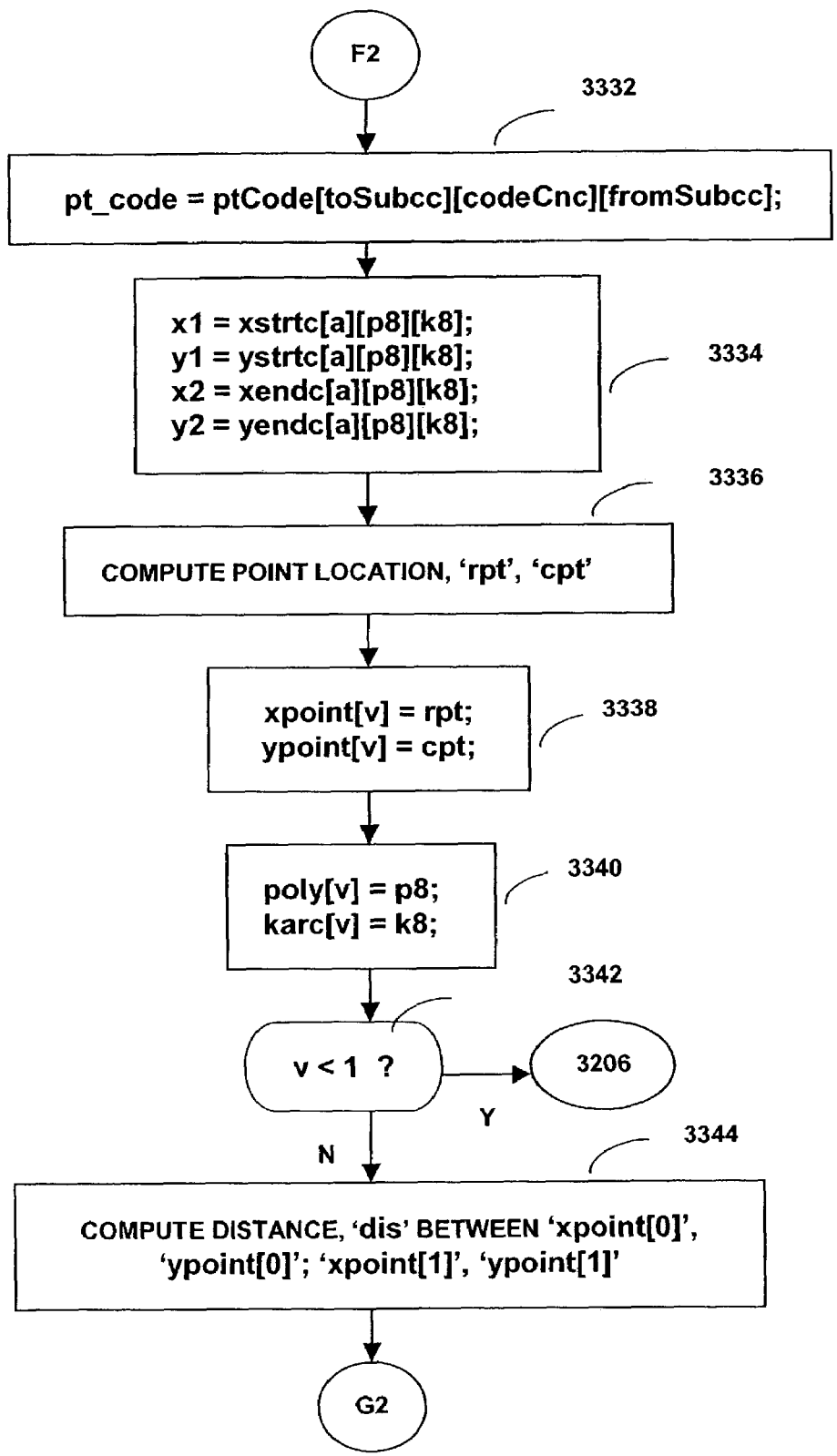
Figure 60F:
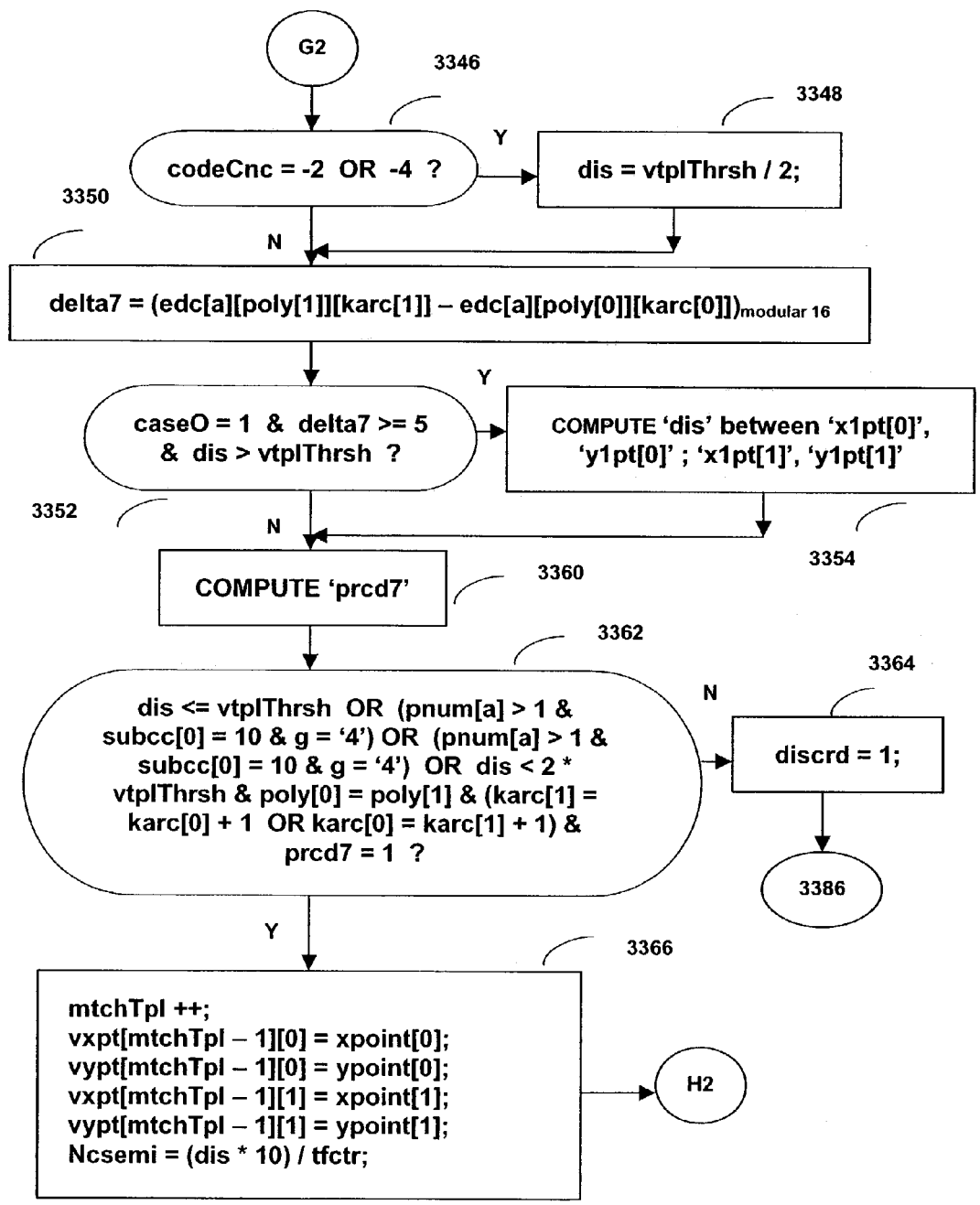
Figure 60G:
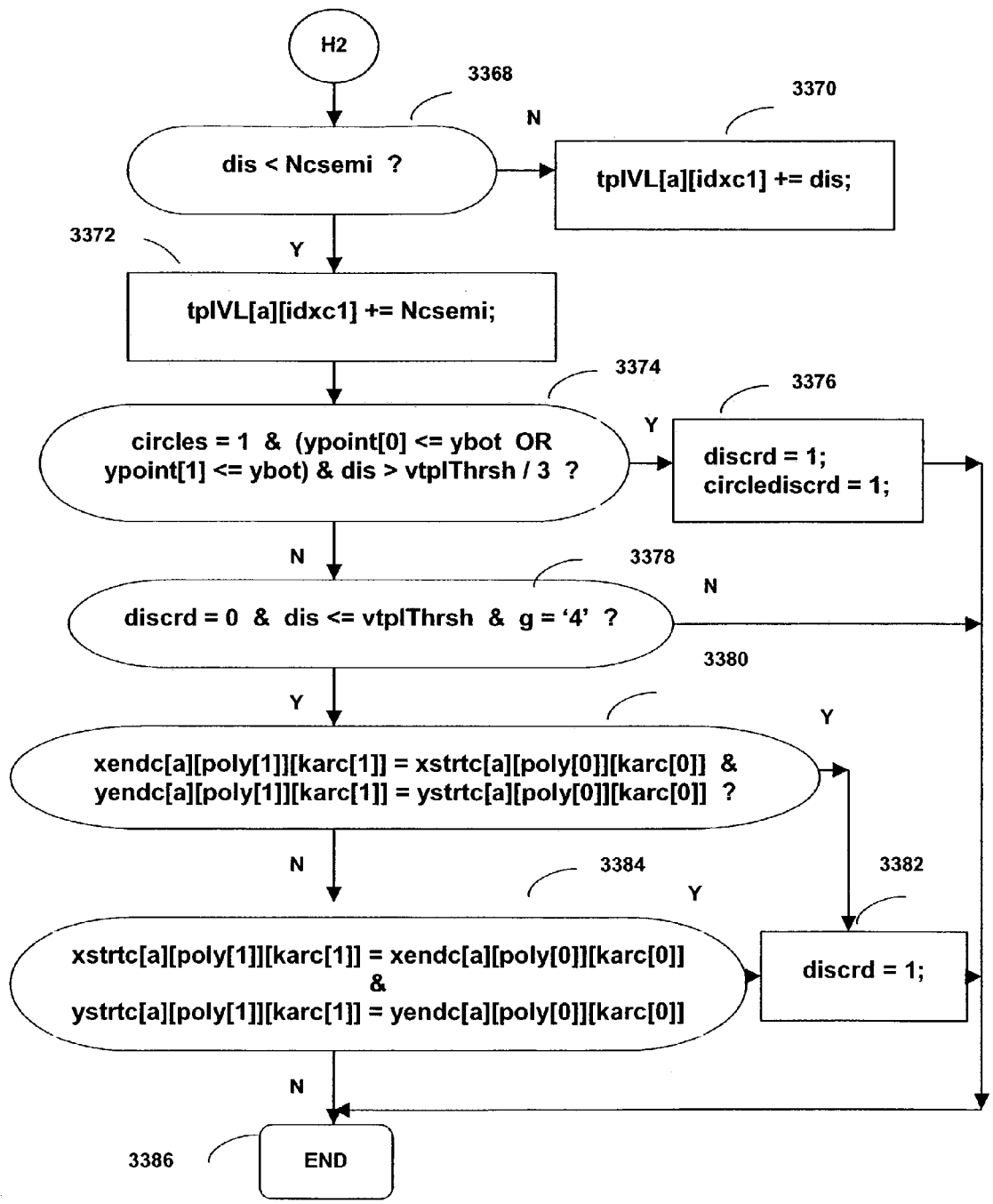
Figure 61A:
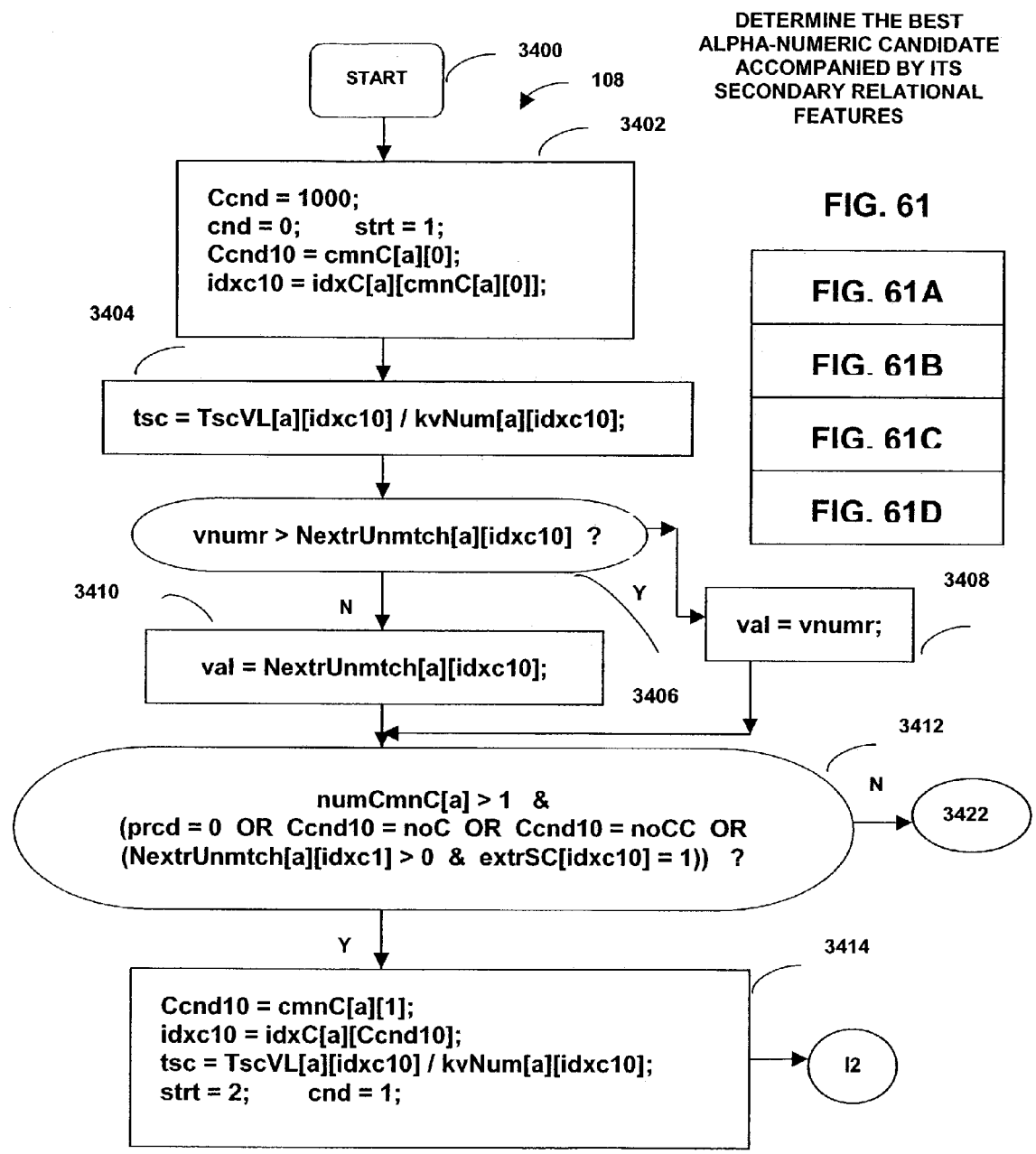
FIG. 61 is a flow diagram illustrating the determination of the best alpha-numeric candidate symbol accompanied by its secondary relational features.
Figure 61B:
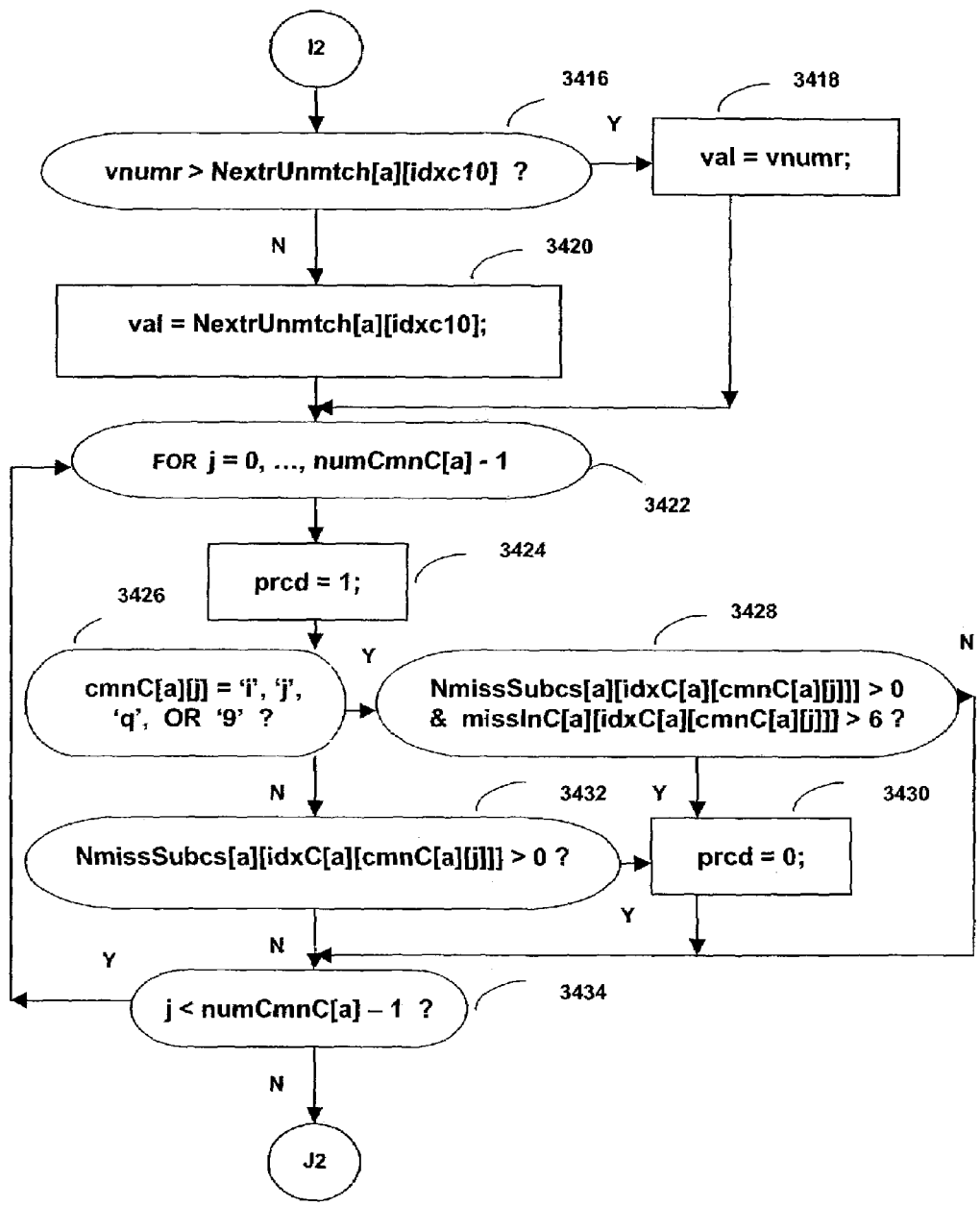
Figure 61C:
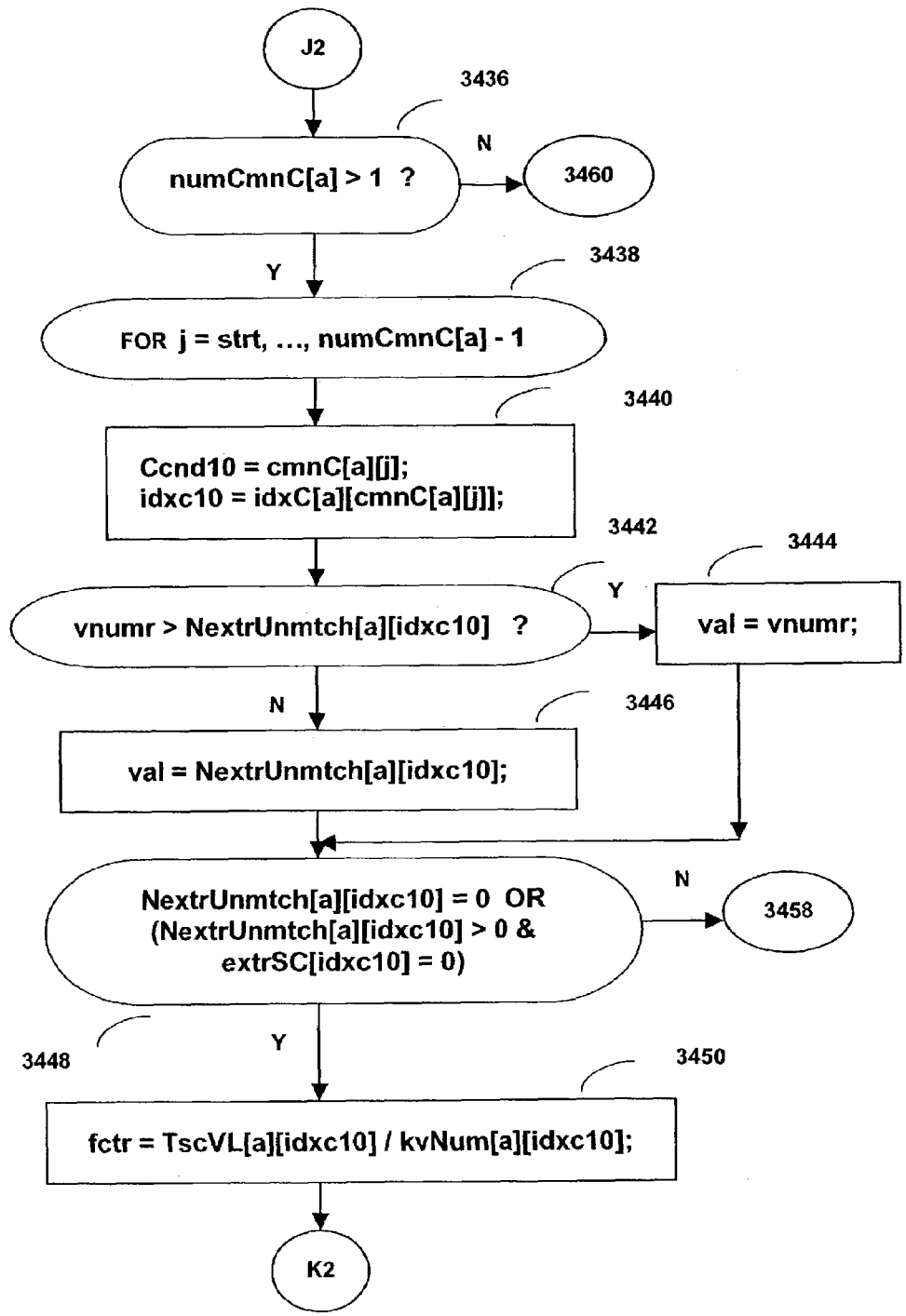
Figure 61D:
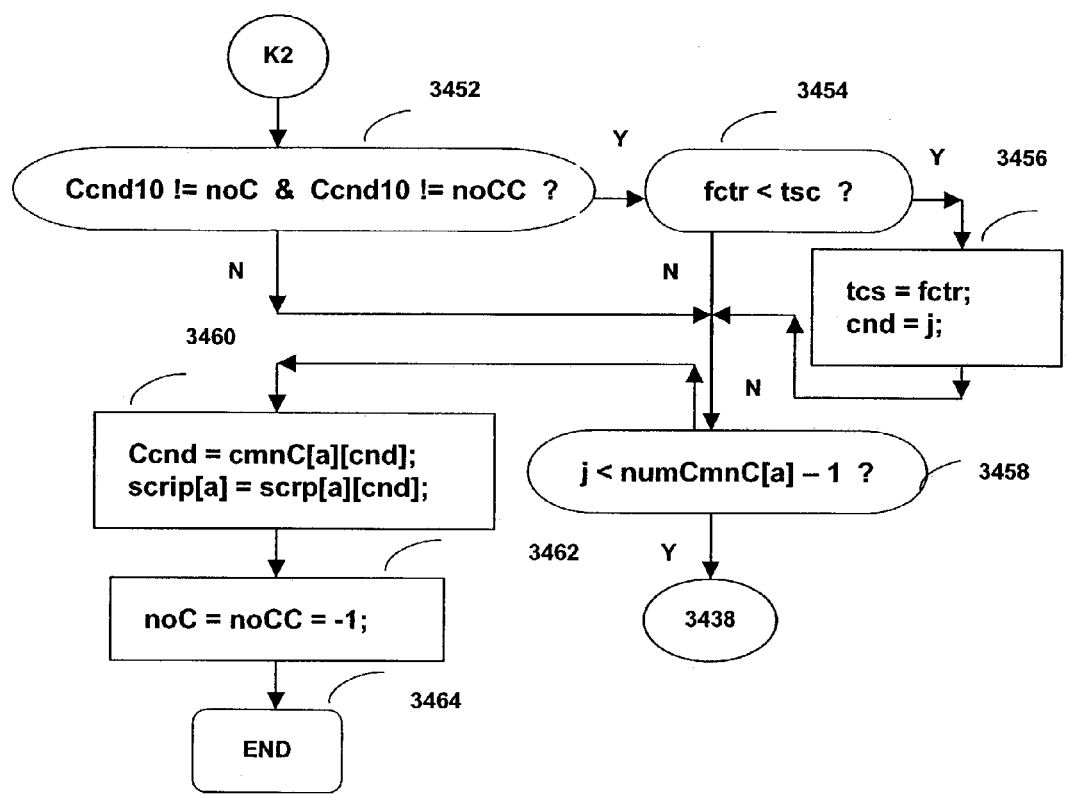

The process to establish alphanumeric candidate symbols is illustrated in (i) FIG. 43 to perform structural invocation, and (ii) FIG. 44 to perform invocations, by way of example. In FIG. 43, for each polyline "p" and arcpoly "k", "numSubClassOpt[a][p][k]" logical symbols (q=0, . . . , numSubClassOpt[a][p][k]−1), in the horizontal direction, and "numSCopt[a][p][k]" sub-class symbols (q1=0, . . . , numSCopt[a][p][k]−1), in the diagonal direction generate a 3-D set of alphanumeric candidate symbols via "numscTOC[q][q1]" from the database (see FIG. 58) in the vertical direction. In FIG. 43, for illustration purposes only, the alphanumeric symbols in the diagonal direction are not shown and although two boxes for each "numSubClassOpt[a][p][k]" logical symbol are shown for this direction to represent invoked alphanumeric candidate symbols, this would be true for most cases; however, in few cases, there may be only one box representing an invoked alphanumeric candidate symbol for each "numSubClassOpt[a][p][k]" logical symbol.

The technique to determine the alphanumeric candidate symbol(s) that emerge(s) for every polyline "p" and arcpoly "k" belonging to alphanumeric "a" starts by searching for a mismatch between every alphanumeric candidate symbol emerged for polyline 0 and arcpoly 0 and the alphanumeric symbols emerged for the remaining polyline(s) and arcpoly(s) belonging to alphanumeric "a". If a mismatch occurs the process moves to the next alphanumeric candidate symbol that emerges for the polyline 0 and arcpoly 0 to search again to obtain a mismatch with the other polylines(s) and arcpoly(s) of alphanumeric "a"'s candidate symbols, as described above. Otherwise, a list is compiled that includes the alphanumeric candidate symbol(s) that commonly occurs for all polylines and arcpolys of alphanumeric "a", as described below:

nsubccmnC→number of alphanumeric candidate symbols, derived structurally.

cmnSubcC[j], where j=0, . . . , nsubccmnC−1→alphanumeric candidate symbol, derived structurally.

sp1[j], where j=0, . . . , nsubccmnC−1→context of each alphanumeric candidate symbol (i.e., cursive), derived structurally.

In FIG. 44, for each encoding and separation pertaining to relationships, "q", (q=0, . . . , ntplC[a]−1), "ntplCOpt[a][q]" options, in the horizontal direction generate a 2-D set of alphanumeric candidate symbol(s) via "GtplToC[m][numtplToC[m]]", where "m=Carctplgy[a][p][k]" from the database in the vertical direction. The technique to determine the alphanumeric candidate symbol(s) that emerge(s) for every encoding and separation, "q", is similarly derived as described above by establishing commonality for a every alphanumeric candidate symbol that emerges for "q=0" with alphanumeric symbols that emerge for the remaining "q"s, when "q>0". During this process, a list is compiled that includes the alphanumeric candidate symbol(s) common to all "q"s (for q=0, . . . , ntplC[a]−1) belonging to alphanumeric "a", as shown below:

ntplcmnC→number of alphanumeric candidate symbols, derived.

cmntplC[j], where j=0, . . . , ntplcmnC−1→alphanumeric candidate symbol, derived ly.

sp2[j], where j=0, . . . , ntplcmnC−1→context of alphanumeric candidate symbol (i.e., upper case), derived.

Note that during the comparisons made for establishing alphanumeric symbol commonality, context (i.e., upper case, lower case, cursive, etc.) of the alphanumeric symbols must match as well. During the comparisons made in the case of encoding and separation to establish alphanumeric symbol commonality, the difference between the two separations corresponding to each of the alphanumeric symbols compared must not exceed "epsilon4" which has a small value and is derived empirically.

When the two list described above are combined, a new list of alphanumeric candidate symbols are invoked via the outlined evidence-based strategy and complied as shown below:

numCmnC[a]→number of alphanumeric candidate symbols, derived.

cmnC[a][j], where j=0, . . . , numCmnC−1→alphanumeric candidate symbol.

scrp[a][j], where j=0, . . . , numCmnC−1→context of alphanumeric candidate symbol (i.e., upper case).

According to the example presented in FIG.'s H and I, the common alphanumeric candidate symbol is "o".

Figure 34:
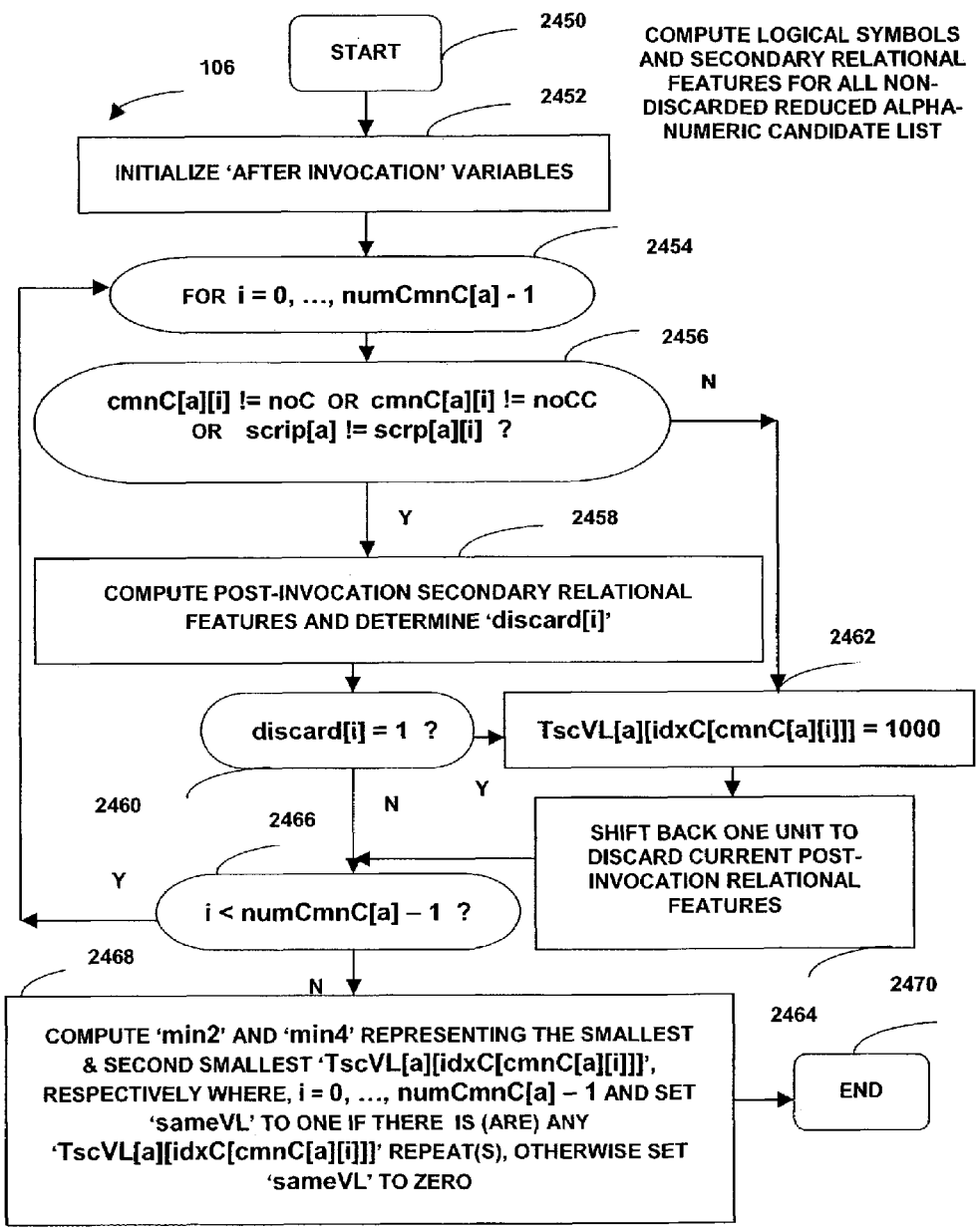
FIG. 34 is a flow diagram illustrating the computation of logical symbols and their secondary relational features for all non-discarded reduced alphanumeric candidate symbol list.
Figure 35B:
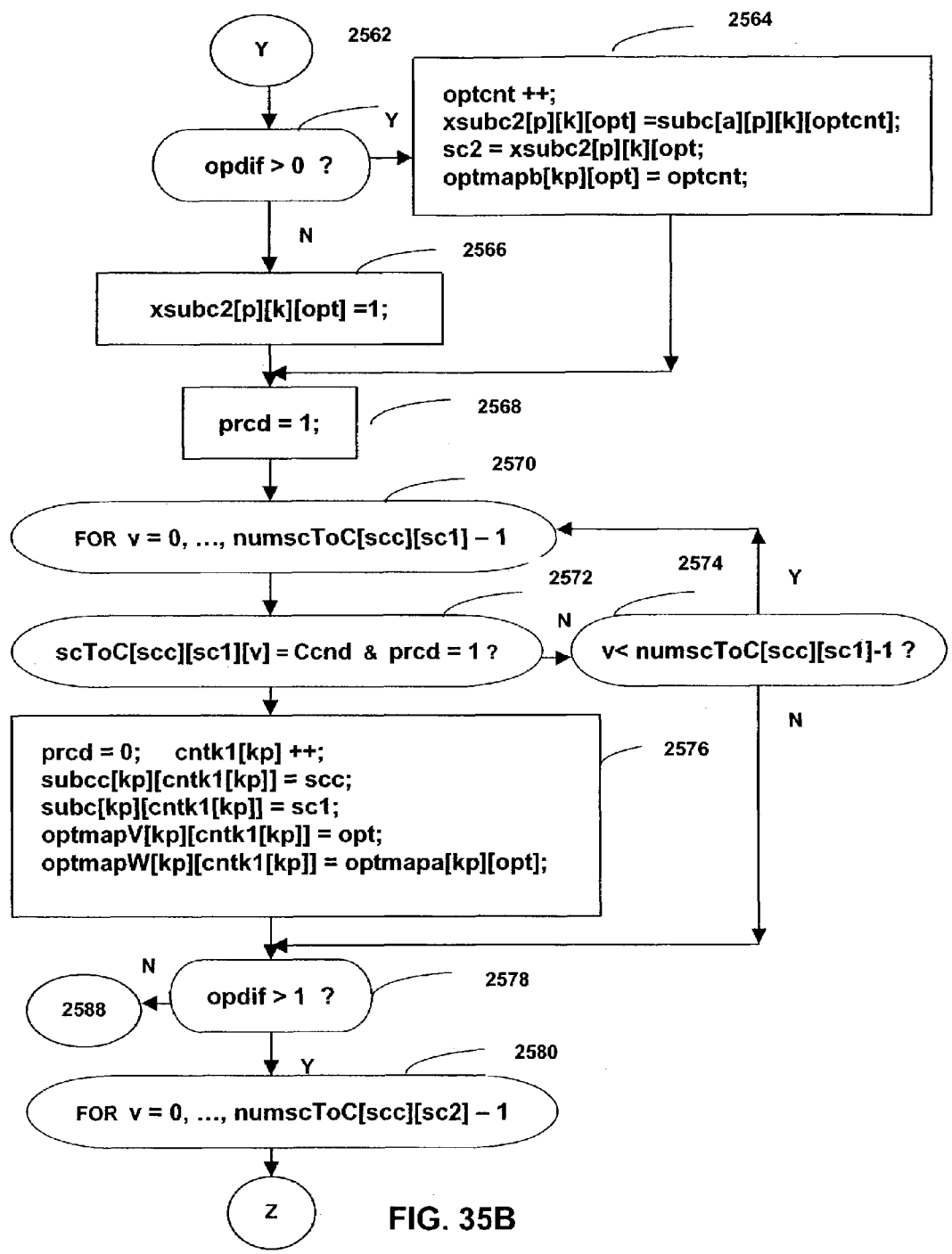
FIG. 35 is a flow diagram illustrating the computation of post-invocation secondary relational features and the determination of the "discard" vector.
Figure 35C:
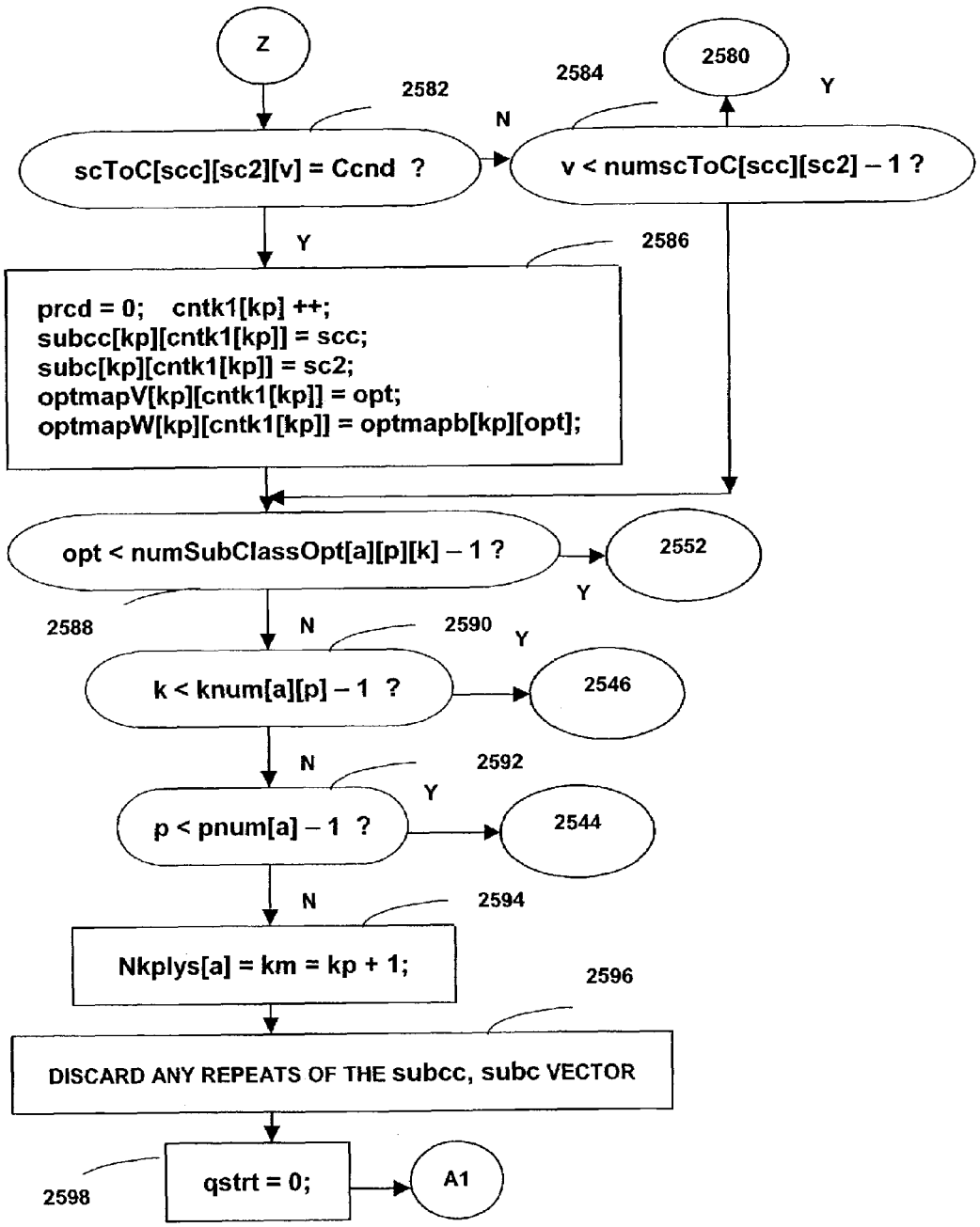
Figure 35D:
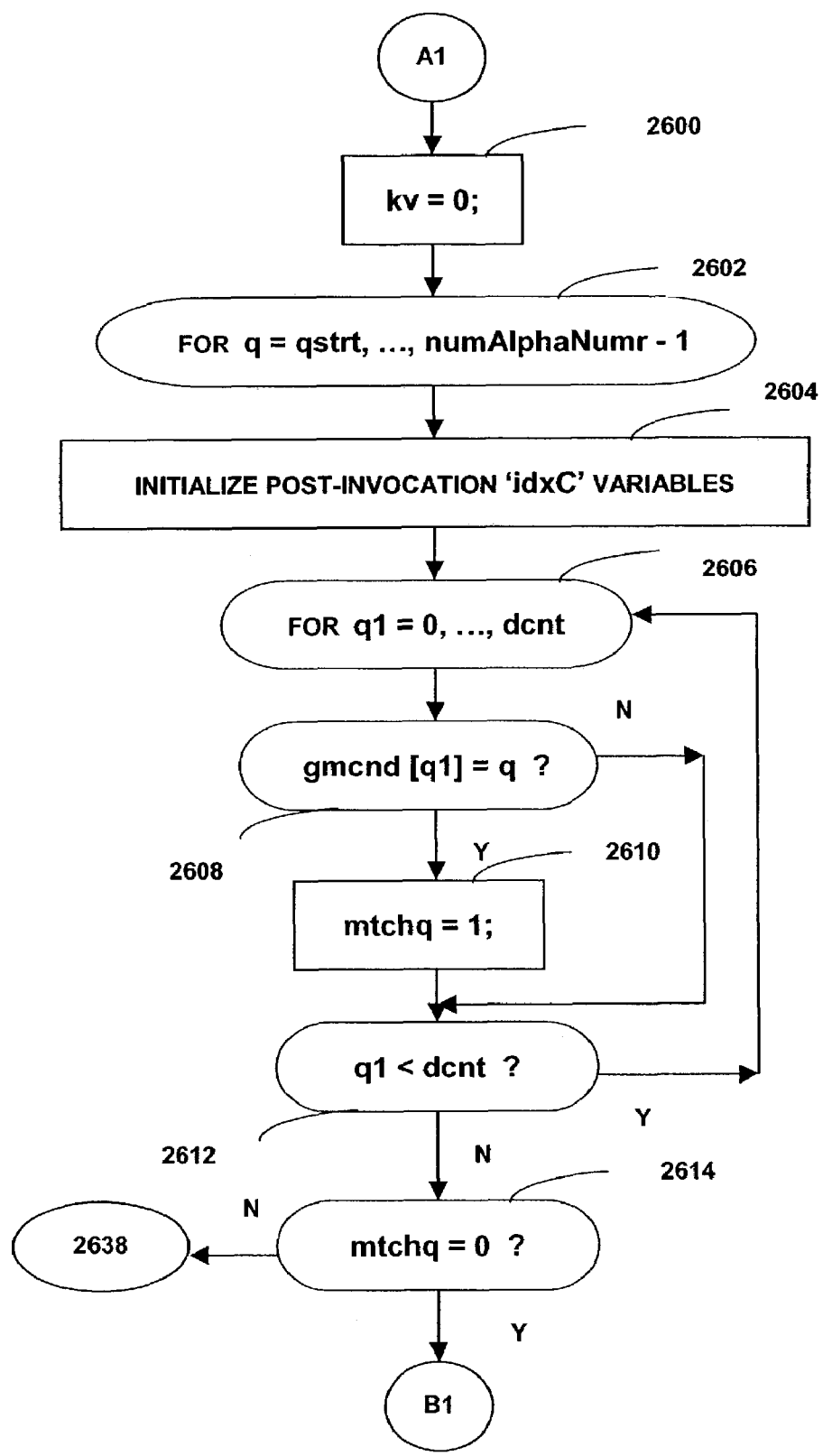
Figure 35E:
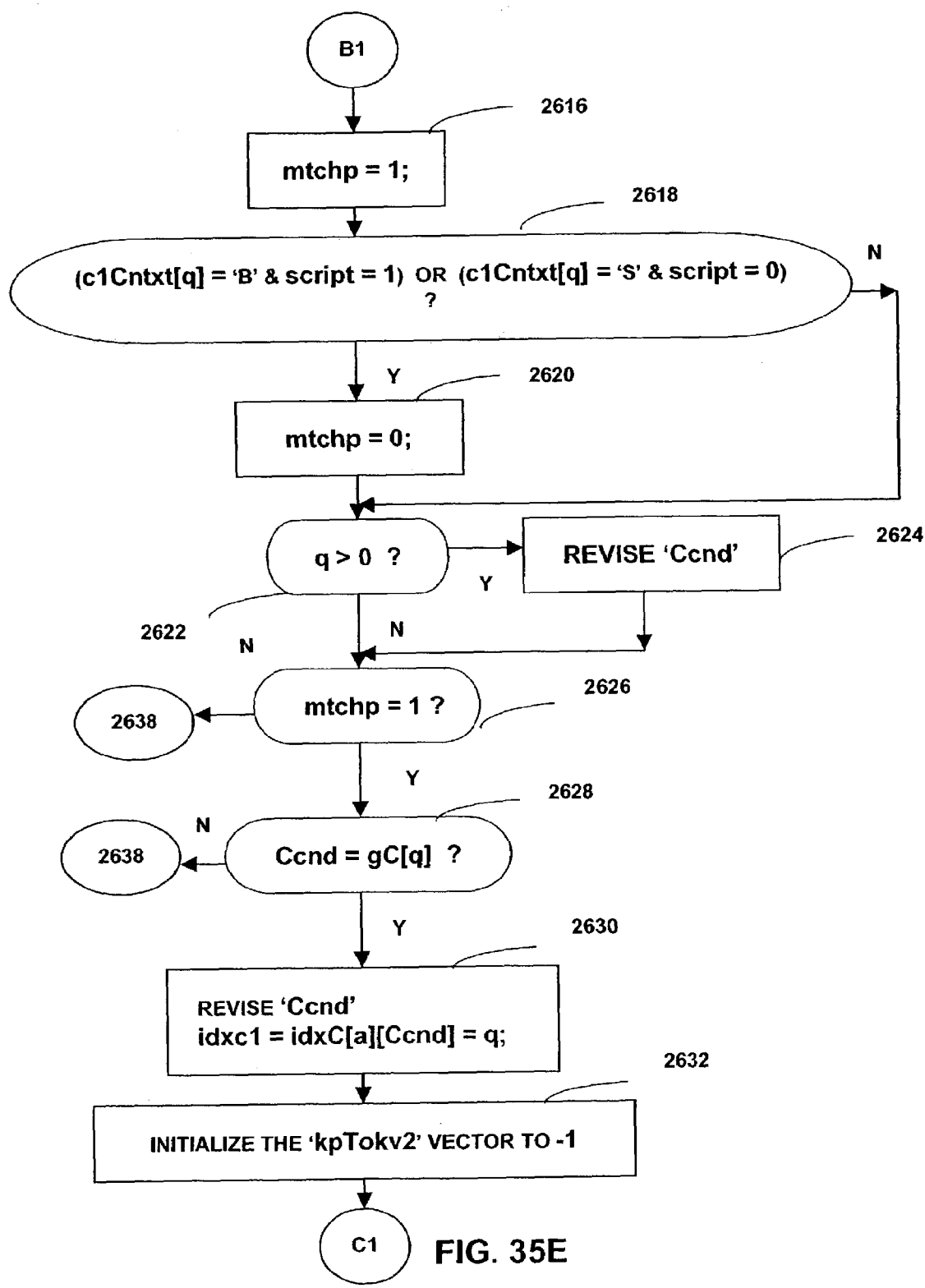
Figure 35F:
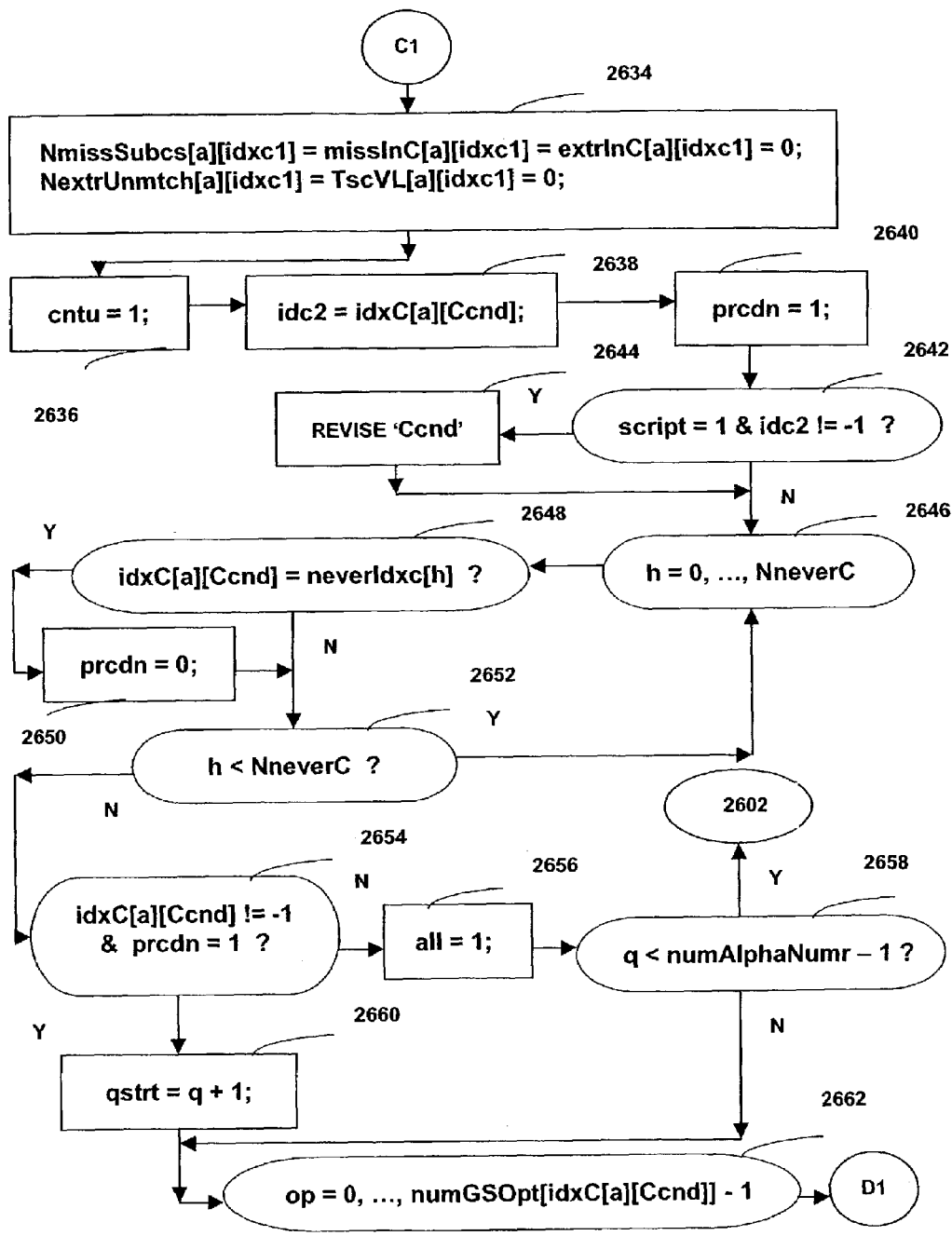
Figure 35G:
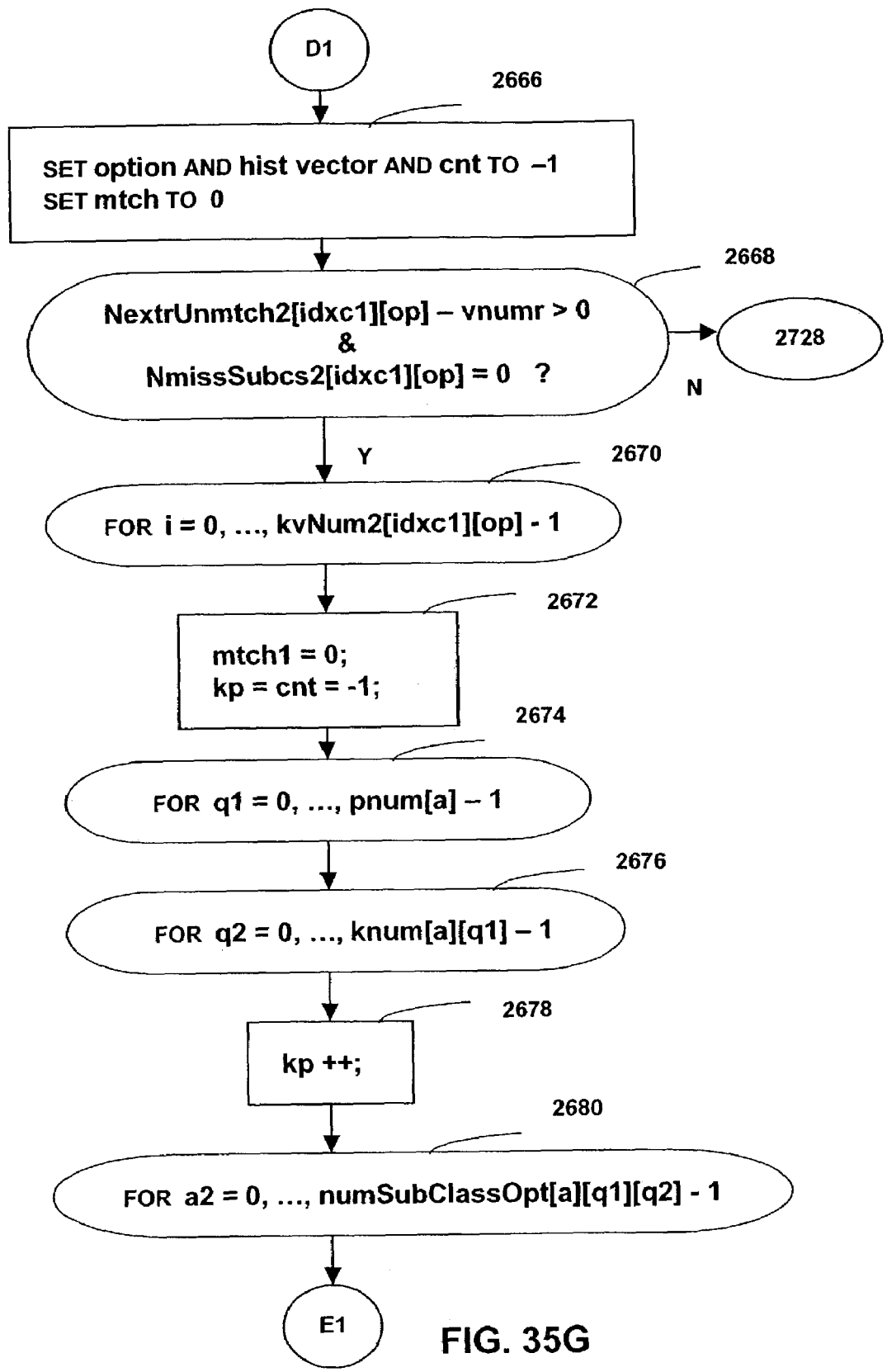
Figure 35H:
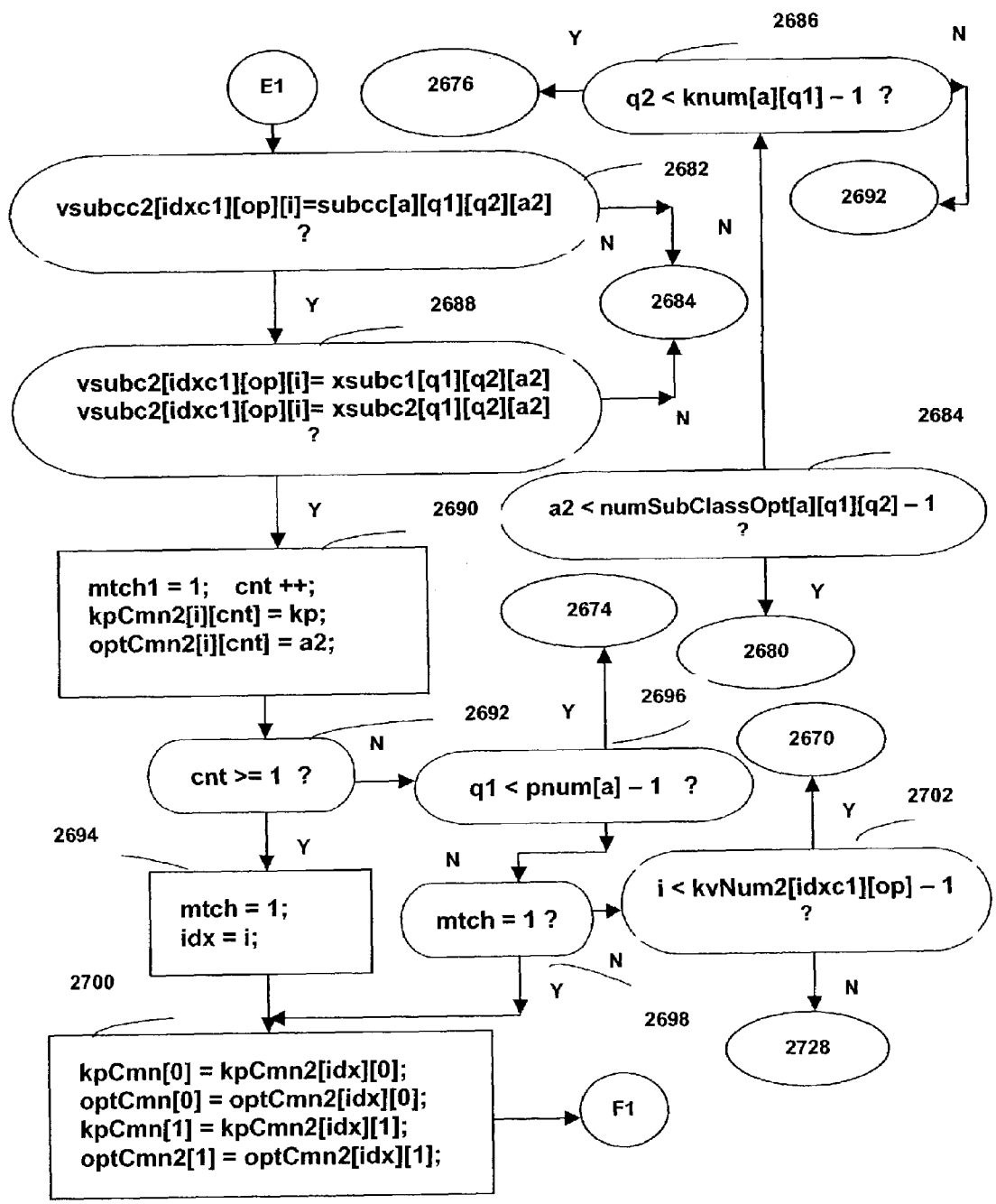
Figure 35I:
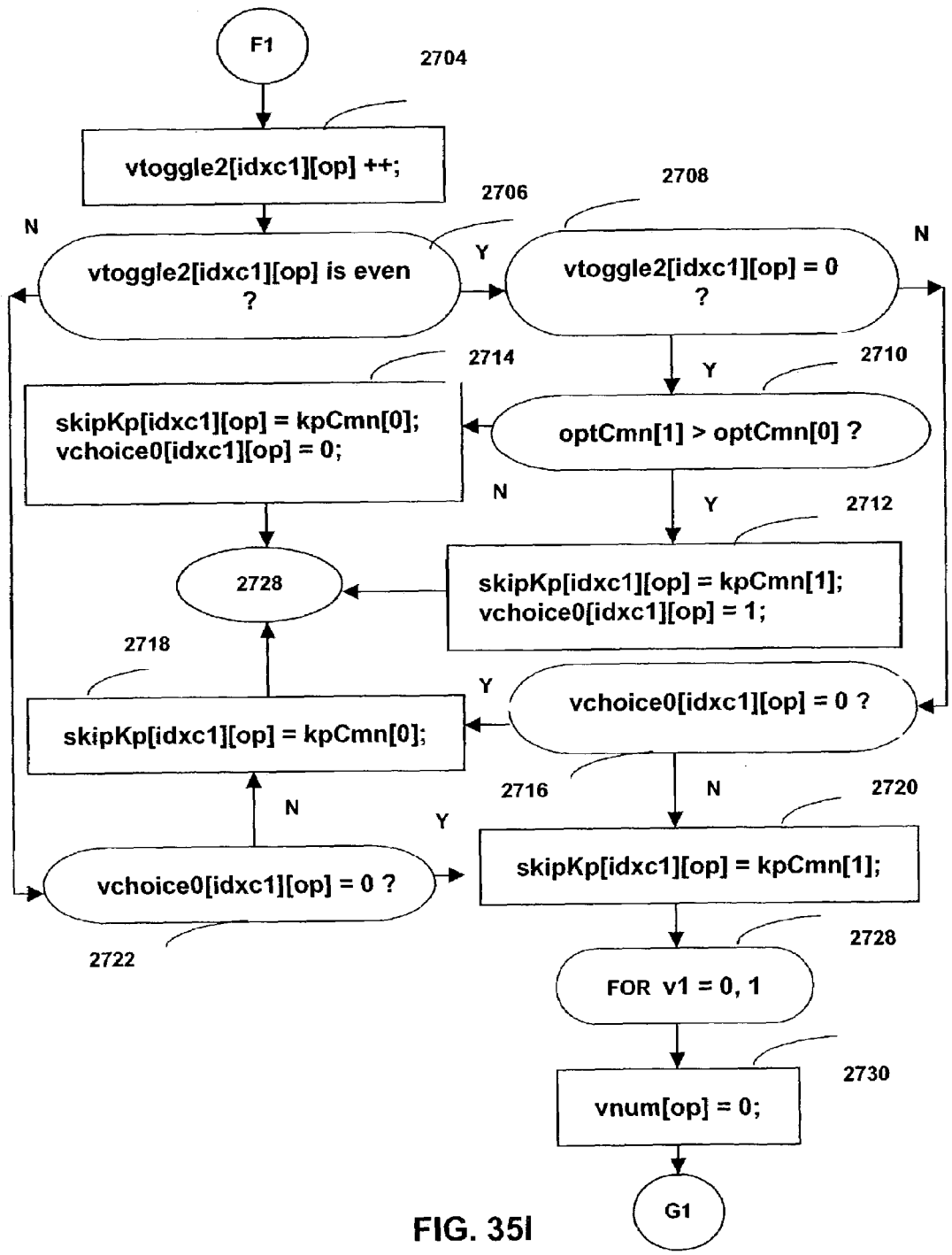
Figure 35J:
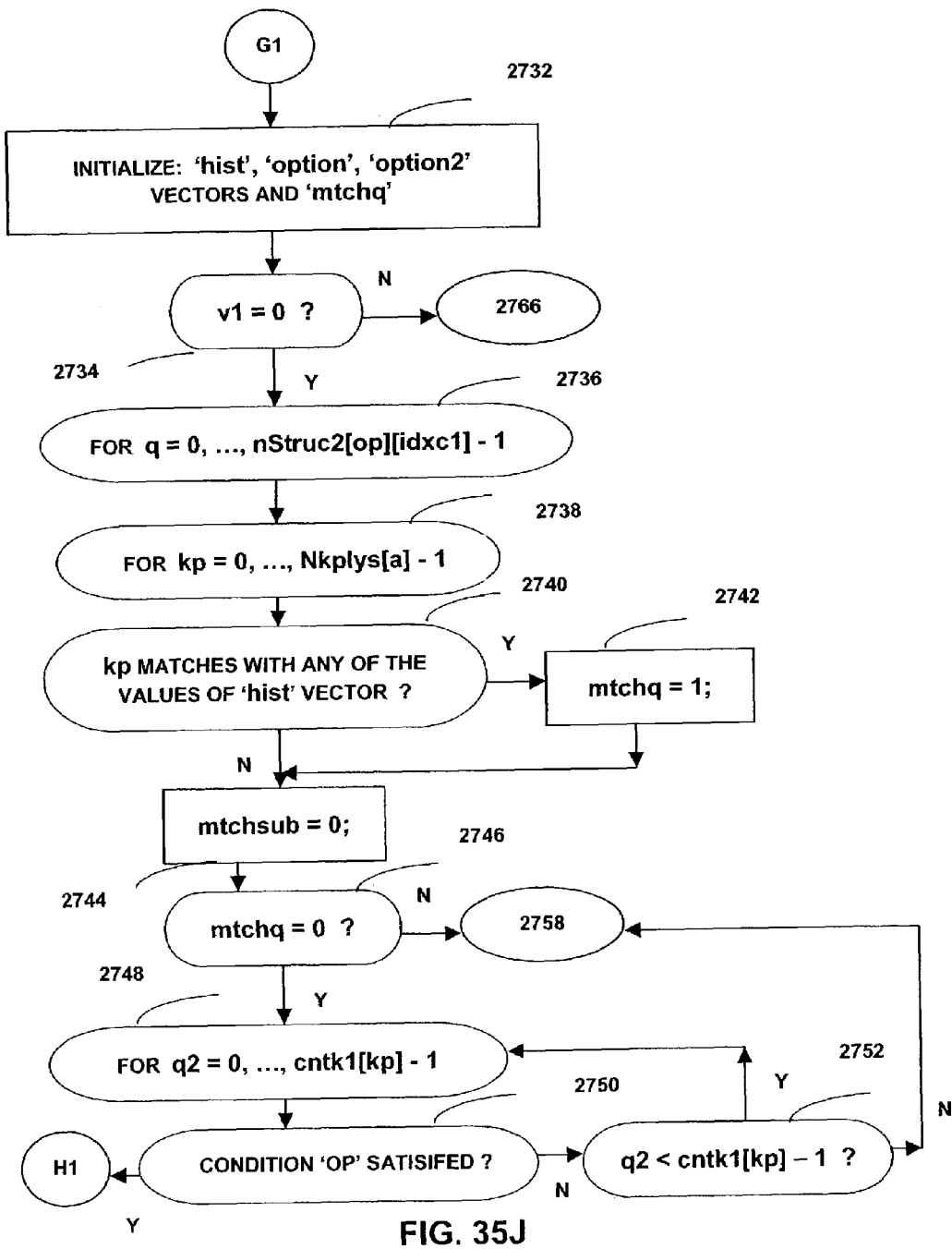
Figure 35K:
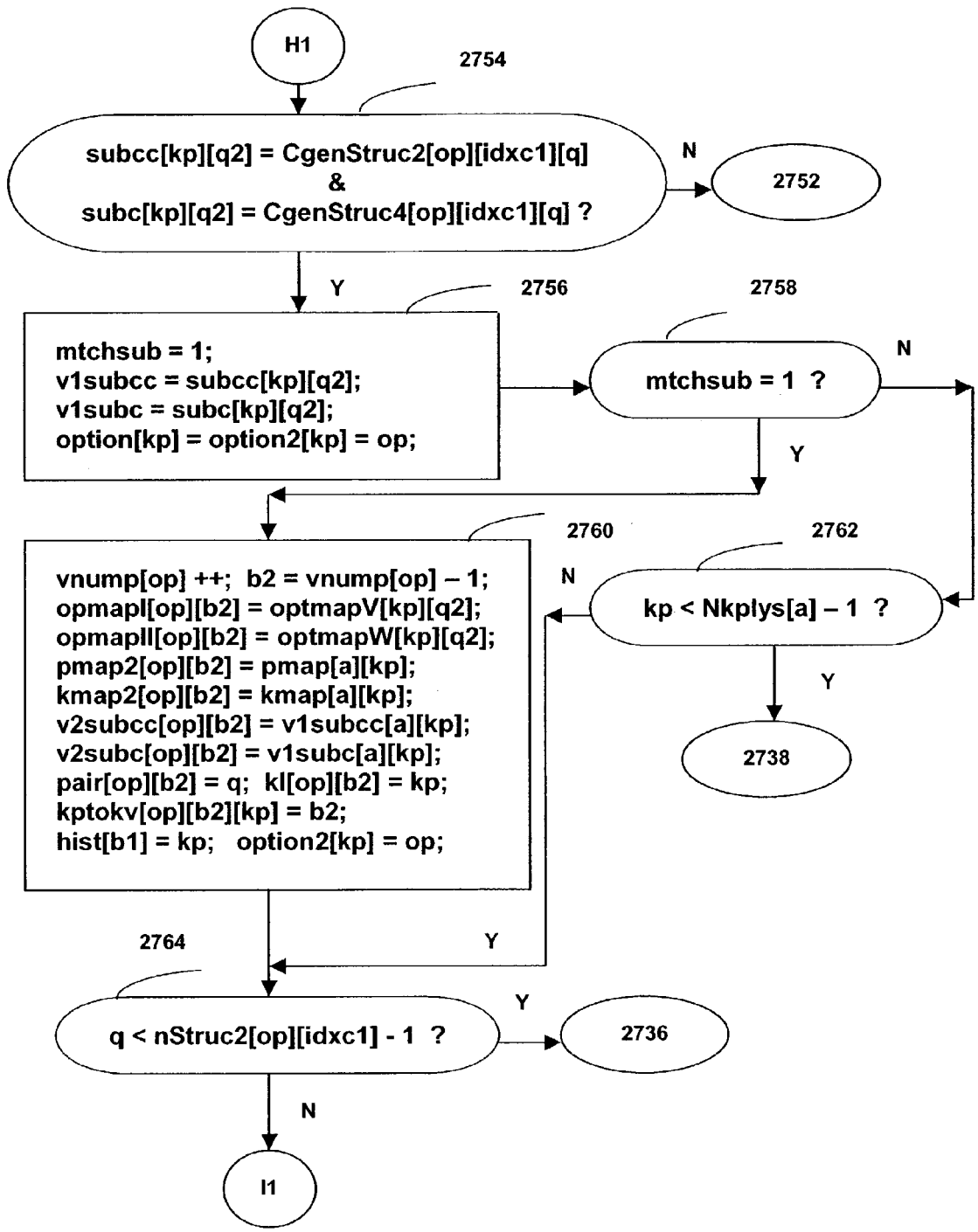
Figure 35L:
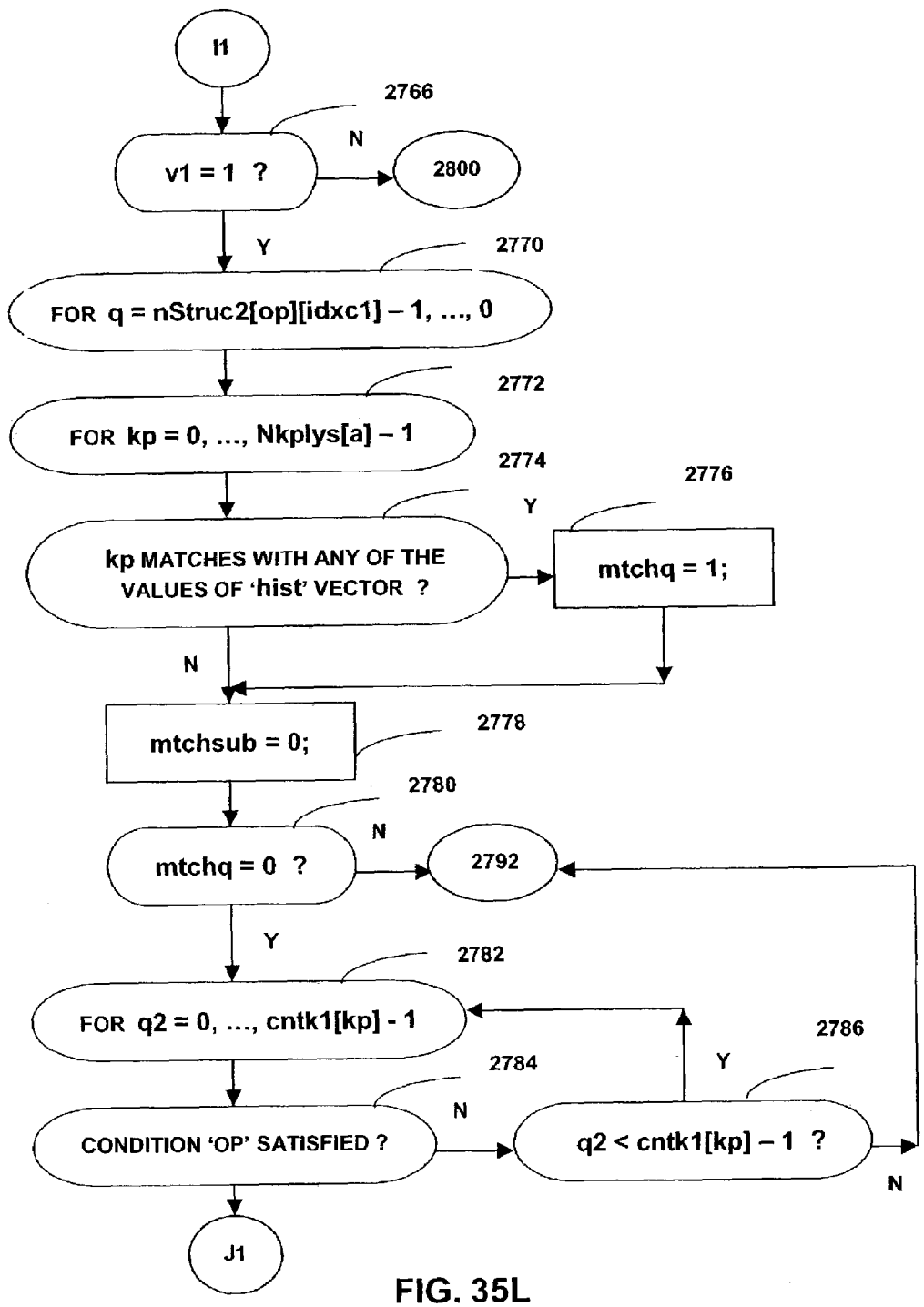
Figure 35M:
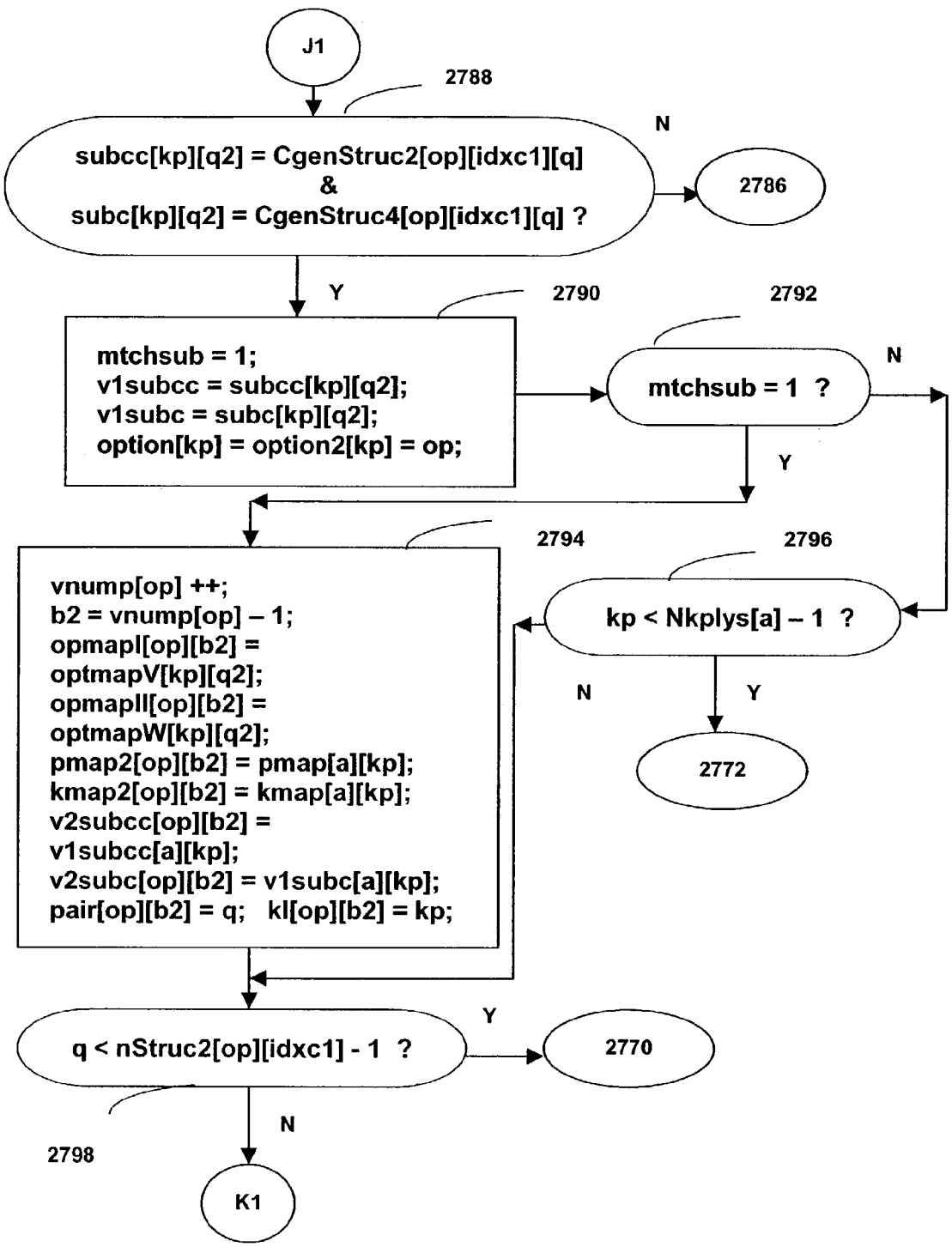
Figure 35N:
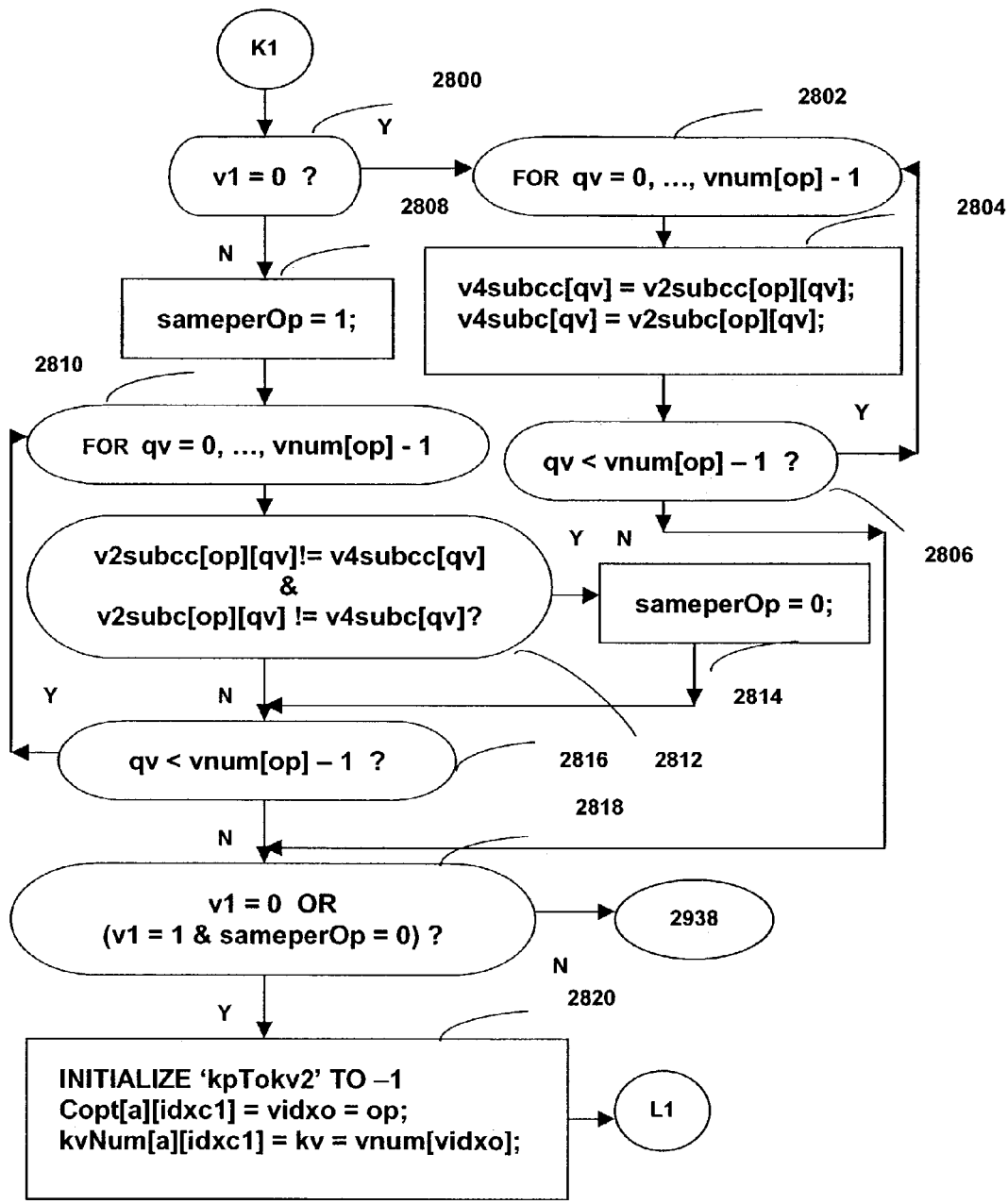
Figure 35O:
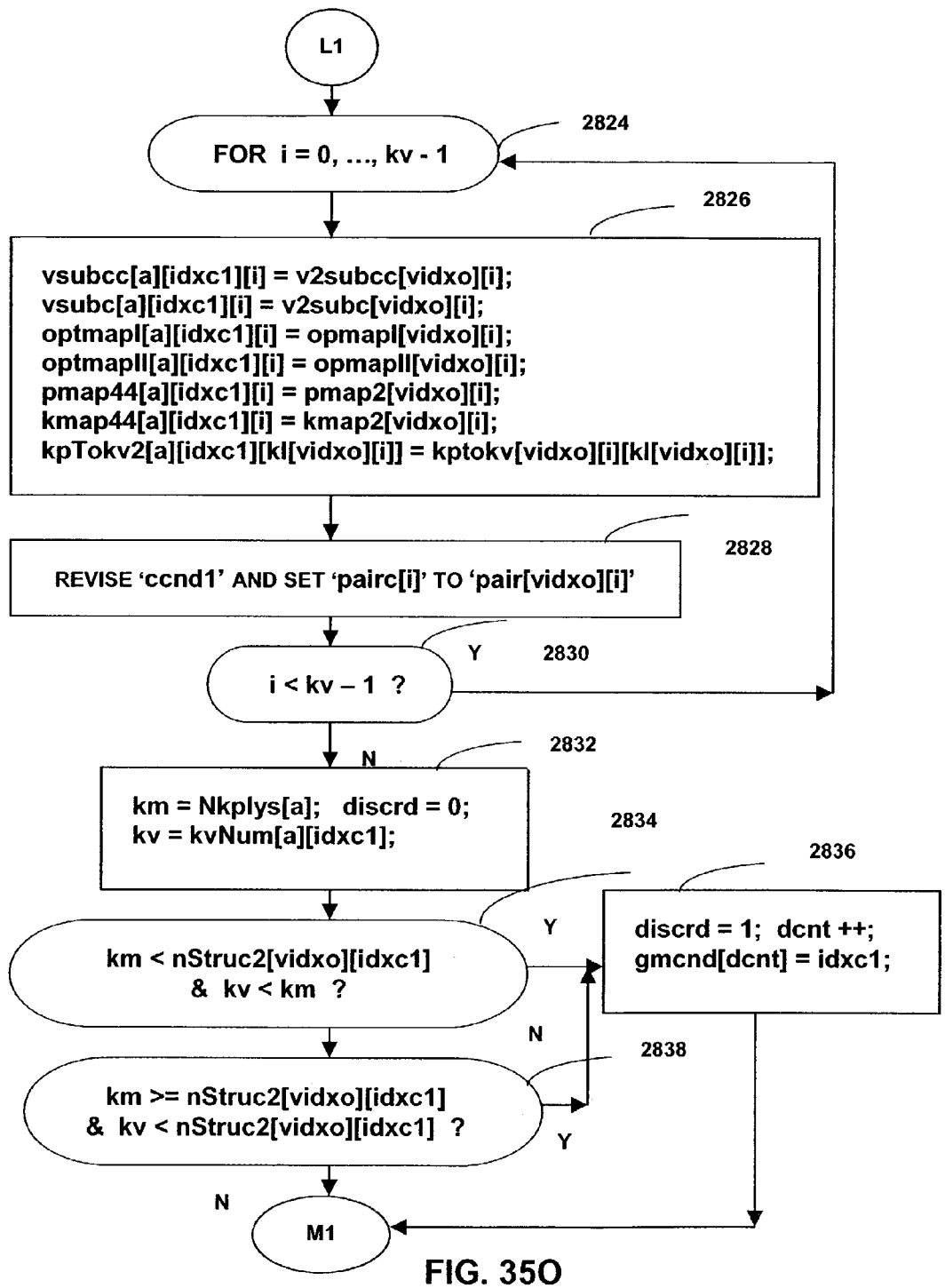
Figure 35P:
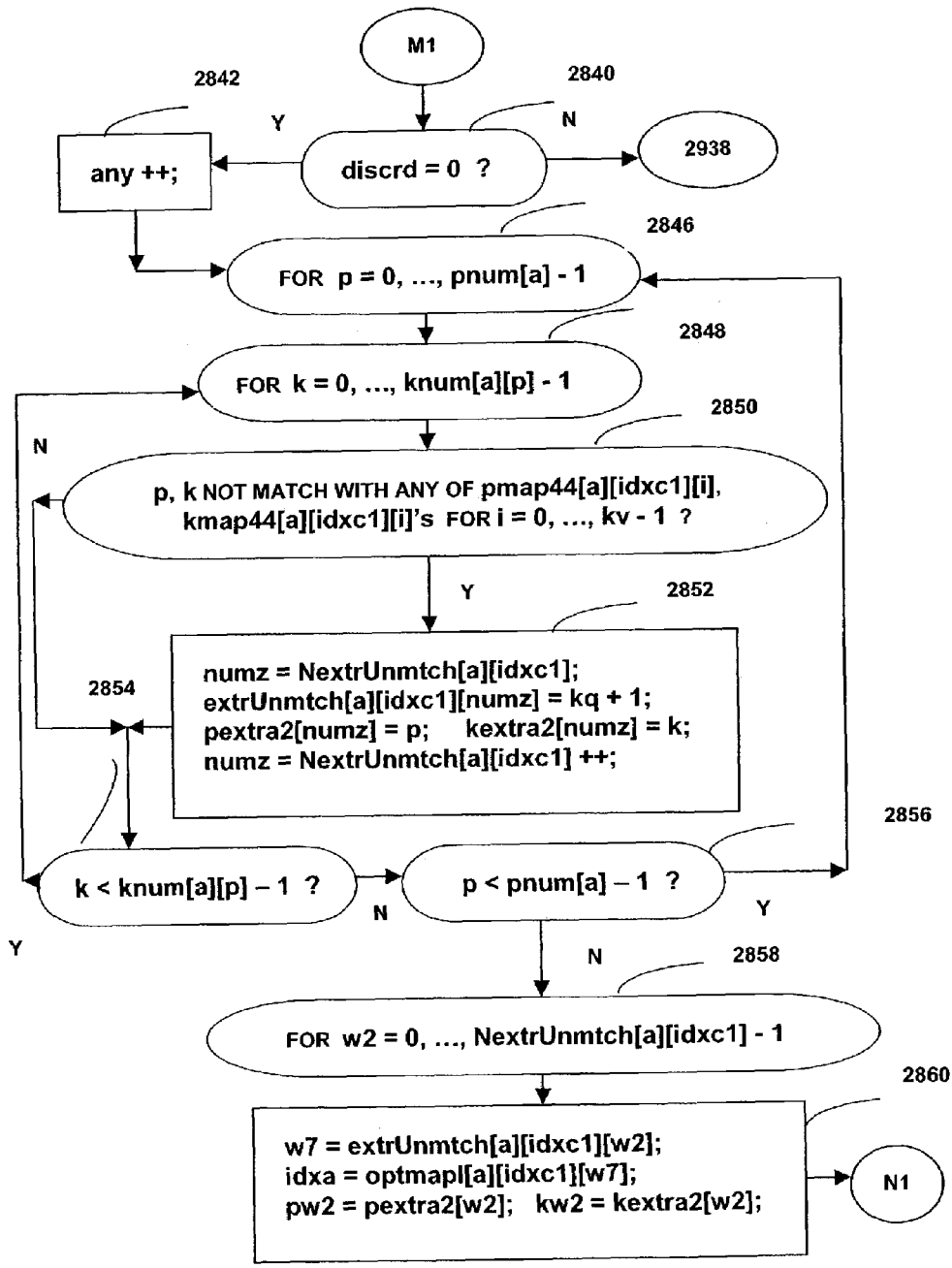
Figure 35Q:
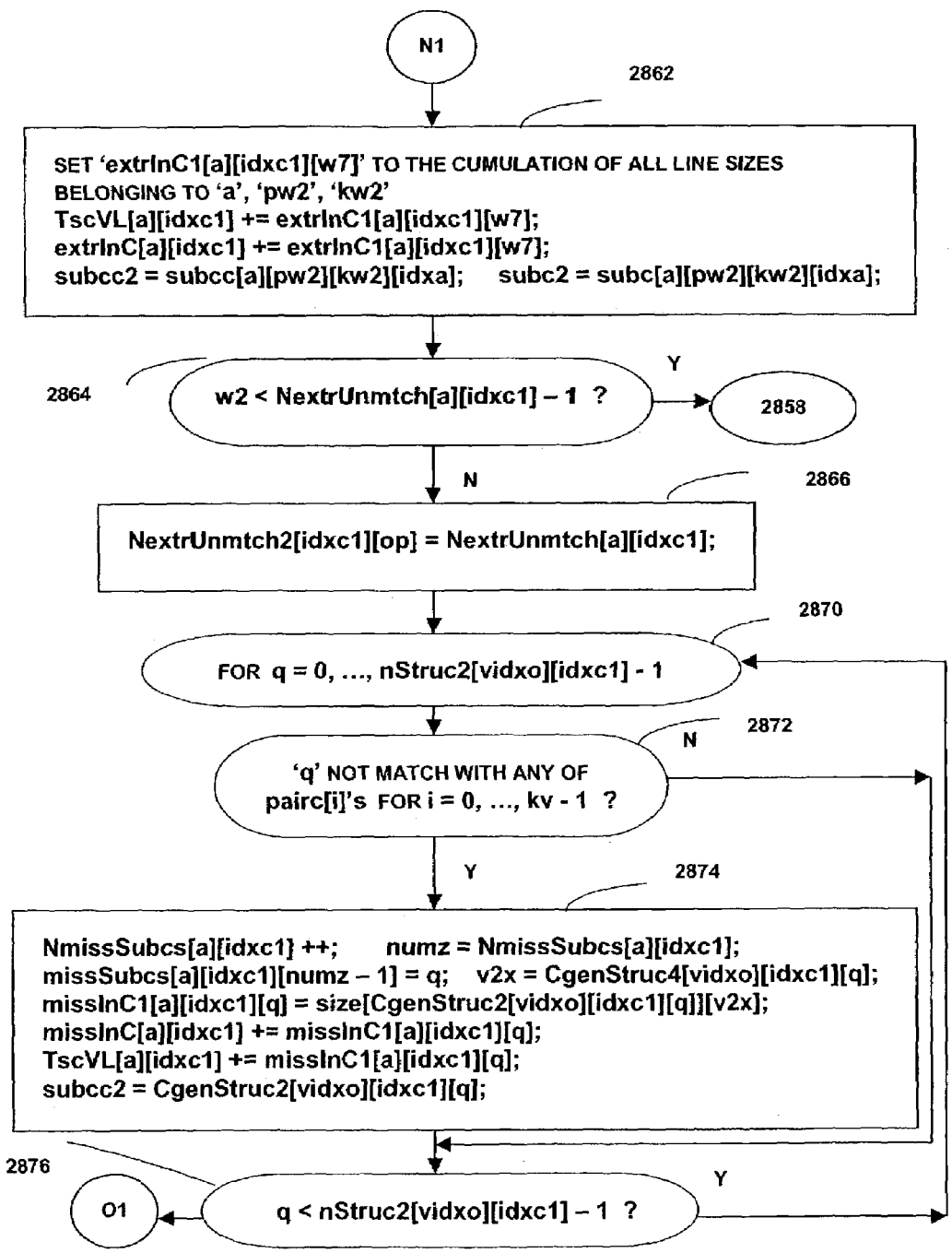
Figure 35R:
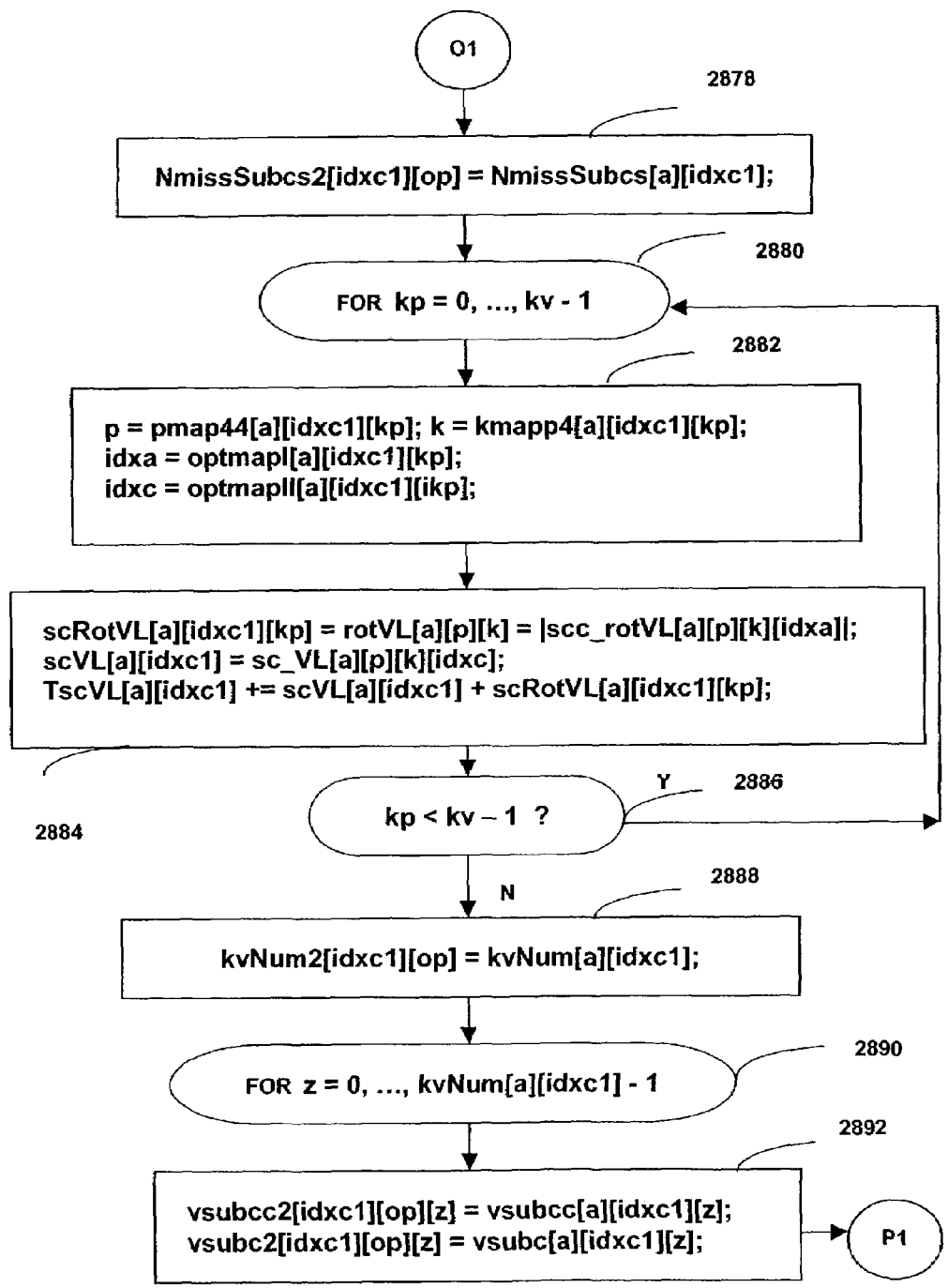
Figure 35S:
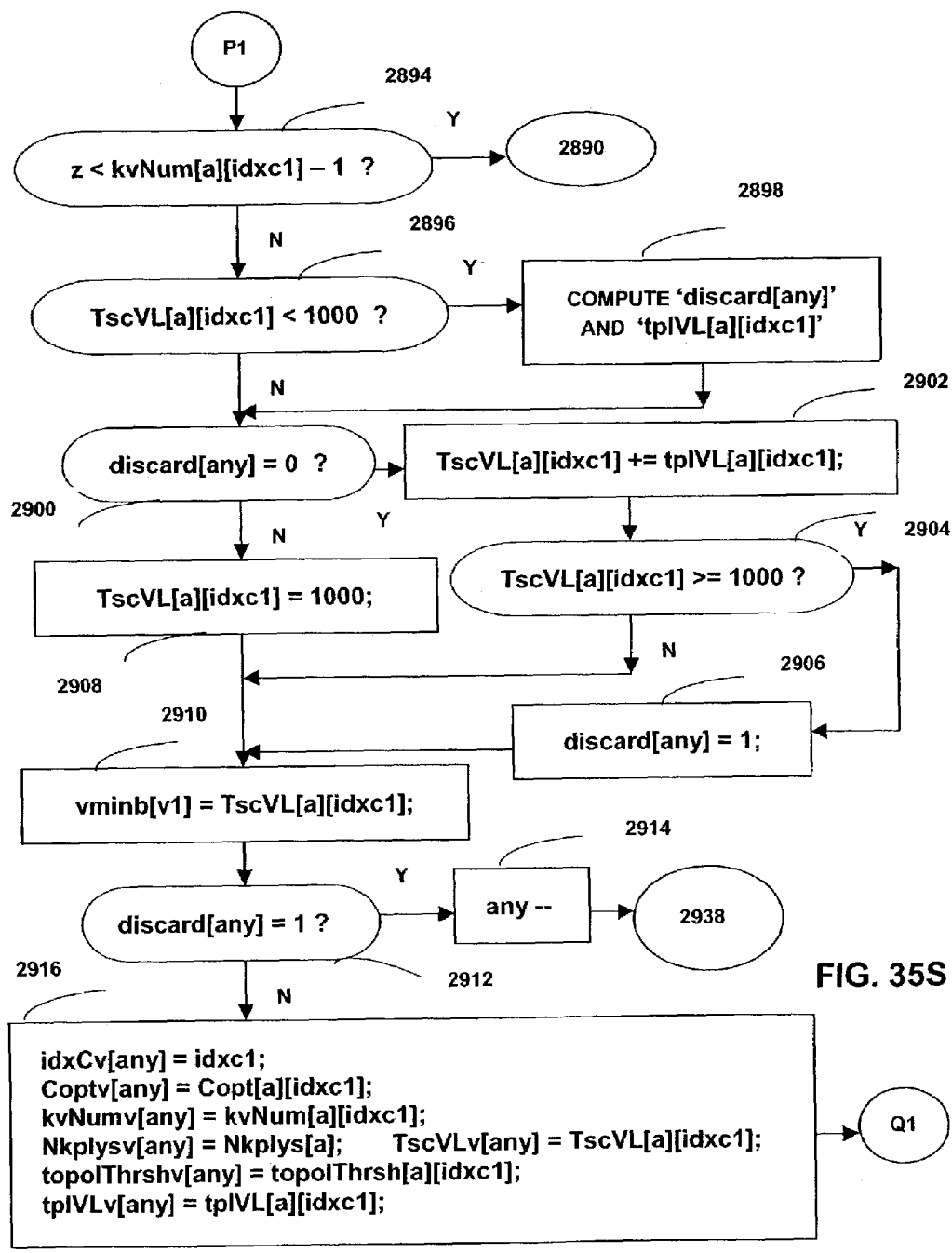
Figure 35T:
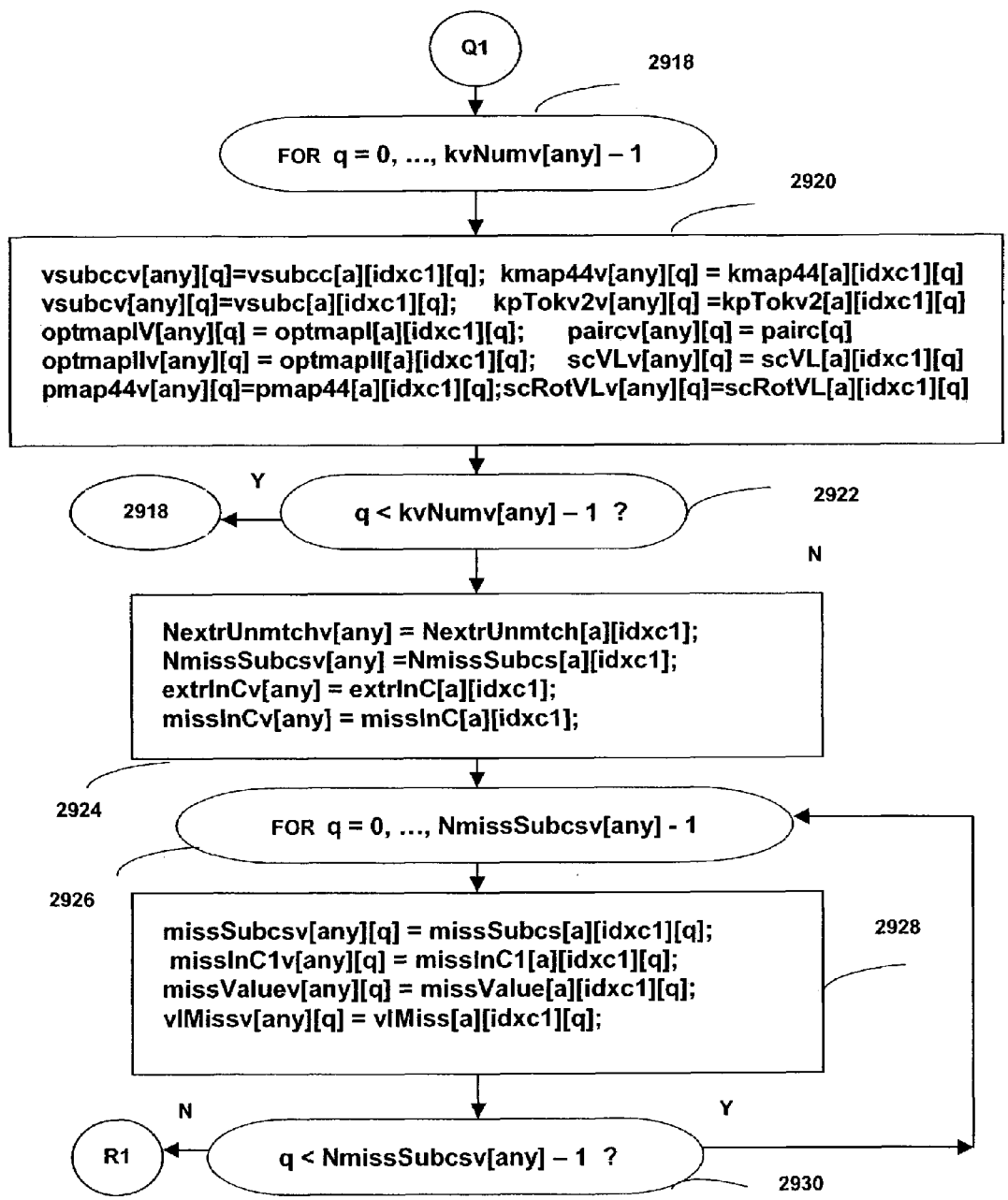
Figure 35U:
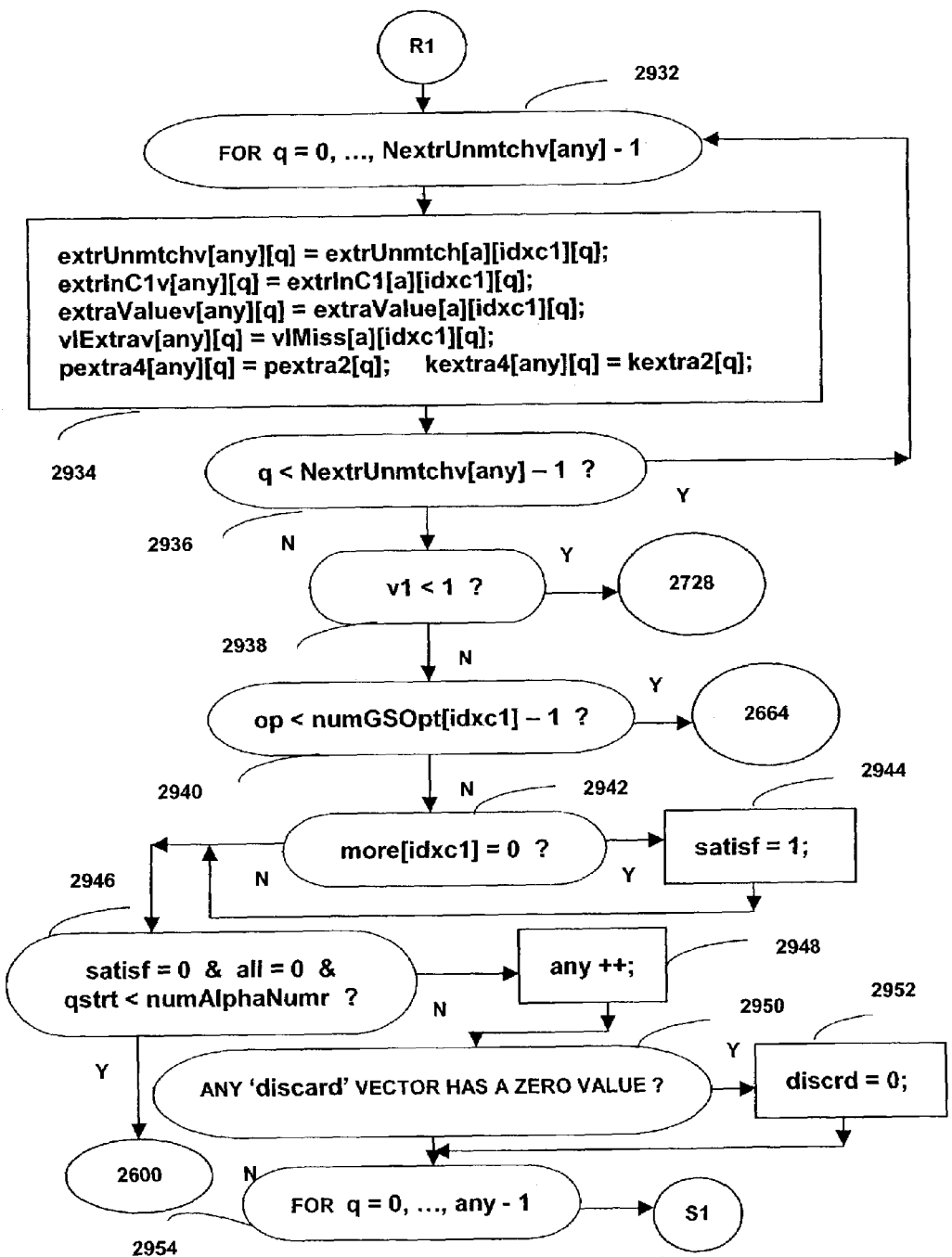
Figure 35V:
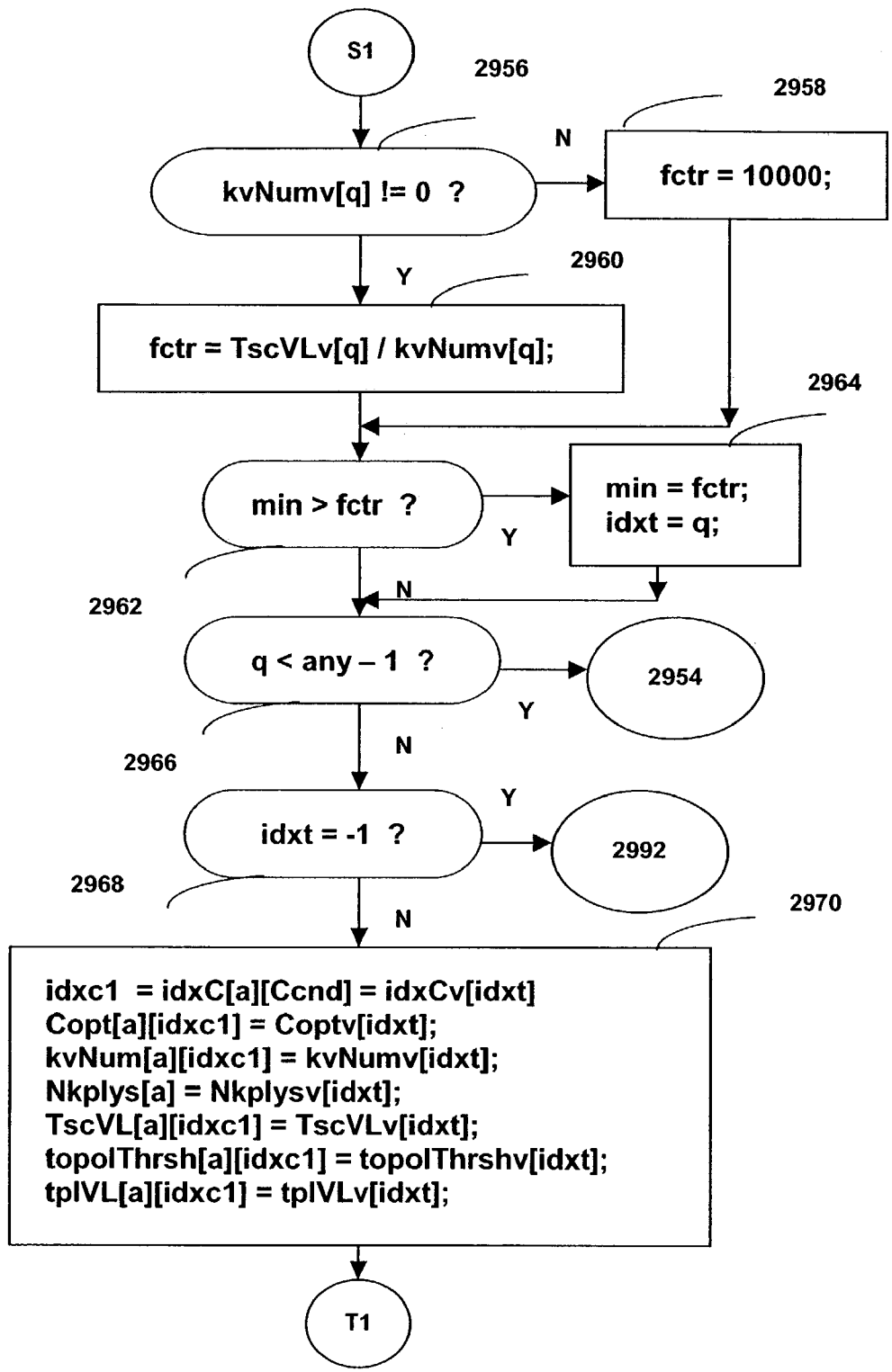
Figure 35W:
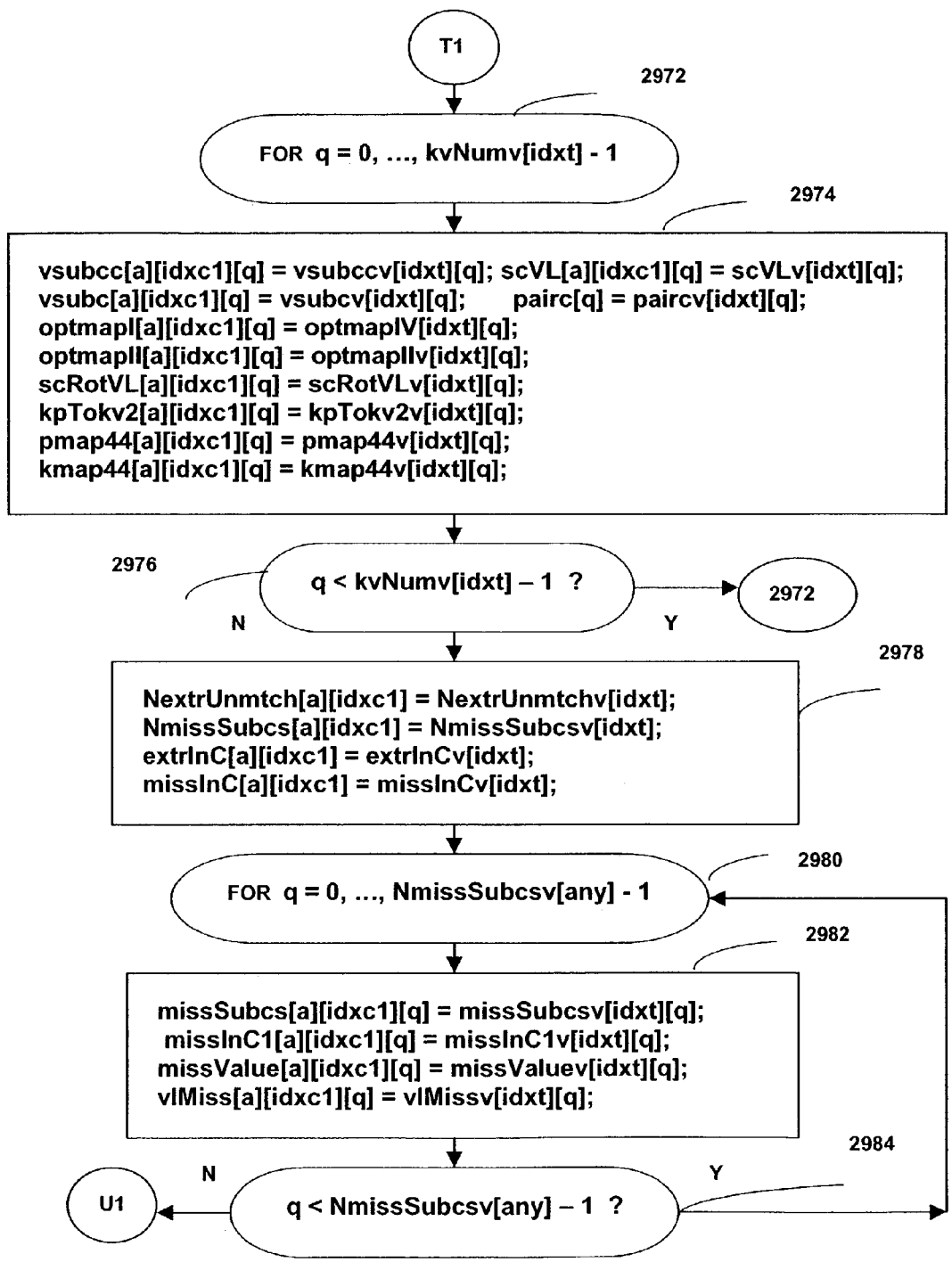
Figure 35X:
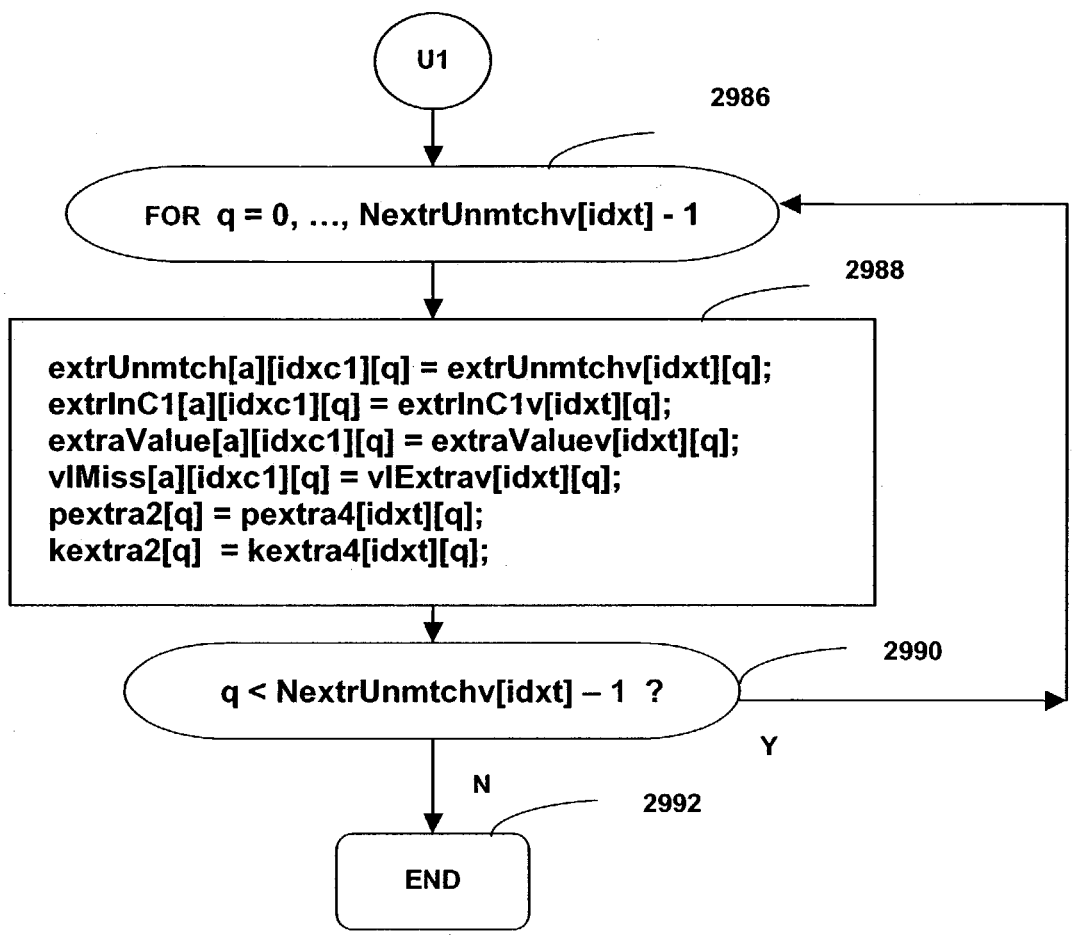

FIG. 3 shows state 106 of the process 40. FIG. 34 illustrates the overall process 106 as it begins at a start state 2450 and moves to state 2452 wherein variables pertaining to the post-invocation of alphanumeric "a" candidate symbols are initialized. The process 106 moves to state 2454 wherein allows states 2456-to-2466 to be repeated for i=0, . . . , numCmnC[a]−1 and then moves to the decision state 2456. Note that "noC" and "noCC" are initially set to '−1'. If the result of the decision state 2456 is in the affirmative, the process 106 moves to state 2458 to compute the secondary relational features. Thus, as another preferred embodiment of the invention, the symbolic representation of the alphanumeric ID is computed (see FIG. 35 and FIG. 42). Furthermore, the secondary relational features comprise topological variance and alphanumeric dissimilarity value representing inferred confidence level, as the alphanumeric ID is compared with a candidate alphanumeric symbol from the database. Next, the process 106 moves to the decision state 2460. Otherwise, the process 106 moves to state 2462 wherein 1000 is assigned to "TscVL[a][idxC[a][cmnC[a][i]]]" and then moves to state 2464 to shift back a single unit the post invocation relational features starting from index "i", in effect discarding the $i^{th}$ post invocation relational features. The process 106 moves to the decision state 2466. If the result of the decision state 2460 is not in the affirmative, the process 106 moves directly to the decision state 2466. If a determination is made in the decision state 2466 that i<numCmnC[a]−1, the process 106 moves to state 2454 to begin another cycle. Otherwise, the process 106 moves to state 2468 whereby for i=0, . . . , numCmnC[a]−1 (i) the smallest and second smallest "TscVL[a][idxC[a][cmnC[a][i]]]", namely "m1" and "m2" respectively are computed and (ii) set "sameVL" to one provided that there is (are) no "TscVL[a][idxC[a][cmnC[a][i]]]" repeat(s), otherwise set "sameVL" to zero. Finally the process terminates at an end state 2470.

FIG. 34 shows state 2458 of the process 106. FIG. 42 lists the resulting secondary relational features of the process 2458 and FIG. 35 illustrates the overall process 2458. This process employs the first phase of the symbolic reshaping scheme. In summary, the process 2458 performs the following tasks listed below for alphanumeric "a", as it uses some of the variables pre-stored in the database (see FIG. 58) and as another preferred embodiment of the invention, it uses the derived variance types and levels shown in FIG. 56:

i) Capture for each arcpoly belonging to alphanumeric "a", for all logical symbol options and subclass symbols options, a series of logical symbols, subclass symbols, associated logical symbol option indices, and associated subclass symbol option indices whereby any one of the alphanumeric symbols generated by the arcpoly's structure-to-alphanumeric mappings pertaining to the combined logical- and subclass-symbols matches with the database's candidate alphanumeric symbol, as illustrated in states 2542–2596.

ii) Determine redundant (or alternative) repeated pairs of logical- and sub-class-symbols and establish alternating (or toggle) block of the appropriate arcpoly", as illustrated in states 2670–2722.

iii) Capture for each database alphanumeric symbols representation option, a series of logical- and subclass-symbols pair(s) that result in a one-to-one match with the counterpart database logical- and subclass-symbols pair(s) using forward and in certain situations backward search technique, as illustrated in states 2732–2798.

iv) Identify extra mismatched arcpoly(s) and derive cost values for each extra arcpoly and the collective extra arcpoly(s), as illustrated in states 2846–2864.

v) Identify missed database logical- and subclass-symbols pair(s) and derive cost values for each missed arcpoly and the collective missed logical- and subclass-symbols pair(s), as illustrated in states 2870–2876.

vi) Derive a new arcpoly structural variance comprising cost values for shape variance and rotation, as illustrated in states 2880–2886.

vii) Establish and implement a "discard criteria" for database's candidate alphanumeric symbol option", as illustrated in states 2888–2952.

viii) Compute connection codes' cost value pertaining to relationships, as illustrated in state 2898.

ix) Compute secondary relational features per database's candidate alphanumeric symbol option", as illustrated in states 2918–2990.

x) Establish the best database option's "secondary relational features", as illustrated in states 2954–2990.

As another preferred embodiment of the invention, candidate alphanumeric symbols undergo the second series of elimination whereby candidate alphanumeric symbols are discarded whose selective feature values belonging to the secondary relational feature set exceed preset criteria-based thresholds (see step (vii). Moreover, the third of the series of elimination of candidate alphanumeric symbols comprises discarding candidate alphanumeric symbols whose topological separation(s) exceed(s) a predefined value. The predefined values are derived empirically. Furthermore, normalized structural sizes of each modeled arcpoly associated with a pair of logical and subclass symbols are stored in the database to allow the derivation of cost value pertaining to missed arcpoly(s), as described in step (v).

The process 2458 begins at a start state 2540 and moves to state 2542 wherein variables are initialized pertaining to the post-invocation of alphanumeric "a" and its candidate symbols. The process 2458 moves to state 2544 wherein allows states 2546-to-2592 to be repeated for p=0, . . . , pnum[a]−1 and then moves to state 2546 wherein allows states 2548-to-2590 to be repeated for k=0, . . . , knum[a][p]−1. The process 2458 moves to the decision state 2548. Note that "skipped pairs" refer to "pr[j]", "kr[j]", where j=0, . . . , vnumr−1 and represent a set of polyline and arcpoly(s) that will not be considered as belonging to alphanumeric "a", as "vnumr" is set to zero in this invention. If the results of the decision state 2548 are in the affirmative, the process 2458 moves to state 2550 to increment "kp" (initially set at −1) by one, initialize "cnk1[kp]" and "optcnt" to −1, and assign "p" and "k" to "pmap[a][kp]" and "kmap[a][kp]", respectively. The process 2458 moves to state 2552 wherein allows states 2554-to-2588 to be repeated for opt=0, . . . , numSubClassOpt[a][p][k]−1 and then moves to state 2554 to increment "optcnt" by one and compute "scc", "sc1", "xsubc1[p][k][opt]", "optmapa[kp][opt]". The process 2458 moves to the decision state 2556. If the result of the decision state 2556 is in the affirmative, the process 2458 moves to state 2558 to set "opdif" to zero and then moves to the decision state 2562. Otherwise, the process 2458 moves to state 2560 to set "opdif" to two and then moves to the decision state 2562. If a determination is made in the decision state 2562 that "opdif" exceeds zero, the process 2458 moves state 2564 to increment "optcnt" by one and compute "sc2", "xsubc2[p][k][opt]", and "optmapb[kp][opt]" and then moves to state 2568 to set "prcd" to one. Otherwise, the 2458 moves to state 2566 to set "xsubc2[p][k][opt]" to one and then to move to state 2568.

The process 2458 then moves to state 2570 wherein allows states 2572-to-2574 to be repeated for v=0, . . . , numscToC[scc][sc1]−1. The process 2458 moves to the decision state 2572. If the results of the decision state 2572 are in the affirmative, the process 2572 moves to state 2576 to set "prcd" to zero, increment "cntk1[kp]" by one, and compute "subcc[kp][cntk1[kp]]", "subc[kp][cntk1[kp]]", "optmapV[kp][cntk1[kp]]", "optmapW[kp][cntk1[kp]]" and then moves to the decision state 2578. Otherwise, the process 2458 moves to the decision state 2574. If the result of the decision state 2574 is in the affirmative, the process 2458 moves to state 2580 to begin another cycle. Otherwise, the process 2458 moves to the decision state 2578. If a determination is made in the decision state 2578 that "opdif" exceeds one, the process 2458 moves to state 2580 wherein allows states 2582-to-2584 to be repeated for v=0, . . . , numscToC[scc][sc2]−1.

The process 2458 moves to the decision state 2582. If the results of the decision state 2582 are in the affirmative, the process 2458 moves to state to 2586 to set "prcd" to zero, compute "subcc[kp][cntk1[kp]]", "subc[kp][cntk1[kp]]", "optmapV[kp][cntk1[kp]]", "optmapW[kp][cntk1[kp]]" and increment "cntk1[kp]" by one, and then moves to the decision state 2588. Otherwise, the process 2458 moves to the decision state 2584. If the result of the decision state 2584 is in the affirmative, the process 2458 moves to state 2580 to begin another cycle. Otherwise, the process 2458 moves to the decision state 2588. If the result of the decision state 2578 not in the affirmative, the process 2458 moves to the decision state 2588. If the result of the decision state 2588 is in the affirmative, the process 2458 moves to state 2552 to begin another cycle. Otherwise, the process 2458 moves to the decision state 2590. If the result of the decision state 2548 not in the affirmative, the process 2458 moves to the decision state 2590. If a determination is made in the decision state 2590 that k<knum[a][p]−1, the process 2458 moves to state 2546 to begin another cycle. Otherwise, the process 2458 moves to the decision state 2592. If the result of the decision state 2592 is in the affirmative, the process 2458 moves to state 2544 to begin another cycle. Otherwise, the process 2458 moves to state 2594 to set "Nkp1ys[a]" and "km" to "kp+1" and then moves to state 2596 to discard any possible repeats amongst the elements of the "subcc" and "subc" vectors.

Next, the process 2458 moves to state 2598 to initialize "qstrt" to zero and then moves to state 2600 to initialize "kv" to zero and moves to state 2602 wherein allows states 2604-to-2658 to be repeated for q=qstrt, . . . , numAlphaNumr−1. Note that "numAlphaNumr" refers to the number of modeled structural and alphanumeric symbols in the database. Then, the process 2458 moves to state 2604 wherein initialization occurs and then moves to state 2606 wherein allows states 2608-to-2612 to be repeated for q1=0, . . . , dcnt. The process 2458 moves to the decision state 2608. If a determination is made in the decision state 2608 that "gmcnd[q1]" is equal to "q" the process 2458 moves to state 2610 to set "mtchq" to one and then moves to the decision state 2612. Otherwise, the process 2458 moves directly to the decision state 2612. If the result of the decision state 2612 is in the affirmative, the process 2458 moves to state 2606 to begin another cycle. Otherwise, the process 2458 moves to the decision state 2614. If a determination is made in the decision state 2614 that "mtchq" is equal to one, the process 2458 moves to state 2616 to initialize "mtchp" to one and then moves to the decision state 2618. If the result of the decision state 2618 is in the affirmative, the process 2458 moves to state 2620 to set "mtchp" to zero and then moves to the decision state 2622. Otherwise, the process 2458 moves directly to the decision state 2622. If a determination is made in the decision state 2622 that "q" is greater than zero, the process 2458 moves to state 2624 to revise the "Ccnd" and then moves to the decision state 2626. Otherwise, the process 2458 moves directly to the decision state 2626. Note that when the alphanumeric candidate symbol is cursive, their integer value is changed to distinguish them from their non-cursive counter-part when used for computing "idxC[a][Ccnd]" and then changed back to their original values for other applications (i.e., cursive "b"). If a determination is made in the decision state 2626 that "mtchp" is equal to one, the process 2458 moves to the decision state 2628. If the result of the decision state 2614 or 2626 or 2628 is not in the affirmative, the process 2458 moves to state 2638 to compute "idc2". If the result of the decision state 2628 is in the affirmative, the process 2458 moves to state 2630 to revise "Ccnd" and set "idxC[a][Ccnd]" and "idxc1" to "q" and then moves to state 2632 to initialize all elements of the "kpTokv2" vector per "idxC[a][Ccnd]" to −1.

Thereafter, the process 2458 moves to state 2634 to initialize "NmissSubcs[a][idxC[a][Ccnd]]", "missInC[a][idxC[a][Ccnd]]", "extrInC[a][idxC[a][Ccnd]]", "TscVL[a][idxC[a][Ccnd]]", and "NextrUnmtch[a][idxC[a][Ccnd]]" to zero and then moves to state 2636 to set "cntu" to one. The process 2458 moves to state 2638 to assign "idxC[a][Ccnd]" to "idxc2" and then to state 2640 to initialize "prcdn" to one. The process 2458 moves to the decision state 2642. If the results of the decision state 2642 are in the affirmative, the process 2458 moves to state 2644 to revise "Ccnd" and then moves to state 2646 wherein allows states 2648-to-2652 to be repeated for h1=0, . . . , NneverC. Otherwise, the process 2458 moves directly to state 2646. The process 2458 moves to the decision state 2648. If the result of the decision state 2648 is in the affirmative, the process 2458 moves to state 2650 to set "prcdn" to zero and then moves to the decision state 2652. Otherwise, the process 2458 moves directly to state 2652. If a determination is made in the decision state 2652 that h1<NneverC, the process 2458 moves to state 2646 to begin another cycle. Otherwise, the process 2458 moves to the decision state 2654. If the results of the decision state 2654 are in the affirmative, the process 2458 moves to state 2660 to compute "qstrt" and then moves to the decision state 2664. Otherwise, the process 2458 moves to state 2656 to set "all" to one and then moves to the decision state 2658. If a determination is made in the decision state 2658 that q<numAlphaNumr−1, the process 2458 moves to state 2602 to begin another cycle. Otherwise, the process 2458 moves to state 2664 wherein allows states 2666-to-2940 to be repeated for op=0, . . . , numGSOpt][idxc1]−1, where "idxc1" is equal to "idxC[a][Ccnd]" and then moves to state 2666 to initialize "mtch" to zero, "cnt" to −1, and the vectors "option" and "hist" to −1 and then moves to the decision state 2668. "numGSOpt[idxc1]" refers to the number of database models (or representations) per database alphanumeric symbol identified by index, "idxc1". If the results of the decision state 2668 are in the affirmative, the process 2458 moves to state 2670 wherein allows states 2672-to-2702 to be repeated for i=0, . . . , kvNum2[idxc1][op]−1. The process 2458 moves to state 2672 to initialize "mtch1" to zero and initialize "kp" and "cnt" to −1.

Next, the process 2458 moves state 2674 wherein allows states 2676-to-2696 to be repeated for q1=0, . . . , pnum[a]−1 and then moves to state 2676 wherein allows states 2678-to-2686 to be repeated for q2=0, . . . , knum[a][q1]−1. The process 2458 moves to state 2678 to increment "kp" by one and then moves to state 2680 wherein allows states 2682-to-2688 to be repeated for a2=0, . . . , numSubClassOpt[a][q1][q2]−1. The process 2458 moves to the decision state 2682. If the result of the decision state 2682 is in the affirmative, the process 2458 moves to the decision state 2688. Otherwise, the process 2458 moves to the decision state 2684. If the result of the decision state 2684 is in the affirmative, the process 2458 moves to state 2680 to begin another cycle. Otherwise, the process 2458 moves to the decision state 2686. If the result of the decision state 2686 is in the affirmative, the process 2458 moves to state 2676 to begin another cycle. Otherwise, the process 2458 moves to the decision state 2696. If the result of the decision state 2688 is in the affirmative, the process 2458 moves to state 2690 to set "mtch1" to one, increment "cnt" by one, and compute "kpCmn2[i][cnt]" and "optCmn2[i][cnt]" and then moves to the decision state 2692. Otherwise, the process 2458 moves to the decision state 2684. If a determination is made in the decision state 2692 that "cnt>=1", the process 2458 moves to state 2694 to assign 1 to "mtch" and set "idx" to 1 and then moves to state 2700 to compute "kpCmn[0]", "optCmn[0]", "kpCmn[1]", and "optCmn[1]". Otherwise, the process 2458 moves to the decision state 2696. If the result of the decision state 2696 is in the affirmative, the process 2458 moves to state 2674 to begin another cycle. Otherwise, the process 2458 moves to the decision state 2698. If a determination is made in the decision state 2698 that "mtch" is equal to one, the process 2458 moves to state 2700 and then moves to state 2704 to increment "vtoggle2[idxc1][op]" by one. Otherwise, the process 2458 moves to the decision state 2702. If the result of the decision state 2702 is in the affirmative, the process 2458 moves to state 2670 to begin another cycle. Otherwise, the process 2458 moves to state 2728.

Thereafter, from state 2704, the process 2458 moves to the decision state 2706. If a determination is made in the decision state 2706 that "vtoggle2[idxc1][op]" is even, the process 2458 moves to the decision state 2708. If a determination is made in the decision state 2708 that "vtoggle2 [idxc1][op]" is equal to zero, the process 2458 moves to the decision state 2710. If the result of the decision state 2710 is in the affirmative, the process 2458 moves to state 2712 wherein "skipKp[idxc1][op]" is computed and "vchoice0 [idxc1][op]" is set to one, and then moves to state 2728. Otherwise, the process 2458 moves to state 2714 wherein "skipKp[idxc1][op]" is computed and "vchoice0[idxc1] [op]" is set to zero, and then moves to state 2728. If the result of the decision state 2708 is not in the affirmative, the process 2458 moves to the decision state 2716. If the result of the decision state 2716 is in the affirmative, the process 2458 moves to state 2718 to set "skipKp[idxc1][op]" to "kpCmn[0]" and then moves to state 2728. Otherwise, the process 2458 moves to state 2720 to set "skipKp[idxc1] [op]" to "kpCmn[1]" and then moves to state 2728. If a determination is made in the decision state 2706 that "vtoggle2[idxc1][op]" is odd, the process 2458 moves to the decision state 2722. If the result of the decision state 2722 is in the affirmative, the process 2458 moves to state 2716 set "skipKp[idxc1][op]" to "kpCmn[1]" and then moves to state 2728. Otherwise, the process 2458 moves to state 2718 to set "skipKp[idxc1][op]" to "kpCmn[0]" and then moves to state 2728 wherein allows states 2730-to-2938 to be repeated for v1=0, 1.

Next, the process 2458 moves to state 2730 to assign zero to "vnum[op]" and then moves to state 2732 for initialization. The process 2458 moves to the decision state 2734. If a determination is made in the decision state 2734 that "v1" is equal to zero, the process 2458 moves to state 2736 wherein allows states 2738-to-2764 to be repeated for q=0, ..., nStruc2[op][idxc1]−1 and then moves to state 2738 allows states 2740-to-2762 to be repeated for kp= 0, ..., Nkplys[a]−1. The process 2458 moves to the decision state 2740. If the result of the decision state 2740 is in the affirmative, the process 2458 moves to state 2742 wherein "mtchq" is set to one and then moves to state 2744 to set "mtchsub" to zero. Otherwise, the process 2458 moves directly to state 2744 and then moves to the decision state 2746. If a determination is made in the decision state 2746 that "mtchq" is equal to zero, the process 2458 moves to state 2748 wherein allows states 2750-to-2752 to be repeated for q2=0, ..., cntk1[kp]−1, and then moves to the decision state 2750, as described in FIG. 46. If the results of the decision state 2750 are in the affirmative, the process 2458 moves to the decision state 2754. Otherwise, the process 2458 moves to the decision state 2752. If the results of the decision state 2754 are in the affirmative, the process 2458 moves to state 2756 to set "mtchsub" to one, and compute "v1subcc", v1subc", "option[kp]", and "option2 [kp]" and then moves to the decision state 2758. Otherwise, the process 2458 moves to the decision state 2752. If a determination is made in the decision state 2752 that q2<cntk1[kp]−1, the process 2458 moves to state 2748 to begin another cycle. Otherwise, the process 2458 moves to the decision state 2758. If a determination is made in the decision state 2758 that "mtchsub" is equal to one, the process 2458 moves to state 2760 to increment "vnump[op]" by one and compute "opmapI[op][vnum[op]−1]", "opmapII [op][vnum[op]−1]", "pmap2[op][vnum[op]−1]", "kmap2 [op][vnum[op]−1]", "v2subcc[op][vnum[op]−1]", "vsubc [op][vnum[op]−1]", "pair[op][vnum[op]−1]", "k1[op] [vnum[op]−1]", "kptokv[op][vnum[op]−1][kp]", "hist [vnum[op]−1]", "option2[kp]" and then moves to the decision state 2764. Otherwise, the process 2458 moves to the decision state 2762. If the result of the decision state 2762 is in the affirmative, the process 2458 moves to state 2738 to begin another cycle. Otherwise, the process 2458 moves to the decision state 2764. If the result of the decision state 2764 is in the affirmative, the process 2458 moves to state 2736 to begin another cycle. Otherwise, the process 2458 moves to the decision state 2766. If the result of the decision state 2734 is not in the affirmative, the process 2458 moves to the decision state 2766. Next, if a determination is made in the decision state 2766 that "v1" is equal to one, the process 2458 moves to state 2770. The process 2458 then performs states 2772-to-2798 exactly as described in states 2736-to-2764. Otherwise, the process 2458 moves to decision state 2800.

Next, if the result of the decision state 2800 is in the affirmative, the process 2458 moves to state 2802 wherein allows states 2804-to-2806 to be repeated for qv=0, ..., vnum[op]−1, and then moves to state 2804 to assign "v2subcc[op][qv]" to "v4subcc[qv]" and "v2subc[op][qv]" to "v4subc[qv]". The process 2458 moves to the decision state 2806. If the result of the decision state 2806 is in the affirmative, the process 2458 moves to state 2802 to begin another cycle. Otherwise, the process 2458 moves to the decision state 2818. If the result of the decision state 2800 is not in the affirmative, the process 2458 moves to state 2808 to initialize "sameperOp" to one and then moves to state 2810 wherein allows states 2812-to-2816 to be repeated for qv=0, ..., vnum[op]−1. The process 2458 moves to the decision state 2812. If the result of the decision state 2812 is in the affirmative, the process 2458 moves state 2814 to set "sameperOp" to zero and then moves to the decision state 2816. Otherwise, the process 2458 moves directly to the decision state 2816. If the result of the decision state 2816 is in the affirmative, the process 2458 moves to state 2810 to begin another cycle. Otherwise, the process 2458 moves to the decision state 2818.

Next, if the result of the decision state 2818 is in the affirmative, the process 2458 moves to state 2820 to initialize all elements of the "kptokv2" vector to −1, set "Copt[a] [idxc1]" and "vidxo" to "op", "kvNum[a][idxc1]", and "kv" to "vnum[vidxo] and then moves to state 2824 wherein allows states 2826-to-2830 to be repeated for i=0, ..., kv−1. The process 2458 moves to state 2826 wherein "vsubcc[a] [idxc1][i]", "vsubc[a][idxc1][i]", "optmapI[a][idxc1][i]", "optmapII[a][idxc1][i]", "pmap44[a][idxc1][i]", "kmap44 [a][idxc1][i]", "kpTokv2[a][idxc1][k1[vidxo][i]]" are computed. The process 2458 moves to state 2828 wherein "ccnd1" and "pairc[i]" are computed and then moves to the decision state 2830. If a determination is made in the decision state 2830 that i<kv−1, the process 2458 moves to state 2824 to begin another cycle. Otherwise, the process 2458 moves to state 2832 to assign zero to "discrd" and set "km" to "Nkplys[a]" and "kv" to "kvNum[a][idxc1][i]". The process 2458 then moves to the decision state 2834. If the results of the decision state 2834 are in the affirmative, the process 2458 moves to state 2836 to assign one to "discrd", increment "dcnt" by one and set "gmcnd[dcnt]" to "idxc1" and then moves to the decision state 2840. Otherwise, the process 2458 moves to the decision state 2838. If the results of the decision state 2838 are in the affirmative, the process 2458 moves to state 2836 and then moves to the decision state 2840. Otherwise, the process 2458 moves directly to the decision state 2840.

Next, if a determination is made in the decision state 2840 that "discrd" is equal to zero, the process 2458 moves to state 2842 to increment "any" by one and then moves to state 2846 wherein allows states 2848-to-2856 to be repeated for p=0, ..., pnum[a]−1 and then moves to state 2848 wherein allows states 2850-to-2854 to be repeated for k=0, . . . , knum[a][p]−1. Then, the process 2458 moves to the decision state 2850. If the result of the decision state 2850 is in the affirmative, the process 2458 moves to state 2852 to compute "numz", "extrUnmtch[a][idxc1][numz]", "pextra2 [numz]", "kextra2[numz]", and increment "numz" and "NextrUnmtch[a][idxc1]" by one and then moves to the decision state 2854. Otherwise, the process 2458 moves directly to the decision state 2854. If the result of the decision state 2854 is in the affirmative, the process 2458 moves to state 2848 to begin another cycle. Otherwise, the process 2458 moves to the decision state 2856. If the result of the decision state 2856 is in the affirmative, the process 2458 moves to state 2846 to begin another cycle. Otherwise, the process 2458 moves to state 2858 wherein allows states 2860-to-2864 to be repeated for w2=0, . . . , NextrUnmtch[a][idxc1]−1 and then moves to state 2860 wherein "w7", "idxa", "pw2", and "kw2" are computed. The process 2458 moves to state 2862 to compute "extrInC[a][idxc1]", "TscVL[a][idxc1]", "extrInC1[a][idxc1][w7]", "subcc2" and "subc2" and then moves to the decision state 2864. If a determination is made in the decision state 2864 that w2<NextrUnmtch[a][idxc1]−1, the process 2458 moves to state 2858 to begin another cycle. Otherwise, the process 2458 moves to state 2866 wherein "NextrUnmtch2[idxc1][op]" is set to "NextrUnmtch[a][idxc1]" and then moves to state 2870 wherein allows states 2872-to-2876 to be repeated for q=0, . . . , nStruc2[vidxo][idxc1]−1 and then moves to the decision state 2872. If the result of the decision state 2872 is in the affirmative, the process 2458 moves to state 2874 to increment "NmissSubcs[a][idxc1] by one, and compute "numz", "missSubcs[a][idxc1][numz−1]", "missInC1[a][idxc1][q]" (see FIG. 57), and "subcc2", and to revise "missInC[a][idxc1]" and "TscVL[a][idxc1]". The process 2458 moves to the decision state 2876. If the result of the decision state 2876 is in the affirmative, the process 2458 moves to state 2870 to begin another cycle. Otherwise, the process 2458 moves to state 2878 wherein "Nmiss-Subcs2[idxc1][op]" is set to "NmissSubcs[a][idxc1]" and then moves to state 2880 wherein allows states 2882-to-2886 to be repeated for kp=0, . . . , kv−1.

Thereafter, the process 2458 moves to state 2882 wherein "p", "k", "idxa", and "idxc" are computed and then moves to state 2884 wherein "scRotVL[a][idxc1][kp]", "rotVL[a][p][k]", "scVL[a][idxc1]", and "TscVL[a][idxc1]" are computed. The process 2458 moves to the decision state 2886. If the result of the decision state 2886 is in the affirmative, the process 2458 moves to state 2880 to begin another cycle. Otherwise, the process 2458 moves to state 2888 wherein "kvNum2[idxc1][op]" is set to "kvNum[a][idxc1]". The process 2458 moves to state 2890 wherein allows states 2892-to-2894 to be repeated for z=0, . . . , kvNum[a][idxc1]1 and then moves to state 2892 to compute "vsubcc[idxc1][op][z]" and "vsubc[idxc1][op][z]". The process 2458 moves to the decision state 2894. If the result of the decision state is in the affirmative, the process 2458 moves to state 2890 to begin another cycle. Otherwise, the process 2458 moves to the decision state 2896. If the result of the decision state 2896 is in the affirmative, the process 2458 moves to state 2898 to compute "tplVL[a][idxc1]" and determine the Boolean value of "discard[any]", and then moves to the decision state 2900. Otherwise, the process 2458 moves directly to the decision state 2900. If a determination is made in the decision state 2900 that "discard[any]" is equal to zero, the process 2458 moves to state 2902 to increment "TscVL[a][idxc1]" by "tplVL[a][idxc1]" and then moves to the decision state 2904. Otherwise, the process 2458 sets "TscVL[a][idxc1]" to 1000 and then moves to state 2910 to assign "TscVL[a][idxc1]" to "vminb[v1]". If the result of the decision state 2904 is in the affirmative, the process 2458 moves to state 2906 to assign one to "discard[any]" and then moves to state 2910. Otherwise, the process 2458 moves directly to the decision state 2910. The process 2458 moves to the decision state 2912. If the result of the decision state 2912 is in the affirmative the process 2458 moves to state 2914 to decrement "any" by one and then moves to the decision state 2938. Otherwise, the process 2458 moves to states 2916-to-2936 wherein variables pertaining to the secondary relational features in FIG. 42 are re-assigned to similar variables, except the indices, "[a][idxc1]" on the right side are replaced by the "[any]" index on the left side. From state 2936, the process 2458 moves to the decision state 2938. If the result of the decision state 2938 is in the affirmative, the process 2458 moves to state 2728 to begin another cycle. Otherwise, the process 2458 moves to the decision state 2940. If the result of the decision state 2940 is in the affirmative, the process 2458 moves to state 2664 to begin another cycle. Otherwise, the process 2458 moves to the decision state 2942. If the result of the decision state 2942 is in the affirmative, the process 2458 moves to state 2944 to assign one to "satisf" and then moves to the decision state 2946. Otherwise, the process 2458 moves directly to the decision state 2946. If the results of the decision state 2946 are in the affirmative, the process 2458 moves to state 2600 to begin another cycle. Otherwise, the process 2458 moves to state 2948 to increment "any" by one. The process 2458 moves to the decision state 2950. If the result of the decision state 2950 is in the affirmative, the process 2458 moves to state 2952 to set "discrd" to zero and then moves to state 2954 wherein allows states 2956-to-2866 to be repeated for q=0, . . . , any −1. Otherwise, the process 2458 moves directly to state 2954.

Next, the process 2458 moves to the decision state 2956. If a determination is made in the decision state 2956 that "kvNumv[q]" is not equal to zero, the process 2458 moves to state 2960 to set "fctr" to "TscVLv[q]/kvNumv[q]" and then moves to the decision state 2962. Otherwise, the process 2458 moves to state 2958 to assign 10000 to "fctr" and then moves to the decision state 2962. If the result of the decision state 2962 is in the affirmative, the process 2458 moves to state 2964 to set "min" to "fctr" and "idxt" to "q" and then moves to the decision state 2966. Otherwise, the process 2458 moves directly to the decision state 2966. If the result of the decision state 2966 is in the affirmative, the process 2458 moves to state 2954 to begin another cycle. Otherwise, the process 2458 moves to the decision state 2968. If a determination is made in the decision state 2968 that "idxt" is equal to −1, the process 2458 terminates at an end state 2992. Otherwise, the process 2458 moves to states 2970-to-2990 wherein the reverse of the process described above from states 2916-to-2936 occurs, namely the index, "[idxt]" on the right side is replaced by the "[a][idxc1]" indices on the left side. Finally, from state 2990, the process 2458 terminates at an end state 2992.

As another preferred embodiment of the invention, FIG. 35 shows state 2898 of the process 2458 to compute variation cost value (or alphanumeric dissimilarity value) for alphanumeric "a". FIG. 59 illustrates the overall process 2898 as it uses some of the variables pre-stored in the database (see FIG. 58 and FIG. 56). Moreover, a set of variances comprising a set of arcpoly variance types, a set of counterpart dissimilarity values and a topological dissimilarity value per pair of arcpolys' relative location are stored in the database. The process 2898 includes the following major steps:

i) Derive threshold value by:
   determining connection code, and
   determining the x- and y-coordinate(s) of the major point(s) on each arcpoly belonging to the alphanumeric "a" used for the computation of variation cost value, by:
      revising the original logical symbol with the 'logical symbol option' index of zero,
      revising the original logical symbol with the first 'logical symbol option' and the associated database logical- and subclass-symbols pair, and computing extreme point's code.
ii) Select appropriate pair(s) of arcpolys belonging to alphanumeric "a" that directly takes part in the variation cost value computation.
iii) Establish a one-to-one correspondence between the pair(s) of arcpoly(s) and database logical- and subclass-symbols pair(s) belonging to the database alphanumeric candidate symbol.
iv) Compute variation cost value for each of the pair(s) of arcpoly(s) and database logical- and subclass-symbols pair(s).
v) Compute variation cost value for each of the mismatched pair(s) of arcpoly(s) and database logical- and subclass-symbols pair(s).
vi) Integrate the said variation cost values that includes the topological cost value to generate the total alphanumeric variation cost.

The process 2898 begins at a start state 2994 and moves to state 2996 wherein a subset of the variables pertaining to the computation of "tplVL[a][idxc1]" are initialized. The process 2898 moves to the decision state 2998. If a determination is made in the decision state 2998 that "Ccnd" is equal to "o", "O", "0", "Q", or "a", the process 2898 moves to state 3000 to set "circle" to one, and then moves to state 3002 to compute threshold variables, "tfctr", "vfctr[idxc1]", "vtplThrsh", and set "idxo" to "Copt[a][idxc1]". Otherwise, the process 2898 moves directly to state 3002. The process 2898 moves to state 3004 to initialize "tplVL[a][idxc1]", and the vectors "midPrb" and "missVL" to zero. The process 2898 moves to state 3006 wherein allows states 3008-to-3012 to be repeated for all arcpoly(s) belonging to alphanumeric "a" and then moves to the decision state 3008. If the result of the decision state 3008 is in the affirmative, the process 2898 moves to state 3010 to set "midPrb" pertaining to the appropriate polyline and arcpoly to one and then moves to decision state 3012. If the result of the decision state 3012 is in the affirmative, the process 2898 moves directly to state 3006 to begin another cycle. Otherwise, the process 2898 moves to state 3014 to compute the lowest point, "ybot" of all polyline(s) and arcpoly(s) belonging to alphanumeric "a". The process 2898 moves to state 3016 to assign "vtplThrsh" to "topolThrsh[a][idxc1]" and then moves to state 3018 wherein allows states 3020-to-3028 to be repeated for j=0, . . . , Ntplgy[idxc1][idxo]−1. The process 2898 moves to the decision state 3020. If the result of the decision state 3020 is in the affirmative, the process 2898 moves to state 3022 to increment "gcnt" by one and compute "gtpl[gcnt]" and then moves to the decision state 3024. Otherwise, the process 2898 moves to the decision state 3028. If a determination is made in the decision state 3024 that "gtpl[gcnt]" matches with '4', '3', '5', or '7', the process 2898 moves to state 3026 to assign one to "midcon" and then moves to the decision state 3028. Otherwise, the process 2898 moves directly to the decision state 3028. If the result of the decision state 3028 is in the affirmative, the process 2898 moves to state 3018 to begin another cycle. Otherwise, the process 2898 moves to state 3030 to increment "gcnt" by one and then moves to the decision state 3032. If a determination is made in the decision state 3032 that "pnum[a]" exceeds one, the process 2898 moves to the decision state 3034. If a determination is made in the decision state 3034 that "midcon" is equal to zero, the process 2898 moves to state 3036 to revise "vtplThrsh" and then moves to state 3040 to further revise "vtplThrsh" and set "topolThrsh[a][idxc1]" to "vtplThrsh". Otherwise, the process 2898 moves to state 3038 to revise "vtplThrsh" and then moves to state 3040. If the result of the decision state 3032 is not in the affirmative, the process 2898 moves to state 3040. The process 2898 moves to the decision state 3042. If a determination is made in the decision state 3042 that the number of connection codes pre-stored in the database per "idxc1" and "idxo" exceeds zero, the process 2898 moves to state 3044 to initialize "mtchq" to zero and compute "tpl", "subcc[0]", and "subc[0]" and then moves to state 3046 wherein allows states 3048-to-3052 to be repeated for kq=0, . . . , kv−1. Then, the process 2898 moves to the decision state 3048. If the result of the decision state 3048 is not in the affirmative, the process 2898 moves to state 3046 to begin another cycle. Otherwise, the process 2898 moves to state 3052 to assign one to "mtchq" and set "kp[0]" to "kq" and then moves to state 3054 to compute "tpl", "subcc[1]" and "subc[1]".

Thereafter, the process 2898 moves to state 3056 wherein allows states 3058-to-3062 to be repeated for kq=0, . . . , kv−1 and then moves to the decision state 3058. If the result of the decision state 3058 is in the affirmative, the process 2898 moves to state 3060 to assign one to "mtchq" and set "kp[1]" to "kq" and then moves to state 3068 to compute "discrd" and revise "tplVL[a][idxc1]" and then moves to state 3078 wherein "idxk" is set to one. Otherwise, the process 2898 moves to the decision state 3062. If a determination is made in the decision state 3062 that kq<kv−1, the process 2898 moves to state 3056 to begin another cycle. Otherwise, the process 2898 moves to the decision state 3064. If a determination is made in the decision state 3064 that "mtchq" is equal to zero, the process 2898 moves to state 3066 wherein "tplVL[a][idxc1]" is incremented by 10, "missCnt" is incremented by one, and "missVL[tpl]" is set to 10, and then moves to the decision state 3070. If a determination is made in the decision state 3070 that "g+1" is equal to ',' the process 2898 moves to state 3072 wherein "tplVL[a][idxc1]" is incremented by 10 again, "missCnt" is incremented by one, "idxg" is incremented by two, and "missVL[tpl]" is incremented by 10, and then moves to the decision state 3146. Otherwise, the process 2898 moves directly to the decision state 3146. If the result of the decision state 3064 is not in the affirmative, the process 2898 moves to state 3068 and then moves to state 3078.

Thereafter, the process 2898 moves to state 3080 wherein "idxg" is incremented by one, "g" is set to "Gtplgy[idxc1][idxo][idxg]" and one is assigned to "mtchg" and then moves to the decision state 3082. If the result of the decision state 3082 is in the affirmative, the process 2898 moves to state 3084 to increment "idxk", set "mtchq" to zero, and compute "tpl", "subcc[0]", and "subc[0]". The process 2898 moves to state 3086 wherein allows states 3088-to-3098 to be repeated for kq=0, . . . , kv−1 and then moves to the decision state 3088. If the result of the decision state 3088 is in the affirmative, the process 2898 moves to the decision state 3090. If a determination is made in the decision state

3090 that "g" is equal to '*', the process 2898 moves to state 3092 to assign one to "mtchq" and set "kp[idxk]" to "kp[idxk−1]" and then moves to the decision state 3100. Otherwise, the process 2898 moves to the decision state 3094. If the results of the decision state 3094 are in the affirmative, the process 2898 moves to state 3096 to assign one to "mtchq" and set "kp[idxk]" to "kq" and then moves to the decision state 3100. Otherwise, the process 2898 moves to the decision state 3098. If the result of the decision state 3098 is in the affirmative, the process 2898 moves to state 3086 to begin another cycle. Otherwise, the process 2898 moves to the decision state 3100. If a determination is made in the decision state 3100 that "mtchq" is not equal to zero, the process 2898 moves to state 3102 wherein "mtchq" is set to zero, "idxk" is incremented by one, and "tpl", "subcc[1]", and "subc[1]" are computed and then moves to state 3104 wherein allows states 3106-to-3128 to be repeated for kq=0, . . . , kv−1. The process 2898 moves to the decision state 3106. If the result of the decision state 3106 is in the affirmative, the process 2898 moves to the decision state 3108. If the decision state 3108 is in the affirmative, the process 2898 moves to state 3110 to set "mtchq" to one and compute "kp[idxk]" and then moves to the decision state 3128. Otherwise, the process 2898 moves to the decision state 3112. If the results of the decision state 3112 are in the affirmative, the process 2898 moves to state 3114 to set "mtchr" to zero and then moves to state 3116 wherein allows states 3118-to-3122 to be repeated for s=0, . . . , (idxk−1)/2−1. The process 2898 moves to the decision state 3118. If the results of the decision state 3118 are in the affirmative, the process 2898 moves to state 3120 to set "mtchv" to one and then moves to the decision state 3122. Otherwise, the process 2898 moves directly to the decision state 3122. If a determination is made in the decision state 3122 that s1< (idxk−1)/2−1, the process 2898 moves to state 3116 to begin another cycle. Otherwise, the process 2898 moves to the decision state 3124. If a determination is made in the decision state 3124 that "mtchv" is equal to zero, the process 2898 moves to state 3126 to set "mtchq" to one and set "kp[idxk]" to "kq" and then moves to the decision state 3130. Otherwise, the process 2898 moves to the decision state 3128. If the results of the decision state 3082 are not in the affirmative, the process 2898 moves to the decision state 3130. If the results of the decision state 3106 are not in the affirmative, the process 2898 moves to the decision state 3128. If the results of the decision state 3112 are not in the affirmative, the process 2898 moves to the decision state 3128. If a determination is made in the decision state 3128 that kq<kv−1, the process 2898 moves to state 3104 to begin another cycle. Otherwise, the process 2898 moves to the decision state 3130. If a determination is made in the decision state 3100 that "mtchq" is equal to one, the process 2898 moves to state 3132 to increment "idxg" by one, then moves to state 3144 and then moves to the decision state 3142. Otherwise, the process 2898 moves to state 3134 wherein "tplVL[a][idxc1]" is incremented by 10, "missCnt" and "idxk" are incremented by one, and "missVL[tpl]" is incremented by 10, and then moves to the decision state 3136. If the result of the decision state 3136 is in the affirmative, the process 2898 moves to state 3138 wherein "tplVL[a][idxc1]" and "missVL[tpl]" are incremented by 10, "idxg" is incremented by three, and "missCnt" is incremented by one, and then moves to the decision state 3142. Otherwise, the process 2898 moves to state 3140 to increment "idxg" by one and then moves to the decision state 3142. If the results of the decision state 3142 are in the affirmative, the process 2898 moves to state 3080 to begin another cycle. Otherwise, the process 2898 moves to the decision state 3146. If the result of the decision state 3146 is in the affirmative, the process 2898 moves to state 3148 to set "missCntTplVL[a][idxc1]" to zero and then moves to the decision state 3150. If a determination is made in the decision state 3150 that "misscnt" exceeds zero, the process 2898 moves to state 3152 to revise "tplVL[a][idxc1]" and "missCntTplVL[a][idxc1]" and then moves to state 3154 to increment "idxk" by one. Otherwise, the process 2898 moves directly to state 3154.

Next, the process 2898 moves to state 3158 wherein allows states 3160-to-3178 to be repeated for i=0, . . . , pnum[a]−1. The process 2898 moves to state 3160 wherein allows states 3162-to-3176 to be repeated for j=0, . . . , knum[a][i]−1 and then moves to the decision state 3162. If the result of the decision state 3162 is not in the affirmative, the process 2898 moves to state 3164 to increment "k1" by one and then moves to the decision state 3166. If the result of the decision state 3166 is in the affirmative the process 2898 moves to the decision state 3168. If the result of the decision state 3168 is in the affirmative the process 2898 moves to state 3170 to increment "tcnt" by one and then moves to the decision state 3172. If a determination is made in the decision state 3172 that "tcnt" is greater than "extraTpl" the process 2898 moves to state 3174 to set "extrTpl[k1]" to one, and then increment "tplVL[a][idxc1]" and "noMtchPtsTplVL[a][idxc1]" by 10 and then moves to the decision state 3176. Otherwise, the process 2898 moves directly to the decision state 3176. If the result of the decision state 3162 is in the affirmative, the process 2898 moves to the decision state 3176. If the result of the decision state 3166 is not in the affirmative, the process 2898 moves directly to the decision state 3176. If the result of the decision state 3168 is not in the affirmative, the process 2898 moves directly to the decision state 3176. If the result of the decision state 3176 is in the affirmative, the process 2898 moves to state 3160 to begin another cycle. Otherwise, the process 2898 moves to the decision state 3178. If the result of the decision state 3178 is in the affirmative, the process 2898 moves to state 3158 to begin another cycle. Otherwise, the process 2898 terminates at an end state 3180. If the result of the decision state 3146 is not in the affirmative, the process 2898 terminates at the end state 3180.

FIG. 59 shows state 3068 of the process 2898. FIG. 60 illustrates the overall process 3068 as it uses some of the variables pre-stored in the database (see FIG. 58). The process 3068 begins at a start state 3202 and moves to state 3204 to assign "Gtplgy[idxc1][idxo][0]" to "g". The process 3068 moves to state 3206 wherein allows states 3208-to-3342 to be repeated for v=0, 1 and then moves to state 3208 to initialize "codeCnc" to −1, whereby "codeCnc" refers to the connection code (see FIG. 47). The process 3068 moves to the decision state 3210. If a determination is made in the decision state 3210 that "g" is equal to 'U', the process 3068 moves to state 3220 to set "codeCnc" to −2 and then moves to the decision state 3218. Otherwise, the process 3068 moves to the decision state 3212. If a determination is made in the decision state 3212 that "g" is equal to 'D', the process 3068 moves to state 3222 to set "codeCnc" to −4 and then moves to the decision state 3218. Otherwise, the process 3068 moves to the decision state 3214. If a determination is made in the decision state 3214 that "codeCnc" is equal to −1, the process 3068 moves to state 3216 to compute "codeCnc" as described in the look-up table shown in FIG. 47 and then moves to the decision state 3218. Otherwise, the process 3068 moves directly to the decision state 3218. If a determination is made in the decision state 3218 that codeCnc>=10, the process 3068 moves to state 3224 to divide "codeCnc" by 10 and then moves to the decision state 3226. Otherwise, the process 3068 moves directly to the decision state 3226. If a determination is made in the decision state 3226 that "choose" is equal to zero, the process 3068 moves to state 3228 to set "v1" to "v" and then moves to state 3232 to compute "osubcc", "num", "p8" and "k8" and set both "prcd" and "op" to one. Otherwise, the process 3068 moves to state 3230 to set "v1" to "idxk−1+v" and then moves to state 3232.

Next, the process 3068 moves to the decision state 3234. If the results of the decision state 3234 are in the affirmative, the process 3066 moves to state 3238 to compute "osubcc" and then moves to the decision state 3240. If the results of the decision state 3240 are in the affirmative, the process 3068 moves to state 3242 to increment "op" by one and then moves to the decision state 3244. Otherwise, the process 3068 moves to the decision state 3246. If the results of the decision state 3246 are in the affirmative, the process 3068 moves to state 3248 to increment "ctoggle[idxc1][idxo]" by one and set "yes" to one and then moves to the decision state 3250. If a determination is made in the decision state 3250 that "ctoggle[idxc1][idxo]" is even, the process 3068 moves to state 3252 to compute "deltax" and then moves to the decision state 3254. If the results of the decision state 3254 are in the affirmative, the process 3068 moves to state 3256 wherein "xa1", "ya1", "xb1", "yb1" and "edx" are computed and then moves to state 3258 to revise "osubcc" using the present value of "osubcc" and the "edx" results, as illustrated in the look-up table shown in FIG. 48. The process 3068 moves to state 3260 to assign zero to "prcd" and then moves to the decision state 3244. If the result of the decision state 3244 is in the affirmative, the process 3068 moves to state 3238 to begin another cycle. Otherwise, the process 3068 moves to the decision state 3262. If a determination is made in the decision state 3250 that "ctoggle[idxc1][idxo]" is odd, the process 3068 moves to state 3260. If the results of the decision state 3254 are not in the affirmative, the process 3068 moves to the decision state 3260.

Next, from the decision state 3262, the process 3068 moves to the decision state 3264. If the results of the decision state 3264 are in the affirmative, the process 3068 moves to state 3268 wherein "xstrt", "ystrt", "xdel", "ydel", "xpoint[v]" and "ypoint[v]" are computed and then moves the decision state 3270. Otherwise, the process 3068 moves directly to the decision state 3270. If the result of the decision state 3262 is not in the affirmative, the process 3068 moves to the decision state 3270. If the result of the decision state 3270 is in the affirmative, the process 3068 moves to state 3272 to compute "x1", "y1", "x2" and "y2" and then moves to the decision state 3274. If a determination is made in the decision state 3274 that y1>y2, the process 3068 moves to state 3278 to assign "x1" to "xpoint[v]" and "y1" to "ypoint[v]" and then moves to the decision state 3280. Otherwise, the process 3068 moves to state 3276 to assign "x2" to "xpoint[v]" and "y2" to "ypoint[v]" and then moves to the decision state 3280. If the result of the decision state 3270 is not in the affirmative, the process 3068 moves to the decision state 3280. If a determination is made in the decision state 3280 that "codeCnc" is equal to −4, the process 3068 moves to state 3280 to compute "x1", "y1", "x2" and "y2" and then moves to the decision state 3284. If a determination is made in the decision state 3284 that y1<y2, the process 3068 moves to state 3288 to assign "x1" to "xpoint[v]" and "y1" to "ypoint[v]" and then moves to the decision state 3290. Otherwise, the process 3068 moves to state 3286 to assign "x2" to "xpoint[v]" and "y2" to "ypoint[v]" and then moves to the decision state 3290. If the results of the decision state 3290 are in the affirmative, the process 3068 moves to state 3292 to set "caseO" to zero and then moves to the decision state 3294. If the results of the decision state 3294 are in the affirmative, the process 3068 moves to state 3296 wherein "l1" is computed and "x1pt" and "y1pt" are initialized to −1 and then moves to the decision state 3298. If a determination is made in the decision state 3298 that l1>=0, the process 3068 moves to state 3300 wherein one is assigned to "caseO", and "x1pt[v]" and "y1pt[v]" are computed and then moves to state 3302 to compute "fromSubcc" and "toSubcc". If the results of the decision state 3294 are not in the affirmative, the process 3068 moves to state 3302. If the result of the decision state 3294 is not in the affirmative, the process 3068 moves to state 3302. If the result of the decision state 3298 is not in the affirmative, the process 3068 moves to state 3302.

Next, from state 3302 the process 3068 moves to the decision state 3304. If the results of the decision state 3304 are in the affirmative, the process 3068 moves to state 3306 to revise "fromSubcc" using a look-up table shown in FIG. 49 and then moves to the decision state 3322. If the results of the decision state 3304 are not in the affirmative, the process 3068 moves to the decision state 3322. If the results of the decision state 3322 are in the affirmative, the process 3068 moves to state 3324 to revise "toSubcc" using a look-up table shown in FIG. 49 and then moves to states 3332-to-3340. Otherwise, the process 3068 moves directly to states 3332-to-3340 wherein "pt_code" (see FIG. 51 and FIG. 53 by way of example), "x1", "y1", "x2", "y2", "rpt", "cpt" (see FIG. 52), "xpoint[v]", "ypoint[v]", "poly[v]" and "karc[v]" are computed and then moves to the decision state 3342.

As another preferred embodiment of the invention, mappings are stored in the database from each arcpoly's (i) major point code and (ii) major points' locations to determine the arcpoly's point location, "rpt", "cpt," being indicative of a connection point location. Moreover, wherein major point codes are used to locate an arcpoly's extreme point and during the presence of line-to-line and arc-to-arc directional shifts and comprise 'U' for "up", 'D' for "down", 'L' for "left", 'R' for "right", '0' for "up-right", '1' for "down-right", '2' for "down-left", and '3' for "up-left" (see FIG. 51).

As another preferred embodiment of the invention, mappings and inverse mappings are stored in the database from/to (i) each derived arcpoly's topological code and (ii) logical symbol, to/from major point codes. Note that "pt_code" refers to the connection code pertaining to the extreme points, and "rpt" and "cpt" refer to one of the major points of the arcpoly belonging to alphanumeric "a". If a determination is made in the decision state 3342 that "v" is less than 1, the process 3068 moves to state 3206 to begin another cycle. Otherwise, the process 3068 moves to state 3344 to compute "dis" and then moves to the decision state 3346. If the results of the decision state 3346 are in the affirmative, the process 3068 moves to state 3348 to revise "dis" and then moves to state 3350 to compute "delta7". Otherwise, the process 3068 moves directly to state 3350. The process 3068 moves to the decision state 3352. If the results of the decision state 3352 are in the affirmative, the process 3068 moves to state 3354 to revise "dis" and then moves to state 3360 to compute "prcd7". Otherwise, the process 3068 moves directly to state 3360.

Next, the process 3068 moves to the decision state 3362. If the results of the decision state 3362 are in the affirmative, the process 3068 moves to state 3366 to increment "mtchTpl" by one, and compute "vxpt[mtchTpl−1][0]", "vypt[mtchTpl−1][0]", "vxpt[mtchTpl−1][1]", "vypt[mtchTpl−1][1]", and "Nscemi" and then moves to the decision state 3368. If a determination is made in the decision state 3368 that dis<Ncsemi, the process 3068 moves to state 3372 to increment "tplVL[a][idxc1]" by "Ncsemi" and then moves to the decision state 3374. Otherwise, the process 3068 moves to state 3370 to increment "tplVL[a][idxc1]" by "dis" and then moves to the decision state 3374. If the results of the decision state 3374 are in the affirmative, the process 3068 moves to state 3376 wherein "discrd" and "circlediscrd" are set to one, and then terminates at an end state 3386. Otherwise, the process 3068 moves directly to the decision state 3378. If the results of the decision state 3378 are in the affirmative, the process 3068 moves to the decision state 3380. If the results of the decision state 3380 are in the affirmative, the process 3068 moves to state 3382 to set "discrd" to one and then terminates at the end state 3386. Otherwise, the process 3068 moves to the decision state 3384. If the results of the decision state 3384 are in the affirmative, the process 3068 moves to state 3382 and then terminates at the end state 3384. If the results of the decision state 3378 are not in the affirmative, the process 3068 terminates at the end state 3384.

FIG. 3 shows state 108 of the process 40. FIG. 61 illustrates the overall process 108 as it begins at a start state 3400 and moves to state 3402 wherein a subset of the variables pertaining to the computation of the best alphanumeric candidate symbol are initialized. The process 108 moves to state 3404 to compute "tsc" and then moves to the decision state 3406. If a determination is made in the decision state 3406 that "vnumr" exceeds "NextrUnmtch[a][idxc10]", the process 108 moves to state 3408 to set "val" to "vnumr" and then moves to the decision state 3412. Otherwise, the process 108 moves to state 3410 to set "val" to "NextrUnmtch[a][idxc1]" and then moves to the decision state 3412. If the result of the decision state 3412 is in the affirmative, the process 108 moves to state 3414 wherein "Ccnd10", "idxc10", "tsc" are computed and "strt" is set to 2 and "cnd" is set to 1. The process 108 moves to the decision state 3416. If a determination is made in the decision state 3416 that "vnumr" exceeds "NextrUnmtch[a][idxc10]", the process 108 moves to state 3418 wherein "val" is set to "vnumr" and then moves to state 3422 wherein allows states 3424-to-3434 to be repeated for j=0, . . . , numCmnC[a]−1. If the results of the decision state 3412 are not in the affirmative, the process 108 moves to state 3422. The process 108 moves to state 3424 to assign one to "prcd". If the result of the decision state 3416 is not in the affirmative, the process 108 moves to state 3420 to assign "NextrUnmtch[a][idxc10]" to "val", then moves to state 3420, followed by states 3422 and 3424.

Next, the process 108 moves to the decision state 3426. If the results of the decision state 3426 are in the affirmative, the process 108 moves to the decision state 3428. If the results of the decision state 3428 are in affirmative, the process 108 moves to state 3430 to set "prcd" to zero and then moves to the decision state 3434. Otherwise, the process 108 moves directly to the decision state 3434. If the results of the decision state 3426 are not in the affirmative, the process 108 moves to the decision state 3432. If the result of the decision state 3432 is in the affirmative, the process 108 moves to state 3430 and then moves to the decision state 3434. Otherwise, the process 108 moves directly to the decision state 3434. If the results of the decision state 3434 are in the affirmative, the process 108 moves to state 3422 to begin another cycle. Otherwise, the process 108 moves to the decision state 3436. If a determination is made in the decision state 3436 that numCmnC[a]>1, then the process 108 moves to state 3438 wherein allows states 3440-to-3458 to be repeated for j=0, . . . , numCmnC[a]−1 and then moves to state 3440 to compute "Ccnd10" and "idxc10". The process 108 moves to the decision state 3442. If a determination is made in the decision state 3442 that "vnumr" is greater than "NextrUnmtch[a][idxc10]", the process 108 moves to state 3444 to assign "vnumr" to "val" and then moves to the decision state 3448. Otherwise, the process 108 moves to state 3446 to set "val" to "NextrUnmtch[a][idxc10]" and then moves to the decision state 3448.

Next, if the results of the decision state 3448 are in the affirmative, the process 108 moves to state 3450 to compute "fctr" and then moves to the decision state 3452. If the results of the decision state 3452 are in the affirmative, the process 108 moves to the decision state 3454. If a determination is made in the decision state 3454 that fctr<tsc, the process 108 moves to state 3456 to set "tsc" to "fctr" and assign "j" to "cnd" and then moves to the decision state 3458. If the results of the decision state 3448 are not in the affirmative, the process 108 moves to the decision state 3458. If the results of the decision state 3452 are not in the affirmative, the process 108 moves to the decision state 3458. If the result of the decision state 3454 is not in the affirmative, the process 108 moves to the decision state 3458. If a determination is made in the decision state 3458 that j<numCmnC[a]−1, the process 108 moves to state 3438. Otherwise, the process 108 moves to the state 3460 to compute "Ccnd" and "scrip[a]". If a determination is made in the decision state 3436 that "numCmnC[a]" does not exceed one, the process 108 moves to state 3460. Thereafter, the process 108 moves to state 3462 to initialize "noC" and "noCC" to −1. The process 108 terminates at an end state 3464.

Symbolic Reshaping

Figure 62A:
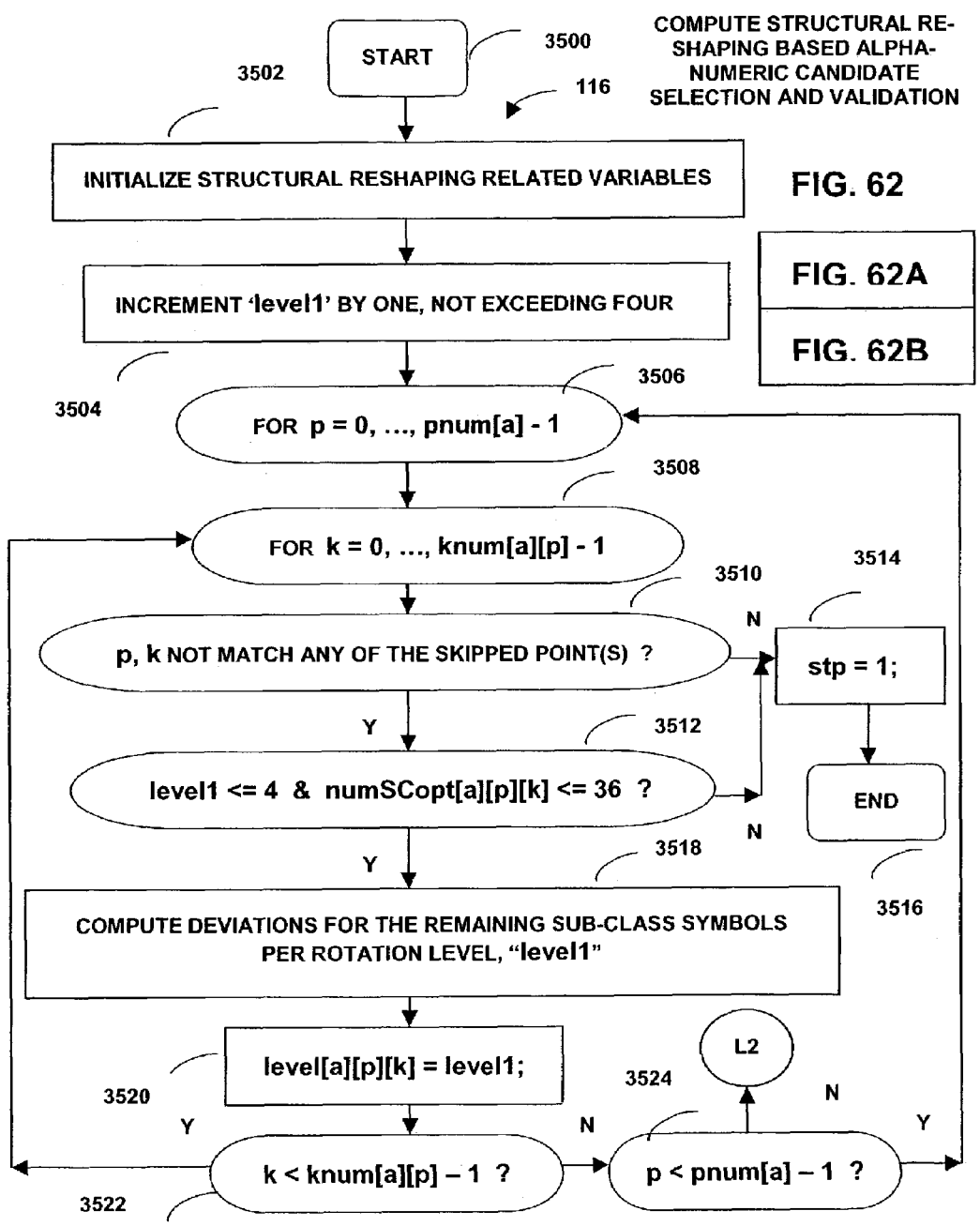
FIG. 62 is a flow diagram illustrating the computation of structural re-shaping based alphanumeric candidate symbol selection and validation.
Figure 62B:
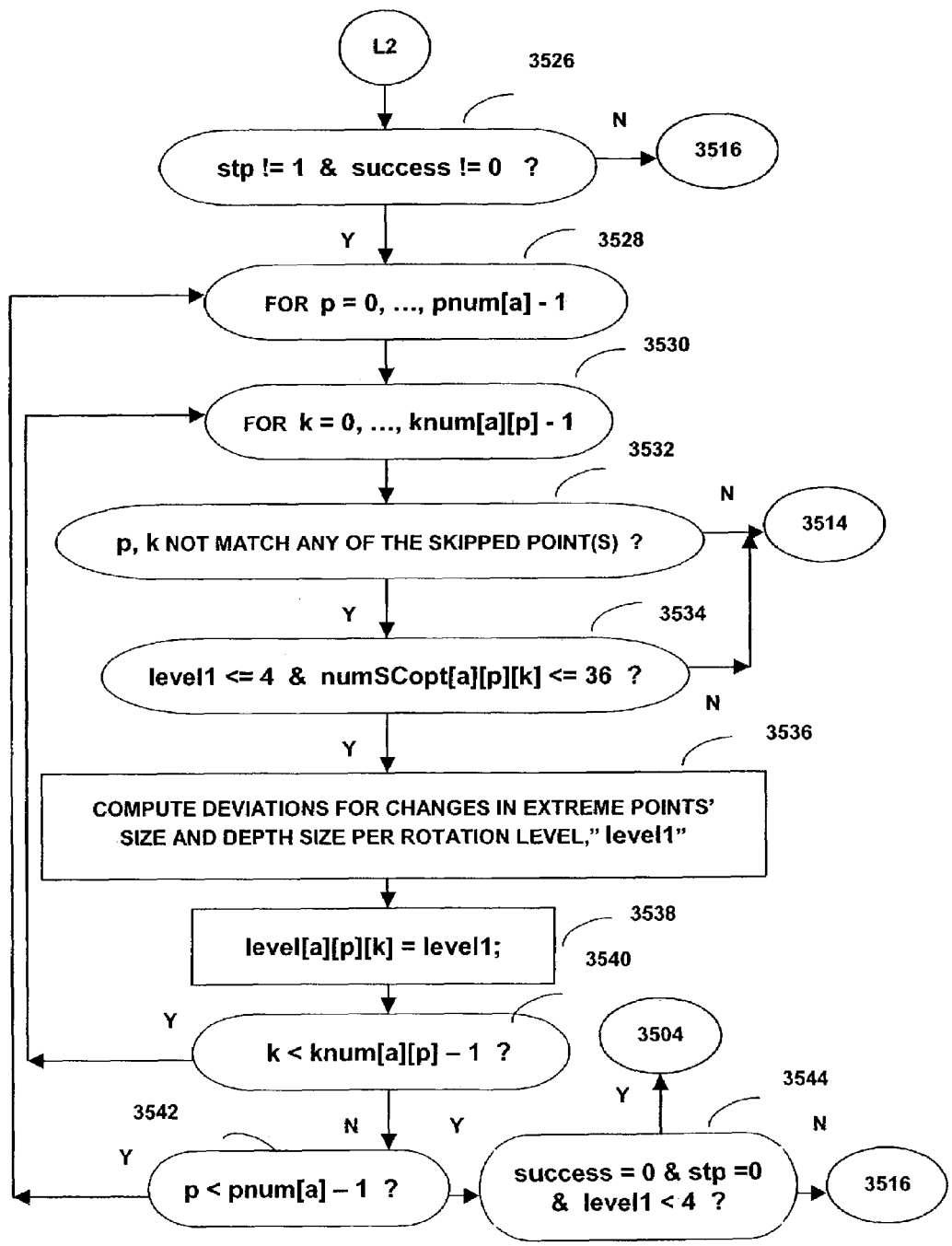

FIG. 3 shows state 116 of the process 40. FIG. 62 illustrates the overall process 116. This process in particular employs the second phase of the symbolic reshaping scheme, which in general comprises the first and third phases of this scheme, as well. As another embodiment of this invention, alternative sets of reduced candidate alphanumeric symbols are generated via selective reshaping of the arcpolys belonging to the alphanumeric ID. Consequently, augmented set of symbolic representations per arcpoly are generated for the alphanumeric ID.

The structural and combined reshaping processes are illustrated in FIG. 50 by way of example and the derived variance types and levels are illustrated in FIG. 56. As another preferred embodiment of the invention, this phase of the symbolic reshaping comprises an ordered sequence of structural, topological and/or combined reshaping of each arcpoly, each time generating a new reduced candidate alphanumeric symbol list and alphanumeric dissimilarity value, until a candidate alphanumeric symbol is validated.

Moreover, the examples pertaining to the re-shaping process comprise: arc-to-arc rotation, line-to-line rotation, arc depth size variance, arc extreme points' size variance, existence/or absence of arc extension on each (or both) extreme point(s), line extreme points' size variance, variances, and combined variances (see FIG. 50). The reshaping of an arcpoly involves applying at least one of: multi-level unit rotations, changes in extreme points' size and depth size on the arcpoly, each time transforming the arcpoly into a new arcpoly having a new orientation and/or new shape. This process is then followed by computing symbolic representation of the alphanumeric ID, generating a reduced list of candidate alphanumeric symbols, computing the secondary relational features per candidate alphanumeric symbols, etc.

In summary, the process 116 computes alternative set(s) of reduced lists of alphanumeric candidate symbols per alphanumeric "a" that involves successive symbolic transformation of logical- and subclass-symbols pair(s) to one another, each time incorporating an additive bi-polar auxiliary rotation, "level[a][p][k]" ranging in value between zero-to-four units, utilizing the following tasks described below:

i) select a series of pre-determined number of remaining unused subclass symbol(s) (if any) each time per logical symbol and compute primary relational features, then compute alternative set(s) of reduced list of alphanumeric candidate symbols and their descriptors and next compute secondary relational features as well as their confidence levels, and/or i) incorporate a series of extreme points' size and depth size variances to the arcpoly belonging to alphanumeric "a", compute primary relational features and alternative set(s) of reduced list of alphanumeric candidate symbols and next compute their descriptors and secondary relational features as well as their confidence levels.

The process 116 begins at a start state 3500 and moves to state 3502 wherein subsets of the variables pertaining to the structural reshaping are initialized. The process 116 moves to state 3504 wherein "level1" is incremented by one to a maximum of four, and then moves to state 3506 wherein allows states 3508-to-3424 to be repeated for p=0, . . . , pnum[a]−1. The process 116 moves to state 3508 wherein allows states 3510-to-3422 to be repeated for k=0, . . . , knum[a][p]−1 and then moves to the decision state 3510. If the results of the decision state 3510 are in the affirmative, the process 116 moves to the decision state 3512. If the results of the decision state 3512 are in the affirmative, the process 116 moves to state 3518 wherein deviations for the remaining sub-class symbols per rotation level, "level1" are computed. The process 116 moves to state 3520 to set "level[a][p][k]" to "level1" and then moves to the decision state 3522. If the result of the decision state 3522 is in the affirmative, the process 116 moves to state 3508 to begin another cycle. Otherwise, the process 116 moves to the decision state 3524. If the result of the decision state 3524 is in the affirmative, the process 116 moves to state 3506 to begin another cycle. Otherwise, the process 116 moves to the decision state 3526. If the results of the decision state 3510 are not in the affirmative, the process 116 moves to state 3514 to set "stp" to one and then terminates at an end state 3516. If the results of the decision state 3512 are not in the affirmative, the process 116 moves to state 3514 and then terminates at the end state 3516. If the results of the decision state 3526 are not in the affirmative, the process 116 terminates at the end state 3516. Otherwise, the process 116 moves to state 3528 wherein allows states 3530-to-3442 to be repeated for p=0, . . . , pnum[a]−1. The process 116 moves to state 3530 wherein allows states 3532-to-3440 to be repeated for k=0, . . . , knum[a][p]−1. The process 116 moves to the decision state 3532. If the results of the decision state 3514 are in the affirmative, the process 116 moves to the decision state 3534. If the results of the decision state 3534 are in the affirmative, the process 116 moves to state 3536, wherein deviations for changes in extreme points' size and depth size per rotation level are computed. The process 116 moves to state 3538 to assign "level1" to "level[a][p][k]" and then moves to the decision state 3540. If the result of the decision state 3540 is in the affirmative, the process 116 moves to state 3530 to begin another cycle. Otherwise, the process 116 moves to the decision state 3542. If the result of the decision state 3542 is in the affirmative, the process 116 moves to state 3528 to begin another cycle. Otherwise, the process 116 moves to the decision state 3544. If the results of the decision state 3524 are not in the affirmative, the process 116 terminates at an end state 3544. If the results of the decision state 3544 are not in the affirmative, the process 116 terminates at the end state 3516. Otherwise, the process 116 moves to state 3504 to begin another cycle. If the results of the decision state 3532 are not in the affirmative, the process 116 moves to state 3514 and then terminates at the end state 3516. If the results of the decision state 3534 are not in the affirmative, the process 116 moves to state 3514 and then terminates at the end state 3516.

Figure 63A:
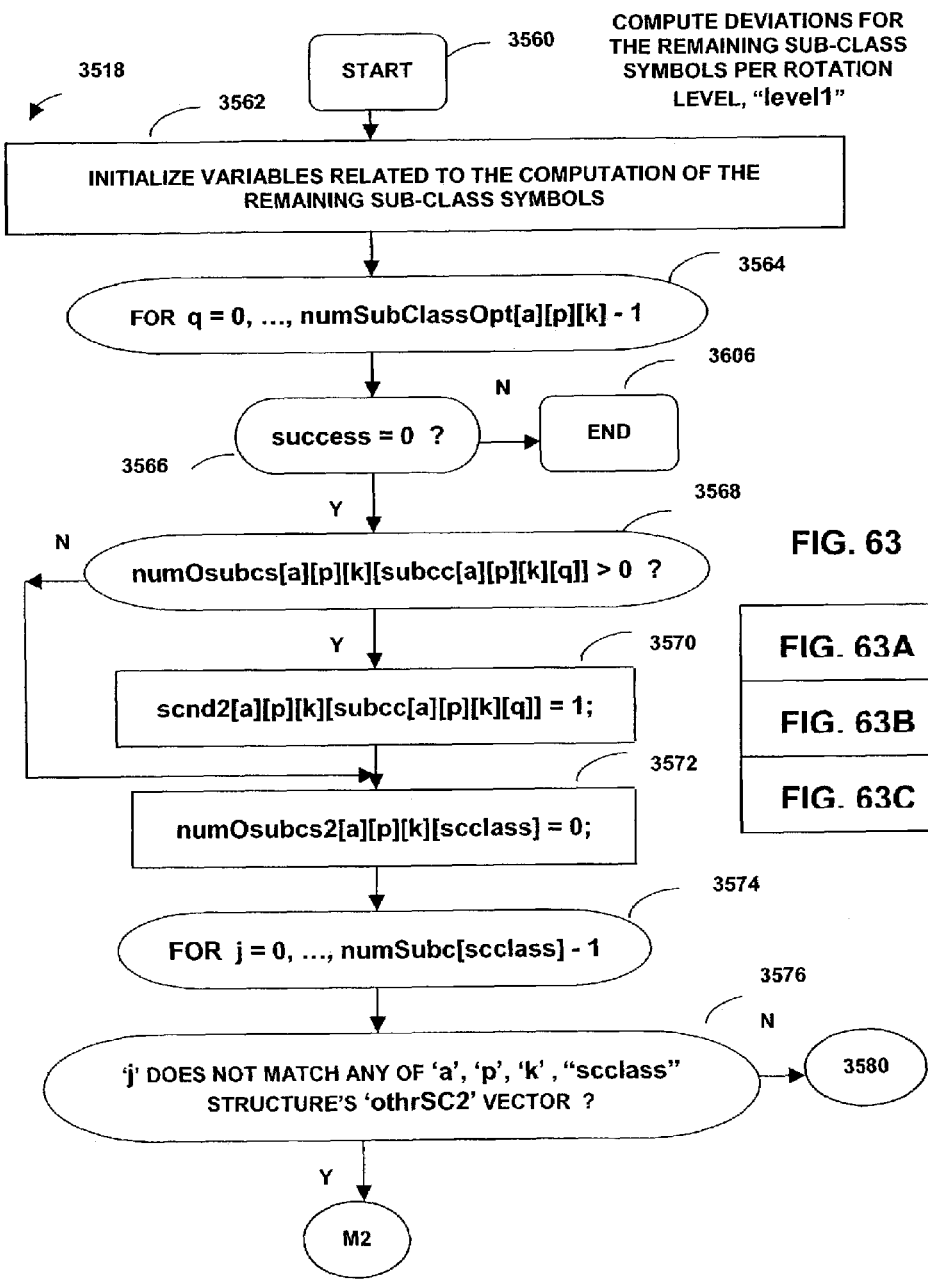
FIG. 63 is a flow diagram illustrating the computation of the image and database deviations for the remaining sub-class symbols per rotation level, "level1."
Figure 63B:
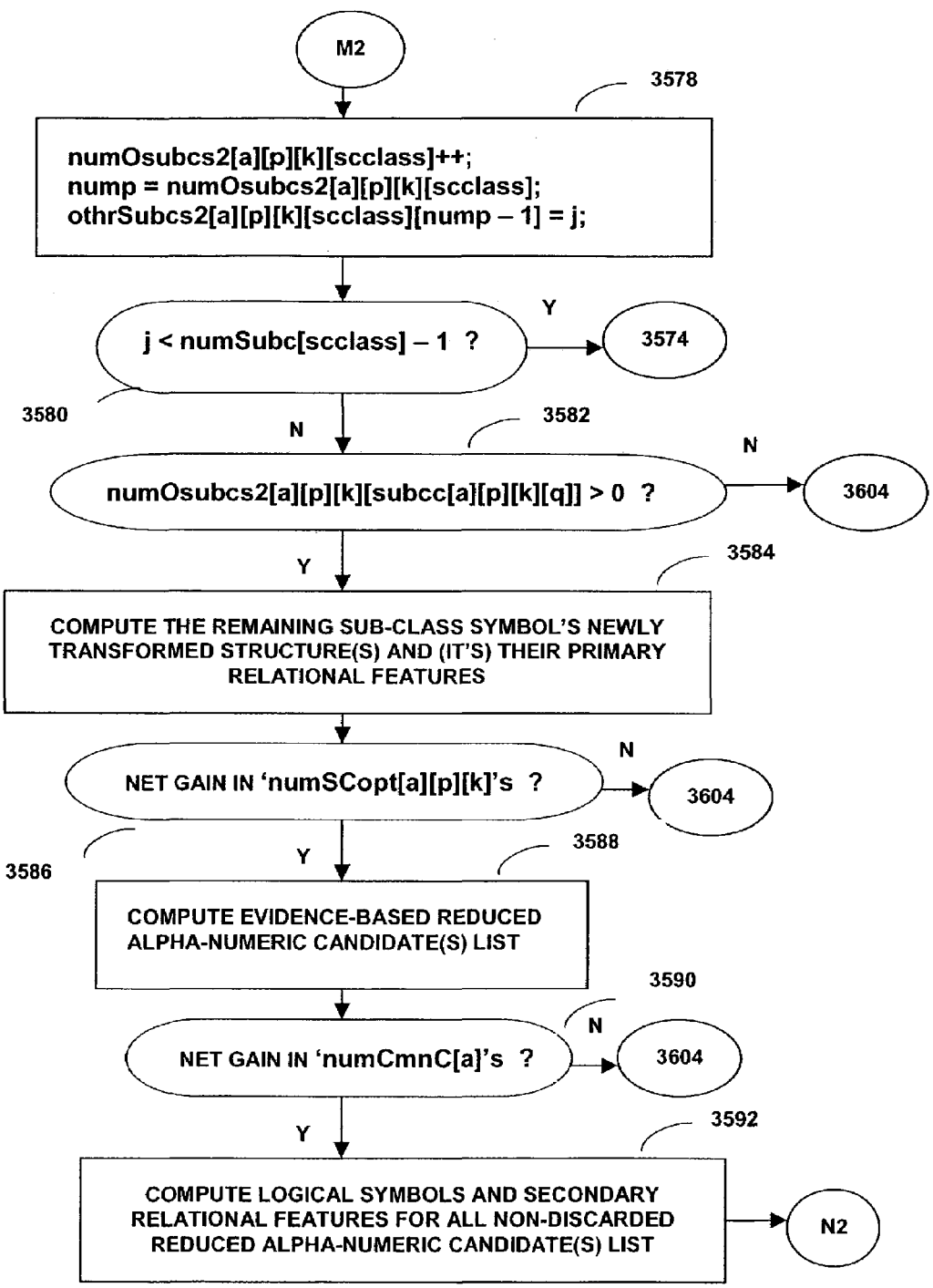
Figure 63C:
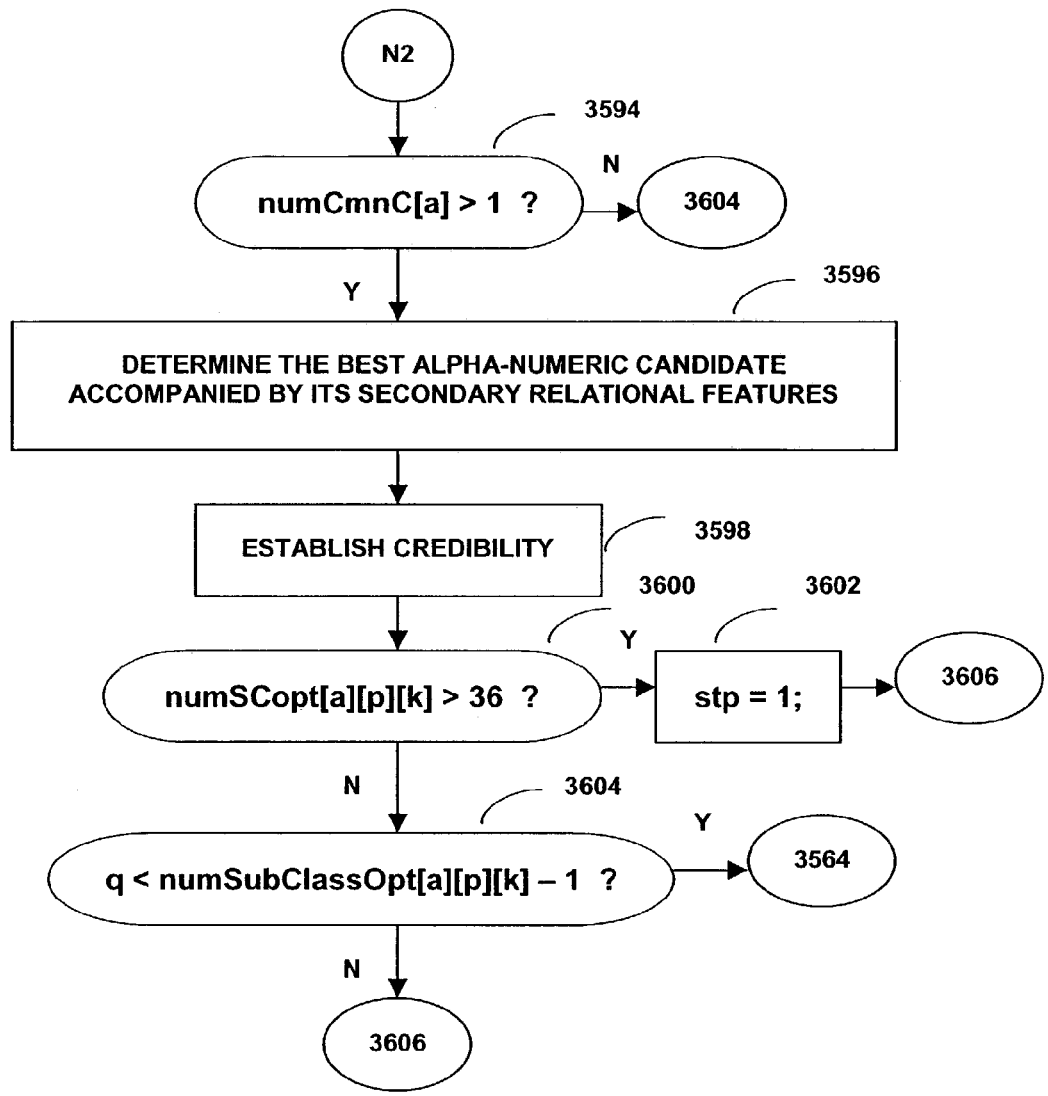

FIG. 62 shows state 3518 of the process 116. FIG. 63 illustrates the overall process 3518 as it begins at a start state 3560 and moves to state 3562 wherein a subset of the variables pertaining to the computation of the remaining sub-class symbols are initialized. The process 3518 moves to state 3564 wherein allows the states 3566-to-3604 to be repeated for q=0, . . . , numSubClassOpt[a][p][k]−1, and then moves to the decision state 3566. If a determination is made in the decision state 3566 that "success" is equal to zero, the process 3518 moves to the decision state 3568. If the result of the decision state 3568 is in the affirmative, the process 3518 moves to state 3570 wherein "scnd2[a][p][k][subcc[a][p][k][q]]" is set to one and then moves to state 3572 wherein "numOsubcs2[a][p][k][scclass]" is initialized to zero, where "scclass" is equal to "subcc[a][p][k][q]". Otherwise, the process 3518 moves directly to state 3572.

Next, the process 3518 moves to state 3574 wherein the states 3576-to-3580 are repeated for j=0, . . . , numSubc [scclass]−1, and then moves to the decision state 3576. If the results of the decision state 3576 are in the affirmative, the process 3518 moves to state 3578 to increment "numOsubcs2[a][p][k][scclass]" by one, and to compute "nump", and "othrSubcs2[a][p][k][scclass][nump−1]" and then moves to the decision state 3580. If the results of the decision state 3576 are not in the affirmative, the process 3518 moves directly to the decision state 3580. If the result of the decision state 3580 is in the affirmative, the process 3518 moves to state 3574 to begin another cycle. Otherwise, the process 3518 moves to the decision state 3582. If a determination is made in the decision state 3582 that "numOsubcs2[a][p][k][subcc[a][p][k][q]]" is greater than zero, the process 3518 moves to state 3584 as described in FIG. 55 and FIG. 65, and then moves to the decision state 3586. If the results of the decision state 3586 are in the affirmative, the process 3518 moves to state 3588 to compute the evidence-based alphanumeric candidate symbol(s) list and then moves to the decision state 3590. If a determination is made in the decision state 3590 that there is a net gain in the number of evidenced-based invocations of the alphanumeric candidate symbols, the process 3518 then moves to state 3592 wherein all non-discarded list of alphanumeric candidate symbols as well as their relational features are computed, and then moves to the decision state 3594. If the result of the decision state 3594 is in the affirmative, the process 3518 moves to state 3596, and then moves to state 3698 to establish credibility. The process 3518 moves to the decision state 3600. If the result of the decision state 3600 is in the affirmative, the process 3518 moves to state 3602 to set "stp" to one and then terminates at an end state 3606. Otherwise, the process 3518 moves to the decision state 3604. If the result of the decision state 3590 is not in the affirmative, the process 3518 moves to the decision state 3604. If the result of the decision state 3594 is not in the affirmative, the process 3518 moves to the decision state 3604. If the result of the decision state 3580 is not in the affirmative, the process 3518 moves to the decision state 3604. If the result of the decision state 3604 is in the affirmative, the process 3518 moves to state 3564 to begin another cycle. Otherwise, the process 3518 terminates at the end state 3606. If the result of the decision state 3566 is not in the affirmative, the process 3518 terminates at the end state 3606. If the result of the decision state 3582 is not in the affirmative, the process 3518 terminates at the end state 3606. If the result of the decision state 3586 is not in the affirmative, the process 3518 terminates at the end state 3606.

Figure 64A:
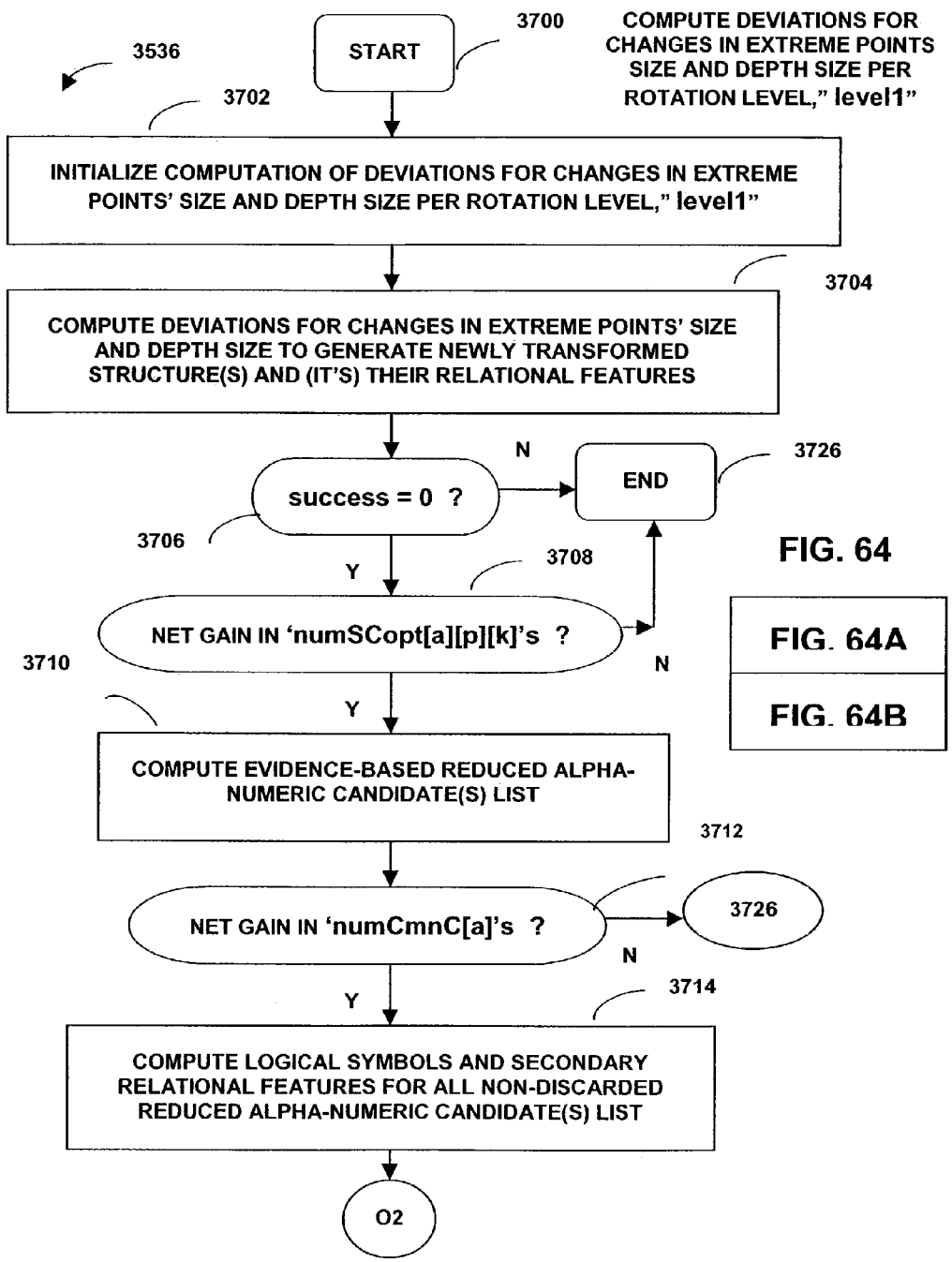
FIG. 64 is a flow diagram illustrating the computation of the image and database deviations for changes in extreme points size and depth size per rotation level, "level1."
Figure 64B:
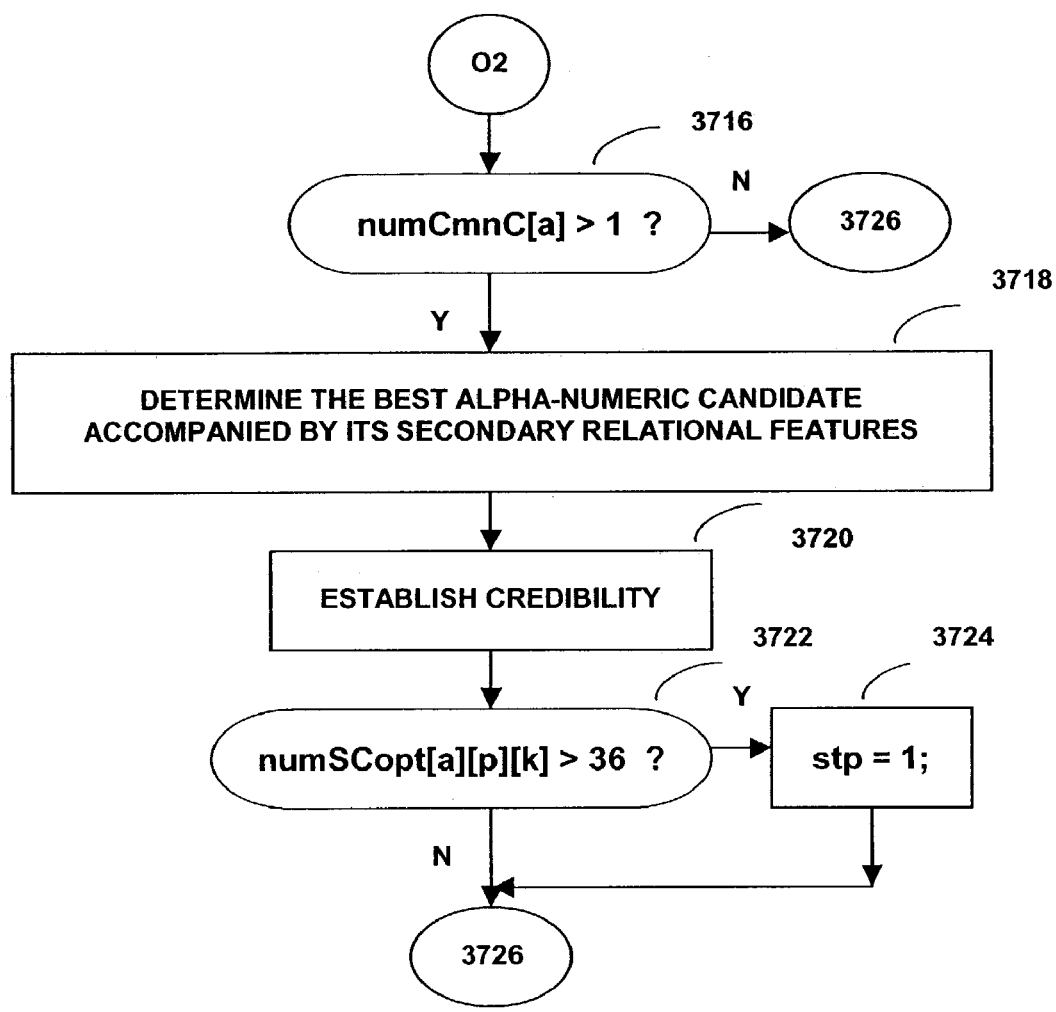
Figure 65A:
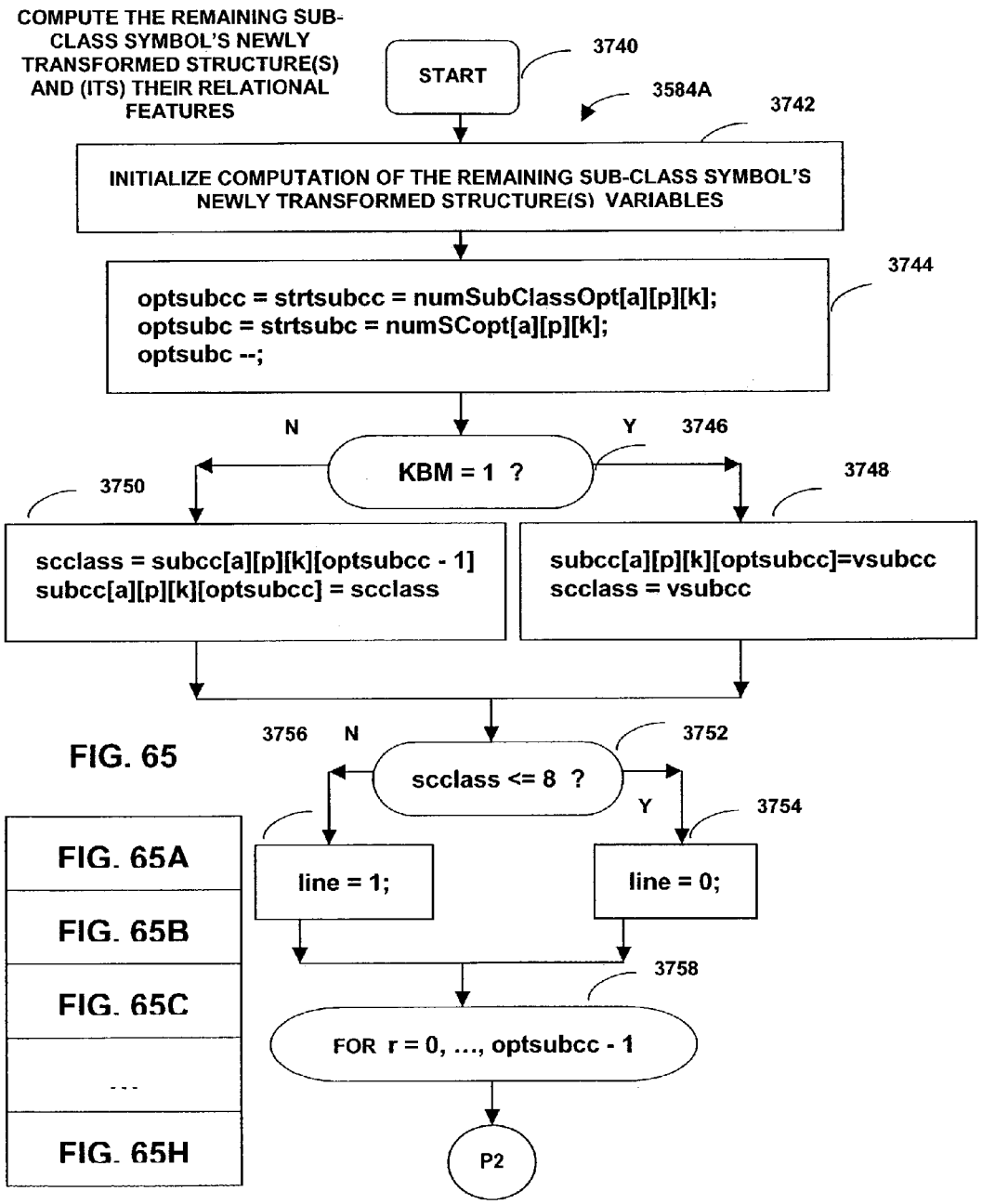
FIG. 65 is a flow diagram illustrating the computation of the remaining sub-class symbol's newly transformed arcpoly(s) and (its) their relational features.
Figure 65B:
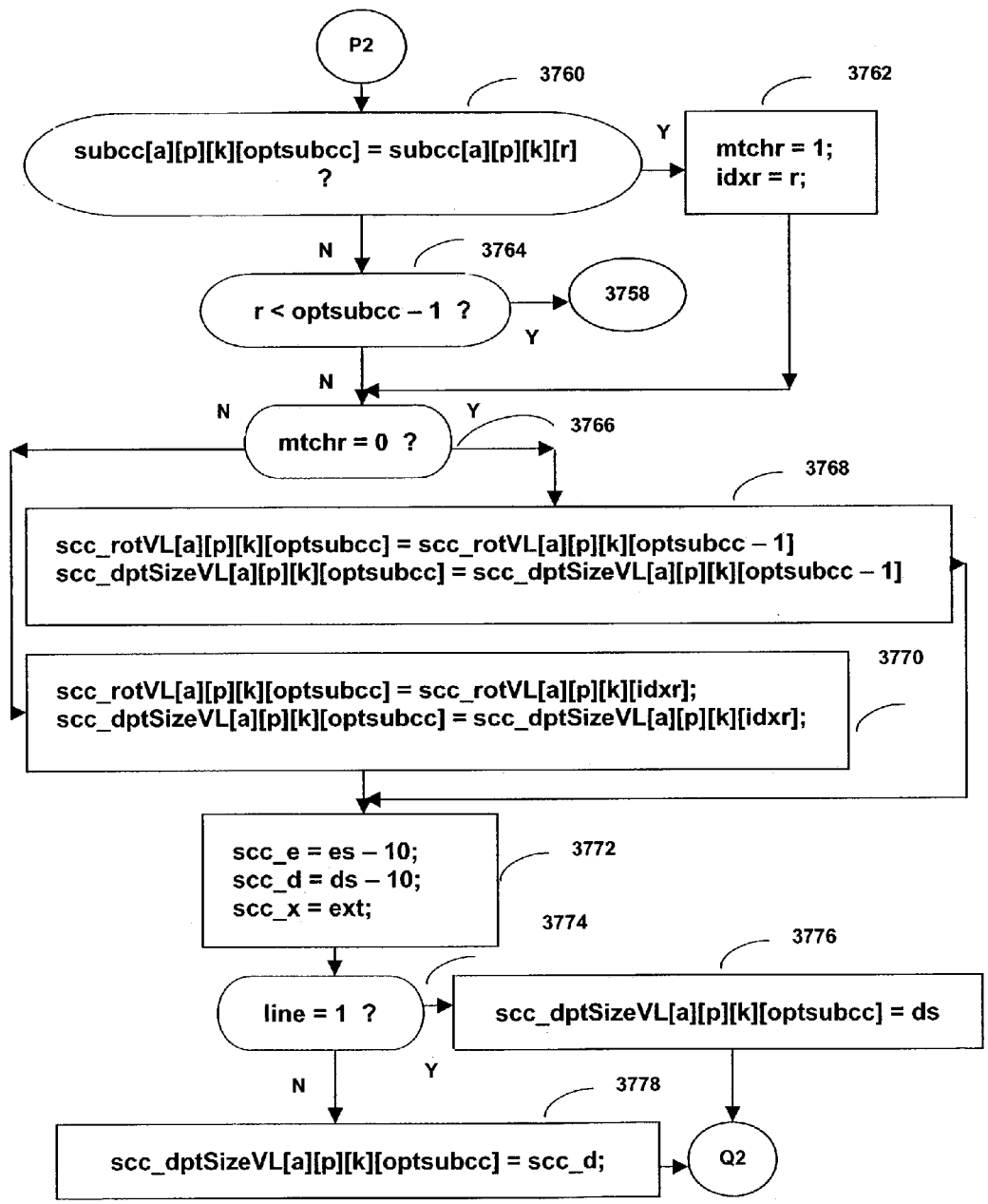
Figure 65C:
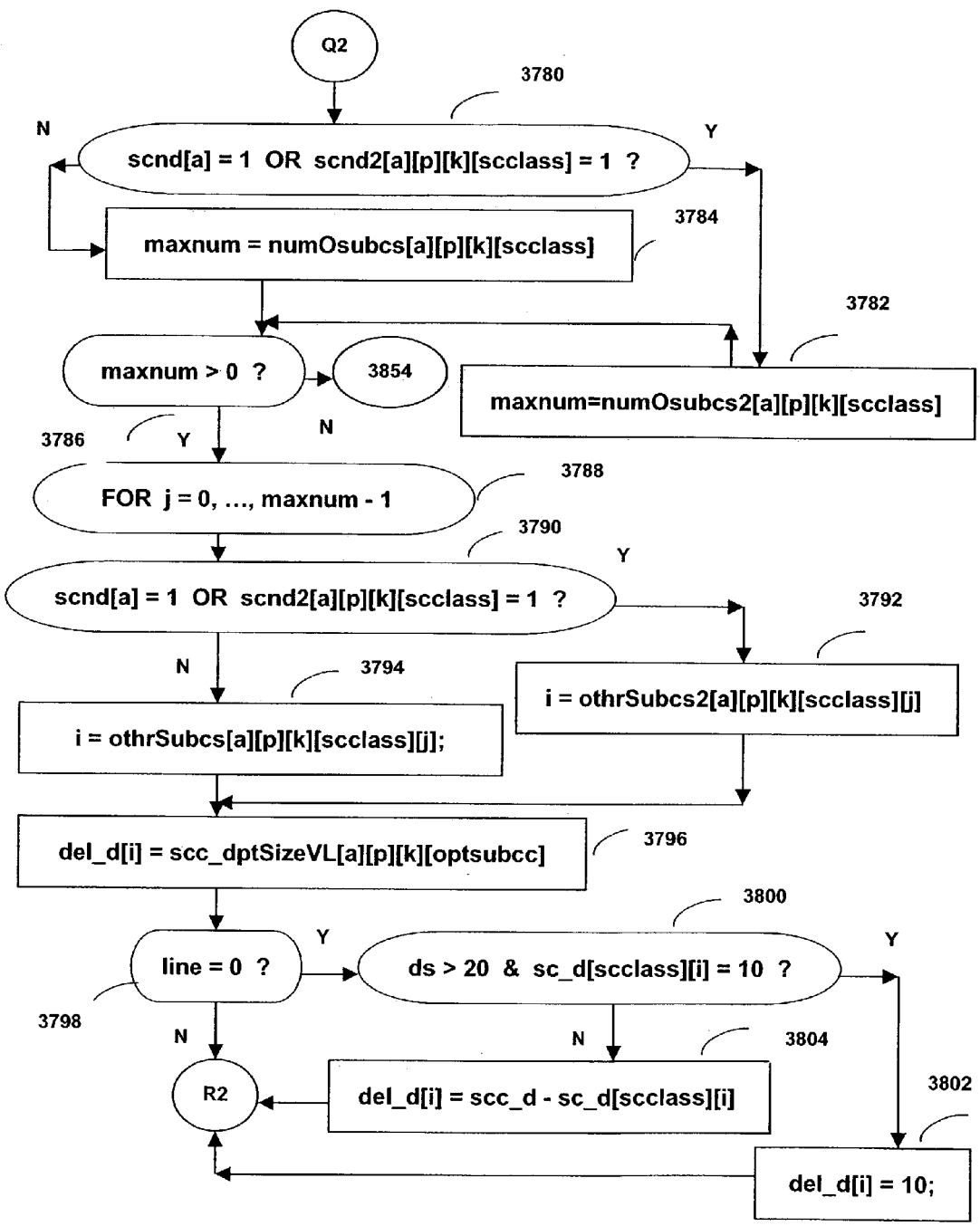
Figure 65D:
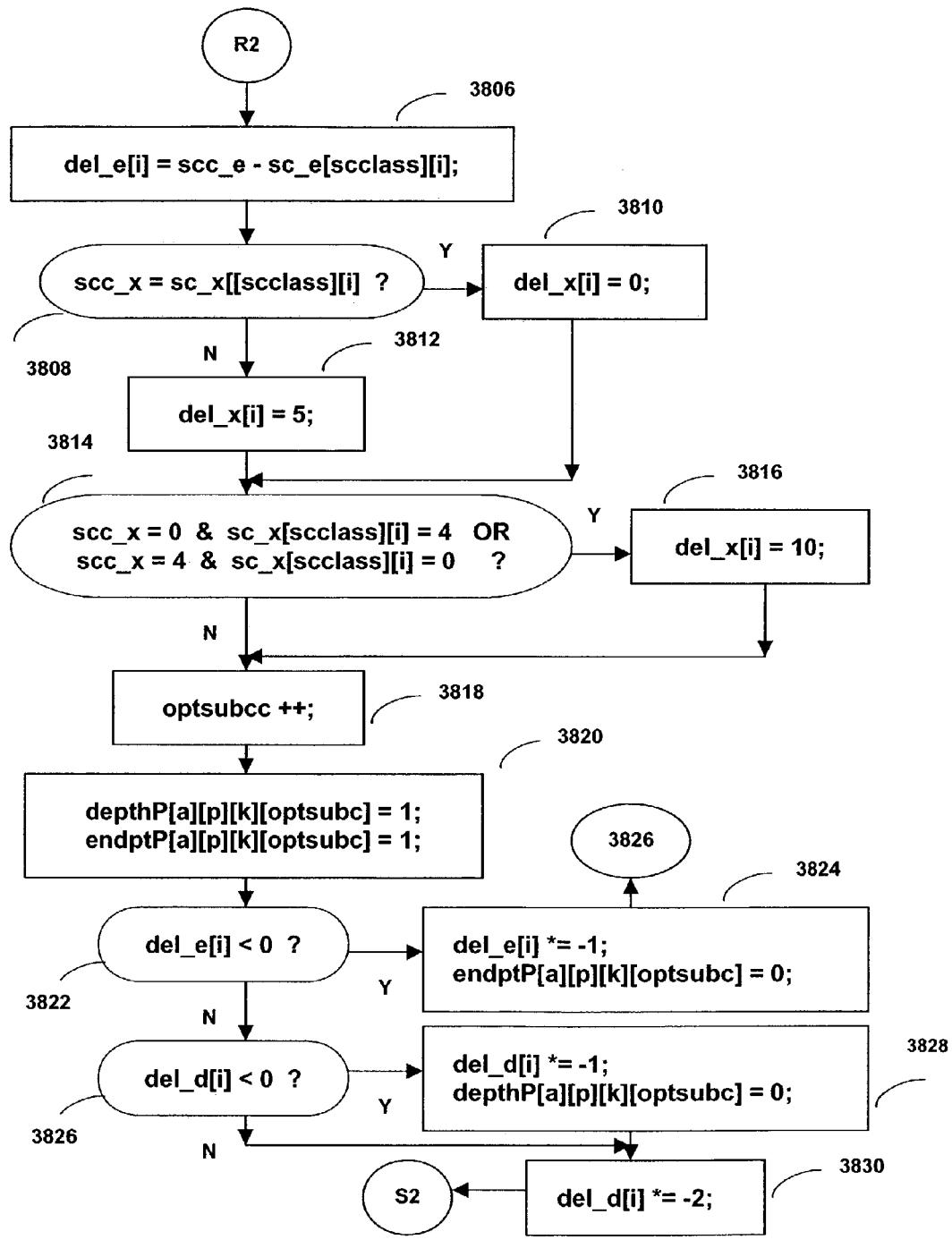
Figure 65E:
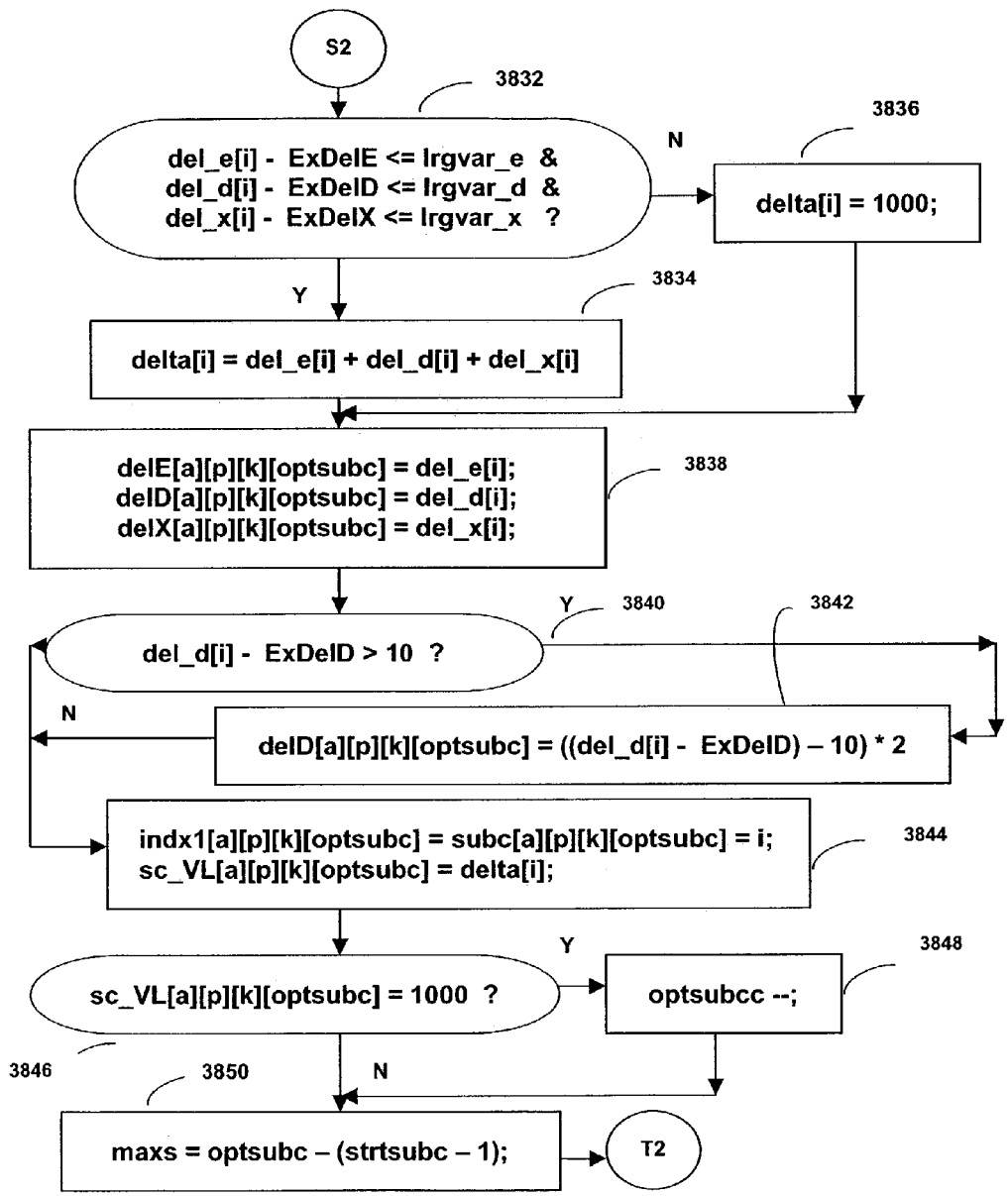
Figure 65F:
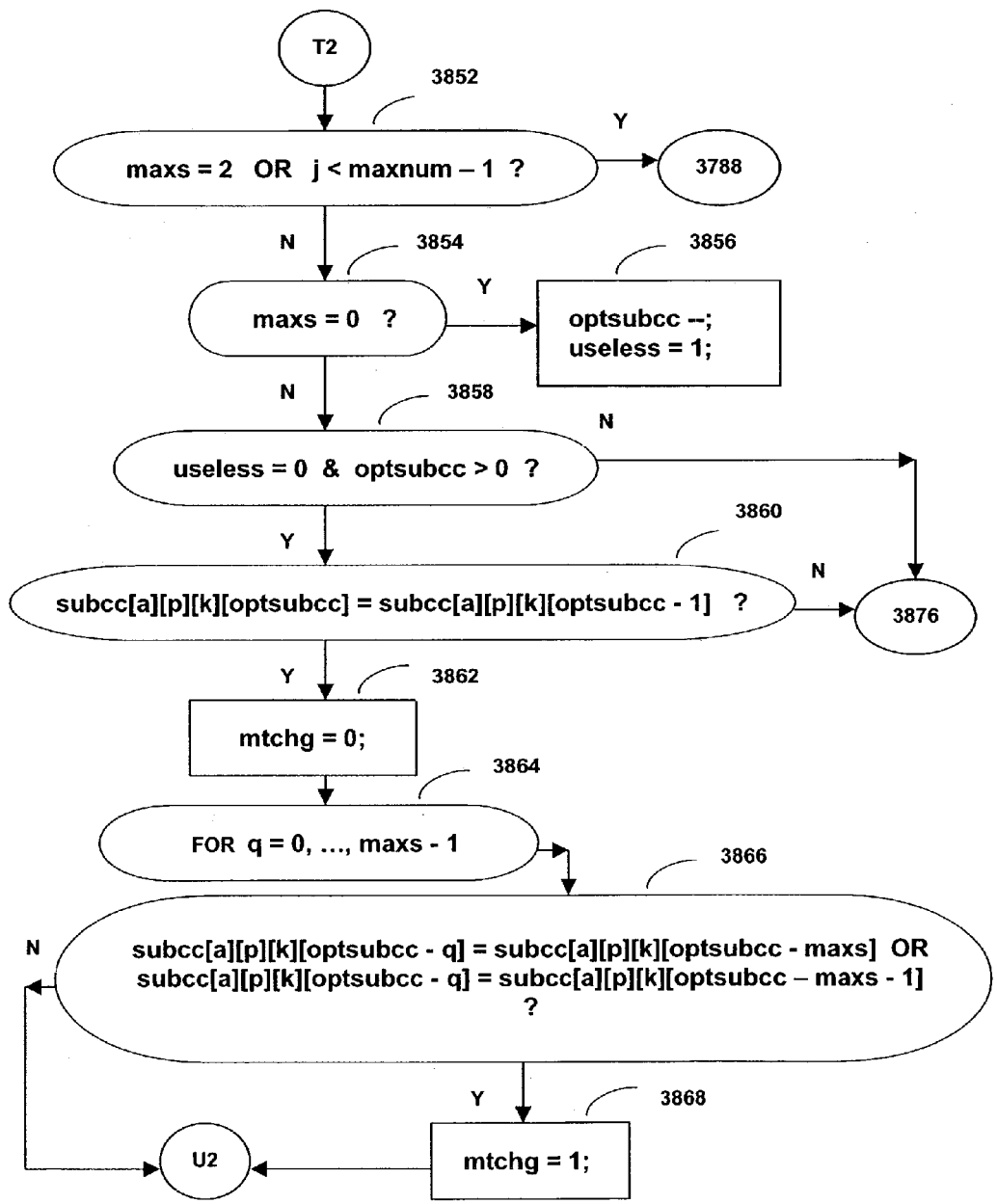
Figure 65G:
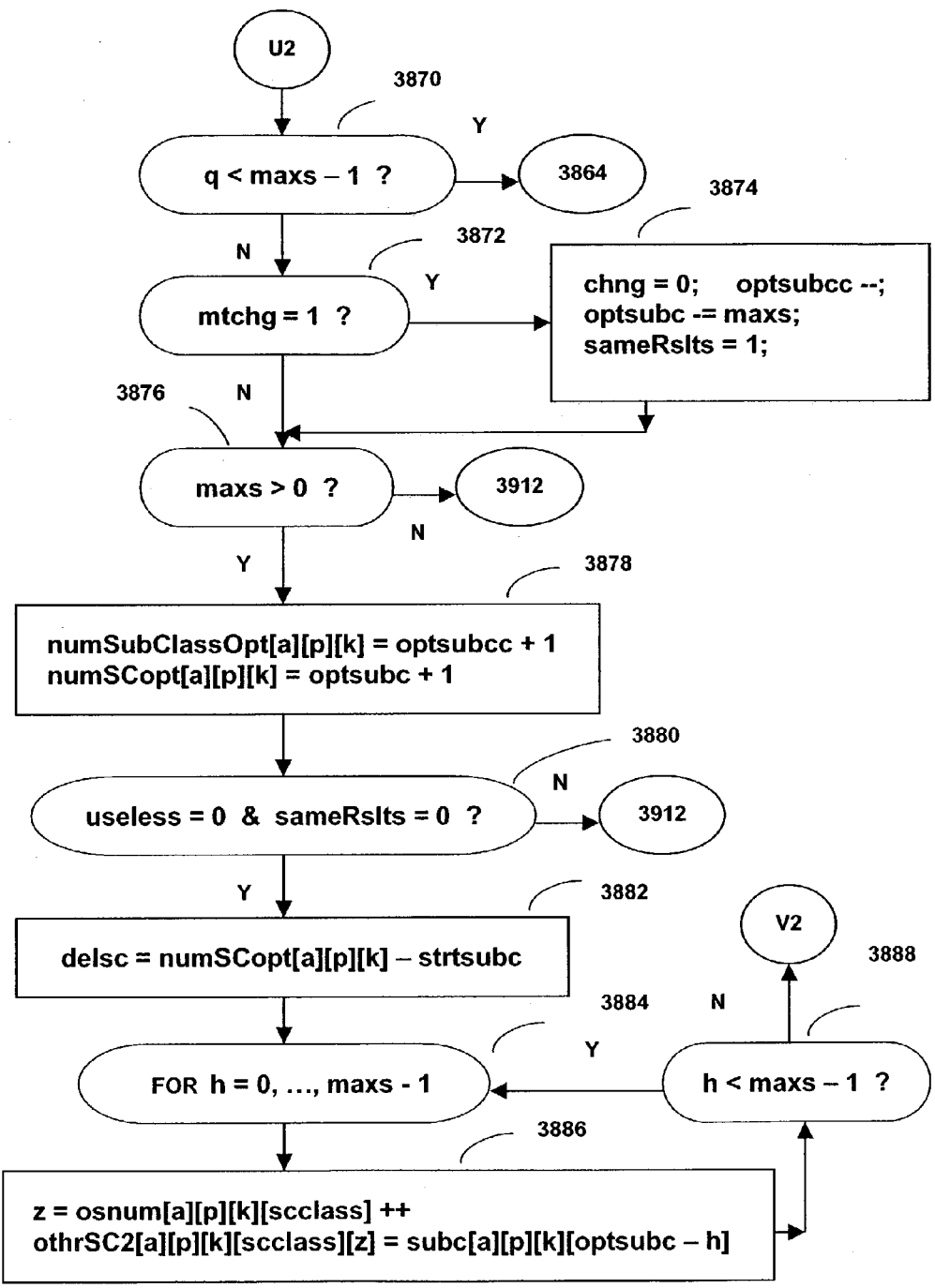
Figure 65H:
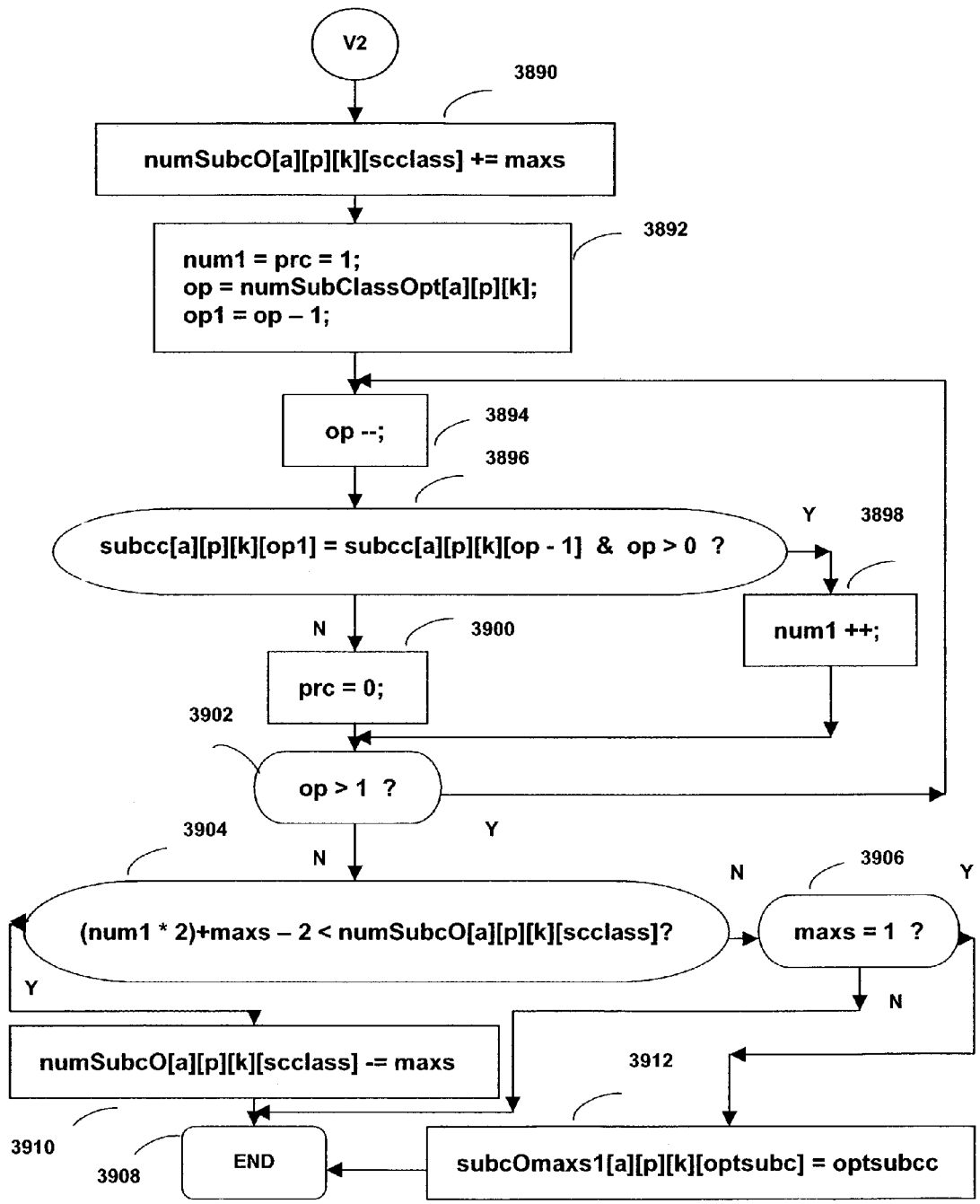

FIG. 62 shows state 3536 of the process 116. FIG. 64 illustrates the overall process 3536 as it begins at a start state 3700 and moves to state 3702 wherein a subset of the variables pertaining to the computation of deviations for changes in extreme points' size and depth size are initialized. The process 3536 moves to state 3704 as described in FIG. 54 and as described as the process 3704A above, a subset of the process 3704. The process 3536 then moves to the decision state 3706. If the result of the decision state 3706 is in the affirmative, the process 3536 moves to the decision state 3708. If the result of the decision state 3708 is in the affirmative, the process 3536 moves to state 3710 to compute the evidenced-based invocation(s) of the alphanumeric candidate symbol(s) list and then moves to the decision state 3712. If a determination is made in the decision state 3712 that there is a net gain in the number of evidenced-based invocation(s) of the alphanumeric candidate symbol(s) list, the process 3536 moves to state 3714, wherein all non-discarded list of alphanumeric candidate symbol(s) as well as their secondary relational features are computed, and then moves to the decision state 3716. If the result of the decision state 3716 is in the affirmative, the process 3536 moves to state 3718, wherein the best alphanumeric candidate symbol and the accompanied secondary relational features are selected, and then moves to state 3720 to establish credibility. The process 3536 moves to the decision state 3722. If the result of the decision state 3722 is in the affirmative, the process 3536 moves to state 3724 to set "stp" to one and then terminates at an end state 3726. Otherwise, the process 3536 terminates directly at the end state 3726. If the result of the decision state 3712 is not in the affirmative, the process 3536 terminates at the end state 3726. If the result of the decision state 3716 is not in the affirmative, the process 3536 terminates at the end state 3726. If the result of the decision state 3706 is not in the affirmative, the process 3536 terminates at the end state 3726. If the result of the decision state 3708 is not in the affirmative, the process 3536 terminates at the end state 3726.

FIG. 63 shows state 3584 of the process 3518. FIG. 65 illustrates the process 3584A as a subset of the process 3584 (see FIG. 55, whereby the parameters passed include the following: (1) "ed" as extreme points' direction, (2) "es" as extreme points' size, (3) "dd" as depth direction, (4) "ds" as depth size, (5) "vsubcc" as the logical symbol). The process 3584A is described below using a detailed 26 step process, for a single alphanumeric "a", polyline "p" and arcpoly "k":

The process 3584A begins at a start state 3740 and moves to state 3742 to initialize the variables pertaining to the computation of the remaining sub-class symbol's newly transformed arcpoly(s). The 3584A moves to state 3744 wherein "strtsubcc", "strtsubc", "optsubcc" and "optsubc" are computed. The process 3584A moves to the decision state 3746. If the result of the decision state 3746 is in the affirmative, the process 3584A moves to state 3748 to set "subcc[a][p][k][optsubcc]" and "scclass" to "vsubcc" and then moves to the decision state 3752. Otherwise, the process 3584A moves to state 3750 to set "subcc[a][p][k][optsubcc]" and "scclass" to "subcc[a][p][k][optsubcc−1]" and then moves to the decision state 3752. If a determination is made in the decision state 3752 that "scclass" is less than or equal to eight, the process 3584A moves to state 3754 to assign zero to "line" and then moves to state 3758. Otherwise, the process 3584A moves to state 3756 to assign one to "line" and then moves to state 3758 wherein allows states 3560-to-3564 to be repeated for r=0, . . . , optsubcc−1.

Next, the process 3584A moves to the decision state 3760. If the result of the decision state 3760 is in the affirmative, the process 3584A moves to state 3762 to set "mtchr" to one and assign "r" to "idxr" and then moves to the decision state 3766. Otherwise, the process 3584A moves to the decision state 3764. If a determination is made in the decision state 3764 that r<optsubcc−1, the process 3584A moves to state 3758 to begin another cycle. Otherwise, the process 3758 moves to the decision state 3766. If a determination is made in the decision state 3766 that "mtchr" is equal to zero, the process 3758 moves to state 3768 wherein "scc_rotVL[a][p][k][optsubcc]" and "scc_dptSizeVL[a][p][k][optsubcc]" are set to "scc_rotVL[a][p][k][optsubcc−1]" and "scc_dptSizeVL[a][p][k][optsubcc−1]", respectively and then moves to state 3772 to compute "scc_e", "scc_d", and "scc_x". Otherwise, the process 3584A moves to state 3770 wherein "scc_rotVL[a][p][k][optsubcc]" and "scc_dptSizeVL[a][p][k][optsubcc]" are set to the respective "scc_rotVL[a][p][k][idxr]" and "scc_dptSizeVL[a][p][k][idxr]", and then moves to state 3772.

Next, the process 3584A moves to the decision state 3774. If a determination is made in the decision state 3774 that "line" is equal to one, the process 3774 moves to state 3776 to assign "ds" to "scc_dptSizeVL[a][p][k][optsubcc]" and then moves to the decision state 3780. Otherwise, the process 3584A moves to state 3778 to assign "scc_d" to "scc_dptSizeVL[a][p][k][optsubcc]". If the results of the decision state 3780 are in the affirmative, the process 3584A moves to state 3782 to set "maxnum" to "numOsubcs2[a][p][k][scclass]" and then moves to the decision state 3786. Otherwise, the process 3584A moves to state 3784 to set "maxnum" to "numOsubcs[a][p][k][scclass]" and then moves to the decision state 3786. If a determination is made in the decision state 3786 that "maxnum" exceeds zero, the process 3584A moves to state 3788 wherein allows states 3790-to-3852 to be repeated for j=0, . . . , maxnum−1, and then moves to the decision state 3790. If the results of the decision state 3790 are in the affirmative, the process 3854 moves to state 3792 to assign "othrSubcs2[a][p][k][scclass][j]" to "i" and then moves to state 3796 to compute "del_d[i]". Otherwise, the process 3854 moves to state 3794 to assign "othrSubcs[a][p][k][scclass][j]" to "i" and then moves to state 3796. The process 3584A moves to the decision state 3798. If a determination is made in the decision state 3798 that "line" is equal to zero, the process 3584A moves to the decision state 3800. If the results of the decision state 3800 are not in the affirmative, the process 3684 moves to state 3804 to assign "scc_d−sc_d[scclass][i]"

to "del_d[i]" and then moves to state 3806 wherein "del_e[i]" is computed. Otherwise, the process 3584A moves to state 3802 to assign 10 to "del_d[i]" and then moves to state 3806. If a determination is made in the decision state 3798 that "line" is not equal to zero, the process 3584A moves directly to state 3806.

Next, the process 3584A moves to the decision state 3808. If the result of the decision state 3808 is in the affirmative, the process 3584A moves to state 3810 to assign zero to "del_x[i]" and then moves to the decision state 3814. Otherwise, the process 3584A moves to state 3812 to assign five to "del_x[i]" and then moves to the decision state 3814. If the results of the decision state 3814 are in the affirmative, the process 3584A moves to state 3816 to assign ten to "del_x[i]" and then moves to state 3818 to increment "optsubcc" by one. Otherwise, the process 3584A moves directly to state 3818. The process 3584A moves to state 3820 to set "depthP[a][p][k][optsubc]" and "endptP[a][p][k][optsubc]" to one, and then moves to the decision state 3822. If a determination is made in the decision state 3822 that "del_e[i]" is less than zero, the process 3584A moves to state 3824 to revise "del_e[i]" and set "endptP[a][p][k][optsubc]" to zero, and then moves to the decision state 3826. If the result of the decision state 3826 is in the affirmative, the process 3584A moves to state 3828 to revise "del_d[i]" and set "depthP[a][p][k][optsubc]" to zero and then moves to state 3830 to double the value of "del_d[i]". The process 3584A moves to the decision state 3832. Otherwise, the process 3584A moves directly to state 3830 and then moves to the decision state 3832. If the results of the decision state 3832 are in the affirmative, the process 3584A moves to state 3834 to set "delta[i]" to "del_e[i]+"del_d[i]+"del_x[i]" and then moves to state 3838 to determine "delE[a][p][k][optsubc]", "delD[a][p][k][optsubc]", and "delX[a][p][k][optsubc]". Otherwise, the process 3584A moves to state 3834 to set "delta[i]" to 1000 and then moves to state 3838.

Next, the process 3584A moves to the decision state 3840. If the result of the decision state 3840 is in the affirmative, the process 3584A moves to state 3842 to update the value of "delD[a][p][k][optsubc]" and then moves to state 3844 to compute "indx1[a][p][k][optsubc]" and "sc_VL[a][p][k][optsubc]". Otherwise, the process 3584A moves directly to state 3844. The process 3584A moves to the decision state 3846. If a determination is made in the decision state 3846 that "sc_VL[a][p][k][optsubc]" is equal to 1000, the process 3584A moves to state 3848 to decrement "optsubcc" by one and then moves to state 3850 to determine "maxs". Otherwise, the process 3584A moves directly to state 3850. The process 3584A moves to the decision state 3852. If the results of the decision state 3852 are in the affirmative, the process 3584A moves to 3788 to begin another cycle. Otherwise, the process 3584A moves to the decision state 3854. If the result of the decision state 3786 is not in the affirmative, the process 3584A moves to the decision state 3854. If a determination is made in the decision state 3854 that "maxs" is equal to zero, the process 3584A moves to state 3856 to decrement "optsubcc" by one and assign one to "useless" and then moves to the decision state 3858. Otherwise, the process 3584A moves directly to the decision state 3858. If the results of the decision state 3858 are in the affirmative, the process 3584A moves to the decision state 3860. If the results of the decision state 3860 are in the affirmative, the process 3584A moves to state 3862 to set "mtchg" to zero and then moves to state 3864 wherein allows states 3866-to-3870 to be repeated for q=0, . . . , maxs−1. The process 3584A moves to the decision state 3866. If the results of the decision state 3866 are in the affirmative, the process 3584A moves to state 3868 to assign one to "mtchg" and then moves to the decision state 3870. Otherwise, the process 3584A moves directly to the decision state 3870. If the result of the decision state 3870 is in the affirmative, the process 3584A moves to state 3864 to begin another cycle. Otherwise, the process 3584A moves to the decision state 3872. If the result of the decision state 3872 is in the affirmative, the process 3584A moves to state 3874 to set "chng" to zero, "sameRslts" to one, decrement "optsubcc" by one and decrement "optsubc" by "maxs", and then moves to the decision state 3876. Otherwise, the process 3584A moves directly to the decision state 3876. If the results of the decision state 3858 are not in the affirmative, the process 3584A moves directly to the decision state 3876. If the results of the decision state 3860 are not in the affirmative, the process 3584A moves directly to the decision state 3876.

Next, if a determination is made in the decision state 3876 that "maxs" is greater than zero, the process 3584A moves to state 3878 wherein "numSubClassOpt[a][p][k]" and "numSCopt[a][p][k]" are computed and then moves to the decision state 3880. If the results of the decision state 3880 are in the affirmative, the process 3584A moves to state 3882 to determine "delsc" and then moves to state 3884 wherein allows states 3886-to-3888 to be repeated for h=0, . . . , maxs−1. The process 3584A moves to state 3886 to increment by one "osnum[a][p][k][scclass]" and determine "othrSC2[a][p][k][scclass][osnum[a][p][k][scclass]]" and then moves to the decision state 3888. If a determination is made in the decision state 3888 that h<maxs−1, the process 3584A moves to state 3884 to begin another cycle. Otherwise, the process 3584A moves to state 3890 to increment "numSubcO[a][p][k][scclass]" by "maxs" and then moves to state 3892 wherein "num1", "op" and "op1" are determined. The process 3584A moves to state 3894 to decrement "op" by one and then moves to the decision state 3896. If the results of the decision state 3896 are in the affirmative, the process 3584A moves to state 3898 to increment "num1" by one, and then moves to the decision state 3902. Otherwise, the process 3584A moves to state 3900 to set "prc" to zero and then moves to the decision state 3902. If a determination is made in the decision state 3902 that "op" exceeds one, the process 3584A moves to state 3894 to begin another cycle. Otherwise, the process 3584A moves to the decision state 3904. If the results of the decision state 3904 are in the affirmative, the process 3584A moves to state 3906 to decrement "numSubcO[a][p][k][scclass]" by "maxs" and then terminates at an end state 3912. Otherwise, the process 3584A moves to the decision state 3906. If a determination is made in the decision state 3906 that "maxs" is equal to one, the process 3584A moves to state 3908 to set "subcOmaxs1[a][p][k][optsubc]" to "optsubcc" and then terminates at the end state 3912. Otherwise, the process 3584A terminates at the end state 3912. If the result of the decision state 3874 is not in the affirmative, the process 3584A terminates at the end state 3912. If the results of the decision state 3880 are not in the affirmative, the process 3584A terminates at the end state 3912.

VI. CONCLUSION

A system for recognizing alphanumeric symbols that includes a pen and digitizing tablet for real time entry of handwritten alphanumeric symbols and a document scanner for generating scanned images of a previously created document containing handwritten alphanumeric symbols by a user is disclosed. This hybrid data-directed and model-driven artificial intelligent system adopts a spatial reasoning approach wherein computations occur on high level semantics. The multi-faceted techniques adopted and its system components work in concert to achieve high-level recognition accuracy. The recognition system solves the signal-to-symbol transition using a three step process that derives a high-level semantic representation of each input alphanumeric pattern. This process involves criteria-based region growing and segmentation to compute alphanumeric ID's logical- and subclass-symbols and their relational features. A mechanism is devised to compute the confidence level representing the goodness of identification of each alphanumeric symbol. At various stages of handwritten recognition process, a hypothetico-verification technique is incorporated to enable adaptation of the initial solution when results are determined to be contrary to preset milestones. Moreover, the incorporated evidence-based mechanism reduces the candidate alphanumeric symbol list. The system is capable of structurally re-shaping arcpolys and generating alternative set(s) of reduced lists of candidate alphanumeric symbols per unrecognized alphanumeric by an ordered sequence of symbolic transformation of each data-directed arcpoly's logical- and subclass-symbols pair to another, each time deriving a new dissimilarity value between the data-directed alphanumeric and its counter-part database modeled alphanumeric symbol. In the database, models of alphanumeric symbols and support information for the handwritten recognition process are incorporated in accordance with the common-property concept whereby an alphanumeric symbol is identified by primitive elements and their relationships. A priori information is effectively used by incorporating (i) generic models, (ii) case (or exemplar) models, and (iii) supporting information (intelligence) in part used for deriving a reasonably accurate set of values for ill-defined variables with a fuzzy nature. An arcpoly is represented by a set of primary features that uniquely describes its shape and orientation. By integrating an unrecognized alphanumeric connection code(s) with each of its arcpoly's symbolic representation, the handwritten recognition system can uniquely represent any alphanumeric.

A method for converting a handwritten-language image into a sequence of alphanumeric symbols, alphanumeric symbols comprising numbers and alphabets that include letters, ascenders, descenders, and diacritical, and regular marks, each alphanumeric symbol being modeled as a pre-specified number of logical- and subclass-symbols pairs and relationship(s) code(s), the image being a sequence of strokes, each stroke being a sequence of adjoining points with positions definable by x- and y-coordinates on a two-dimensional surface, the method approximating a stroke by a polyline, a polyline comprising an arcpoly or a sequence of adjoining arcpolys, an arcpoly being either an arc or a line or a point and having its net gradient directions not exceeding a pre-specified value, an alphanumeric ID consisting a polyline or a sequence of polylines extracted from the image data, wherein ID here refers to the order, starting from zero, an image structure being a point, line, arc, arcpoly, or polyline, an arc being a sequence of adjoining lines having the same clockwise motion from one line to the next with a net gradient directions not exceeding a predefined value, a clockwise motion being a Boolean variable representing the direction of rotation, a line being a sequence of adjoining elements having the same directions, a line direction being an encoded value derived from a pre-defined high resolution16-direction code system, an element being two adjoining points, an element direction being an encoded value derived from a pre-defined low resolution 8-direction code system, net gradient directions being the accumulation of direction differences in an 8/or 16 direction code system of all adjoining pairs of lines belonging to an arc, adjoining elements having a common point, adjoining lines in a polyline having different directions, adjoining arcpolys in a polyline having at least one pair of adjoining arcpolys inconsistent, a consistent pair of adjoining arcpolys being the lines of both adjoining arcpolys having equal directions of rotation and the last line of the first adjoining arcpoly and the first line of the second adjoining arcpoly having equal directions of rotation with respect to either of the adjoining arcpoly's direction of rotation, an arcpoly having a start point, mid-point, and an end point, the start point and the end point being called the extreme points, the start point, mid-point, and end point being called the major points, a straight line segment connecting the extreme points being called the extreme line segment, the extreme points size being the length of the line that makes up its geometrical structure when there is only one line, otherwise being the straight line segment that connects the end points of the extreme edges of the arcpoly, extreme edges of an arcpoly being the farthest lines from the mid-line with regards to index whose directions are not towards the mid-point on the extreme line segment, for arcpolys with more than one line a straight line connecting the end points of the arcpoly's extreme edges being called the extreme edge segment and for arcpolys with only one line a straight line connecting the extreme points being called the extreme edge segment, the direction of the extreme edge segment being called the extreme points direction, the depth line segment being the straight line segment that connects to the midpoint on the arcpoly from a point on the extreme line segment and is perpendicular to the extreme points segment, the length of the depth line segment or an approximation thereof being called the depth size, the direction of the depth line segment being called the depth direction, a line being a point when the extreme points are the same, a line being a member of a finite class of lines wherein each class member has a unique orientation, a line being a member of a finite subclass of lines wherein each subclass member has a unique extreme points size, an arc being a member of a finite class of arcs wherein each class member has a unique orientation, an arc being a member of a finite subclass of arcs wherein each subclass member has a unique extreme points size and/or unique depth size, logical symbols being a finite class of lines, arcs, and a point wherein each class member to the exclusion of the point has a unique orientation, subclass symbols being a finite subclass of lines, arcs, and a point wherein each class member to the exclusion of the point has a unique extreme points size and/or different depth size, arcpoly descriptors being comprised of a primary feature set and description of the arcpoly via the sub-structures that make up its geometric structure, primary feature set representing the entire structure of an arcpoly, an arcpoly primary feature set being comprised of extreme points direction, depth direction, extreme points size, depth size, clockwise motion, and in somewhat rare situations presence of extension(s), an arcpoly structure comprising shape and orientation, extension being an adjoining smaller arcpoly together forming a consistent pair of adjoining arcpolys, primary relational features being a gradient feature set between the database features and a pre-determined expansion of an arcpoly feature set derived from the image, secondary relational features being an expansion of primary relational features used for deriving dissimilarity level between alphanumeric ID and a database alphanumeric symbol, the method comprising the steps of: comprising a pen and digitizing tablet for real time entry of handwritten alphanumeric symbols by a user and, in certain implementations a scanner for generating scanned images of a previously created document containing handwritten text or alphanumeric symbols; establishing a signal-to-symbol transition in three major steps by deriving high-level semantic information from the image data manifesting as arcpolys identified by their logical- and subclass symbols and described by their features; incorporating a three phase symbolic reshaping scheme during the handwriting recognition process that includes: (i) deriving dissimilarity level from alphanumeric ID's net variation and the integration of each of its arcpoly structural variation(s) signifying a reasonably accurate confidence level for the goodness of recognition, (ii) determining the reshaping or transformation of an arcpoly to another arcpoly by introducing variations to the original arcpoly and deriving at each step, the new cost value as a function of variation(s) present and imposed, and (iii) determining the equivalent representation of an arcpoly by a succession of smaller and adjoining arcpoly(s) in order, or vice versa; establishing a hierarchical hypothesis-and-verification technique during various stages of the handwriting recognition process, whereby a series of initial assessments are made based on the information availed upon them and later during processing they are validated or rejected depending on the degree in which preset milestones were satisfied and are followed by a sequence of alternative hypotheses in the event of failure of the latest hypothesis until they are satisfied; incorporating in database, models of alphanumeric symbols and support information for the handwriting recognition process; reducing the computed list of alphanumeric (candidate) symbols' search range for each alphanumeric ID; possibly further reducing the said list of alphanumeric (candidate) symbol(s) for each alphanumeric ID; incorporating a multi-stage hierarchical confidence level capability manifesting as dissimilarity cost value for each alphanumeric ID and database alphanumeric candidate symbol, thus enabling the set of alphanumeric candidate symbols' ranking from best-to-worst by using their derived secondary relational features; determining the best alphanumeric symbol among the said list of alphanumeric candidate symbol(s) for each alphanumeric ID as a function of the derived confidence level and the number of matched and mismatched "logical- and subclass-symbols pairs," being derived and selected from the said image and database, respectively; establishing each alphanumeric candidate symbol's validation per alphanumeric ID; and determining alternative set(s) of reduced lists of alphanumeric candidate symbols per alphanumeric ID, each set being accompanied by descriptors and secondary relational features as well as confidence levels.

The above method wherein the first major step of establishing a signal-to-symbol transition includes the steps of: reducing each polyline or a sequence of polylines to one arcpoly or a sequence of arcpolys and determining their descriptors and primary features; and computing spatial variables pertaining to the said polyline(s) and arcpoly(s).

The above method wherein the second major step of establishing a signal-to-symbol transition includes the steps of: computing (relationship(s)) code(s) pertaining to the said polylines and arcpolys; registering (or grouping) the said polyline(s) and their arcpoly(s) to each alphanumeric ID; and grouping the said connection codes to each alphanumeric ID.

The above method wherein the final major step of establishing a signal-to-symbol transition includes the step of computing logical- and subclass symbols and primary relational features for each arcpoly belonging to each alphanumeric ID comprising feature variances in reference to the features pre-stored in the data-base, incorporating the first phase of the symbolic reshaping scheme.

The above method wherein the step of reducing each polyline or a sequence of polylines to one arcpoly or a sequence of arcpolys and determining their descriptors and primary features includes the steps of: hypothesizing each arcpoly; and verifying in multiple stages each arcpoly.

The above method wherein the step of hypothesizing each arcpoly per polyline ID includes the step of determining a pre-established criteria based region growing and correcting process, incorporating the third phase of the symbolic reshaping scheme.

The above method wherein the step of determining a region growing and correcting process per polyline ID comprises the steps of: computing low resolution element directions using an 8-direction code system from each pair of x- and y-coordinates; pre-processing image data to remove jitters and achieve smoothing; computing line-based representation; and computing clockwise-based segmentation thus producing an arcpoly or a series of inconsistent pairs of adjoining arcpolys, and determining their descriptors.

The above method wherein the step of verifying in multiple stages each arcpoly per polyline ID, incorporating the third phase of the symbolic reshaping scheme includes the steps of: post-processing I on arcpoly(s); post-processing II on arcpoly(s); and post-processing III on arcpoly(s).

The above method wherein the step of post-processing II on arcpoly(s) per polyline ID includes the steps of: computing line-based descriptors; computing all set(s) of primary features belonging to the said hypothesized arcpoly(s); determining type I segmentation(s) to possibly revise the said hypothesized arcpoly(s); determining type II segmentation(s) to possibly revise the said hypothesized arcpoly(s); determining type III segmentation(s) to possibly revise the said hypothesized arcpoly(s); determining type IV segmentation(s) to possibly revise the said hypothesized arcpoly(s); determining type V segmentation(s) to possibly revise the said hypothesized arcpoly(s); selecting and implementing a segmentation type on each said hypothesized arcpoly according to a pre-established criteria, if any; and computing all set(s) of descriptors and primary features belonging to the revised arcpoly(s).

The above method wherein the step of post-processing III on arcpoly(s) per polyline ID includes the steps of: determining arcpoly forward direction search for the detection of over-extended index; determining arcpoly backward direction search for the detection of over-extended index; and implementing the said segmentation type using the over-extended index derived on each said arcpoly, if over-extension is detected.

The above method wherein the step of computing spatial variables pertaining to the said polyline(s) and arcpoly(s) includes the steps of: computing text line characteristics for each line of text; computing text line-based characteristics per polyline ID; and detecting ascender- and descender-type(s) per polyline ID.

The above method wherein the step of pre-processing the image data to remove jitters and achieve smoothing per polyline ID comprises the steps of: computing modular "m" difference between a pair of low resolution directions, using an 8-direction code system or high resolution directions, using a 16-direction code system, whereby "m=8" for low resolution directions and "m=16" for high resolution directions and generating a new sequence of x- and y-coordinates from a sequence of low or high resolution directions.

The above method wherein the step of determining type I segmentation(s) to possibly revise the said hypothesized arcpoly(s) includes the step of determining clockwise based and modular "m" based pairwise direction difference, whereby "m"=8 or 16.

The above method wherein the step of computing line-based representation per polyline ID includes the steps of: implementing region growing I to reduce row and column data; computing row-based median and column-based median; implementing region growing II to further reduce row and column data by using the said medians; and computing high resolution line directions for each pair of x- and y-coordinates.

The above method wherein the step of computing each set of primary features belonging to each arcpoly per polyline ID includes the steps of: computing clockwise motion; computing extreme points direction; computing extreme points size; computing depth direction; and computing depth size.

The above method wherein the step of computing extreme points size includes the step of determining alignment level between a pair of low or high resolution line directions.

The above method wherein the step of computing depth size includes the step of determining the Boolean variable "direction_exceed."

The above method wherein the step of determining connection code(s) pertaining to the said polylines and arcpolys includes the step of computing accurate high resolution extreme points direction.

The above method wherein the step of computing accurate high resolution extreme points direction includes the step of computing "direction_gradient."

The above method wherein the step of registering (or grouping) the said polyline(s), their arcpoly(s) and their connection code(s) to each alphanumeric ID includes the steps of: determining the Boolean variable "near" signifying a pair of polyline-to-polyline grouping when "near=1" and polyline-to-polyline isolation, otherwise; computing accurate depth direction belonging to an arcpoly per polyline; and normalizing each arcpoly's feature values pertaining to sizes per polyline.

The above method wherein the step of normalizing each arcpoly's feature values per polyline includes the step of computing alphanumeric ID height threshold for upper and lower case alphanumeric symbol set distinction.

The above method wherein the step of computing logical- and subclass symbols and primary relational features for each arcpoly belonging to each alphanumeric ID, each time a maximum of a single 'logical symbol option' and a pre-selected maximum number of 'sub-class symbols options' generating one logical symbol and at most generating a few subclass symbols, respectively includes the steps of: determining logical symbol from extreme points size and in certain situations from depth size per 'logical symbol option;' determining sub-class symbol per 'sub-class symbols option;' determining arcpoly structural variance cost value; and establishing a 'logical symbol and sub-class symbol(s) options' discard criteria;

The above method wherein the step of determining arcpoly structural variance cost value includes the steps of: deriving arcpoly shape variance cost value per 'sub-class symbols option;' and deriving arcpoly rotation cost value in part from the imposed bi-polar auxiliary rotation unit that ranges from zero-to-four units per 'logical symbol option.'

The above method wherein the step of deriving arcpoly shape variance cost value per 'sub-class symbols option' includes the steps of: computing extreme points size variance cost value; computing depth size variance cost value; and computing extension variance cost value.

The above method wherein the step of incorporating in database, models of alphanumeric symbols and support information for the handwriting recognition process includes the steps of: producing generic model(s) of alphanumeric symbols in accordance with the common-property concept whereby an alphanumeric symbol is identified by primitive elements and their relationships; producing exemplar (or case) models of alphanumeric symbols in accordance with the common-property concept, generating a set of representation options per alphanumeric symbol when integrated with the generic model(s); deriving arcpoly structure-to-alphanumeric mappings; deriving topology-to-alphanumeric mappings; and determining collective pertinent and context dependent evidence to aid the handwriting recognition process.

The above method wherein the step of incorporating a multi-stage hierarchical confidence level capability manifesting as dissimilarity cost value for each alphanumeric ID and database alphanumeric candidate symbol, thus enabling the set of alphanumeric candidate symbols' ranking from best-to-worst by using their derived secondary relational features includes the steps of: computing secondary relational features; and ranking database alphanumeric candidate symbols.

The above method wherein the step of computing secondary relational features for the said database alphanumerical candidate symbol and the alphanumeric ID includes the steps of: capturing for each arcpoly belonging to alphanumeric ID, for all said logical symbol options and said subclass symbols options, a series of said logical symbols, said subclass symbols, associated logical symbol option indices, and associated subclass symbol option indices whereby any one of the alphanumeric symbols generated by the said arcpoly structure-to-alphanumeric mappings pertaining to the combined logical- and subclass symbols matches with the said database alphanumeric candidate symbol; capturing for each database alphanumeric symbols representation option, a series of said logical- and subclass-symbols pair(s) that result in a one-to-one match with the counterpart database logical- and subclass-symbols pair(s) using forward and in certain situations backward search technique; identifying extra mismatched arcpoly(s) and deriving cost values for each extra arcpoly and the collective extra arcpoly(s); identifying missed database logical- and subclass-symbols pair(s) and deriving cost values for each missed arcpoly and the collective missed logical- and subclass-symbols pair(s); deriving a new arcpoly structural variance comprising cost values for shape variance and rotation; establishing discard criteria for the said database alphanumeric candidate symbol; and computing variation cost value.

The above method wherein the step of computing variation cost value includes the steps of: deriving threshold value; selecting appropriate pair(s) of arcpolys belonging to the said alphanumeric ID that directly takes part in the variation cost value computation; establishing a one-to-one correspondence between the said pair(s) of arcpoly(s) and database logical- and subclass-symbols pair(s) belonging to the said database alphanumeric candidate symbol; computing variation cost value for each of the said pair(s) of arcpoly(s) and database logical- and subclass-symbols pair(s); computing variation cost value for each of the mis-matched pair(s) of arcpoly(s) and database logical- and subclass-symbols pair(s); and integrating the said variation cost values to generate the total variation cost value.

The above method wherein the step of computing variation cost value for each of the said pair(s) of arcpoly(s) and database logical- and subclass-symbols pair(s) includes the steps of: determining code connection; and determining the x- and y-coordinate(s) of the major point(s) on each arcpoly belonging to the said alphanumeric ID used for the computation of variation cost value.

The above method wherein the step of determining the x- and y-coordinate(s) of the major point(s) on each arcpoly belonging to the said alphanumeric ID used for the computation of variation cost value includes the steps of: revising the original logical symbol with the 'logical symbol option' index of zero; revising the said original logical symbol and the said database logical- and subclass-symbols pair; and computing extreme points code.

The above method wherein the step of reducing the computed list of alphanumeric candidate symbols' search range for each alphanumeric ID includes the steps of: determining a list of alphanumeric symbols that emerge repeatedly (or commonly) for every polyline and arcpoly by using the database's set of links from each arcpoly's pair of logical symbols and sub-class symbols to their superset alphanumeric candidate symbol; and determining a possibly shorter list of alphanumeric symbols by cross referencing the said list with the list of alphanumeric symbols that emerge repeatedly (or commonly) for all code(s) per alphanumeric ID by using the database's set of links from each encoding and separation pertaining to polyline and arcpoly relationship(s) to their superset alphanumeric candidate symbols.

The above method wherein the step of determining a list of alphanumeric symbols that emerge repeatedly (or commonly) for every polyline and arcpoly includes the steps of: compiling a list of database alphanumeric symbols for each arcpoly using data generated by the said arcpoly structure-to-alphanumeric mappings pertaining to each of a series of logical- and subclass-symbols pair(s) belonging to the said arcpoly; and compiling a list of database alphanumeric symbols for each code by using data generated by the said topology-to-alphanumeric mappings pertaining to each of a series of logical- and subclass-symbols pair(s) belonging to the said arcpoly.

The above method wherein the step of compiling a list of database alphanumeric symbols for each arcpoly is followed by the step of compiling a shorter list of alphanumeric symbol(s) that emerge(s) repeatedly (or commonly) for every arcpoly belonging to the said alphanumeric ID.

The above method wherein the step of compiling a list of database alphanumeric symbols for each arcpoly is followed by the step of compiling a shorter list of alphanumeric symbol(s) that emerge(s) repeatedly (or commonly) for every code belonging to the said alphanumeric ID.

The above method wherein the step of computing alternative set(s) of reduced lists of alphanumeric candidate symbols per alphanumeric ID includes successive symbolic transformation of logical- and subclass-symbols pair(s) to one another that includes arcpoly structural, and combined reshaping processes, incorporating the second phase of the symbolic reshaping scheme.

The above method wherein the step of computing alternative set(s) of reduced lists of alphanumeric candidate symbols is performed for each arcpoly of the said alphanumeric ID, each time incorporating an additive bi-polar auxiliary rotation ranging in value between zero-to-four units.

The above method wherein the step of computing alternative set(s) of reduced list of alphanumeric candidate symbols is performed for each arcpoly of the said alphanumeric ID, each time incorporating an additive bi-polar auxiliary rotation ranging in value between zero-to-four units includes the steps of: selecting a series of pre-determined number of unused subclass symbol(s) (if any) each time per logical symbol and computing primary relational features, then computing alternative set(s) of reduced list of alphanumeric candidate symbols and their descriptors and next computing secondary relational features as well as their confidence levels; and incorporating a series of extreme points size and depth size variances to the arcpoly belonging to the said alphanumeric ID, computing primary relational features and alternative set(s) of reduced list of alphanumeric candidate symbols and next computing their descriptors and secondary relational features as well as their confidence levels.

While the present invention has been described and shown in connection with specific embodiments thereof, it will be understood that it is capable of further modification, and this application is capable of further modification, and this application is intended to cover any variations, uses, or adaptations of the invention following, in general, the principles of the invention and including such departures from the present invention as would be understood to those skilled in the art as equivalent and the scope and context of the present invention is to be interpreted as including such equivalents and construed in accordance with and encompassed by the claims appended hereto. Therefore, it is the object of the appended claims to cover all such various alternatives, variations, and modifications of the present invention as are within the spirit and scope of the present invention.

What is claimed is:

1. A method of automatically recognizing alphanumeric symbols, comprising:
    (a) receiving digital information indicative of an unrecognized alphanumeric symbol;
    (b) computing one or more arcpolys of the unrecognized alphanumeric symbol;
    (c) computing at least one symbolic representation of the unrecognized alphanumeric symbol based on the arcpolys;
    (d) generating a plurality of candidate lists of alphanumeric symbols;
    (e) generating a reduced list of candidate alphanumeric symbols and alphanumeric confidence levels from the plurality of candidate lists based on the symbolic representation of the unrecognized alphanumeric symbol and a stored candidate list, wherein the reduced candidate list contains candidates which are common to a plurality of candidate lists;
    (f) determining a best candidate in the reduced list of candidate alphanumeric symbols and automatically validating the best candidate;
    (g) if the best candidate cannot be validated, performing a multi-phase symbolic reshaping on the arcpolys so as to obtain a different symbolic representation of the unrecognized alphanumeric symbol so that the unrecognized alphanumeric symbol can be recognized;
    (h) wherein the multi-phase symbolic reshaping includes a phase comprising:
    criteria-based region growing and splitting of arcpolys so that they better conform to a plurality of alphanumeric symbol models included in a stored candidate list; and
    computing a multi-stage post-processing of arcpolys so that they better conform to a plurality of alphanumeric symbol models; and (i) wherein the criteria based growing and splitting comprises:

computing row-based median and column-based median to derive a threshold used for grouping polyline points into cluster(s) of points;

detecting significant bends on adjoining lines or detecting significant line size(s) for arcpolys which comprise a (I) line and an arc, or (II) line and a line, and splitting them at a splitting point whereby the two arcpolys best conform to stored alphanumeric symbol models; and detecting arcpolys which are significantly more extended than a half circle and splitting them at a splitting point whereby the two arcpolys best conform to stored alphanumeric symbol models.

2. The method of claim 1, wherein the multi-phase symbolic reshaping comprises a phase of computing an alphanumeric dissimilarity value between each unrecognized alphanumeric symbol and stored candidate alphanumeric symbol, the alphanumeric dissimilarity value being indicative of the confidence level.

3. The method of claim 2, wherein computing an alphanumeric dissimilarity value comprises computing a symbolic representation for each arcpoly of an unrecognized alphanumeric symbol.

4. The method of claim 2, wherein the alphanumeric dissimilarity value is computed based at least on the sum of two or more of the following computed variances:

topological variance for all pairs of arcpoly(s) of the unrecognized alphanumeric symbol;

structural variance for all arcpoly(s) of the unrecognized alphanumeric symbol;

variance(s) pertaining to mismatched logical- and sub-class-symbol pair(s) in reference to stored data representing missing symbol(s); and variance(s) pertaining to mismatched logical- and sub-class-symbol pair(s) in reference to image data representing extra image structure(s).

5. The method of claim 1, wherein a phase of the multi-phase symbolic reshaping for the unrecognized alphanumeric symbol comprises an ordered sequence of structural, topological and/or combined reshaping of each arcpoly, each time generating a new reduced alphanumeric candidate symbol list and dissimilarity value, until a candidate alphanumeric symbol is validated.

6. The method of claim 5, wherein reshaping of an arcpoly comprises applying at least one of: multi-level unit rotations, changes in extreme points size, and depth size on the arcpoly, each time transforming the arcpoly into a new arcpoly having a new orientation and/or new shape.

7. The method of claim 6, wherein for each transformed arcpoly of an unrecognized alphanumeric symbol steps (b)–(f) are repeated.

8. The method of claim 7, wherein arcpoly reshaping types comprise: arc-to-arc rotation, line-to-line rotation, arc depth size variance, arc extreme points size variance, extra or missing arc extension(s) on each (or both) extreme point(s), line extreme points size variance, topological variance, and combined variances.

9. The method of claim 1, additionally comprising computing text-line characteristics for each polyline and arcpoly.

10. The method of claim 9, wherein the text line characteristics are selected from: base line, core line, ascender line, and descender line levels, for one or more lines of text within the received digital information.

11. The method of claim 1 wherein the multi-stage post-processing comprises:

removing polyline jitters to achieve smoothing; and merging adjoining arcpolys with equal direction of motion and minor direction change between a last line direction of a former arcpoly and a first line direction of a latter arcpoly such that the combined arcpoly has one direction of motion.

12. The method of claim 1, wherein the symbolic representation and the different symbolic representation together form an augmented symbolic representation.

13. The method of claim 1, wherein automatically validating the best candidate comprises automatically validating the best candidate using multiple criteria including topological relations and criteria-based thresholding.

14. The method of claim 1, wherein generating the plurality of candidate lists of alphanumeric symbols comprises:

generating at least one structurally determined list of candidate alphanumeric symbols; and generating at least one topologically determined list of candidate alphanumeric symbols.

15. The method of claim 14, wherein generating the reduced list of candidate alphanumeric symbols from the plurality of candidate lists comprises:

generating the at least one structurally determined list of candidate alphanumeric symbols based on structural features of the unrecognized alphanumeric symbol;

generating the at least one topologically determined list of candidate alphanumeric symbols based on topological features of the unrecognized alphanumeric symbol; and generating the reduced list of candidate alphanumeric symbols via the intersection of the structurally and topologically determined lists of candidate alphanumeric symbols.

16. The method of claim 1, wherein validating the best candidate comprises automatically validating the best candidate.

17. A system for automatically recognizing alphanumeric symbols, comprising:

(a) means for receiving digital information indicative of an unrecognized alphanumeric symbol;

(b) means for computing one or more arcpolys of the unrecognized alphanumeric symbol;

(c) means for computing at least one symbolic representation of the unrecognized alphanumeric symbol based on the arcpolys;

(d) means for generating a plurality of candidate lists of alphanumeric symbols;

(e) means for generating a reduced list of candidate alphanumeric symbols and alphanumeric confidence levels from the plurality of candidate lists based on the symbolic representation of the unrecognized alphanumeric symbol and a stored candidate list, wherein the reduced candidate list contains candidates which are common to a plurality of candidate lists;

(f) means for determining a best candidate in the reduced list of candidate alphanumeric symbols and automatically validating the best candidate;

(g) means for performing a multi-phase symbolic reshaping on the arcpolys, if the best candidate cannot be validated, so as to obtain a different symbolic representation of the unrecognized alphanumeric symbol so that the unrecognized alphanumeric symbol can be recognized;

(h) wherein the means for multi-phase symbolic reshaping includes a phase comprising:

criteria-based region growing and splitting of arcpolys so that they better conform to a plurality of alphanumeric symbol models included in a stored candidate list; and computing a multi-stage post-processing of arcpolys so that they better conform to a plurality of alphanumeric symbol models; and (i) wherein the means for criteria based growing and splitting comprises:

computing row-based median and column-based median to derive a threshold used for grouping polyline points into cluster(s) of points;

detecting significant bends on adjoining lines or detecting significant line size(s) for arcpolys which comprise a (I) line and an arc, or (II) line and a line, and splitting them at a splitting point whereby the two arcpolys best conform to stored alphanumeric symbol models; and detecting arcpolys which are significantly more extended than a half circle and splitting them at a splitting point whereby the two arcpolys best conform to stored alphanumeric symbol models.

18. The system of claim 17, wherein the multi-phase symbolic reshaping comprises means for computing an alphanumeric dissimilarity value between each unrecognized alphanumeric symbol and stored candidate alphanumeric symbol, the alphanumeric dissimilarity value being indicative of the confidence level.

19. The system of claim 18, wherein computing an alphanumeric dissimilarity value comprises means for computing a symbolic representation for each arcpoly of an unrecognized alphanumeric symbol.

20. The system of claim 18, wherein the alphanumeric dissimilarity value is computed based at least on the sum of two or more of the following computed variances:

topological variance for all pairs of arcpoly(s) of the unrecognized alphanumeric symbol;

structural variance for all arcpoly(s) of the unrecognized alphanumeric symbol;

variance(s) pertaining to mismatched logical- and sub-class-symbol pair(s) in reference to stored data representing missing symbol(s); and variance(s) pertaining to mismatched logical- and sub-class-symbol pair(s) in reference to image data representing extra image structure(s).

21. The system of claim 17, wherein a phase of the means for multi-phase symbolic reshaping for the unrecognized alphanumeric symbol comprises an ordered sequence of structural, topological and/or combined reshaping of each arcpoly, each time generating a new reduced alphanumeric candidate symbol list and dissimilarity value, until a candidate alphanumeric symbol is validated.

22. The system of claim 17, wherein reshaping of an arcpoly comprises means for applying at least one of: multi-level unit rotations, changes in extreme points size, and depth size on the arcpoly, each time transforming the arcpoly into a new arcpoly having a new orientation and/or new shape.

23. The system of claim 17, wherein for each transformed arcpoly of an unrecognized alphanumeric symbol means (b)–(f) are repeatedly executed.

24. The system of claim 17, wherein the means for automatically validating the best candidate comprises means for automatically validating the best candidate using multiple criteria including topological relations and criteria-based thresholding.

25. The system of claim 17, wherein the means for generating the plurality of candidate lists of alphanumeric symbols comprises:

means for generating at least one structurally determined list of candidate alphanumeric symbols; and means for generating at least one topologically determined list of candidate alphanumeric symbols.

26. The system of claim 25, wherein the means for generating the reduced list of candidate alphanumeric symbols from the plurality of candidate lists comprises:

means for generating the at least one structurally determined list of candidate alphanumeric symbols based on structural features of the unrecognized alphanumeric symbol;

means for generating the at least one topologically determined list of candidate alphanumeric symbols based on topological features of the unrecognized alphanumeric symbol; and means for generating the reduced list of candidate alphanumeric symbols via the intersection of the structurally and topologically determined lists of candidate alphanumeric symbols.

27. The system of claim 17, wherein the means for validating the best candidates automatically validates the best candidate.

* * * * *

UNITED STATES PATENT AND TRADEMARK OFFICE
CERTIFICATE OF CORRECTION

| | | |
|---|---|---|
| PATENT NO. | : 7,218,782 B1 | Page 1 of 2 |
| APPLICATION NO. | : 10/419480 | |
| DATED | : May 15, 2007 | |
| INVENTOR(S) | : Kamran Reihani | |

It is certified that error appears in the above-identified patent and that said Letters Patent is hereby corrected as shown below:

On the Figures page, Sheet 102, FIG. 53:

Delete: FIG. 53 content (page)
Insert: Attached copy for FIG. 53, Sheet 102 of 144

On the Claims page, Column 81, line 55, item 7:

Delete: (b)(f)
Insert: (b)-(f)

On the Claims page, Column 84, line 14, item 23:

Delete: (b)(f)
Insert: (b)-(f)

Signed and Sealed this

Nineteenth Day of August, 2008

JON W. DUDAS
*Director of the United States Patent and Trademark Office*

COLLECTIVE EVIDENCE DATA BASE:
EXAMPLE: COMPUTE "pt_code"
"fromSubcc"  →  "toSubcc"
   <6>              <5>
When: "codeCnc = 2"  →  pt_code = ptCode[5][2][6] = 'D';
When: "codeCnc = 0"  →  pt_code = ptCode[5][0][6] = 'U';
"fromSubcc"  →  "toSubcc"
   <6>              <7>
When: "codeCnc = 2"  →  pt_code = ptCode[7][2][6] = 'U';
When: "codeCnc = 0"  →  pt_code = ptCode[7][0][6] = 'D';
FIG. 53

UNITED STATES PATENT AND TRADEMARK OFFICE
CERTIFICATE OF CORRECTION

PATENT NO. : 7,218,782 B1  Page 1 of 1
APPLICATION NO. : 10/419480
DATED : May 15, 2007
INVENTOR(S) : Reihani It is certified that error appears in the above-identified patent and that said Letters Patent is hereby corrected as shown below:

1) On the title page, item 76, 'Inventor':

Delete:   Inventor:   Kamran Reihani, 2600 Sandigale Dr., Las Cruces, NM (US) 88011
   Insert:   Inventor:   Kamran Reihani, 214 Providence Glen Dr., Chapel Hill, NC (US) 27514

Signed and Sealed this

Fourth Day of November, 2008

JON W. DUDAS
*Director of the United States Patent and Trademark Office*